US008091621B2

(12) United States Patent  (10) Patent No.: US 8,091,621 B2
Zobel et al.  (45) Date of Patent: Jan. 10, 2012

(54) FLAT TUBE, FLAT TUBE HEAT EXCHANGER, AND METHOD OF MANUFACTURING SAME

(75) Inventors: Werner Zobel, Boeblingen (DE); Jens Nies, Holzgerlingen (DE); Bernhard Stephan, Altenriet (DE); Charles James Rogers, Racine, WI (US); Thomas Feldhege, Leinfelden-Echterdingen (DE)

(73) Assignee: Modine Manufacturing Company, Racine, WI (US)

( * ) Notice: Subject to any disclaimer, the term of this patent is extended or adjusted under 35 U.S.C. 154(b) by 155 days.

(21) Appl. No.: 12/176,188

(22) Filed: Jul. 18, 2008

(65) Prior Publication Data

US 2009/0020278 A1   Jan. 22, 2009

Related U.S. Application Data

(63) Continuation of application No. PCT/US2007/060769, filed on Jan. 19, 2007.

(30) Foreign Application Priority Data

| Jan. 19, 2006 | (DE) | 10 2006 002 627 |
| Jan. 20, 2006 | (DE) | 10 2006 002 789 |
| Jan. 21, 2006 | (DE) | 10 2006 002 932 |
| Feb. 14, 2006 | (DE) | 10 2006 006 670 |
| Apr. 8, 2006 | (DE) | 10 2006 016 711 |
| Jun. 27, 2006 | (DE) | 10 2006 029 378 |
| Jul. 13, 2006 | (DE) | 10 2006 032 406 |
| Jul. 20, 2006 | (DE) | 10 2006 033 568 |
| Jul. 29, 2006 | (DE) | 10 2006 035 210 |
| Sep. 2, 2006 | (DE) | 10 2006 041 270 |
| Sep. 9, 2006 | (DE) | 10 2006 042 427 |

(51) Int. Cl.
*F28F 1/40*  (2006.01)

(52) U.S. Cl. ............ 165/177; 29/890.049
(58) Field of Classification Search .......... 165/177; 29/890.053, 890.049
See application file for complete search history.

(56) References Cited

U.S. PATENT DOCUMENTS 1,242,652 A   9/1917  Capell
(Continued)

FOREIGN PATENT DOCUMENTS

DE   273441   7/1912
(Continued)

OTHER PUBLICATIONS

PCT/US2007/060790 International Preliminary Report on Patentability dated Jul. 31, 2008 (4 pages).
(Continued)

*Primary Examiner* — Teresa Walberg
(74) *Attorney, Agent, or Firm* — Michael Best & Friedrich LLP

(57) ABSTRACT

A number of flat tubes, flat tube heat exchangers, and methods of manufacturing both are described and illustrated. The flat tubes can be constructed of one, two, or more pieces of sheet material. A profiled insert integral with the flat tube or constructed from another sheet of material can be used to define multiple flow channels through the flat tube. The flat tubes can be constructed of relatively thin material, and can be reinforced with folds of the flat tube material and/or of an insert in areas subject to higher pressure and thermal stresses. Also, the relatively thin flat tube material can have a corrosion layer enabling the material to resist failure due to corrosion. Heat exchangers having such flat tubes connected to collection tubes are also disclosed, as are manners in which such tubes can be provided with fins.

24 Claims, 55 Drawing Sheets

U.S. PATENT DOCUMENTS

| | | | |
|---|---|---|---|
| 1,599,395 A | 9/1926 | Hards | |
| 2,222,842 A | 11/1940 | Humphrey | |
| 2,252,210 A | 8/1941 | Seemiller | |
| 2,373,218 A | 4/1945 | Arnold | |
| 2,444,463 A | 7/1948 | Nordquist | |
| 2,757,628 A | 8/1956 | Johnston | |
| 2,912,749 A * | 11/1959 | Bauernfeind et al. | ... 29/890.039 |
| 3,021,804 A | 2/1962 | Simpelaar | |
| 3,053,511 A * | 9/1962 | Godfrey | ............ 165/133 |
| 3,229,760 A | 1/1966 | Hurter et al. | |
| 3,687,193 A | 8/1972 | Wright | |
| 3,734,135 A | 5/1973 | Mosier | |
| 4,197,625 A | 4/1980 | Jahoda | |
| 4,215,744 A | 8/1980 | Bowles | |
| 4,470,452 A | 9/1984 | Rhodes | |
| 4,501,321 A | 2/1985 | Real et al. | |
| 4,570,700 A * | 2/1986 | Ohara et al. | ............ 165/134.1 |
| 4,805,693 A | 2/1989 | Flessate | |
| 4,901,908 A * | 2/1990 | Negura et al. | ............ 228/183 |
| 4,949,543 A | 8/1990 | Cottone et al. | |
| 5,036,909 A | 8/1991 | Whitehead et al. | |
| 5,058,266 A | 10/1991 | Knoll | |
| 5,179,770 A | 1/1993 | Block et al. | |
| 5,185,925 A | 2/1993 | Ryan et al. | |
| 5,186,250 A | 2/1993 | Ouchi et al. | |
| 5,351,750 A | 10/1994 | Garcia | |
| 5,386,629 A | 2/1995 | Ouchi et al. | |
| 5,441,106 A | 8/1995 | Yukitake | |
| 5,456,006 A | 10/1995 | Study | |
| 5,457,885 A | 10/1995 | Ohashi et al. | |
| 5,692,300 A * | 12/1997 | Conn et al. | ............ 29/890.053 |
| 5,799,727 A | 9/1998 | Liu | |
| 6,119,341 A | 9/2000 | Kato et al. | |
| 6,192,977 B1 | 2/2001 | Dey et al. | |
| 6,209,202 B1 | 4/2001 | Rhodes et al. | |
| 6,261,706 B1 | 7/2001 | Fukuda et al. | |
| 6,308,775 B1 | 10/2001 | Naumann | |
| 6,425,261 B2 | 7/2002 | Burk et al. | |
| 6,467,170 B2 | 10/2002 | Kato et al. | |
| 6,470,570 B2 | 10/2002 | Prater et al. | |
| 6,475,301 B1 | 11/2002 | Grab et al. | |
| 6,502,305 B2 | 1/2003 | Martins et al. | |
| 6,513,586 B1 | 2/2003 | Haussmann | |
| 6,527,045 B1 | 3/2003 | Osakabe et al. | |
| 6,537,388 B1 | 3/2003 | Wynns et al. | |
| 6,546,774 B2 | 4/2003 | Granetzke | |
| 6,640,886 B2 | 11/2003 | Lamich | |
| 6,640,887 B2 | 11/2003 | Abell et al. | |
| 6,666,265 B1 | 12/2003 | Kato et al. | |
| 6,988,539 B2 | 1/2006 | Kato et al. | |
| 7,107,680 B2 | 9/2006 | Ueda | |
| 7,117,936 B2 | 10/2006 | Ohata et al. | |
| 7,135,239 B2 | 11/2006 | Rajagopalan | |
| 7,152,671 B2 | 12/2006 | Shibagaki et al. | |
| 7,204,302 B2 | 4/2007 | Shibagaki et al. | |
| 7,487,589 B2 | 2/2009 | Smith et al. | |
| 7,665,512 B2 | 2/2010 | Brost et al. | |
| 2003/0024694 A1 | 2/2003 | Lamich | |
| 2004/0035910 A1 | 2/2004 | Dockus et al. | |
| 2004/0108305 A1 | 6/2004 | Harnisch et al. | |
| 2004/0194943 A1 | 10/2004 | Yamauchi | |
| 2004/0206482 A1 | 10/2004 | Bang | |
| 2005/0006082 A1 | 1/2005 | Brost et al. | |
| 2005/0077033 A1 | 4/2005 | Schmalzried | |
| 2005/0092476 A1 | 5/2005 | Hu et al. | |
| 2005/0133210 A1 | 6/2005 | Inagaki et al. | |
| 2005/0247444 A1 | 11/2005 | Ohata et al. | |
| 2006/0086491 A1 | 4/2006 | Ueda | |
| 2006/0230617 A1 | 10/2006 | Kent et al. | |
| 2006/0243429 A1 | 11/2006 | Chu et al. | |
| 2006/0265874 A1 | 11/2006 | Hashimoto et al. | |
| 2006/0283585 A1 | 12/2006 | Smith et al. | |
| 2007/0095514 A1 | 5/2007 | Inoue et al. | |
| 2009/0014164 A1 | 1/2009 | Zobel et al. | |
| 2009/0014165 A1 | 1/2009 | Zobel et al. | |
| 2009/0019689 A1 | 1/2009 | Zobel et al. | |
| 2009/0019694 A1 | 1/2009 | Zobel et al. | |
| 2009/0019695 A1 | 1/2009 | Zobel et al. | |
| 2009/0019696 A1 | 1/2009 | Zobel et al. | |
| 2009/0020277 A1 | 1/2009 | Zobel et al. | |
| 2009/0056927 A1 | 3/2009 | Zobel et al. | |
| 2009/0218085 A1 | 9/2009 | Rogers et al. | |
| 2009/0260794 A1 | 10/2009 | Minami et al. | |
| 2010/0243225 A1 | 9/2010 | Zobel et al. | |

FOREIGN PATENT DOCUMENTS

| | | |
|---|---|---|
| DE | 401893 | 9/1924 |
| DE | 934644 | 11/1955 |
| DE | 935487 | 11/1955 |
| DE | 2113581 | 12/1972 |
| DE | 3809944 | 10/1989 |
| DE | 4031577 | 4/1992 |
| DE | 4340378 | 6/1994 |
| DE | 29614186 | 12/1997 |
| DE | 19641144 | 4/1998 |
| DE | 19753724 | 6/1999 |
| DE | 10137334 | 2/2003 |
| DE | 10200586 | 7/2003 |
| DE | 102004057407 | 8/2005 |
| EP | 0179646 | 4/1986 |
| EP | 0765701 | 4/1997 |
| EP | 0859209 | 8/1998 |
| EP | 0907062 | 4/1999 |
| EP | 1074807 | 2/2001 |
| EP | 1306156 | 5/2003 |
| EP | 1362649 | 11/2003 |
| EP | 1640684 | 3/2006 |
| EP | 1684041 | 7/2006 |
| FR | 2690233 | 10/1993 |
| FR | 2811746 | 1/2002 |
| GB | 444964 | 3/1936 |
| GB | 683161 | 11/1952 |
| GB | 2203677 | 10/1988 |
| GB | 2354960 | 4/2001 |
| GB | 2426727 | 12/2006 |
| JP | 57105690 | 7/1982 |
| JP | 58000094 | 1/1983 |
| JP | 60247426 | 12/1985 |
| JP | 7019779 | 1/1995 |
| JP | 10160375 | 6/1998 |
| JP | 2001050677 | 2/2001 |
| JP | 2002350083 | 12/2002 |
| JP | 2004092940 | 3/2004 |
| JP | 2005214511 | 8/2005 |
| JP | 2006064345 | 3/2006 |
| RU | 2032878 | 4/1995 |
| SU | 340209 | 1/1972 |
| SU | 616521 | 7/1978 |
| WO | 03/060412 | 7/2003 |
| WO | 2004/080640 | 9/2004 |
| WO | 2004/085948 | 10/2004 |
| WO | 2005/033606 | 4/2005 |
| WO | 2006/116857 | 11/2006 |
| WO | 2007/009588 | 1/2007 |
| WO | 2008/011115 | 1/2008 |

OTHER PUBLICATIONS

PCT/US2007/060790 International Search Report and Written Opinion dated Nov. 20, 2007 (6 pages).

PCT/US2007/060789 International Preliminary Report on Patentability dated Jul. 22, 2008 (8 pages).

PCT/US2007/060789 International Search Report and Written Opinion dated Nov. 15, 2007 (10 pages).

PCT/US2007/060774 International Preliminary Report on Patentability dated Jul. 22, 2008 (5 pages).

PCT/US2007/060774 International Search Report and Written Opinion dated Oct. 3, 2007 (8 pages).

PCT/US2007/060785 International Search Report and Written Opinion dated Apr. 1, 2008 (7 pages).

PCT/US2007/060785 International Preliminary Report on Patentability dated Jul. 31, 2008 (5 pages).

PCT/US2007/060769 International Preliminary Report on Patentability dated Jul. 22, 2008 (5 pages).

PCT/US2007/060769 International Search Report and Written Opinion dated May 30, 2008 (6 pages).

Extended European Search Report for Application No. 07717324.3 dated Apr. 29, 2010 (5 pages).
PCT/US07/16396 International Search Report and Written Opinion dated Aug. 20, 2008 (8 pages).
PCT/US2007/016396 International Preliminary Report on Patentability dated Jan. 20, 2009 (7 pages).
First Office Action from the State Intellectual Property Office of China for Application No. 200780009794.6 dated Jan. 8, 2010 (English Translation—7 pages).
First Office Action from the State Intellectual Property Office of China for Application No. 200810174245.0 dated Apr. 28, 2010 (English Translation—5 pages).
First Office Action from the State Intellectual Property Office of China for Application No. 200780009801.2 dated Nov. 27, 2009 (English Translation—5 pages).
First Office Action from the State Intellectual Property Office of China for Application No. 200780009913.8 dated Jan. 8, 2010 (English Translation—6 pages).
Office Action from the United States Patent Office for U.S. Appl. No. 12/176,186 dated Jun. 9, 2010 (9 pages).
Office Action from the United States Patent Office for U.S. Appl. No. 12/176,943 dated May 27, 2010 (15 pages).
Office Action from the United States Patent Office for U.S. Appl. No. 12/176,929 dated May 21, 2010 (16 pages).
Office Action from the United States Patent Office for U.S. Appl. No. 12/176,933 dated May 27, 2010 (7 pages).
Office Action from the United States Patent Office for U.S. Appl. No. 12/176,937 dated May 24, 2010 (14 pages).

* cited by examiner

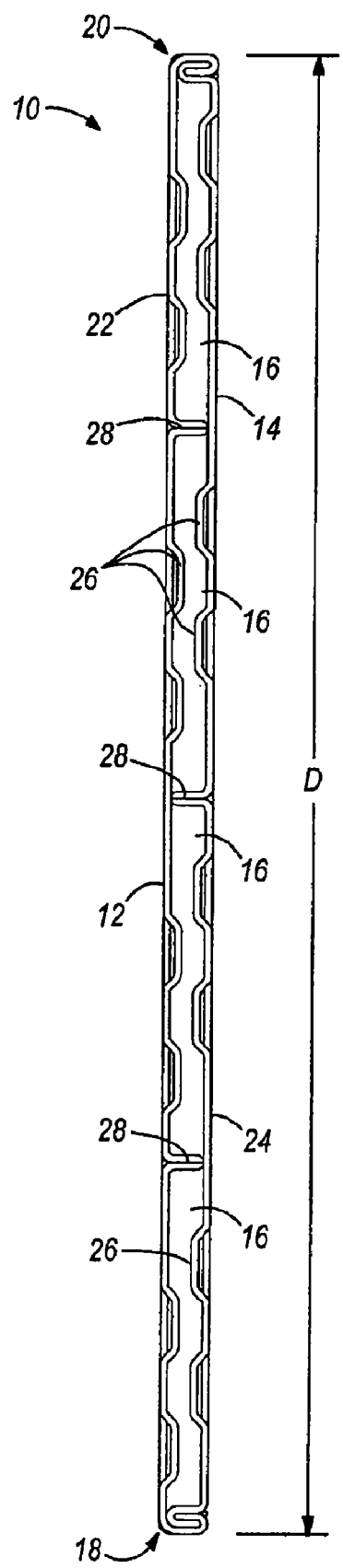
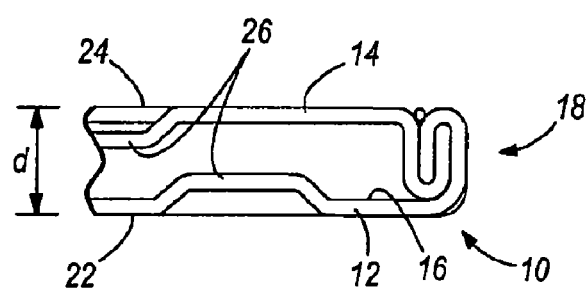
FIG. 2
FIG. 1

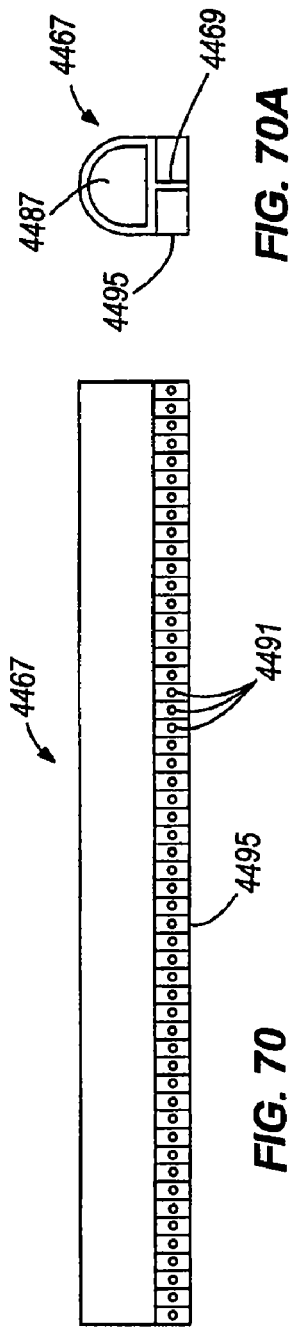
FIG. 70
FIG. 70A
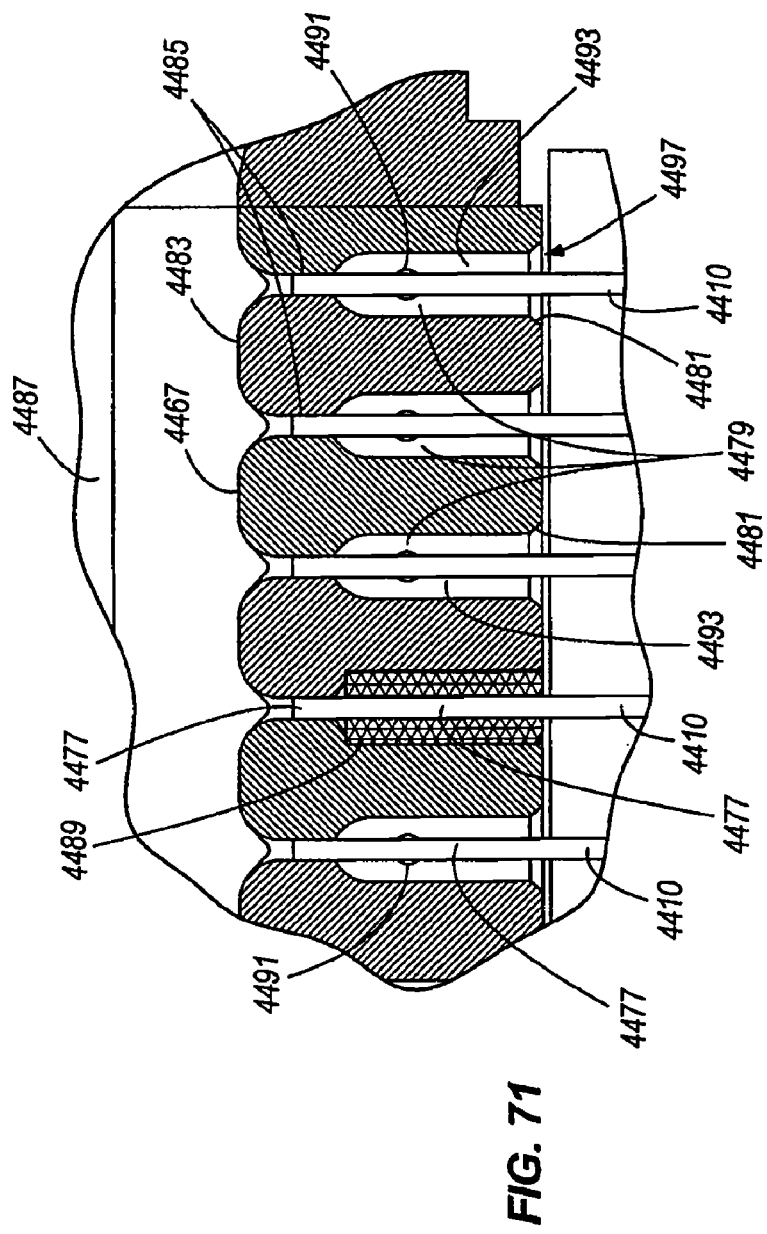
FIG. 71

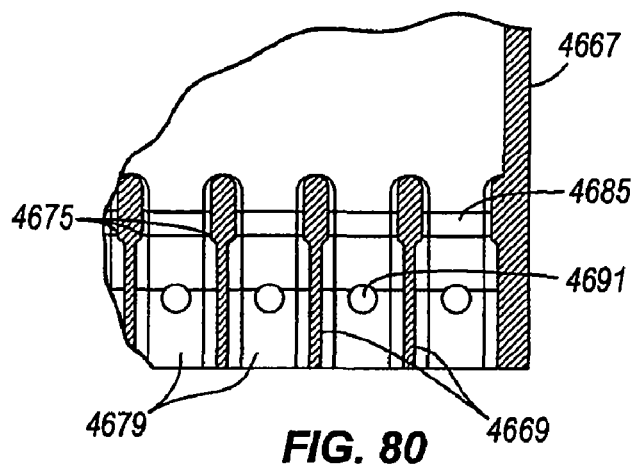
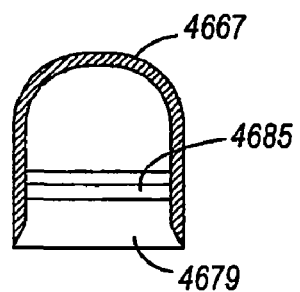
FIG. 80    FIG. 80A
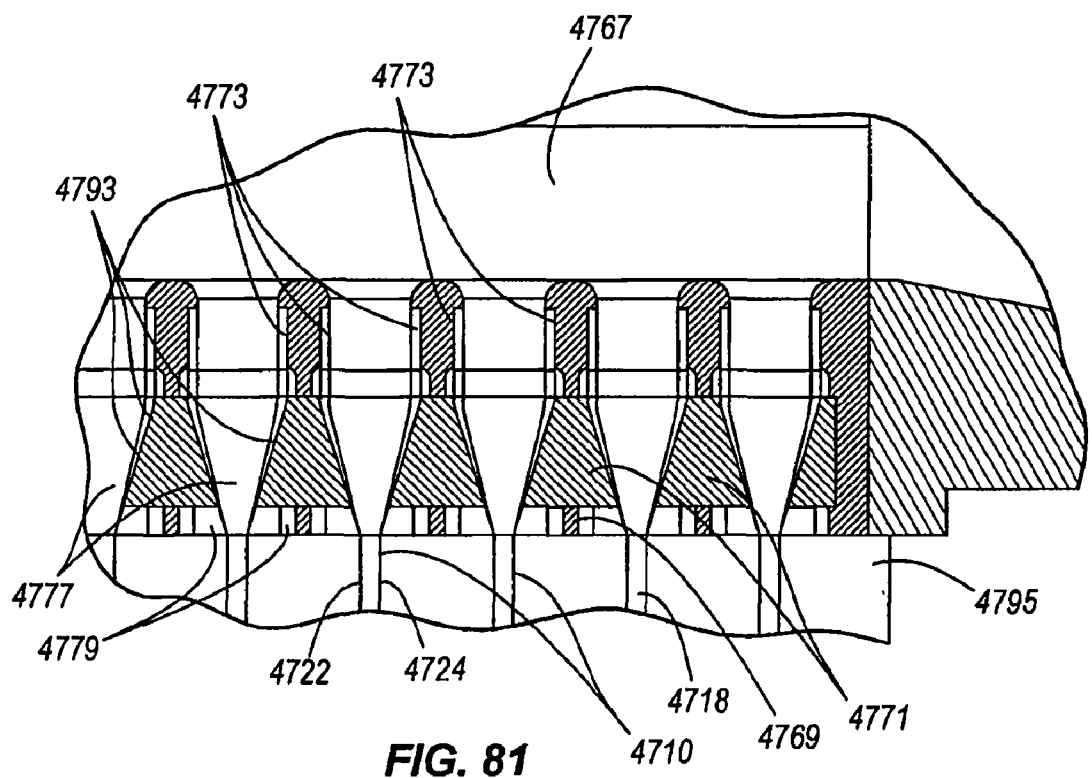
FIG. 81

US 8,091,621 B2

FLAT TUBE, FLAT TUBE HEAT EXCHANGER, AND METHOD OF MANUFACTURING SAME

CROSS-REFERENCE TO RELATED APPLICATIONS

This is a continuation application of International Patent Application No. PCT/US2007/060769, filed 19 Jan. 2007. Priority is hereby claimed to German Patent Application No. DE 10 2006 002 627.6, filed Jan. 19, 2006, and to German Patent Application No. DE 10 2006 002 789.2, filed on Jan. 20, 2006, and to German Patent Application No. DE 10 2006 002 932.1, filed on Jan. 21, 2006, and to German Patent Application No. DE 10 2006 006 670.7, filed Feb. 14, 2006, and to German Patent Application No. DE 10 2006 016 711.2, filed Apr. 8, 2006, and to German Patent Application No. DE 10 2006 029 378.9, filed Jun. 27, 2006, and to German Patent Application No. DE 10 2006 032 406.4, filed Jul. 13, 2006, and to German Patent Application No. DE 10 2006 033 568.6, filed Jul. 20, 2006, and to German Patent Application No. DE 10 2006 035 210.6, filed Jul. 29, 2006, and to German Patent Application No. DE 10 2006 041 270.2, filed Sep. 2, 2006, and to German Patent Application No. DE 10 2006 042 427.1, filed Sep. 9, 2006, the entire contents of which are incorporated herein by reference.

SUMMARY

In some embodiments, the present invention provides a heat exchanger tube including a tube body at least partially defined by a sheet of material having a thickness of no greater than about 0.15 mm, the tube body having a thickness, a width larger than and substantially perpendicular to the thickness, an outer wall defined at least in part by the sheet of material, an internal chamber having a maximum width extending in a direction of the width of the tube body, a broad side, and first and second narrow sides each defining an interior surface of the internal chamber, the sheet of material being bent to at least partially define the first narrow side of the tube body. The heat exchanger of the present invention can also include a first portion of the outer wall overlapping a second portion of the outer wall at the second narrow end and defining a seam, wherein the first portion has an end at a location along the width of the tube, and wherein the internal chamber extends from a center of the tube past the location to the interior surface of the second narrow side.

The present invention also provides a heat exchanger tube including a sheet of material at least partially forming an outer wall of a tube body having a first narrow side, a second narrow side, and a broad side, the sheet of material having a thickness of less than about 0.15 mm and being folded at the first narrow side of the tube body, the first narrow side and the second narrow side being reinforced such that each of the first narrow side and the second narrow side have a thickness greater than the thickness of the sheet of material.

In addition, the present invention provides method of forming a heat exchanger tube including the act of shaping a sheet of material having a thickness of less than about 0.15 mm to form a tube body having a thickness, a width larger than and substantially perpendicular to the thickness, an outer wall defined at least in part by the sheet of material, an internal chamber having a maximum width extending in a direction of the width of the tube body, a broad side, and first and second narrow sides each defining an interior surface of the internal chamber. The method can also include the acts of bending the sheet of material to at least partially define the first narrow side of the tube body, and overlapping a first portion of the outer wall with a second portion of the outer wall at the second narrow end and forming a seam, the first portion of the outer wall having an end at a location along the width of the tube, and the internal chamber extending from a center of the tube past the location to the interior surface of the second narrow side.

BRIEF DESCRIPTION OF THE DRAWINGS

FIG. 1 is a side view of a tube according to some embodiments of the present invention.

FIG. 2 is an enlarged view of an end of the tube shown in FIG. 1.

FIG. 70 is a side view of a collection tank according to an embodiment of the present invention.

FIG. 70A is an end view of the collection tank shown in FIG. 70.

FIG. 71 is a detail view of a heat exchanger having the collection tank illustrated in FIGS. 70 and 70A.

FIG. 80 is a detail side view of the collection tank of the heat exchanger illustrated in FIGS. 78 and 79.

FIG. 80A is an end view of the collection tank illustrated in FIGS. 78-80.

FIG. 81 is a detail side view of a heat exchanger having a collection tank according to another embodiment of the present invention.

DETAILED DESCRIPTION

Figure 3:
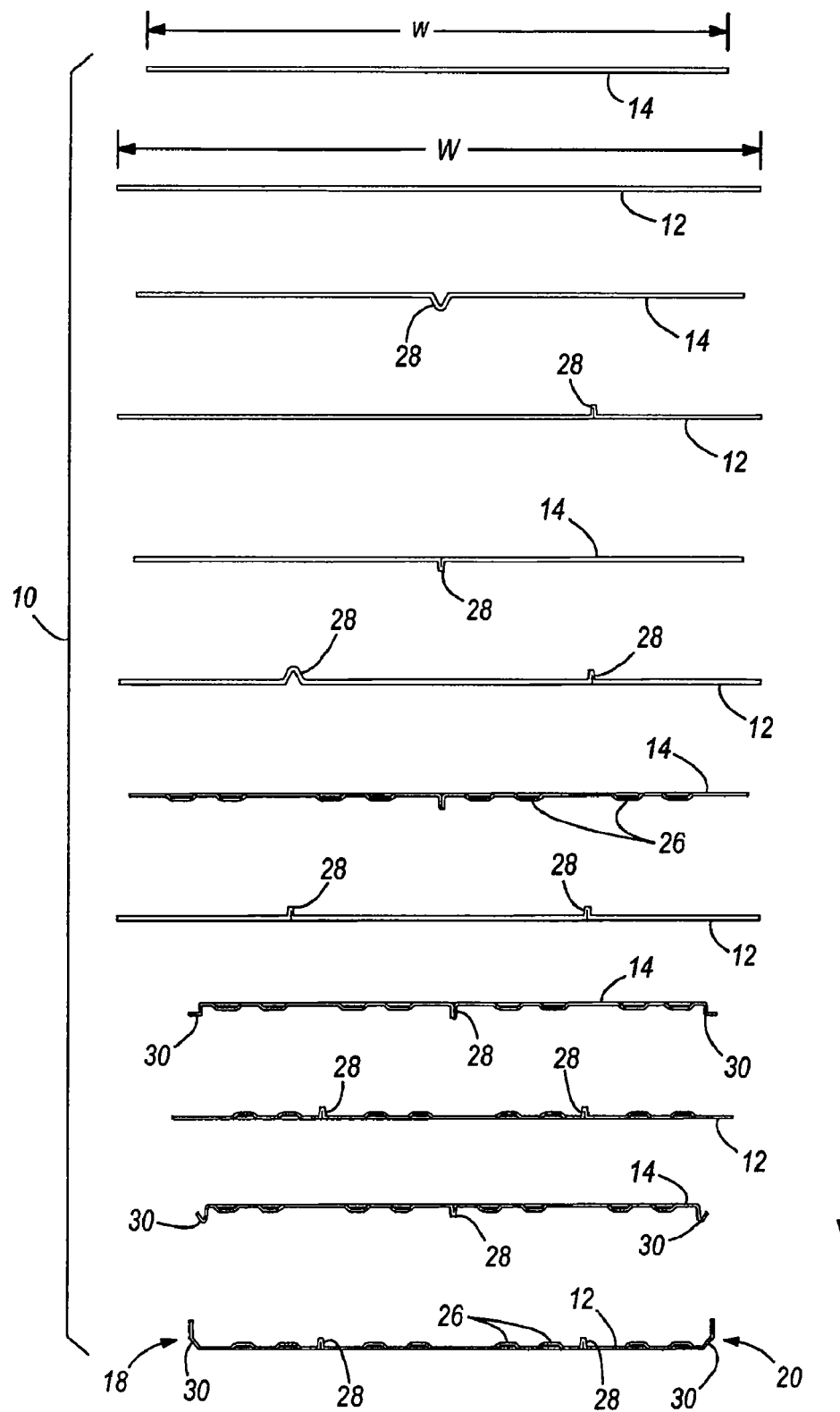
FIG. 3 schematically illustrates a set of exemplary manufacturing steps that can be used to form the tube shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As described in greater detail below, many embodiments of the present invention relate to or are based upon the use of tubes having a substantially flat cross-sectional shape taken along a plane perpendicular to a longitudinal axis of the tube. In particular, each such tube can have a major dimension and a smaller minor dimension perpendicular to the major dimension. These dimensions are sometimes referred to herein as being "diameters", although the use of the term "diameter" is not intended to alone indicate or imply that the feature referred to is round, rotund, or otherwise has any particular shape. Rather, the term "diameter" is only used to refer to a largest dimension of the tube in the direction and location indicated. Each such tube can have two opposing walls defining the faces of the tube (referred to herein as the "broad sides" of the tube), and two shorter and more stable walls (referred to herein as the "narrow sides" of the tube) joining the broad sides. Collectively, the broad and narrow sides of the tube define an interior space through which fluid can flow in any state, including without limitation gas, liquid, vapor, and any combination thereof at any pressure or vacuum (including no pressure or vacuum).

Another feature of the flat tubes employed in many embodiments of the present invention (described in greater detail below) is the relatively low thickness of material used to construct at least some of the walls of the flat tubes. In some embodiments, the wall material of the flat tubes has a thickness of no greater than about 0.20 mm (0.007874 in). In still other embodiments, the wall material of the flat tubes has a thickness of no greater than about 0.15 mm (0.0059055 in).

The relatively low wall material thickness can result in good thermal properties of the flat tubes. Also, by utilizing one or more of the flat tube features described herein, the inventors have discovered that a number of different flat tubes having various characteristics adapted for a variety of applications can be constructed using significantly reduced material while retaining strength and heat exchange properties of heavier conventional flat tubes. In some embodiments, a wall material thickness of the flat tubes of no less than about 0.050 mm (i.e., no less than about 0.0019685 in) provides good strength and corrosion resistance performance, while in other embodiments, a wall material thickness of the flat tubes of no less than about 0.030 mm (0.00118 in) can be used.

As explained in greater detail below, the heat exchanger tubes and other portions of heat exchangers described herein can be manufactured using a number of manufacturing techniques and processes and can include corrosion protection features, such as, for example, those techniques and processes described below and illustrated in FIGS. 92-95. A number of manufacturing processes and techniques and the corrosion protection features referenced hereinafter are particularly advantageous when applied to heat exchanger tubes and portions of heat exchangers having significantly reduced material thickness. In addition, such techniques, processes, and corrosion protection features provide significant advantages relating to the overall performance of flat tubes and heat exchangers made from such material.

Many embodiments of the present invention utilize flat tubes having major and minor diameters as described above (indicated as D and d, respectively, in the following text) that provide unique advantages in many applications. When used, for example, in conjunction with the material thicknesses just described and in conjunction with other features of the flat tubes described in the various embodiments below, flat tubes adapted for a number of different applications can be produced. Also, the ability to produce flat tubes having some of the major and minor dimensions D, d described herein is facilitated by the use of the relatively thin wall material described above.

For example, in some embodiments of the present invention, the major dimension D (i.e., the width of the flat tube in the illustrated embodiments herein) is no less than about 10 mm (0.39370 in). Also, this major dimension D is no greater than about 300 mm (3.9370 in) in some embodiments. In other embodiments, the major dimension D is no greater than about 200 mm (7.87402 in). As another example, in some embodiments of the present invention, the minor diameter d (i.e., the thickness of the flat tube in the illustrated embodiments herein) is no less than about 0.7 mm (0.02756 in). Also, this minor dimension d is no greater than about 10 mm (0.39370 in) in some embodiments. In other embodiments, the minor dimension d is greater than about 7 mm (0.2756 in). Such major and minor dimensions apply to any of the flat tube embodiments described and/or illustrated herein.

In many embodiments, the major and minor dimensions D, d are dependent at least in part upon the applications of the flat tubes. For example, in condenser applications, the major diameter D of the flat tube is no less than about 10 mm (0.39370 in) in some embodiments. Also, a major diameter D of the flat tube in some condenser applications is no greater than about 20 mm (0.78740 in). The minor diameter d for some condenser applications of the flat tube is no less than about 1.0 mm (0.039370 in). Also, a minor diameter d of the flat tube in some condenser applications is no greater than about 2.0 mm (0.078740 in). As another example, in radiator applications, the major diameter D of the flat tube is no less than about 10 mm (0.39370 in) in some embodiments. Also, a major diameter D of the flat tube in some radiator applications is no greater than about 200 mm (7.8740 in). The minor diameter d for some radiator applications of the flat tube is no less than about 0.7 mm (0.027559 in). Also, a minor diameter d of the flat tube in some radiator applications is no greater than about 2.0 mm (0.078740 in) As another example, in charge air cooler applications, the major diameter D of the flat tube is no less than about 20 mm (0.78740 in) in some embodiments. Also, a major diameter D of the flat tube in some charge air cooler applications is no greater than about 160 mm (6.29921 in). The minor diameter d for some charge air cooler applications of the flat tube is no less than about 4.0 mm (0.15748 in). Also, a minor diameter d of the flat tube in some charge air cooler applications is no greater than about 10.0 nm (0.39370 in).

Still other applications of flat tubes according to any of the embodiments described herein include oil coolers. In oil cooler applications, the major diameter D of the flat tube is no less than about 10 mm (0.49470 in) in some embodiments. Also, a major diameter D of the flat tube in some oil cooler applications is no greater than about 150 mm (5.90551 in). The minor diameter d for some oil cooler applications of the flat tube is no less than about 1.5 mm (0.05906 in). Also, a minor diameter d of the flat tube in some oil cooler applications is no greater than about 4.0 mm (0.15748 in). As yet another example, in evaporator applications, the major diameter D of the flat tube is no less than about 30 mm (1.18110 in) in some embodiments. Also, a major diameter D of the flat tube in some evaporator applications is no greater than about 75 mm (2.95276 in). The minor diameter d for some evaporator applications of the flat tube is no less than about 1.0 mm (0.039370 in). Also, a minor diameter d of the flat tube in some evaporator applications is no greater than about 2.0 mm (0.078740 in). It should be noted that further applications (e.g., gas coolers) of the flat tubes described and/or illustrated herein are possible, and fall within the spirit and scope of the present invention.

Many of the flat tube embodiments described below and illustrated herein are constructed of a metal including aluminum (e.g., aluminum or an aluminum alloy). However, a number of other types of metals can instead be utilized while still providing the strength, heat transfer, and manufacturability characteristics desired for use in heat exchange devices. In some embodiments, the metal material of the flat tubes is provided with a brazing material coating. The brazing material coating can have a number of different possible thicknesses, and in some embodiments is no less than about 10% of the thickness of the flat tube wall material to produce good performance results. Also, in some embodiments, the brazing material coating is no greater than about 30% of the thickness of the flat tube wall material. In other embodiments where the flat tubes are to be soldered rather than brazed, the metal material of the flat tubes can be provided with a soldering material coating. A number of different securing operations (brazing, welding, soldering, and the like) can be used to construct any of the various flat tubes and heat exchanger assemblies described and/or illustrated herein. However, portions of the following text refer only to brazing, although it should be understood that other types of securing operations (including welding and soldering) are equally applicable in such embodiments.

A number of the flat tube features mentioned above relate to the construction of the tube walls using relatively thin sheet material. In some embodiments, significant enhancements to thin-walled flat tube performance is generated by providing either or both of the stable narrow sides with folds that are substantially perpendicular or substantially parallel to the broad sides of the flat tube. Such folds can be formed, for example, by rolling or folding adjacent longitudinal edges of sheet metal upon or into one another. In those embodiments of the present invention in which either or both narrow sides of the flat tube have folds that are substantially parallel to the broad sides of the flat tube, such folds can have the same or different lengths with respect to one another. As will also be described in greater detail below, folds at the narrow sides of a flat tube can be shaped to hook or inter-engage with one another—a feature that can be helpful in the manufacture of the flat tube and/or of a heat exchanger employing the flat tube.

In many of the following embodiments, flat tubes are disclosed having folded narrow sides and also having other folds and/or deformations formed within the flat tubes. In a manufacturing process, the folds that form the narrow sides can be produced subsequent to the manufacture of such other folds and/or deformations, although other manufacturing alternatives are possible. Also, it should be noted that the folds formed within the flat tube can be multiple folds, and in some embodiments are arranged tightly against or abutting one another.

A first embodiment of a flat tube 10 according to the present invention is illustrated in FIGS. 1-5. The flat tube 10 is constructed of two portions of sheet material 12, 14 shaped to define internal flow channels 16. Each of the two portions 12, 14 can be formed from one endless strip of material or coil passed through a manufacturing line having a material cutting device (e.g., laser, saw, water jet, blade, and the like) for producing two strips that are then joined together as will be described below. Alternatively, the two portions 12, 14 can be formed from two endless strips of material or coils passed through a manufacturing line. In either case, the manufacturing line can be equipped with roll sets (as illustrated by way of example below) or other sheet forming elements to shape the strips as will be described in greater detail below. As used herein and in the appended claims, the term "endless" does not literally mean that the element or product referred to has a limitless supply. Rather, the term "endless" means only that the element or product is received from a much greater supply of continuous material in some upstream bulk form, such as in supply coils of material.

Although the portions 12, 14 can have thicknesses falling within any of the ranges described above, the portions 12, 14 in the illustrated embodiment of FIGS. 1-5 have a wall thickness of about 0.10 mm (0.0039369 in) by way of example. In some embodiments, the portions 12, 14 include material formed of aluminum or an aluminum alloy. However, other portion materials (described above) can instead be utilized in other embodiments. Either or both sides of the portions 12, 14 can be coated with a brazing material coating, such as a layer of brazing coating that is about 10-30% of the portion thickness.

As shown in FIG. 2, the flat tube 10 of the illustrated embodiment defines a small diameter d. Using the wall thicknesses described earlier, the inventors have discovered that a small diameter d of at least about 0.8 mm (0.031496 in) provides good performance results in many applications. Also using the wall thicknesses described earlier, the inventors have discovered that a small diameter d of no greater than about 2.0 mm (0.07874 in) provides good performance results in many applications. However, in some embodiments, a maximum small tube diameter d of no greater than about 1.5 mm (0.059055 in) is used. As shown in FIG. 1, the flat tube 10 of the illustrated embodiment also defines a large diameter D. Using the wall thicknesses described earlier, the inventors have discovered that a large diameter D of at least about 40 mm (1.5748 in) provides good performance results in many applications. Also using the wall thicknesses described earlier, the inventors have discovered that a large diameter D of no greater than about 45 mm (1.7717 in) provides good performance results in many applications. However, it is possible for the flat tube 10 to define a large diameter D and a small diameter d with other dimensions, including those described above with reference to all of the flat tubes disclosed herein, based at least in part upon the manufacturing processes used, the intended application of the tubes, and/or the use of thicker or thinner wall materials. For this purpose, the portions 12, 14 of particular widths can be made available, and the installations of the manufacturing line can be adjusted according to the desired diameters D and d.

The flat tube 10 in the illustrated embodiment of FIGS. 1-5 includes a first narrow side 18, a second narrow side 20, a first broad side 22, and a second broad side 24. The first broad side 22 and the second broad side 24 correspond to the portions 12 and 14, respectively. With particular reference to FIG. 1, the first broad side 22 and the second broad side 24 define a number of folds 28. The folds 28 extend from the first broad side 22 and the second broad side 24 to define four flow channels 16. In other embodiments, the flat tube 10 can include more or fewer flow channels 16 defined between the folds 28. Although the folds 28 can run in an uninterrupted and continuous manner along the entire length of the flat tube 10 to isolate adjacent flow channels 16 from one another. However, in other embodiments, the folds 28 can be interrupted or breached in one or more locations along their length in order to permit flow between flow channels 16. Regardless of whether the folds 28 are uninterrupted or interrupted, the folds 28 can strengthen the flat tube 10 against compression, and can strengthen the flat tube 10 against expansion in those embodiments in which the distal ends of the folds 28 are attached to a broad side 24 of the flat tube 10 (e.g., by brazing or in any other suitable manner). The folds 28 can also serve a rigidifying function in order to resist bending of the flat tube 10.

With reference now to FIGS. 1 and 2, the first broad side 22 and the second broad side 24 also define a number of protrusions 26. In other embodiments, neither side 22, 24 has such protrusions 26. The illustrated protrusions are generally convex bumps extending into the flow channels 16 of the flat tube 10, and can have any footprint desired, such as a round footprint, square, triangular or other polygonal footprint, any elongated footprint (e.g., elongated ribs running along any desired length of the flow channels, running transverse to the flow channels, and the like), irregular footprints, or footprints of any other shape (e.g., serpentine, zig-zag, chevron, and the like). Where used, the protrusions 26 can function to induce or sustain turbulence in the flat tube 10, thereby increasing heat transfer in such locations. Also, like the folds 28 described above, the protrusions 26 can serve a rigidifying function to help stiffen the broad sides 22, 24 of the flat tube 10. The protrusions 26 can be located in any pattern or patternless manner in the flat tube 10, and in some embodiments are located only in particular areas of the flow channels 16 to produce desired flow and heat transfer effects.

FIG. 3 schematically illustrates a set of exemplary manufacturing steps that can be used to form a flat tube 10 such as that illustrated in FIGS. 1, 2, 4, and 5. Starting with a first portion of material 12 defining a width W and a second portion of material 14 defining a smaller width w, a desired number of folds 28 are formed, and will help to define the flow channels 16. The folds 28 in the illustrated embodiment are formed on both portions 12, 14. In other embodiments, folds 28 are formed in only one of the portions 12, 14. Similarly, the protrusions 26 in the illustrated embodiment are formed on both portions 12, 14, although in other embodiments the protrusions 26 are formed in only one of the portions 12, 14. The folds 28 and protrusions 26 are located between the longitudinal edges of the material defining the portions 12, 14 (e.g., the longitudinal edges of the sheet metal defining the portions 12, 14).

Figure 4:
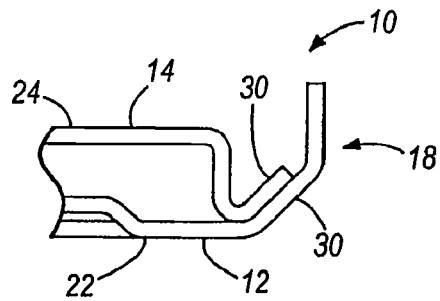
FIG. 4 is an enlarged view of a narrow side of the tube shown in FIG. 1.
Figure 5:
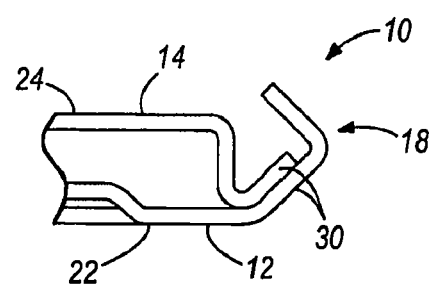
FIG. 5 is another enlarged view of the narrow side shown in FIG. 1.

The width W of the first portion 12 and the width w of the second portion 14 in the illustrated embodiment of FIGS. 1-5 are reduced during the course of forming the folds 28 and protrusions 26. It is to be understood that other deformations can be included in the exemplary manufacturing steps of FIG. 3 to generate other features of the flat tube 10, as desired. With continued reference to the manufacturing example of FIG. 3, an additional set of folds 30 is formed at each of the longitudinal edges of the portions 12, 14 subsequent to forming the necessary folds 28 and protrusions 26, thereby defining the narrow sides 18 and 20 of the flat tube 10. In other embodiments, either or both of the additional sets of folds 30 can be produced prior to or at the same time as the folds 28 and protrusions 26, although the process illustrated in FIG. 3 can provide significant manufacturing advantages based upon manufacturing line setup and operation. As best illustrated in FIGS. 4 and 5, the additional folds 30 of each of the portions 12, 14 engage one another to define the first narrow side 18 and the second narrow side 20 of the tube, respectively. By virtue of this engagement between the longitudinal edges of the portions 12, 14 of the two-piece flat tube 10, the portions 12, 14 can be held together even before the brazing or other securing operations on the portions 12, 14. More specifically, FIGS. 4 and 5 illustrate the folds 30 of one portion 14 defining a larger length than the folds 30 of the other portion 12. Thus, the folds 30 of one portion 12 can fold around the folds 14 of the other portion, as is also shown in FIG. 2.

As the illustrated embodiment of FIGS. 1-5 shows, in some embodiments, one of the portions 12 is sufficiently long to wrap around and thereby receive the longitudinal edge of the other portion 14 (e.g., whereby the longitudinal edge of one portion 14 is nested in the folded longitudinal edge of the other portion 12. In other embodiments, one of the portions 12 is instead only sufficiently long to overlap the longitudinal edges of the other portion 14. However, the embodiments described above in connection with FIGS. 1-5 can provide significant advantages relating to the assembly and manufacture of the flat tube 10, including the retention of the portions 12, 14 as described above, and a greater degree of narrow side reinforcement and strength based upon the greater thickness of material at the narrow sides 18, 20. In the illustrated embodiment of FIGS. 1-5, both narrow sides 18, 20 are provided with the same folded structure best show in FIGS. 2-5. However, in other embodiments, only one of the two narrow sides 18, 20 of the flat tube 10 has any of the folded structures described above. In such embodiments, the connection between the two portions 12, 14 at the other narrow side 20, 18 can be made in any other manner desired.

FIGS. 6-11 illustrate alternative constructions of flat tubes according to additional embodiments of the present invention. These embodiments employ much of the same structure and have many of the same properties as the embodiments of the flat tube described above in connection with FIGS. 1-5. Accordingly, the following description focuses primarily upon the structure and features that are different than the embodiments described above in connection with FIGS. 1-5. Reference should be made to the description above in connection with FIGS. 1-5 for additional information regarding the structure and features, and possible alternatives to the structure and features of the flat tubes illustrated in FIGS. 6-11 and described below. Structure and features of the embodiments shown in FIGS. 6-11 that correspond to structure and features of the embodiments of FIGS. 1-5 are designated hereinafter in respective hundreds series of reference numbers (e.g., 112, 212, 312, and the like).

FIGS. 6-11 illustrate other constructions of a narrow side 118, 218, 318, 418, 518, 618 and/or 120, 220, 320, 420, 520, 620. For ease of description, reference herein is made only to one of the narrow sides 118, 218, 318, 418, 518, 618 of each tube 110, 210, 310, 410, 510, 610, it being understood that the other narrow side 120, 220, 320, 420, 520, 620 can have the same or different structure, as desired. The narrow sides 118, 218, 318, 418, 518, 618 shown in FIGS. 6-11 can be manufactured in steps similar to those described above with reference to FIG. 3. Furthermore, each of the narrow sides 118, 218, 318, 418, 518, 618 shown in FIGS. 6-11 provide strength and/or stability to the tube 110, 210, 310, 410, 510, 610 compared with conventional flat tube designs, taking into consideration the relatively small thickness of the material used to construct the tube walls in some embodiments: about 0.050-0.15 mm (0.0019685-0.0059055 in) in some embodiments as described above, and about 0.030-0.15 mm (0.00118-0.0059055 in) in other embodiments, and other material thickness ranges described herein.

Figure 6:
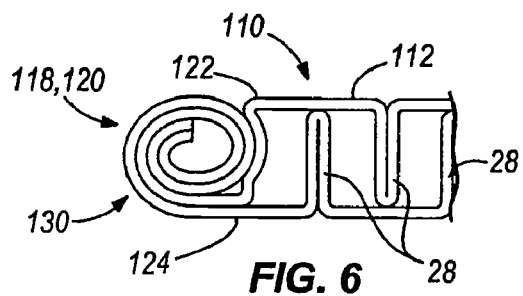
FIG. 6 is an enlarged view of a narrow side of a tube according to another embodiment of the present invention.
Figure 7:
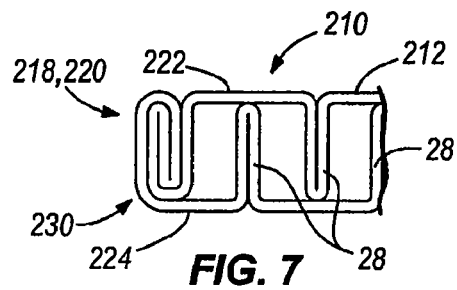
FIG. 7 is an enlarged view of a narrow side of a tube according to yet another embodiment of the present invention.
Figure 8:
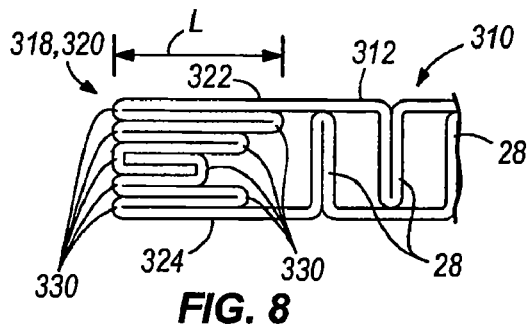
FIG. 8 is an enlarged view of a narrow side of a tube according to still another embodiment of the present invention.
Figure 9:
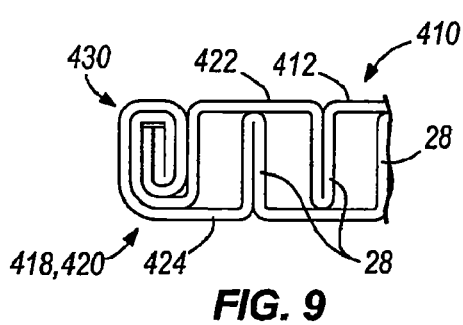
FIG. 9 is an enlarged view of a narrow side of a tube according to another embodiment of the present invention.

The narrow sides 118, 218, 418 of the flat tubes 110, 210, 310 shown in FIGS. 6, 7, and 9 can be formed by folding or rolling together adjacent longitudinal edges of the two tube portions 112, 212, 412 and 114, 214, 414, thereby defining a number of folds 130, 230, 330, 430, 530, 630. It should be noted that forms are referred to herein and in the appended claims as "folds" regardless of whether they were made by rolling or folding operations, and regardless of whether the resulting shapes are rotund (e.g., FIG. 6), stacked (e.g., FIGS. 7-9) or angular (e.g., FIGS. 10 and 11). With continued reference to FIGS. 6, 7, and 9, each narrow side 118, 218, 418 provides unique heat transfer, strength, and stability characteristics, and can be formed using different techniques. At least a portion of the folded or rolled longitudinal edges (and in the case of the narrow sides 218, 418 illustrated in FIGS. 7 and 9, the majority of the folded or rolled longitudinal edges) are formed to be approximately perpendicular to the broad sides 122, 222, 422 and 124, 224, 424 of the flat tube 110, 210, 410.

Figure 10:
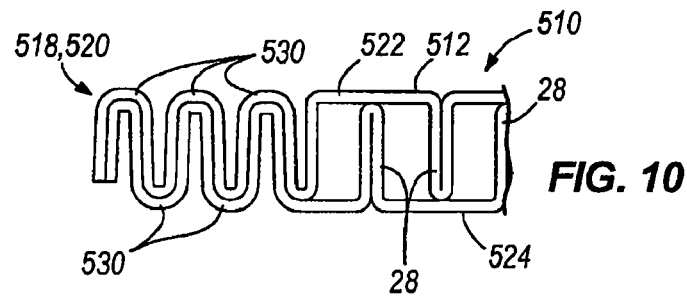
FIG. 10 is an enlarged view of a narrow side of a tube according to yet another embodiment of the present invention.
Figure 11:
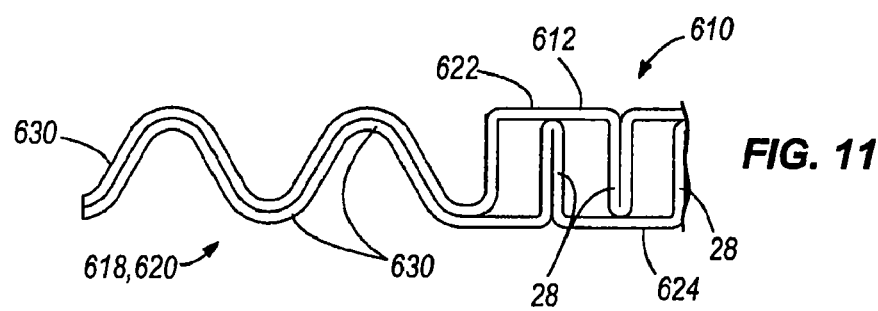
FIG. 11 a narrow side of a tube according to still another embodiment of the present invention.

With reference to the narrow sides 518, 618 of the flat tubes 510, 610 shown in FIGS. 10 and 11, the longitudinal edges of portions 512, 612 and 514, 614 can also be formed by folding or rolling together the adjacent longitudinal edges of the two tube portions 512, 612 and 514, 614. Once again, each of the narrow sides 518, 618 of the flat tubes 510, 610 provides unique heat transfer, strength, and stability characteristics, and can be formed using different techniques. In both cases, the longitudinal edges of the portions 512, 612 and 514, 614 can be folded upon itself to define a serpentine edge of the flat tube 510, 610. Although the folds 530, 630 of this serpentine edge can abut one another with little or no space between adjacent folds 530, 630, in some embodiments (see FIGS. 10 and 11), a space exists between adjacent portions of each fold. The heat transfer, firmness, strength, and/or size of the flat tubes 510, 610 can be selected as desired, based upon the orientation of the folds 530, 630 in such embodiments (e.g., substantially perpendicular to the broad sides 522, 622 and 524, 624, or at a significant angle less than 90 degrees with respect to the broad sides 522, 622 and 524, 624) and the space between adjacent portions of each fold 530, 630.

The illustrated embodiment of FIG. 8 provides an example of how at least a portion of the folds 330 (and in some cases, the majority of the folds 330) of the narrow side 318 can be parallel or substantially parallel to the broad sides 322, 324 of the flat tube 310. Some or all of these folds 330 can lie against one another for improved heat transfer therebetween. In some embodiments, the folds 330 of the narrow side 318 can be substantially the same length L, such as in cases where a particular flow channel shape is desired adjacent the narrow side 318 of the flat tube 310. However, in other embodiments (such as that shown in FIG. 8), at least some of the narrow side folds 330 parallel to the broad sides 322, 324 have a different length than others. For example, the differently-sized folds can define a generally concave (FIG. 8) or convex side of an adjacent flow channel 316, such as for defining a desired flow channel shape adjacent the narrow side 318. With reference to the illustrated embodiment of FIG. 8, the length L of each fold 330 decreases from the outside of the flat tube 310 towards the inside of the flat tube 310 (i.e., the first fold 330 that lies against the broad side 322 has a greater length L than the subsequent fold 330, and the last fold 330 that lies against the other broad side 324 has a greater length L than the previous fold 330). In these embodiments, such shapes of the narrow side 318 can help avoid sudden temperature transitions across the flat tube 310, an issue that can otherwise contribute to tube failure in many applications. As another example, differently-sized folds can define a wedge-shaped narrow side 318, which can provide a non-symmetrical heat transfer bridge across the distance between the broad sides 322, 324. Still other shapes of the narrow side 318 defined by differently-sized folds 330 parallel to the broad sides 322, 324 are possible, and fall within the spirit and scope of the present invention.

In those embodiments in which folds 330 of the narrow side 318 are parallel or substantially parallel to the broad sides 322, 324 of the two-piece flat tube 310, the folds 330 formed of the first portion 312 can be hooked together or inter-engaged with the folds 330 formed of the second portion 314 (see FIG. 8, for example). As a result, the formed flat tube 310 can be held together before brazing or other securing operations on the portions 312, 314, which can facilitate assembly of the flat tubes 310 into banks and/or of heat exchangers having such flat tubes 310, as it is further explained below. It will be appreciated that similar advantages exist in the other narrow side embodiments described above with reference to FIGS. 6, 7, and 9-11.

In those embodiments of the present invention in which either or both narrow sides 18, 118, 218, 318, 418, 518, 618, 20, 120, 220, 320, 420, 520, 620 have folds 30, 130, 230, 330, 430, 530, 630 as described above, such folds 30, 130, 230, 330, 430, 530, 630 can generally provide increased stability to the narrow sides 18, 118, 218, 318, 418, 518, 618, 20, 120, 220, 320, 420, 520, 620 despite the relatively small wall thickness of the flat tube 10, 110, 210, 310, 410, 510, 610 mentioned earlier. A greater number of folds 30, 130, 230, 330, 430, 530, 630 at the narrow sides 18, 118, 218, 318, 418, 518, 618, 20, 120, 220, 320, 420, 520, 620 can also provide better protection for the flat tube 10, 110, 210, 310, 410, 510, 610 against damage due to high internal pressures, impact from objects, and corrosion, for example. This can be of great importance when using such flat tubes 10, 110, 210, 310, 410, 510, 610 in heat exchangers for motor vehicles.

Although not required in the flat tube embodiments described above, the first and/or second portions 12, 112, 212, 312, 412, 512, 612 and 14, 114, 214, 314, 414, 514, 614 can have one or more folds 28 located between the narrow sides 18, 118, 218, 318, 418, 518, 618 and 20, 120, 220, 320, 420, 520, 620 of the flat tube 10, 110, 210, 310, 410, 510, 610. In this regard, the description of such folds 28 in the illustrated embodiment of FIGS. 1-5 is applicable equally to the other embodiments described above. For ease of description, further information regarding these folds 28 will now be made with reference to the illustrated embodiments of FIGS. 12 and 13 using the reference numbers of the embodiment of FIGS. 1-5.

In some embodiments, the inventors have discovered that locations of the internal folds 28 can be selected to define flow channels 16 of varying size to enable different fluid and/or flow characteristics (e.g., flow rates and/or directions, pressures, multiple fluid types, and the like) in different locations of the same flat tube 10, and to enable different manners of heat transfer in the different locations. With reference to the illustrated embodiment of FIG. 12, the width or distance "a" between interior folds 28 is defined substantially parallel to the first and second broad sides 22, 24 of the flat tube 10, and varies based upon the desired degree of resistance to temperature change along the width of the flat tube 10.

Figure 12:
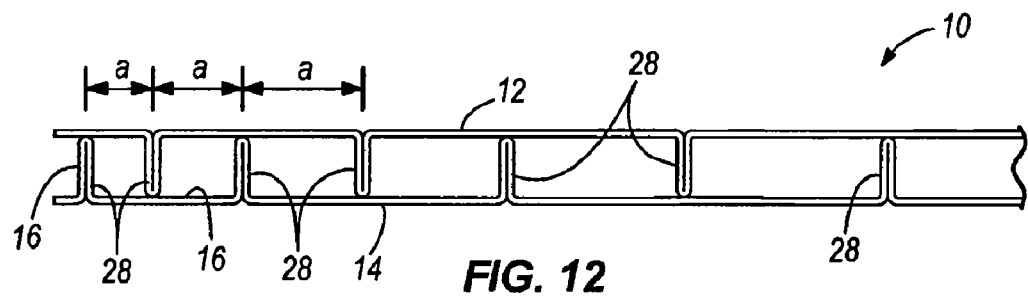
FIG. 12 is an enlarged view of a portion of a tube including internal folds according another embodiment of the present invention.
Figure 13:
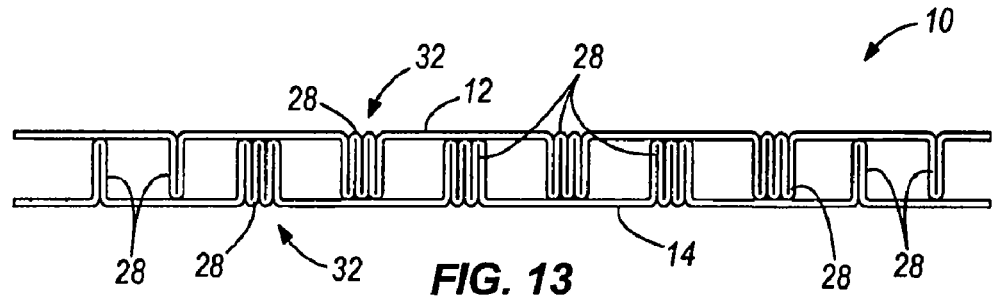
FIG. 13 is an enlarged view of a portion of a tube including internal folds according to yet another embodiment of the present invention.

In some embodiments, such as that shown in FIG. 12, the distance "a" between interior folds 28 can become larger starting from either or both narrow sides 18 and 20 of the flat tube 10 toward the center of the flat tube 10. Accordingly, in some embodiments, the distance "a" increases from interior fold 28 to interior fold 28, starting from one narrow side 18, 20 in the direction of the middle of the flat tube 10, and subsequently decreases again in the direction of the other narrow side 20, 18. In such embodiments, the cross-sectional area of the individual flow channels 16 formed by the interior folds 28 increases and decreases, respectively. In some embodiments, the distance "a" begins at either or both narrow sides 18, 20 at a magnitude of about 0.5 mm (0.019685 in) and increments to a few millimeters.

For example, in such cases, a flat tube 10 with a width of approximately 42 mm (approx. 1.6634 in) can include a large number of interior folds 28 and flow channels 16. It is conceivable that a flat tube 10 can include relatively wider flow channels 16 substantially adjacent either or both narrow sides 18, 20, with narrower flow channels 16 near the center of the flat tube 10. Also, although the flow channels 16 in many embodiments have widths "a" of the sizes described above, such widths can be significantly larger in other embodiments, including ranges of at least 1 cm (0.3937 in).

In some embodiments, the flat tube 10 can include interior folds 28 immediately adjacent one another, wherein such interior folds are abutting or in intimate contact with one another immediately following formation of the interior folds 28 or after brazing or other securing operations on the portions 12, 14. For example, multiple interior folds 28 can be arranged tightly against one another. In any of these cases, two or more interior folds 28 can define a set 32 of interior folds 28. The flat tube 10 can have any number of such sets 32 of interior folds 28, such as those shown in FIG. 13, either alone or in conjunction with any number of single folds 28. Each set 32 of interior folds 28 shown in FIG. 13 includes three individual interior folds 28. However, in other embodiments, two interior folds 28 can be sufficient to form a set 32, and/or four or more interior folds 28 can form a set 32. Accordingly, the number of interior folds 28 that form the set 32 is freely selectable based upon the intended application of the flat tube 10 and other factors. In this regard, either or both portions 12, 14 of the flat tube 10 can have fold sets 32 having any number of interior folds 28 and any combination of sets 32 with different numbers of interior folds 28.

The single interior folds 28 and/or sets 32 of interior folds 38 can all be located on the same portion 12 or 14, or on both portions 12, 14 of the flat tube 10 in any arrangement desired. For example, multiple sets 32 of interior folds 28 can be symmetrically arranged about a central location of the flat tube 10 (such as the arrangement of interior fold sets 32 shown in FIG. 13), wherein corresponding sets 32 on opposite sides of the central location extend from the same portion 12, 14 or from a different portion 12, 14 (e.g., FIG. 13). Also, in some embodiments, one or more single interior folds 28 and/or one or more sets 32 of interior folds 28 on one portion 12, 14 of the flat tube 10 can be nested within the interior folds 28 of a set 32 on the opposite portion 14, 12 of the flat tube 10.

Sets 32 of interior folds 28 as described above can be utilized to provide flat tubes 10 with higher resistance to pressure and greater load-bearing capacity, and can also be used to vary the cross-sectional shape of flow channels 16. It should be noted that the features described above regarding varying flat tubes 10 with varying flow channel widths apply equally to embodiments in which sets 32 of interior folds 28 are utilized. Also, in those embodiments in which the flat tube 10 is formed with a brazing process, the interior folds 28 on one broad side 22, 24 (whether in single form or in sets 32) can form brazed joints with the other broad side 24, 22, thus improving bonding within the flat tube 10.

Figure 14:
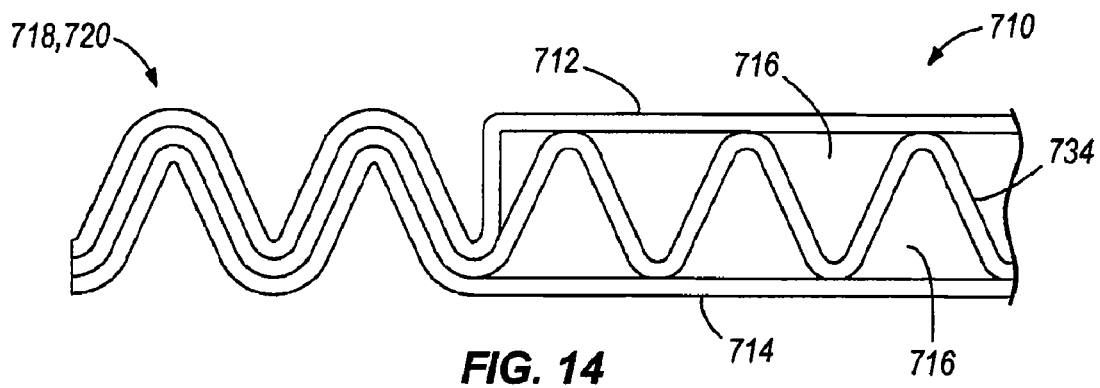
FIG. 14 is an enlarged view of a portion of a tube including an insert according to still another embodiment of the present invention.
Figure 15:
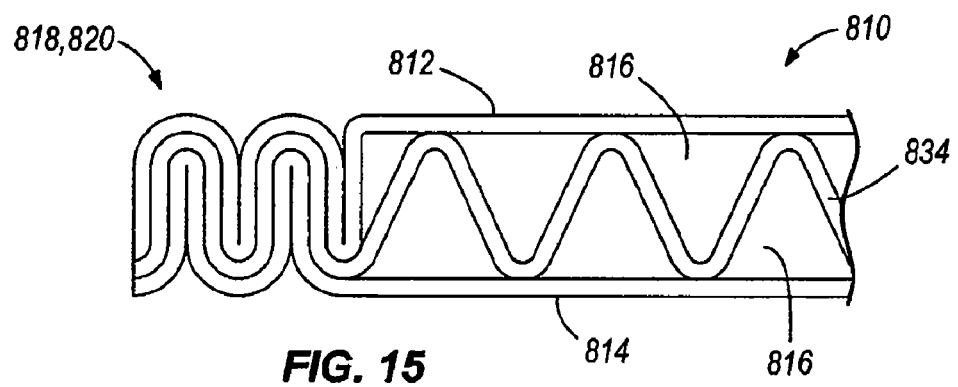
FIG. 15 is an enlarged view of a portion of a tube including an insert according to another embodiment of the present invention.

FIGS. 14 and 15 illustrate two additional constructions of flat tubes according to additional embodiments of the present invention. These embodiments employ much of the same structure and have many of the same properties as the embodiments of the flat tube described above in connection with FIGS. 1-13. Accordingly, the following description focuses primarily upon the structure and features that are different than the embodiments described above in connection with FIGS. 1-13. Reference should be made to the description above in connection with FIGS. 1-13 for additional information regarding the structure and features, and possible alternatives to the structure and features of the flat tubes illustrated in FIGS. 14 and 15 and described below. Structure and features of the embodiments shown in FIGS. 14 and 15 that correspond to structure and features of the embodiments of FIGS. 1-13 are designated hereinafter in the 700 and 800 series of reference numbers, respectively.

The flat tubes 10, 110, 210, 310, 410, 510, 610 illustrated in FIGS. 1-13 above each have internal walls defined by interior folds 28 of the first and/or second portions 12, 112, 212, 312, 412, 512, 612, 14, 114, 214, 314, 414, 514, 614. In any of these embodiments, however, these walls at least partially defining the flow channels 16, 116, 216, 316, 416, 516, 616 can be defined by a separate portion of material that is connected to either or both of the first and second portions 12, 112, 212, 312, 412, 512, 612, 14, 114, 214, 314, 414, 514, 614 in the manufacture of the flat tubes 10, 110, 210, 310, 410, 510, 610. Although different from the flat tubes 10, 110, 210, 310, 410, 510, 610 described above in this manner, such alternative flat tubes can have any of the construction features described above in connection with FIGS. 1-13 (e.g., exterior wall thicknesses and materials, tube diameters, interior wall shapes, locations, spacings, and sets, and narrow side constructions).

For example, the flat tubes 710, 810 shown in FIGS. 14 and 15 are each constructed using two portions 712, 714 and 812, 814, respectively between and which is located an insert 734, 834 defined by another portion of material. In both cases, the insert 734, 834 has a corrugated shape, whereby corrugations of the insert 734, 834 can form flow channels 716, 816 in the flat tube 710, 810. Either or both narrow sides 718, 720 and 818, 820 of the flat tube 710, 810 (only one of which is shown in each of FIGS. 14 and 15) can incorporate a portion of the insert 734, 834 by commonly folding the edges of the first and second portions 712, 714 and 812, 814 with the edges of the insert 734, 834. For example, in some embodiments, the flat tube 710 has serpentine narrow sides 718, 720 as shown in FIG. 14, wherein the edges of the insert 734 are folded with and into the longitudinal sides of the first and second portions 712, 714. In other embodiments, the narrow sides 818, 820 of the flat tube 810 are folded tightly against one another as shown in FIG. 15, wherein the edges of the insert 834 are again folded with and into the longitudinal sides of the first and second portions 812, 814. In yet other embodiments, the longitudinal edges of an insert can be rolled into those of the first and second portions in any of the narrow side structures shown in FIGS. 6-10.

The embodiments of the present invention described above each utilize two separate pieces of material to define the first and second portions 12, 112, 212, 312, 412, 512, 612, 712, 812, and 14, 114, 214, 314, 414, 514, 614, 714, 814 of the flat tubes 10, 110, 210, 310, 410, 510, 610, 710, 810. Although such tube constructions have unique advantages, including some portion-to-portion inter-engagement features and manufacturing advantages, flat tubes according to the present invention can also be formed of one part, such as by a single or undivided endless sheet metal strip. By deforming the single part, free longitudinal edges of the single part can be brought together and joined by brazing, welding, or other securing operations. In other words, some embodiments of the flat tubes according to the present invention can be formed from one part (e.g., sheet metal strip) while still defining two stable narrow sides. Various embodiments of such one-part flat tubes are described in detail below. With the exception of those features of the one-part flat tubes described below that are inconsistent or incompatible with the tube features described above with reference to the two-piece embodiments of FIGS. 1-15, the one-part flat tubes described below can have any of the construction features described above in connection with FIGS. 1-15 (e.g., exterior wall thicknesses and materials, tube diameters, interior wall shapes, locations, spacings, and sets, and narrow side constructions).

The one-piece tubes described below can have improved thermal properties over conventional flat tubes based at least in part upon the use of the relatively thin tube wall material (described above) that can be employed. Additionally, assembly of the flat tubes within a heat exchanger can also be simplified.

Like the two-piece flat tubes described above, folds formed at the narrow sides of the one-piece flat tubes described below can be substantially perpendicular or substantially parallel to the broad sides. For example, a first narrow side of the flat tube can be formed of a continuous portion of a single sheet of metal and can include a set of multiple folds. In some embodiments, these folds can define multiple lengths (e.g., similar to those described above in connection with FIG. 8), which can help avoid the formation of cracks due to thermal fatigue. A second narrow side of the flat tube can be formed by the fee longitudinal edges of the single sheet of metal, and can also have multiple folds. In spite of the sheet metal thickness of 0.05-0.15 mm (0.0019685-0.00591 in) in some embodiments, and 0.03-0.15 mm (0.00118-0.00591 in) in other embodiments, the longitudinal edges of the single piece of material forming the second narrow side can be coupled by brazing, welding, or other securing operations. Also like the two-piece flat tubes described above, either or both broad sides of the one-piece flat tubes can include interior folds and other deformations (e.g., inwardly-directed beads, ribs, or other protrusions that need not reach across the interior of the flat tubes). The interior folds can form flow channels within the flat tube, and can be arranged in any of the manners described above with reference to the two-piece flat tubes. By way of example only, the interior folds can be in sets, can be at particular spacings that may or may not vary across the width of the flat tube, and can increase in the direction from either or both narrow sides toward the middle of the flat tube. As a result of such interior folds and interior fold arrangements, the capability of the one-piece flat tube to resist high temperature change loads can be significantly improved.

Examples of one-piece flat tubes having some of these features are illustrated in FIGS. 16-24, each of which have first and second portions 912, 914, 1012, 1014, 1112, 1114, 1212, 1214, 1312, 1314, 1412, 1414, 1512, 1514, 1612, 1614, 1712, 1714 formed of a common piece of material folded to the shapes illustrated. Although other materials and material thicknesses can be employed as described in greater detail above in connection with the two-piece flat tubes, the illustrated first and second portions 912, 914, 1012, 1014, 1112, 1114, 1212, 1214, 1312, 1314, 1412, 1414, 1512, 1514, 1612, 1614, 1712, 1714 are formed of aluminum or aluminum alloy sheet metal strip having a material thickness of about 0.10 mm (0.003937 in). Any of the flat tubes 910, 1010, 1110, 1210, 1310, 1410, 1510, 1610, 1710 can have a brazing material coating on either or both sides, wherein each layer of the brazing material coating can have a thickness of about 10-20% of the thickness of the sheet metal strip.

Using the wall thicknesses described earlier, the inventors have discovered that a small diameter d of at least 0.8 mm (0.031496 in) for the illustrated flat tubes 910, 1010, 1110, 1210, 1310, 1410, 1510, 1610, 1710 provides good performance results in many applications. Also using the wall thicknesses described earlier, the inventors have discovered that a small diameter d of no greater than about 2.0 mm (0.07874 in) for the illustrated flat tubes 910, 1010, 1110, 1210, 1310, 1410, 1510, 1610, 1710 provides good performance results in many applications. However, in some embodiments, a maximum small diameter d of no greater than about 1.5 mm (0.059055 in) for the illustrated flat tubes 910, 1010, 1110, 1210, 1310, 1410, 1510, 1610, 1710 is used. Moreover, a large diameter D for any of the illustrated flat tubes 910, 1010, 1110, 1210, 1310, 1410, 1510, 1610, 1710 is usually freely selectable within certain manufacturing limits. In some embodiments, one example, the large diameter D is approximately 50 mm (1.969 in). However, one-piece flat tubes 910, 1010, 1110, 1210, 1310, 1410, 1510, 1610, 1710 having larger or smaller diameters D, d (including those described above with regard to all flat tube embodiments disclosed herein) and the wall thicknesses described earlier can also be manufactured, in which cases the original width W of the material (see FIG. 16, for example) used to form the fiat tubes 910, 1010, 1110, 1210, 1310, 1410, 1510, 1610, 1710 is made available at the manufacturing line.

As mentioned above, the various types of narrow side folds and interior folds described in connection with the embodiments of FIGS. 1-15 can be employed in the one-piece tubes described herein. In some one-piece tube embodiments, such as those shown in FIGS. 19-24, either or both narrow sides 1218, 1220, 1318, 1320, 1418, 1420, 1518, 1520, 1618, 1620, 1718, 1720 of the flat tube 910, 1010, 1110, 1210, 1310, 1410, 1510, 1610, 1710 can include multiple folds 1230, 1330, 1430, 1530, 1630, 1730, which can provide relatively more stable and strong narrow tube sides 1218, 1220, 1318, 1320, 1418, 1420, 1518, 1520, 1618, 1620, 1718, 1720. As a result, the relatively more stable narrow sides 1218, 1220, 1318, 1320, 1418, 1420, 1518, 1520, 1618, 1620, 1718, 1720 can provide sufficient protection of the flat tubes 910, 1010, 1110, 1210, 1310, 1410, 1510, 1610, 1710 against damage due to temperature and/or pressure fatigue, impact from objects, and corrosion, thereby providing better performance when used in a heat exchanger for motor vehicles (for example).

Figure 16:
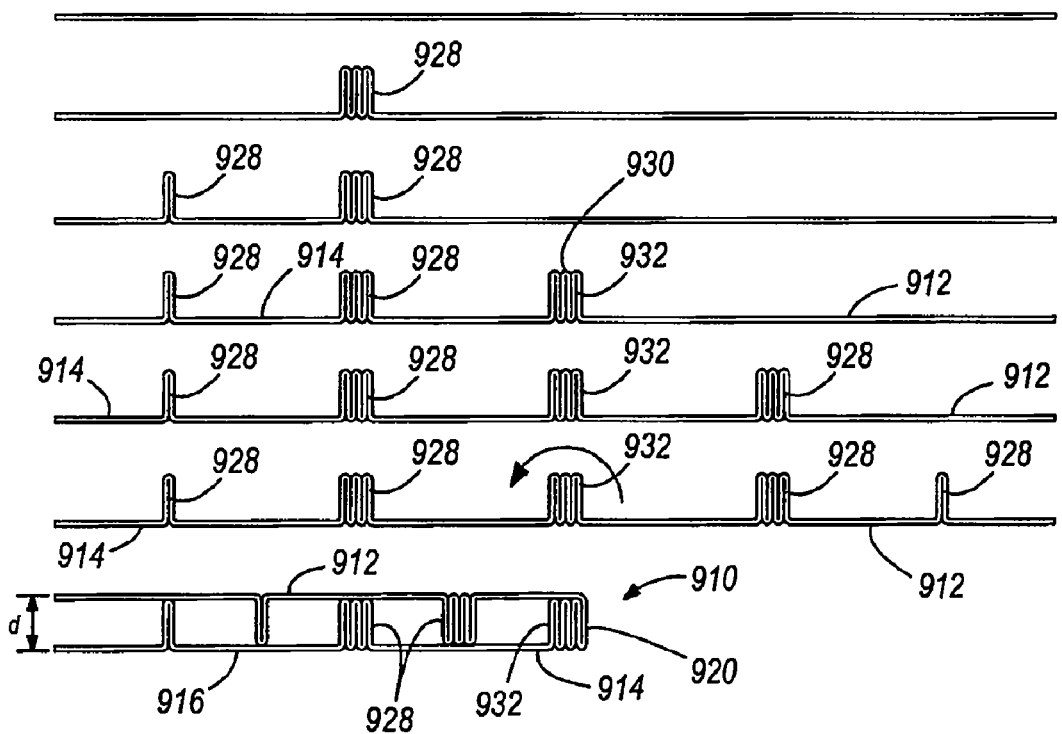
FIG. 16 schematically illustrates a set of exemplary manufacturing steps that can be used to form a tube including first and second portions formed from a common piece of folded material.
Figure 17:
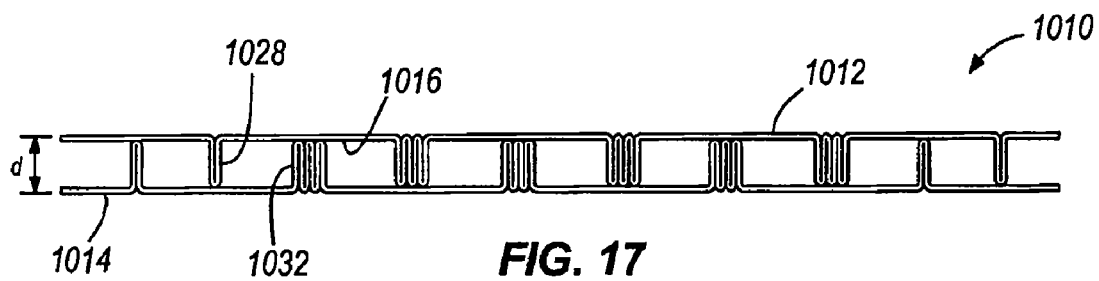
FIG. 17 is an enlarged view of a tube including first and second portions formed from a common piece of folded material according to still another embodiment of the present invention.
Figure 18:
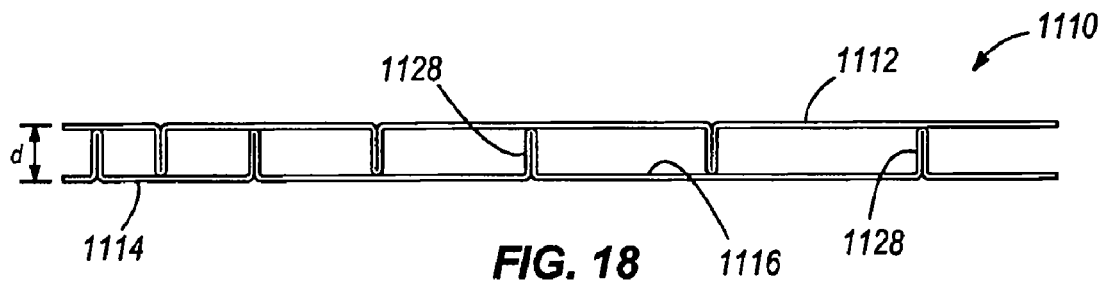
FIG. 18 is an enlarged view of a tube including first and second portions formed from a common piece of folded material according to another embodiment of the present invention.

With reference now to FIG. 16, an example of the manner in which a one-piece tube 910 can be manufactured is shown. In particular, FIG. 16 illustrates at least part of a manufacturing process to form a one-piece flat tube 910. Single and/or multiple folds are made in a sheet of starting material, and will at least partially define interior folds 928 of the flat tube 910, and flow channels 916 within the flat tube 910. In some embodiments, the sheet of starting material is an endless sheet, such as that fed from a coil of material upstream of the manufacturing elements used to produce the folds. At the same or different time, additional folds are created that will at least partially define folds at a narrow side 920 of the flat tube 910. For example, a set 932 of multiple folds 930 is produced at or near the center of the one-piece metal strip illustrated in FIG. 16 to define a narrow side 920 by folding the strip in the direction shown by arrow substantially adjacent the set 932 of multiple folds 930. As a result of this fold indicated by arrow, first and second broad sides 912, 914 of the flat tube 910 are defined. The other narrow side 918 and the folds 930 of the other narrow side 918 can take any of the forms shown in FIGS. 19-23 or those described and/or illustrated above in connection with the narrow sides of the two-piece flat tubes 10, 110, 210, 310, 410, 510, 610, 710, 810. FIGS. 17 and 18 illustrate features of alternate one-piece flat tube constructions (narrow sides not shown) that can be employed. More specifically, FIG. 17 provides an example of how single interior folds 1028 and sets 1032 of multiple interior folds 1028 on either or both broad sides 1022, 1024 can be utilized in the same one-piece flat tube 1010 to define flow channels 1016 of the same or different size. FIG. 18 provides an example of how a number of single interior folds 1128 can be made at particular locations on either or both broad sides 1122, 1124 to define flow channels 1116 of varying cross-sectional size, such as gradually increasing cross-sectional sizes in a direction along the width of the one-piece flat tube 1110.

FIGS. 19-24 show still further examples of one-piece flat tubes 1210, 1310, 1410, 1510, 1610 according to other embodiments of the preset invention. Like the one-piece tube embodiments illustrated in FIGS. 16-18, each of the one-piece flat tubes 1210, 1310, 1410, 1510, 1610 illustrated in FIGS. 19-24 have interior folds 1228, 1328, 1428, 1528, 1628, 1728 arranged individually and/or in sets to define flow channels 1216, 1316, 1416, 1516, 1616, 1716. In some cases, the arrangement of individual interior folds 1228, 1328, 1428, 1528, 1628, 1728 and/or sets 1232, 1332, 1532 of such folds 1228, 1328, 1528 is determined based upon one or more factors (e.g., single or multiple fluids through the tubes 1210, 1310, 1410, 1510, 1610, 1710 anticipated temperatures, thermal stresses, and thermal cycling to which the different portions of the tube width and/or length will be exposed, internal fluid pressures, and the like.

Figure 19:
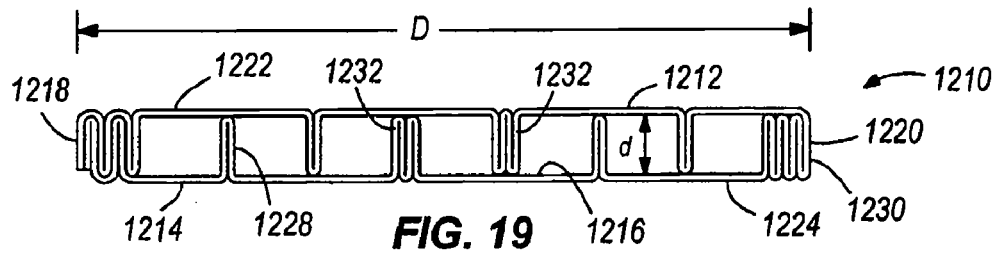
FIG. 19 is a side view of a tube including first and second portions formed from a common piece of folded material according to yet another embodiment of the present invention.
Figure 20:
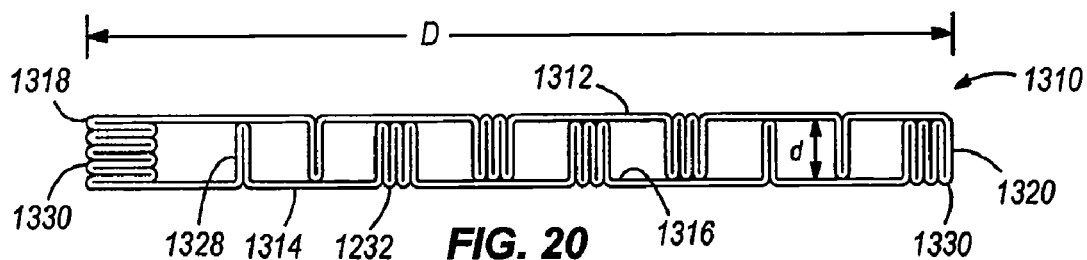
FIG. 20 is a side view of a tube including first and second portions formed from a common piece of folded material according to still another embodiment of the present invention.

With particular reference first to FIG. 19, multiple interior folds 1228 near the center of the flat tube 1210 define a material thickness of four times that of the unfolded tube material (i.e., two single folds 1228 arranged tightly or immediately adjacent one another, such as in an abutting fashion). The one-piece flat tube 1210 illustrated in FIG. 19 has two such sets 1232 of interior folds 1228, each of which is formed in a different broad side 1222, 1224 of the flat tube 1210. In the embodiment of FIG. 20, four sets 1332 of multiple interior folds 1328 each define a material thickness of six times that of the unfolded tube material (i.e., three single folds 1328 arranged tightly or immediately adjacent one another, such as in an abutting fashion). The interior folds 1328 in the embodiment of FIG. 20 are positioned to define flow channels 1316 of varying size, unlike those of FIG. 19, which have substantially the same size. It will be appreciated that any other number of interior fold sets 1232, 1332 can be provided on either or both broad sides 1222, 1224, 1322, 1324 of the one-piece flat tubes 1210, 1310 illustrated in FIGS. 19 and 20, with or without additional individual interior folds 1228, 1328 (i.e., interior folds 1228, 1328 not in sets 1232, 1332 as also shown in FIGS. 19 and 20).

Figure 21:
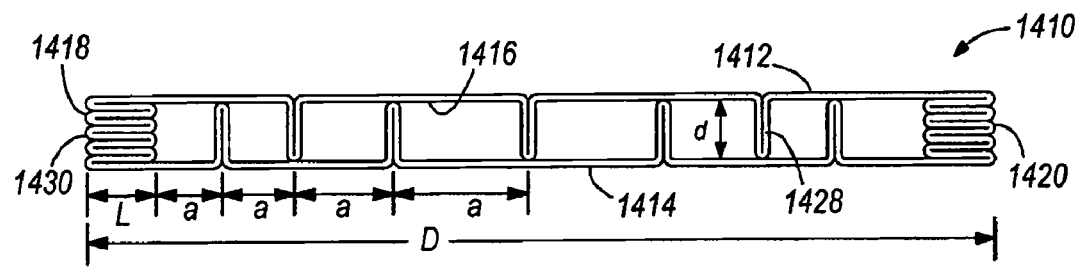
FIG. 21 is a side view of a tube including first and second portions formed from a common piece of folded material according to another embodiment of the present invention.
Figure 22:
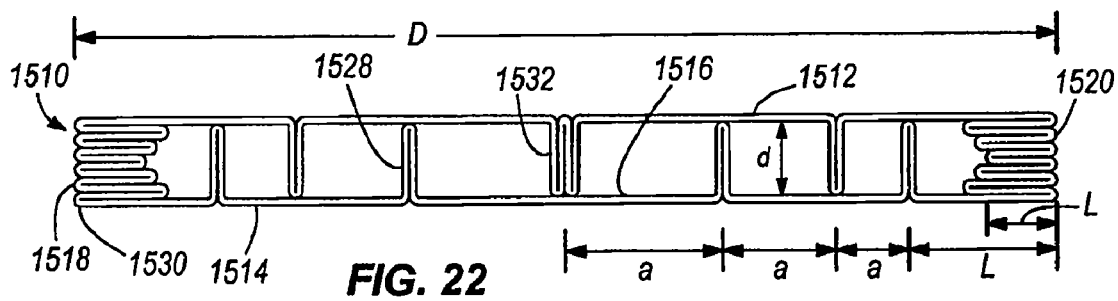
FIG. 22 is a side view of a tube including first and second portions formed from a common piece of folded material according to yet another embodiment of the present invention.
Figure 23:
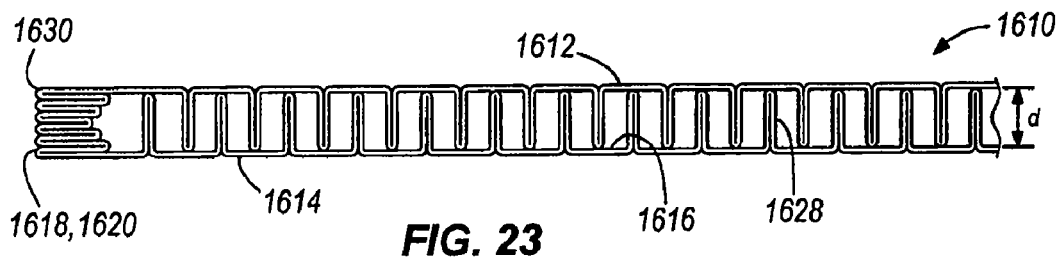
FIG. 23 is a side view of a tube including first and second portions formed from a common piece of folded material according to still another embodiment of the present invention.

The embodiments of FIGS. 21, 22, and 23 provide examples of one-piece flat tubes 1410, 1510, 1610 in which only single folds 1428, 1528, 1628 are used to form the flow channels 1416, 1516, 1616. By way of example, the interior folds 1428, 1528 of the one-piece flat tubes 1410, 1510 illustrated in FIGS. 21 and 22 are positioned to define flow channels 1416, 1516 of varying size (increasing toward the center of each flat tube 1410, 1510, 1610), unlike those of FIG. 23, which have substantially the same size, with the exception of a slightly larger flow channel 1616 immediately adjacent either or both narrow sides 1618, 1620. It should be noted that the interior folds 1228, 1328, 1428, 1528, 1628, 1728 of any of the one-piece flat tubes 1210, 1310, 1410, 1510, 1610, 1710 illustrated in FIGS. 19-24 can be positioned to define flow channels 1216, 1316, 1416, 1516, 1616, 1716 of the same or different size, and that the widths of the flow channels 1216, 1316, 1416, 1516, 1616, 1716 can increase or decrease toward the center of the flat tubes 1210, 1310, 1410, 1510, 1610, 1710 gradually in the same direction across the majority or all of the tube width, or in any other manner desired. Also, other constructions of the flat tubes 1210, 1310, 1410, 1510, 1610, 1710 can include different numbers of single folds 1228, 1328, 1428, 1528, 1628, 1728 and sets of multiple interior folds 1228, 1328, 1428, 1528, 1628, 1728 as desired.

With continued reference to the one-piece flat tube embodiments illustrated in FIGS. 19-24, each flat tube 1210, 1310, 1410, 1510, 1610, 1710 has one narrow side 1220, 1320, 1420, 1520, 1620, 1720 defined by a continuous folded portion of the sheet of material used to construct the flat tube 1210, 1310, 1410, 1510, 1610, 1710, and an opposite narrow side 1218, 1318, 1418, 1518, 1618, 1718 where two free longitudinal edges of the sheet of material are brought together and folded to close the flat tube 1210, 1310, 1410, 1510, 1610, 1710. This opposite narrow side 1218, 1318, 1418, 1518, 1618, 1718 and the folds 1230, 1330, 1430, 1530, 1630, 1730 of the opposite narrow side 1218, 1318, 1418, 1518, 1618, 1718 can take any of the forms shown in FIGS. 19-24 or those described and/or illustrated above in connection with the narrow sides of the two-piece flat tubes 10, 110, 210, 310, 410, 510, 610, 710, 810.

With regard to the narrow side 1220, 1320, 1420, 1520, 1620, 1720 formed by the continuous folded portion as described above, this narrow side can take any of the forms shown in FIGS. 19-24. However, this same narrow side 1220, 1320, 1420, 1520, 1620, 1720 can also take any of the shapes described and/or illustrated above in connection with the narrow sides of the two-piece flat tubes 10, 110, 210, 310, 410, 510, 610, 710, 810, in which cases the terminal ends of the first and second portions 12, 14, 112, 114, 212, 214, 312, 314, 412, 414, 512, 514, 612, 614, 712, 714, 812, 814 at the narrow sides 18, 118, 218, 318, 418, 518, 618, 718 of the flat tubes 10, 110, 210, 310, 410, 510, 610, 710, 810 would be joined as part of the same continuous piece of sheet material. Accordingly, the unique benefits of each narrow side form described above in connection with FIGS. 1-11, 14, and 15 can exist for either or both narrow sides 1218, 1220, 1318, 1320, 1418, 1420, 1518, 1520, 1618, 1620, 1720 of the embodiments illustrated in FIGS. 19-24.

With particular reference to the illustrated embodiment of FIG. 19, the one-piece flat tube 1210 illustrated therein has narrow sides 1218, 1220 formed with folds 1230 that are arranged substantially perpendicularly to the broad sides 1222, 1224 of the flat tube 1210. The multiple folds 1230 forming the narrow sides 1218, 1220 are differentiated from each other in that the folds 1230 forming the second narrow side 1220 are formed from a continuous portion of the one-piece strip of material used to create the flat tube 1210, while the folds 1230 forming the first narrow side 1218 are formed from the two longitudinal edges of the one-piece strip of material. In other embodiments, however, the flat tube 1210 can instead have first and second narrow sides 1218, 1220 with folds 1230 that are substantially parallel to the broad sides 1222, 1224 of the flat tube 1210.

The one-piece flat tube 1310 illustrated in FIG. 20 also has a second narrow side 1320 with multiple folds 1330 substantially perpendicular to the broad sides 1322, 1324 of the flat tube 1310, whereas the first narrow side 1318 has multiple folds 1330 arranged substantially parallel to the broad sides 1322, 1324 of the flat tube 1310. In other embodiments, however, the flat tube 1310 can instead have a first narrow side 1318 with folds 1330 that are substantially perpendicular to the broad sides 1322, 1324, and a second narrow side 1320 with folds 1330 that are substantially parallel to the broad sides 1322, 1324.

The one-piece flat tube 1410 illustrated in FIG. 21 has first and second narrow sides 1418, 1420 with multiple folds 1430 that are substantially parallel to the broad sides 1422, 1424 of the flat tube 1410. In other embodiments, the multiple folds 1430 of either or both narrow sides 1418, 1420 are instead substantially perpendicular to the broad sides 1422, 1424 of the flat tube 1410. Although each of the multiple folds 1430 at both of the narrow sides 1418, 1420 illustrated in FIG. 21 are substantially the same length, those of either or both narrow sides 1418, 1420 can instead be of different lengths L (e.g., see FIGS. 22 and 23). In such embodiments, the varying lengths of the narrow sides 1518, 1520, 1618 can take any of the forms described above in connection with the embodiment of FIG. 8, and can therefore produce any of the benefits also described therein. With reference to the embodiments of FIGS. 22 and 23, the illustrated arrangement of varying-length folds 1530, 1630 of the narrow sides 1518, 1520, 1630 (i.e., shorter folds 1530, 1630 flanked by longer folds 1530, 1630), can be generally effective in supporting temperature change loads. Also, sudden transitions in pressure from the narrow sides 1518, 1520, 1618 to the broad sides 1522, 1524, 1622, 1624 can be avoided with this arrangement. Additionally, as with the other one-piece flat tube embodiments described herein, one or more sets of multiple interior folds 1528 (such as the single set shown in FIG. 22) and/or a relatively high number of flow channels 1616 (such as those shown in FIG. 23) can be utilized to help support temperature change loads and to help withstand sudden transitions in pressure. Yet another measure aimed to improve temperature change load resistance is varying the distance "a" between folds to define increasingly wider flow channels 1516 toward the center of the flat tube 1510.

Figure 24:
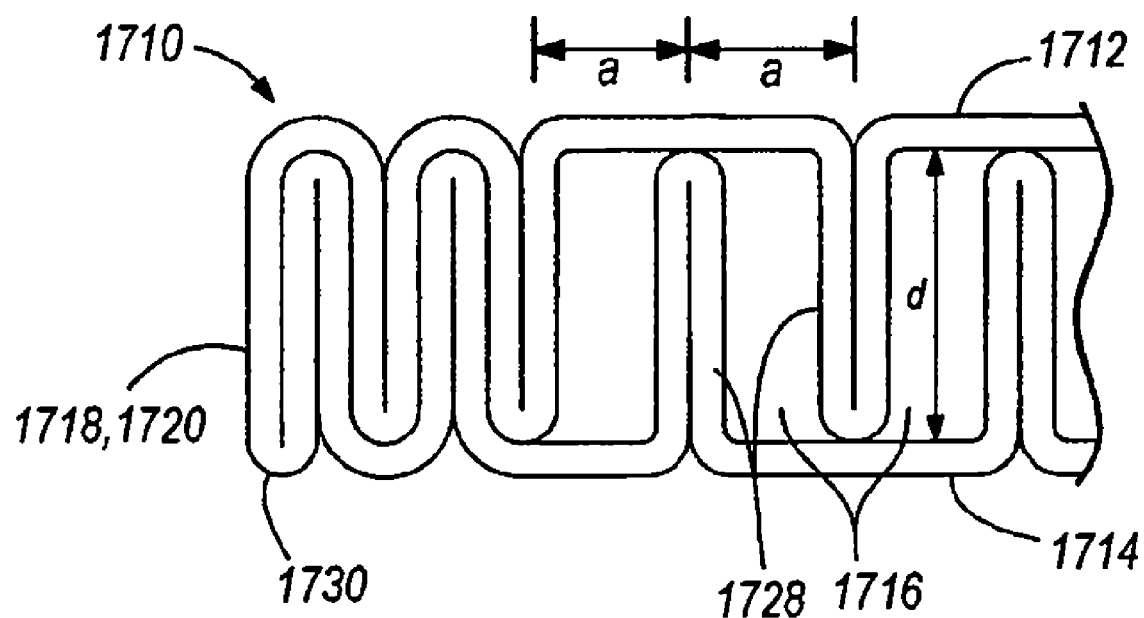
FIG. 24 is an enlarged view of a tube including first and second portions formed from a common piece of folded material according to another embodiment of the present invention.

FIG. 24 shows an example of the manner in which any of the narrow side constructions shown in the two-piece flat tube embodiments of FIGS. 6-11, 14, and 15 can be employed in the narrow side of a one-piece flat tube having a continuous sheet of material as mentioned above. The narrow side 1718 shown in FIG. 24 is similar in many respects to that of FIG. 11 described above, with the exception of abutting adjacent folds 1730 and a single continuous sheet of material defining the folds 1730 rather than two overlapping sheets of material (or two overlapping portions of the same sheet of material). In this particular example, the distances "a" between the folds 1730 and the first interior fold 1728, and between the other interior folds 1728 are relatively small, and can range in some embodiments from 0.5 mm (0.019685 in) to 2 mm (0.07874 in) or more—even as large as 1 cm (2.54 in). Furthermore, in some embodiments, this flat tube 1610 has a width of about 42 mm (0.16535 in) allowing for multiple folds 1728 and flow channels 1716.

Flat tubes according to the some embodiments of the present invention can include an internal insert that reinforces at least one of the narrow sides of the flat tube while also potentially performing one or more other functions (e.g., reinforcing the broad sides of the tube, defining multiple flow channels in fluid communication or not in fluid communication with one another, defining flow turbulators, and the like). The insert can be defined by a separate portion of material that is connected to the sheet or sheets of material defining the exterior tube walls in the manufacture of the flat tubes, and can be used as a complement to or instead of interior folds as described in a number of the embodiments above. Examples of inserts have already been provided in connection with the illustrated embodiments of FIGS. 14 and 15.

Although inserts can be employed with one-piece flat tubes according to some embodiments of the present invention (described in greater detail below), a number of unique advantages are gained by the use of inserts in two-piece flat tubes. In some embodiments, such advantages are gained in the use of inserts in two-piece flat tubes constructed of sheet material having a relatively small thickness. In some embodiments, the wall material of the flat tubes has a thickness of no greater than about 0.20 mm (0.007874 in). However, in other embodiments, the inventors have discovered that a wall material of the flat tubes having a thickness of no greater than about 0.15 mm (0.0059055 in) provides significant performance results relating to the overall performance of the heat exchanger, manufacturability, and possible wall constructions (as disclosed herein) that are not possible using thicker wall materials. The relatively small wall material thickness can result in good thermal properties of the two-piece flat tubes having inserts. In some embodiments, a wall material thickness of such flat tubes of no less than about 0.050 mm (i.e., no less than about 0.0019685 in) provides good strength and corrosion resistance performance, whereas in other embodiments, a wall material thickness of such flat tubes of no less than about 0.030 mm (i.e., no less than about 0.00118 in) can be used. Also, the two-piece flat tubes having inserts described below can have dimensions similar to the two-piece flat tubes described above in connection with FIGS. 1-15.

As explained in greater detail below, the heat exchanger tubes and other portions of heat exchangers described herein can be manufactured using a number of manufacturing techniques and processes and can include corrosion protection features, such as, for example, those techniques and processes described below and illustrated in FIGS. 92-95. A number of manufacturing processes and techniques and the corrosion protection features referenced hereinafter are particularly advantageous when applied to heat exchanger tubes and portions of heat exchangers having significantly reduced material thickness. In addition, such techniques, processes, and corrosion protection features provide significant advantages relating to the overall performance of flat tubes and heat exchangers made from such material.

FIGS. 25-34 illustrate various two-piece flat tubes 1810, 1810A, 1910, 2010, 2110, 2210, 2310, 2410, 2510, 2610, 2710, 2810, 2910, 3010, 3110, 3210 each including a first portion 1812, 1812A, 1912, 2012, 2112, 2212, 2312, 2412, 2512, 2612, 2712, 2812, 2912, 3012, 3112, 3212, a second portion 1814, 1814A, 1914, 2014, 2114, 2214, 2314, 2414, 2514, 2614, 2714, 2814, 2914, 3014, 3114, 3214, and an insert 1834, 1834A, 1934, 2034, 2134, 2234, 2334, 2434, 2534, 2634, 2734, 2834, 2934, 3034, 3134, 3234, all of which can be constructed of sheets of material, such as strips of metal or other material. For ease of description, the following description refers only to the illustrated embodiment of FIGS. 25 and 26, it being understood that the following description applies equally to all of the embodiments illustrated in FIGS. 25-34 (barring inconsistent or incompatible description)

Figure 25:
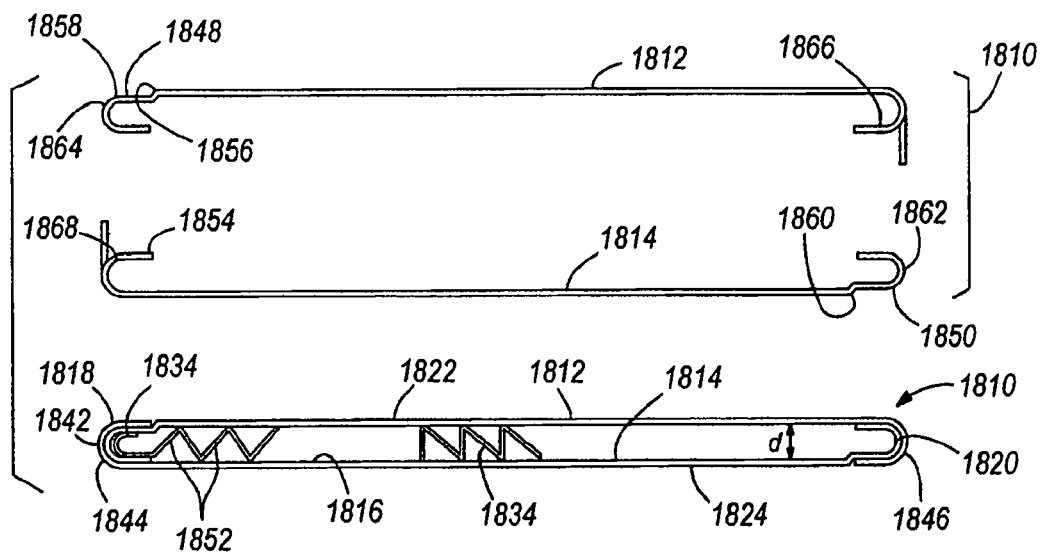
FIG. 25 is an exploded view of a tube including first and second portions and an insert positioned between the first and second portions according to some embodiments of the present invention.
Figure 26:
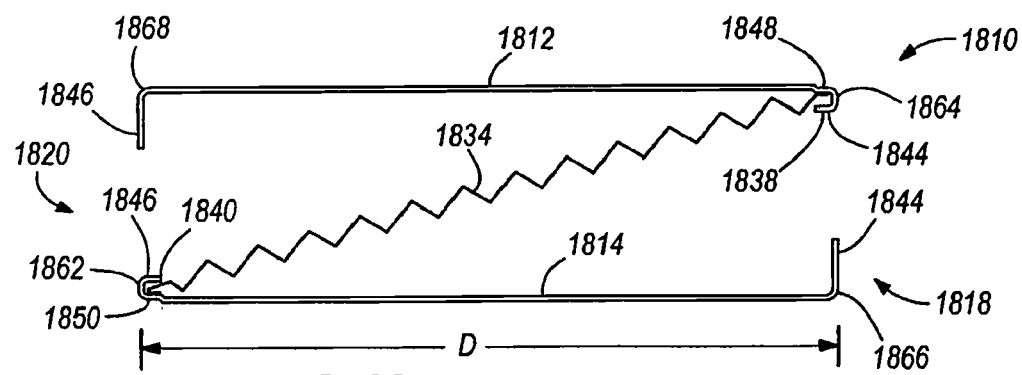
FIG. 26 is an exploded view of the tube shown in FIG. 25.

In some embodiments of the two-piece flat tube 1810 illustrated in FIGS. 25 and 26, the first and second portions 1812, 1814 and the insert 1834 can be constructed of a material (e.g., aluminum, aluminum alloy, or other material described herein) having a relatively low sheet thicknesses. For example, the inventors have discovered that a material thickness for these elements of no greater than about 0.15 mm (0.0098425 in) provides good performance results in many applications. In some embodiments, the material for these elements also has a thickness no less than about 0.03 mm (0.0011811 in). In many embodiments, it is preferred that a relatively smaller sheet thickness be used for the insert 1834 than for the first and second portions 1812, 1814 of the two-piece flat tube 1810. In spite of the relatively small sheet thicknesses, the narrow sides 1818, 1820 of the two-piece flat tube 1810 can have relatively improved stability, particularly when used in conjunction with features of the two-piece flat tube 1710 described below.

In the illustrated embodiment of FIGS. 25 and 26, each broad side 1822, 1824 of the flat tube 1810 is formed of a separate portion of material (such as a separate strip). The portions of material overlap in two locations to define two longitudinal seams 1844, 1846. These longitudinal seams 1844, 1846 of the two-piece flat tube 1810 extend from respective narrow sides 1818, 1820 of the flat tube 1810 to opposite broad sides 1822, 1824, in contrast to other illustrated embodiments (e.g., see FIG. 27 described in greater detail below), where the longitudinal seams extend from respective narrow sides of the flat tube to the same broad side of the flat tube. In the illustrated embodiment of FIGS. 25 and 26, the longitudinal seams 1844, 1846 are both located at and extend from a respective narrow side 1818, 1820 of the flat tube 1810 into the broad sides 1822, 1824 of the flat tube 1810. More specifically, the longitudinal seams 1844, 1846, namely those portions of the flat tube 1810 at which the sheet material of the flat tube 1810 is overlapped, extend about at least part of (and in some embodiments a majority or all of) the narrow sides 1818, 1820, and lie partially in a corresponding broad side 1822, 1824 of the flat tube 1810. The width of the seam 1844, 1846 can be determined according to desirable manufacturing purposes.

In some embodiments, the longitudinal seams 1844, 1846 of the flat tube 1810 present a flush or substantially flush outer surface of the flat tube 1810 (e.g., provide a substantially flat broad side 1822, 1824 of the flat tube 1810). For this purpose, that longitudinal edge of each longitudinal seam 1844, 1846 that is overlapped by the other longitudinal edge can be recessed by forming the overlapped longitudinal edge with an offset 1848, 1850. Accordingly, the longitudinal edge of one tube portion 1812, 1814 can be wrapped by and receive the corresponding longitudinal edge of the other tube portion 1814, 1812 in a recess 1848, 1850 to define the longitudinal seam 1844, 1846. Thus, for both seams 1844, 1846, the underlying longitudinal edge of the two overlapping tube portions 1812, 1814 can terminate within the interior of the flat tube 1810, and can be free prior to brazing, welding, or other securing techniques. As a result of this construction, flat tubes 1810 can be produced with precise desired widths (even without cutting or other machining operations, in some embodiments) despite the fact that looser tolerances are maintained for the widths of starting material for the individual tube portions 1812, 1814, since the overlapped longitudinal seams 1844, 1846 permit relative lateral positioning of the first and second tube portions 1812, 1814 in an assembled state. In particular, in some embodiments, a terminal longitudinal edge 1854, 1856 of each tube portion 1812, 1814 does not abut the other tube portion 1812, 1814, thereby permitting such adjustment.

The use of overlapping longitudinal seams such as those illustrated in the embodiment of FIGS. 25 and 26 provides significant reinforcement of the flat tube 1810 at the first and second narrow sides 1818, 1820—a feature that can be highly important in many applications where thermal stresses, temperature change loads, and failures due to pressure loading and debris impact are common in conventional flat tubes. In some embodiments, further reinforcement of the first and/or second narrow sides 1818, 1820 is provided by one or more folds of the first and/or second tube portions 1812, 1814 at the narrow sides 1818, 1820 (i.e., at the longitudinal edges of such portions 1812, 1814). Generally, folding the longitudinal edges of the first and/or second tube portions 1812, 1814 can increase the strength of the flat tube 1810 and resistance of the flat tube 1810 to damage. In those embodiments in which a narrow side 1818, 1820 is defined at least in part by overlapping longitudinal edges of the first and second tube portions 1812, 1814 (one extending about, receiving, or encompassing the other), either one or both of the overlapped longitudinal edges (e.g., the encompassed and encompassing edges) can be folded back to increase the thickness of that longitudinal edge at the narrow side 1818, 1820.

For example, it is envisioned that either or both overlapping longitudinal edges of tube portions 1812, 1814 at either or both narrow sides 1818, 1820 can include folds adjacent the corresponding gradation 1858, 1860 (described in greater detail below). For example, in some embodiments, the combined thickness of the first and second tube portions 1812, 1814 can be about 0.25 mm (0.0098425 in) or smaller in some embodiments, with either or both overlapping longitudinal edges having at least one fold to thicken the narrow side 1818, 1820, and with the material thickness of the insert 1834 being about 0.10 mm (0.003937 in) or less. In such embodiments, the thickness of the first and second tube portions 1818, 1820 can each be in the range of 0.05-0.15 mm (0.0019685-0.0059055 in), and can be in the range of 0.03-0.15 mm (0.0019685-0.0059055 in) in other embodiments.

It should also be noted that the overlapped longitudinal seam construction of the two-piece flat tube illustrated in FIGS. 25 and 26 can be employed in flat tube embodiments having no internal insert. For example, such a longitudinal seam construction can be employed in two-piece flat tubes having interior folds such as those described above in connection with the embodiments of FIGS. 113 and 16-24, or in other two-piece flat tubes.

Although not required, in many embodiments the tube portions (e.g., tube portions 1812, 1814 in FIGS. 25 and 26) have substantially the same shape, and can even be identical. When assembled as described above, the tube portions 1812, 1814 are arranged with their longitudinal edges reversed with respect to one another. For example, one longitudinal edge of one of the two tube portions 1812, 1814 includes a gradation 1856, 1860 defining a recess 48, 50 as described above, followed by a portion defining an arc 1862, 1864, while a corresponding overlapping longitudinal edge of the other tube portion 1814, 1812 includes a portion with a larger arc 1866, 1868 receiving the smaller arc 1862, 1864. Accordingly, in the illustrated embodiment of FIGS. 25 and 26, one smaller arc portion 1862, 1864 and one larger arc portion 1866, 1868 form one of the narrow sides 1818, 1820 as part of the manufacturing process of the two-piece flat tube 1810. It is to be understood that the term "arc" as used herein and in the appended claims is not restricted to a half round form. Moreover, the term "arc" as used herein and in the appended claims is inclusive of any suitable geometry for forming the narrow sides 1818, 1820, which can include square, triangular, or other open polygonal shapes, wave shapes, and other formations.

By employing tube portions that are substantially the same shape or identical, fewer part types (and in some cases, a single part type) can be used to construct the two-piece flat tube 1810, resulting in lower inventory, simpler assembly, and significant cost reductions.

The internal insert 1834 partially illustrated in FIG. 25 and fully illustrated in FIG. 26 is formed of a third piece of material, and generally includes two longitudinal edges 1838, 1840, either or both of which can lie substantially within a respective narrow side 1818, 1820 of the flat tube 1810. In some embodiments, the longitudinal edges 1838, 1840 are formed with a shape for this purpose, such that the longitudinal edges 1838, 1840 can be received within the interior shape of the narrow sides 1818, 1820. Also in some embodiments, at least part of either or both longitudinal edges 1838, 1840 have a shape corresponding to that of the narrow sides 1818, 1820. For example, either or both longitudinal edges 1838, 1840 can be formed into the shape of a loop 1842 such that at least part of the loop 1842 matches the shape of the corresponding narrow side 1818, 1820 of the flat tube 1810. In some embodiments, this shape correspondence can result in a reinforcement of the flat tube at the narrow sides 1818, 1820. Further reinforcement can be obtained by connecting either or both longitudinal edges 1838, 1840 with the narrow sides 1818, 1820, such as by brazing, welding, or in any other suitable manner.

With reference to FIG. 26, which illustrates the manner in which the two-piece flat tube 1810 can be assembled, the internal insert 1834 is shown received within arc portions 1862, 1864 of the first and second tube portions 1812, 1814 as the first and second tube portions 1812, 1814 are brought together during assembly. More particularly, the longitudinal edges 1838, 1840 of the internal insert 1834 are supported by the arc portions 1862, 1864 of the first and second tube portions 1812, 1814, and will be within the later-defined narrow sides 1818, 1820 of the tube 1810 to reinforce the narrow sides 1818, 1820 once assembly is complete. The resulting two-piece flat tube 1810 has narrow sides 1818, 1820 with a double wall thickness due to the overlapping longitudinal seams 1844, 1846 extending over and beyond the narrow sides 1818, 1820, and can also have further thickness defined by the that of the nested longitudinal edges 1838, 1840 of the internal insert 1834. In some cases, for example, the two-piece flat tube 1810 includes first and second tube portions 1812, 1814 collectively defining a wall thickness of about 0.20 mm (0.007874 in) to help prevent corrosion or deterioration, and/or to provide resistance against debris impact, and pressure and temperature change loads.

As explained in greater detail below, the heat exchanger tubes and other portions of heat exchangers described herein can be manufactured using a number of manufacturing techniques and processes and can include corrosion protection features, such as, for example, those techniques and processes described below and illustrated in FIGS. 92-95. A number of manufacturing processes and techniques and the corrosion protection features referenced hereinafter are particularly advantageous when applied to heat exchanger tubes and portions of heat exchangers having significantly reduced material thickness. In addition, such techniques, processes, and corrosion protection features provide significant advantages relating to the overall performance of flat tubes and heat exchangers made from such material.

The internal insert 1834 illustrated in the embodiment of FIGS. 25 and 26 has a number of corrugations 1852 across the width of the flat tube 1810. These corrugations 1852 can be joined to the interior of the broad sides 1822, 1824 of the first and second tube portions 1812, 1814 to form flow channels 1816 running in the longitudinal direction of the flat tube 1810. By using this arrangement, flow channels 1816 can be defined in the flat tube 1810 in a cost-effective manner, while also simplifying the manufacturing process of the two-piece flat tube 1810. In spite of the low wall thickness of the internal insert 1834 (which can be the same or smaller than the above-described thicknesses of the first and second tube portions 1812, 1814 described above), the flow channels 1816 formed within the two-piece flat tube 1810 can provide improved stability to internal pressure of the flat tube 1810.

The hydraulic diameter of the flow channels 1816 can be determined by appropriate design of the corrugations 1852 described above. In some embodiments, for example, the hydraulic diameter of the flow channels 1816 is relatively small considering that the small diameter d of the two-piece flat tube 1810 can be about 0.8 mm (0.031496 in), and that the number of corrugations 1852 can be relatively large.

In some embodiments, at least some of the corrugations 1852 are shaped to have one corrugation flank perpendicular or substantially perpendicular to the broad sides 1822, 1824 of the two-piece flat tube 1810, and an adjacent corrugation flank inclined with respect to the broad sides 1822, 1824 (e.g., see the center corrugations 1852 illustrated in FIG. 25, for example). In other embodiments, at least some of the corrugations 1852 are shaped to each have both corrugation flanks at a substantial incline with respect to the broad sides 1822, 1824 (e.g., see the left corrugations 1852 illustrated in FIG. 25, for example). In still other embodiments, at least some of the corrugations 1852 are shaped to have both flanks perpendicular or substantially perpendicular to the broad sides 1822, 1824 of the two-piece flat tube 1810.

Figure 33:
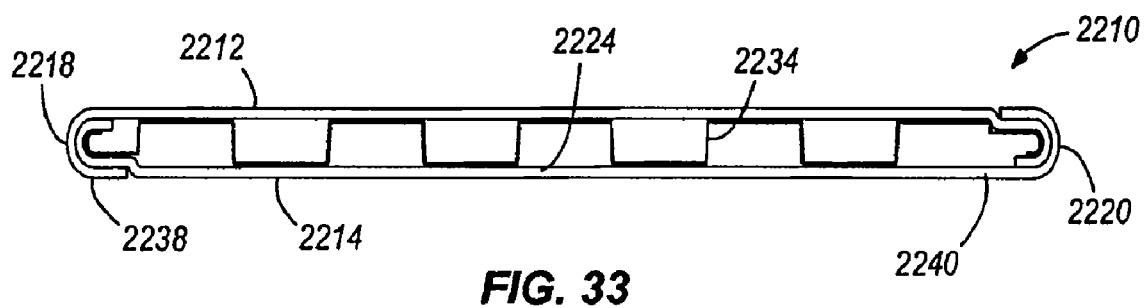
FIG. 33 is a side view of a portion of a tube including first and second portions and an insert positioned between the first and second portions according to another embodiment of the present invention.

An example of such an embodiment is shown in FIG. 33, which illustrates a two-piece flat tube 2210 that is substantially the same as that of FIGS. 25 and 26 with the exception of the insert shape. Like the embodiment of FIGS. 25 and 26, the insert 2234 illustrated in FIG. 33 reinforces the narrow sides 2218, 2220 by longitudinal edges 2238, 2240 of the insert 2234 lining at least a portion of the inner surface of each tube portion 2212, 2214 at the narrow sides 2218, 2220. In other embodiments, only one of the longitudinal edges 2238, 2240 of the insert 2234 extends into a corresponding narrow side 2218, 2220. It should be noted that the two-piece flat tube assembly shown in FIG. 33 can have any of the same features described herein in connection with the embodiment of FIGS. 25 and 26. In still other embodiments, at least some of the corrugations 1852 can define a curved wave pattern (e.g., sinusoidal), or any other profiled surface in which the corrugations are identical or different across the width of the two-piece flat tube 1810.

In some embodiments, the insert 1834 defines a number of flow channels 1816 having the same shape and size across the width of the two-piece flat tube 1810. In other embodiments, the insert 1834 can be shaped so that the shape and/or size of the flow channels 1816 varies across the width of the two-piece flat tube 1810 (e.g., by using an insert 1834 with different types of corrugations 1852 at different locations across the width of the two-piece flat tube 1810). An example of this is shown in FIG. 25, where both types of corrugations described above for the illustrated insert 1834 are used. In other embodiments, any number of different corrugation shapes and sizes can be used across the width of the two-piece flat tube 1810. This variance across the width can provide significant advantages over conventional flat tubes by adapting different portions of the flat tube 1810 for different flow and/or environmental conditions (e.g., different fluids or flow directions through different sections of the same flat tube 1810, different internal or external flow rates, temperatures, and/or pressures at different locations across the width of the flat tube 1810, and the like).

The internal insert 1834 illustrated in FIGS. 25 and 26 are formed of a single piece of material. However, it should be noted that in other embodiments, the internal insert 1834 can instead be formed of more than one part (in which case the flat tube assembly illustrated in FIGS. 25 and 26 can include four or more parts).

With continued reference to the embodiment of FIGS. 25 and 26, the thickness of at least one narrow side 1818, 1820 generally corresponds to the sum of the thicknesses of the two broad sides 1822, 1824 (and, more precisely, of the longitudinal edges of the first and second portions 1812, 1814) and the insert 1834. For example, the combined thickness of the overlapping longitudinal edges of the first and second portions 1812, 1814 and the insert 1834 can be about 0.25 mm (0.0098425 in) or less in some embodiments. It should also be noted that in some cases, each of the first and second tube portions 1812, 1814 and the insert 1834 can have substantially the same thickness (in any of the thickness ranges described above), such as in cases in which the same sheet material is used to construct all three pieces. In such cases, either or both narrow sides 1818, 1820 can be defined by a thickness that is approximately three times the material thickness of either first and second tube portion 1812, 1814 (i.e., when a loop 1842 on either or both longitudinal edges of the insert 1834 is received within a corresponding narrow side 1818, 1820 to increase the thickness thereof as described above). In some embodiments, either or both longitudinal edges of the insert 1834 can be folded over upon itself and then provided with a loop 1842 or otherwise shaped to at least partially correspond to the interior of the narrow side 1818, 1820, thereby reinforcing the wall material of the first and second portions 1812, 1814 at the narrow sides 1818, 1820. Any number of such longitudinal edge folds for the insert 1834 can be made to achieve a desired thickness, reinforcement, and stability of the narrow sides 1818, 1820.

In some embodiments having a narrow side reinforcing insert 1834 as described above, each of the first and second tube portions 1812, 1814 can have a thickness of less than 0.15 mm (0.00591 in), and the thickness of the insert 1834 can be no greater than about 0.10 mm (0.003937 in), such as a flat tube 1810 in which the first and second tube portions 1812, 1814 each have a thickness of about 0.12 mm (0.0047224 in), and in which the insert 1834 has a thickness of no greater than about 0.10 mm (0.003937 in). In other embodiments, the thickness of each of the first and second tube portions 1812, 1814 and the insert 1834 can be no less than about 0.05 mm (0.0019685 in) and no greater than about 0.15 mm (0.0059055) to provide a relatively cost-effective heat exchanger with good heat transfer and strength properties. In other embodiments, the thickness of each of the first and second tube portions 1812, 1814 and the insert 1834 can be no less than about 0.03 mm (0.00118 in) in other embodiments.

At least one of the first and second portions 1812, 1814 and the insert 1834 can have a brazing material coating on either or both sides thereof in order to permit such parts of the illustrated tube assembly to be joined by brazing. In the illustrated embodiment of FIGS. 25 and 26 by way of example only, the first and second portions 1812, 1814 and the insert 1834 of the flat tube 1810 is manufactured from aluminum or aluminum alloy sheeting made available in endless strips of material coated on at least one side with brazing material.

As shown in FIGS. 25 and 26, the two-piece flat tube 1810 of the illustrated embodiment defines a small diameter d and a large diameter D. Using the wall thicknesses described earlier, the inventors have discovered that a small diameter d of at least about 0.7 mm (0.027559 in) provides good performance results in many applications, such as in radiators. Also using the wall thicknesses described earlier, the inventors have discovered that a small diameter d of no greater than about 1.5 mm (approx. 0.059055 in) provides good performance results in many applications, such as in radiators. In the case of charge air coolers and other applications, the inventors have discovered that the small diameter d can be larger than about 1 cm (0.3937 in) to provide good performance results. Although such small diameter dimensions can be employed in various embodiments, any of the small diameter dimensions described above with regard to all of the flat tube embodiments disclosed herein can be used. The large diameter D of the two-piece flat tube 1810 illustrated in FIGS. 25 and 26 can have any size desired (including those also described above with regard to all of the flat tube embodiments disclosed herein), based at least in part upon the width of the starting material used to construct the flat tube 1810.

Figure 28:
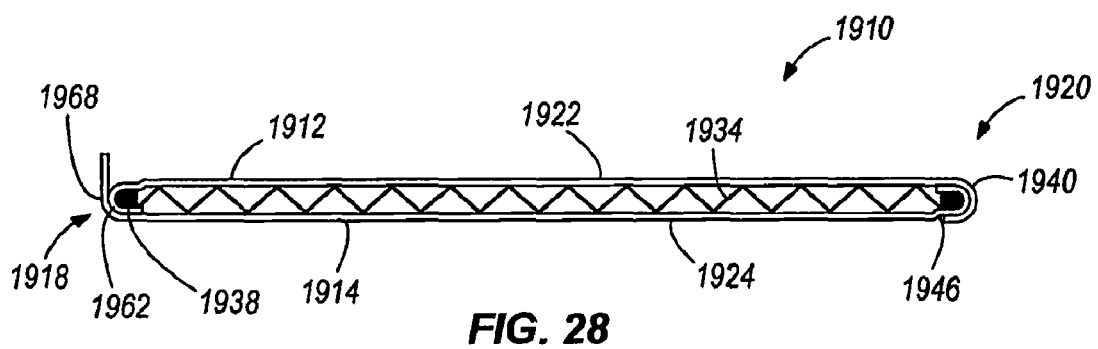
FIG. 28 is a side view of the tube including first and second portions and an insert positioned between the first and second portions according to yet another embodiment of the present invention.
Figure 29:
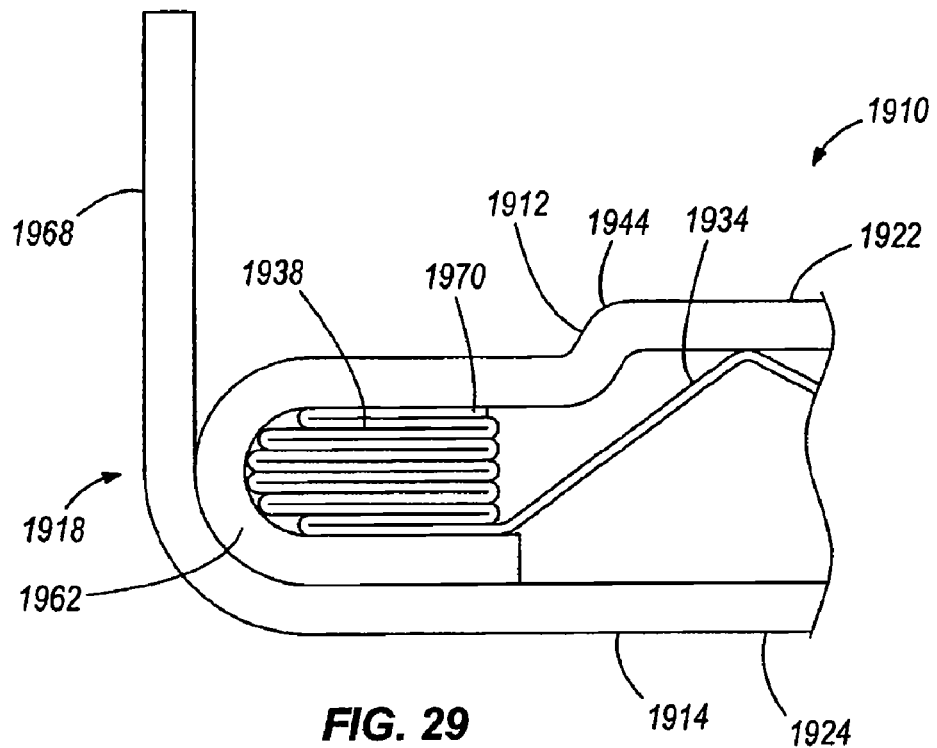
FIG. 29 is an enlarged view of a portion of the tube shown in FIG. 28.

As mentioned above, in some embodiments, either or both longitudinal edges of the insert 1834 can be provided with any number of folds to achieve a desired thickness for increased reinforcement and stability of the first and second portions 1812, 1814 at the narrow sides 1818, 1820. An example of such an embodiment is illustrated in FIGS. 28 and 29. The two-piece flat tube 1910 illustrated in FIGS. 28 and 29 is substantially the same as that of FIGS. 25 and 26 with the exception of the insert shape.

FIG. 28 illustrates the flat tube 1910 with a narrow side 1918 at a stage in which the large arc portion 1968 has not been completely manufactured. In other words, one longitudinal edge of the second tube portion 1914 is not wrapped around the already-formed smaller arc portion 1962 formed by a corresponding longitudinal edge of the first tube portion 1912. This longitudinal edge of the second tube portion 1914 is displaced or moved around the smaller arc portion 1962 to complete the narrow side 1918. As a consequence, the resulting longitudinal seam 1944 lies in one broad side 1922, with another of the two longitudinal seams 1946 lying in the other broad side 1924. These longitudinal seams 1944, 1946 are located at the narrow sides 1918, 1920 of the two-piece flat tube 1910 as described in earlier embodiments.

In the illustrated embodiment of FIGS. 28 and 29, the longitudinal edges 1938, 1940 of the insert 1934 have been folded several times, as best shown in FIG. 29. The longitudinal edges 1938 with these folds 1970 are received within the narrow sides 1918, 1920 of the two-piece flat tube 1910, and can provide significant reinforcement to the overlapped longitudinal edges of the first and second tube portions 1912, 1914 at the narrow sides 1918, 1920. In other embodiments, only one of the longitudinal edges 1938, 1940 of the insert 1934 has such folds 1970.

The number of folds 1970 of the longitudinal edges 1938, 1940 can depend at least in part upon the dimensions of the flat tube 1910. In some embodiments by way of example only, the two-piece flat tube 1910 has a small diameter d of about 1.0 mm (0.03937 in), the first and second tube portions 1912, 1914 each have a material thickness of about 0.15 mm (0.0059055 in), and the material thickness of the insert 1934 is about 0.05 mm (0.0019685 in), wherein about 10 folds are created on each longitudinal edge 1938, 1940 of the insert 1934. Although these multiple folds 1970 can have varying lengths, in some embodiments the maximum length L of these folds is about 1.0 mm (0.03937 in). Also, these multiple folds 1970 can run in a direction parallel or substantially parallel to the broad sides 1922, 1924 of the two-piece flat tube 1910 in some embodiments (see FIGS. 28 and 29), and can run in other directions (e.g., perpendicular to the broad sides 1922, 1924) in other embodiments. It is to be understood that the wall thicknesses of the first and second tube portions 1912, 1914 and the insert 1934 can vary, as can the distances d and L based upon desired specifications of the flat tube 1910.

It should be noted that the two-piece flat tube assembly shown in FIGS. 28 and 29 can have any of the same features described herein in connection with the embodiment of FIGS. 25 and 26.

Figure 27:
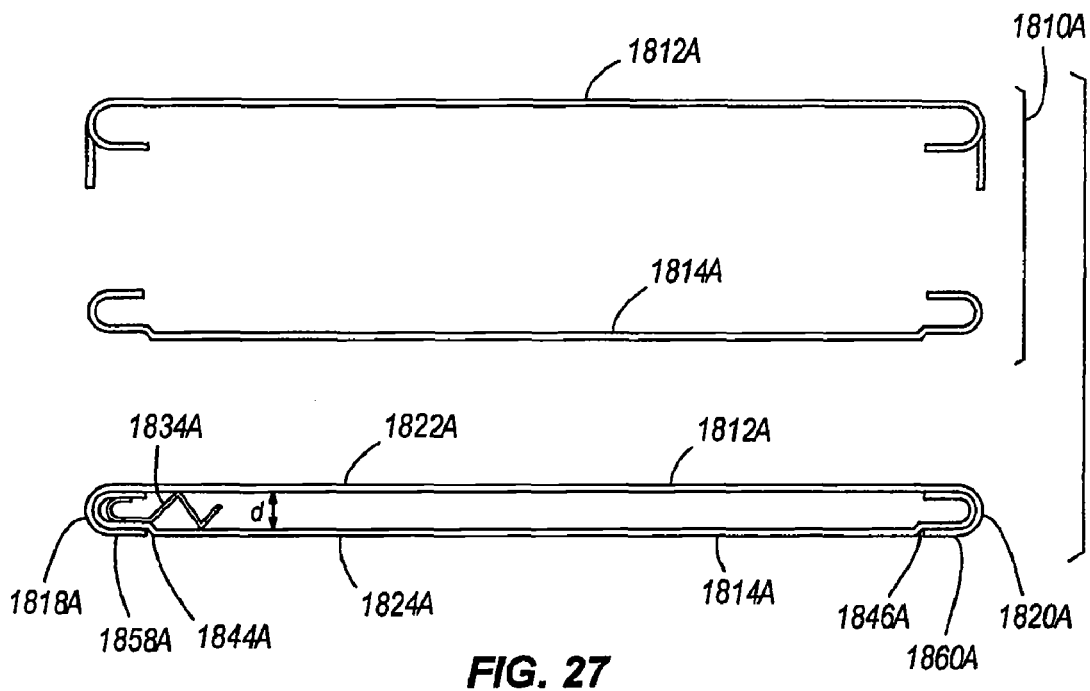
FIG. 27 is an exploded view of a tube including first and second portions and an insert positioned between the first and second portions according to still another embodiment of the present invention.

FIG. 27 illustrates a two-piece flat tube according to an additional embodiment of the present invention. This embodiment employs much of the same structure and has many of the same properties as the embodiments of the flat tube described above in connection with FIGS. 25, 26, 28, 29 and 33. Accordingly, the following description focuses primarily upon the structure and features that are different than the embodiments described above in connection with FIGS. 25, 26, 28, 29 and 33. Reference should be made to the description above in connection with FIGS. 25, 26, 28, 29 and 33 for additional information regarding the structure and features, and possible alternatives to the structure and features of the two-piece flat tube illustrated in FIG. 27 and described below. Structure and features of the embodiment shown in FIG. 27 that correspond to structure and features of the embodiments of FIGS. 25, 26, 28, 29 and 33 are designated hereinafter in the 1800 series of reference numbers.

Like the embodiments of the present invention described in connection with FIGS. 25 and 26, the tube assembly illustrated in FIG. 27 has first and second portions 1812A, 1814A and an insert 1834A. The opposite longitudinal edges 1838A, 1840A of the insert 1834A line the inner surfaces of both pairs of overlapped longitudinal sides of the first and second tube portions 1812A, 1814A, thereby reinforcing the narrow sides 1818A, 1820A of the flat tube 1810A.

The two-piece flat tube 1810A illustrated in FIG. 27 is an example of the manner in which both longitudinal seams 1844A, 1846A joining the first and second portions 1812A, 1814A of the flat tube 1810A can extend to and on the same broad side 1822A, 1824A of the flat tube 1810A. In the illustrated embodiment of FIG. 27, both longitudinal seams 1844A, 1846A extend to and on the second broad side 1824A of the flat tube 1810A. Alternatively, the longitudinal seams 1844A, 1846A can be formed in the first broad side 1822A, if desired. In the illustrated embodiment, the second broad side 1824A defined primarily by the second tube portion 1814A is capable of absorbing relatively loose tolerances (i.e., is capable of tolerance equalization) at its opposite longitudinal edges. However, in some embodiments, the first broad side 1822A defined primarily by the first tube portion 1812A does not have the same capability or degree of capability, because each of its longitudinal edges can lie against or immediately adjacent a gradation 1858A, 1860A of the second tube portion 1814A.

With continued reference to the illustrated embodiment of FIG. 27, the longitudinal seams 1844A, 1846A extend from respective narrow sides 1818A, 1820A in directions toward the center of the flat tube 1810A. A significant portion of each longitudinal seam 1818A, 1820A (i.e., the gradations 1858A, 1860A), however, lies in the same broad side 1824A, where the cross-sectional length e of each gradation 1858A, 1860A measured to the distal edge of the narrow sides 1818A, 1820A can be determined according to the desired manufacturing process used to produce the tube portions 1812A, 1814A. In the illustrated embodiment of FIG. 27, the small diameter d of the two-piece flat tube 1810A is in the range of about 0.7-1.5 mm (0.027559-0.059055 in) when the two-piece flat tube 1810A is incorporated in a radiator, although other small diameters d are possible for the same and different applications, including the diameters d described above in connection with the embodiment of FIGS. 25 and 26, and those described above in connection with the small and large diameters for all of the flat tubes of the present invention disclosed herein. For example, in other constructions, the small diameter d of the flat tube 1810A can be greater than 1.0 cm (approx. 0.3937 in).

As with the other two-piece flat tube embodiments described herein, it is envisioned that a manufacturing process of the flat tube 1910 includes at least partially forming the two tube portions 1912, 1914 from respective strips of sheet material, and then joining the at least partially formed strips to one another as described herein by the end of the manufacturing line.

Figure 30:
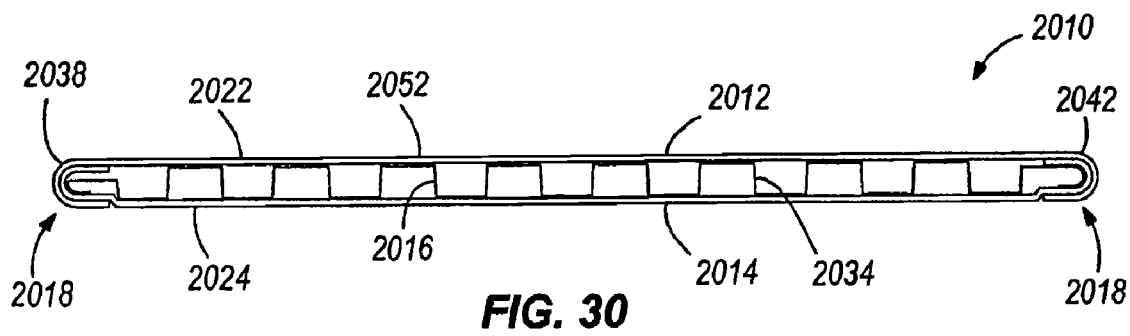
FIG. 30 is a side view of a tube including first and second portions and an insert positioned between the first and second portions according to still another embodiment of the present invention.
Figure 31:
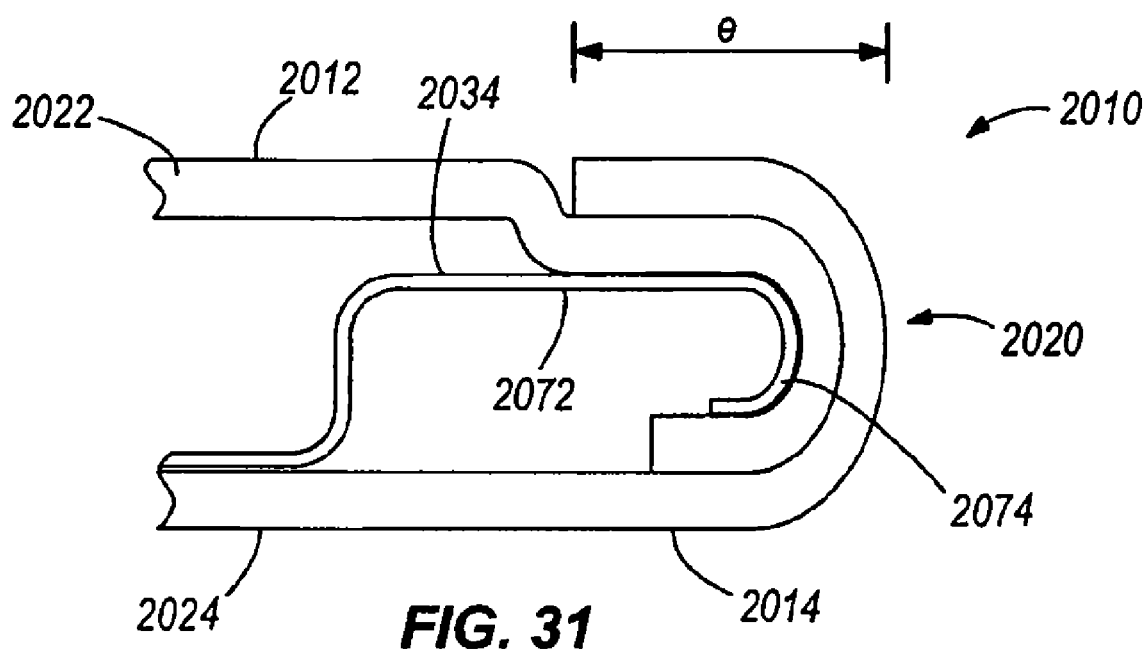
FIG. 31 is an enlarged view of a portion of the tube shown in FIG. 30.

FIGS. 30-32 illustrate two additional constructions of flat tubes according to additional embodiments of the present invention. These embodiments employ much of the same structure and have many of the same properties as the embodiments of the flat tube described above in connection with FIGS. 25-29 and 33. Accordingly, the following description focuses primarily upon the structure and features that are different than the embodiments described above in connection with FIGS. 25-29 and 33. Reference should be made to the description above in connection with FIGS. 25-29 and 33 for additional information regarding the structure and features, and possible alternatives to the structure and features of the flat tubes illustrated in FIGS. 30-32 and described below. Structure and features of the embodiments shown in FIGS. 30-31, and 32 that correspond to structure and features of the embodiments of FIGS. 25-29 and 33 are designated hereinafter in the 2000 and 2100 series of reference numbers, respectively.

The tube assembly illustrated in FIGS. 30 and 31 is substantially the same as that shown in FIG. 27, with the exception of the insert shape. In particular, the tube assembly illustrated in FIGS. 30 and 31 is an example of the manner in which the insert 2034 can take different shapes to define flow channels 2016 of different shapes and sizes. By way of example, the illustrated internal insert 2034 includes corrugations 2052 having flanks that are substantially perpendicular to the broad sides 2022, 2024 of the two-piece flat tube 2010. The corrugation flanks are joined together by substantially flat sections that can be brazed, welded, or secured in any other suitable manner to the inside surfaces of the broad sides 2022, 2024 of the first and second tube portions 2012, 2014. This particular construction of lamellae or internal insert 2034 is generally referred to as flat-top lamellae.

With continued reference to FIGS. 30 and 31, the longitudinal edges 2038, 2042 of the internal insert 2034 are shaped to each include a gradation 2072 and a connecting arc 2074 received substantially within and reinforcing the narrow sides 2018, 2020 of the two-piece flat tube 2010. In other embodiments, only one of the longitudinal edges 2038, 2042 is provided with these features.

Figure 32A:
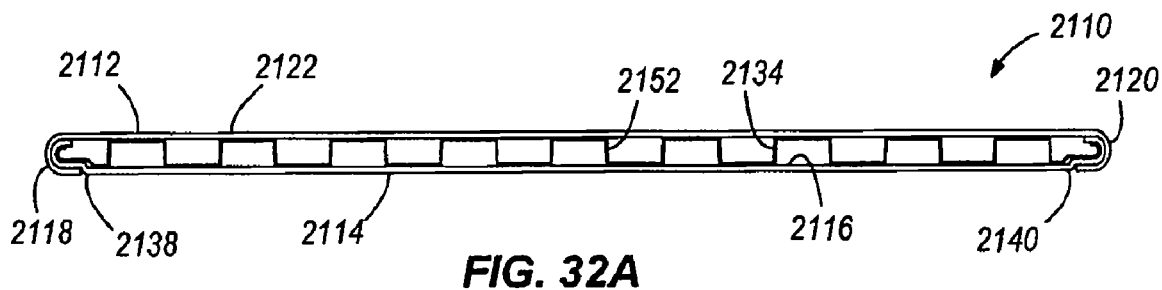
FIG. 32A is a side view of a tube including first and second portions and an insert positioned between the first and second portions according to yet another embodiment of the present invention.
Figure 32B:
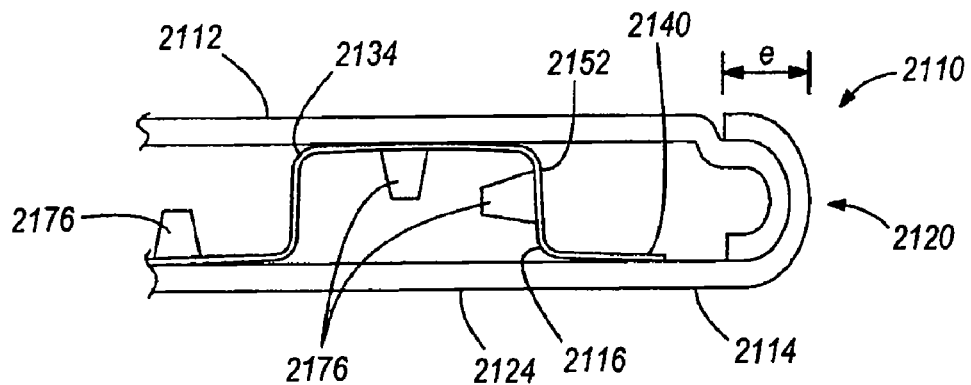
FIG. 32B is an enlarged view of a portion of the tube shown in FIG. 32A.

In any of the insert embodiments described herein, the inserts can be provided with features that increase or sustain turbulence within the flow channels defined at least in part by the inserts. An example of such features is shown in FIGS. 32A and 32B. In this embodiment, the flanks and flat sections of the corrugations 2152 in the illustrated insert 2134 include winglets 2176 (not shown in FIG. 32A) positioned to increase or sustain flow turbulence within the flow channels 2116. The winglets 2176 can be arranged or distributed at intervals along the length of the flat tube 2110 in any patterned or patternless manner, and can be located in any feature or combination of features of the corrugations 2152. Also, it should be noted that the winglets 2176 can include shapes other than those shown in FIGS. 32A and 32B.

The flat tube assembly illustrated in FIGS. 32A and 32B also provides an example of how either or both longitudinal edges of an insert in any of the embodiments herein need not necessarily be received or otherwise located within the overlapped longitudinal edges of the first and second tube portions, and need not necessarily be part of or extend to the narrow sides of the flat tube. In the particular construction shown in FIGS. 32A and 32B by way of example, the internal insert 2134 includes at least one longitudinal edge 2140 that ends before the narrow side 2120. Instead, the longitudinal edge 2140 is adjacent one of the broad sides 2124. Other constructions of the insert 2124 can include either or both longitudinal edges 2138, 2140 adjacent the other broad side 2122 of the flat tube 2110, either or both rolled longitudinal edge 2138, 2140 not within or nested in a corresponding narrow side 2118, 2120 of the flat tube 2110, and the like.

Figure 34:
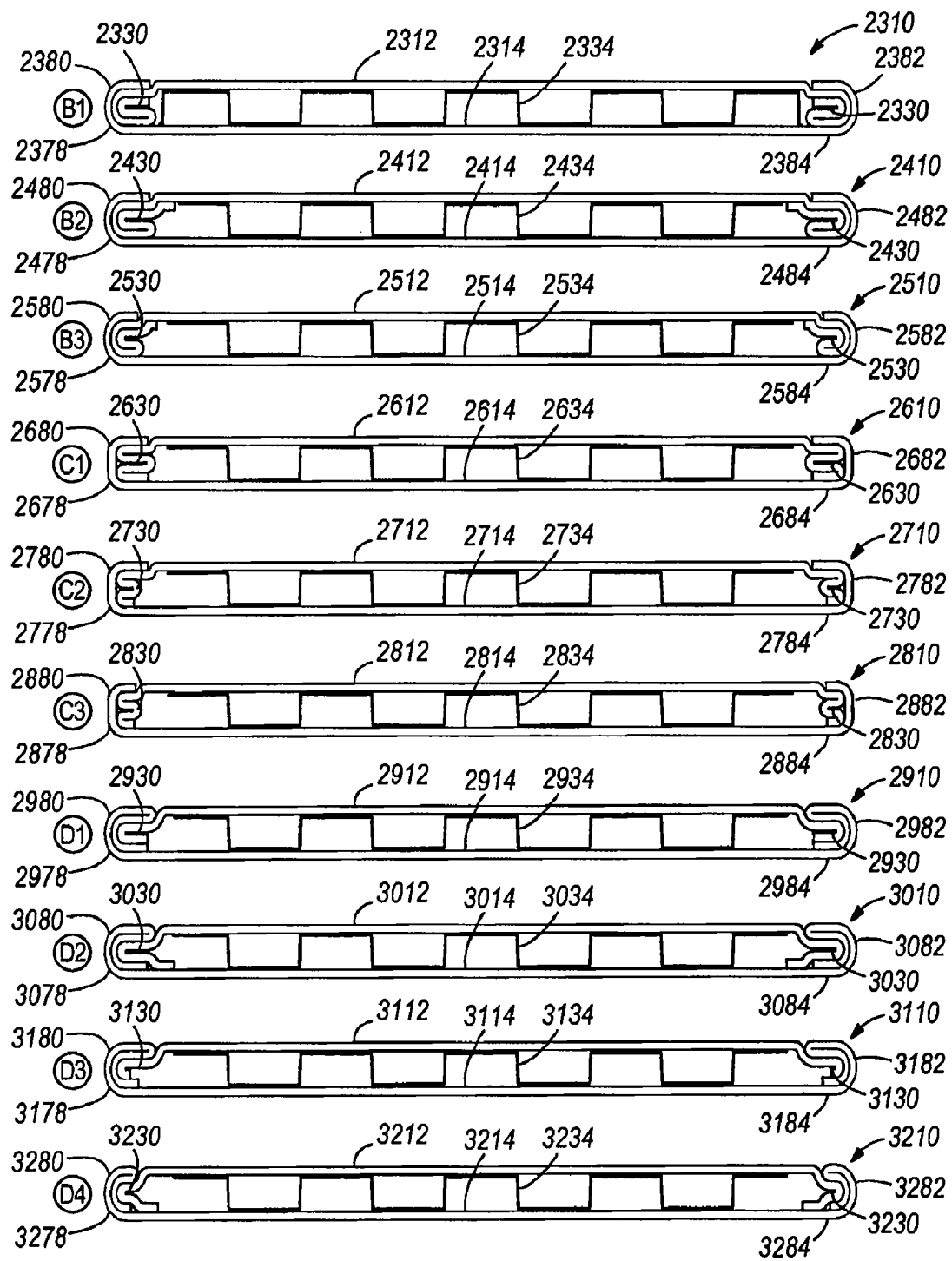
FIG. 34 illustrates ten embodiments of tubes according to some embodiments of the present invention.
Figure 35:
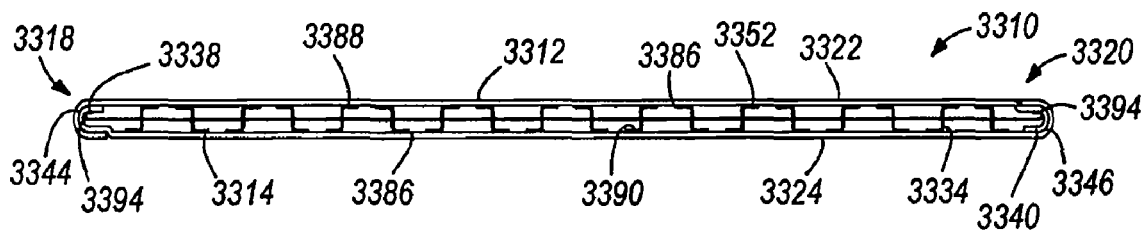
FIG. 35 is a side view of a tube according to some embodiments of the present invention.
Figure 36:
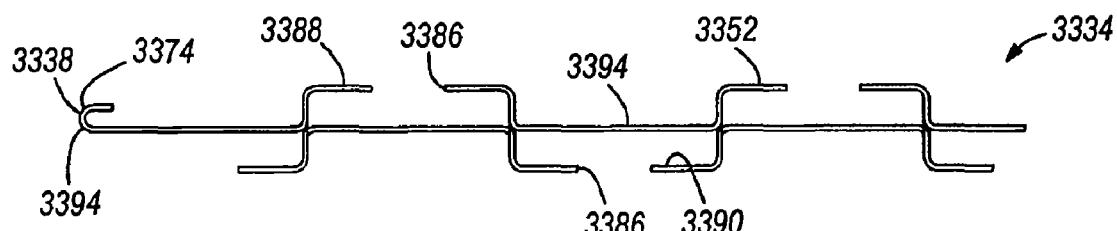
FIG. 36 is a side view of an internal insert for the tube shown in FIG. 35.
Figure 37:
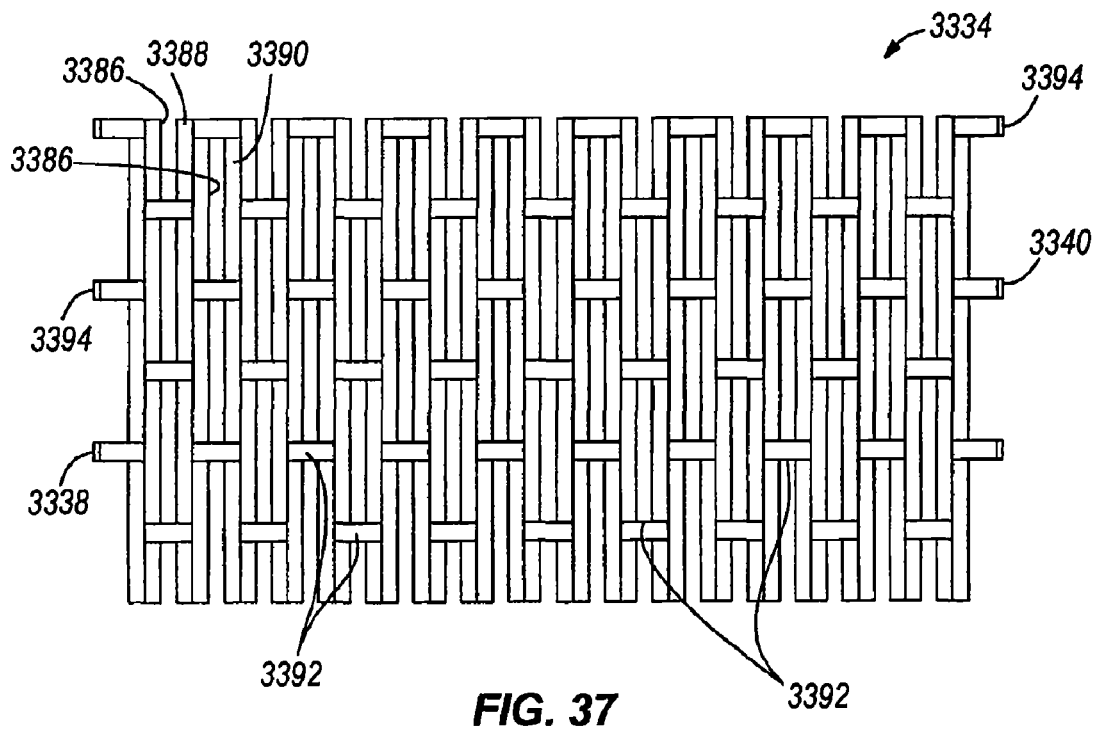
FIG. 37 is a top view of the internal insert shown in FIG. 36.
Figure 38:
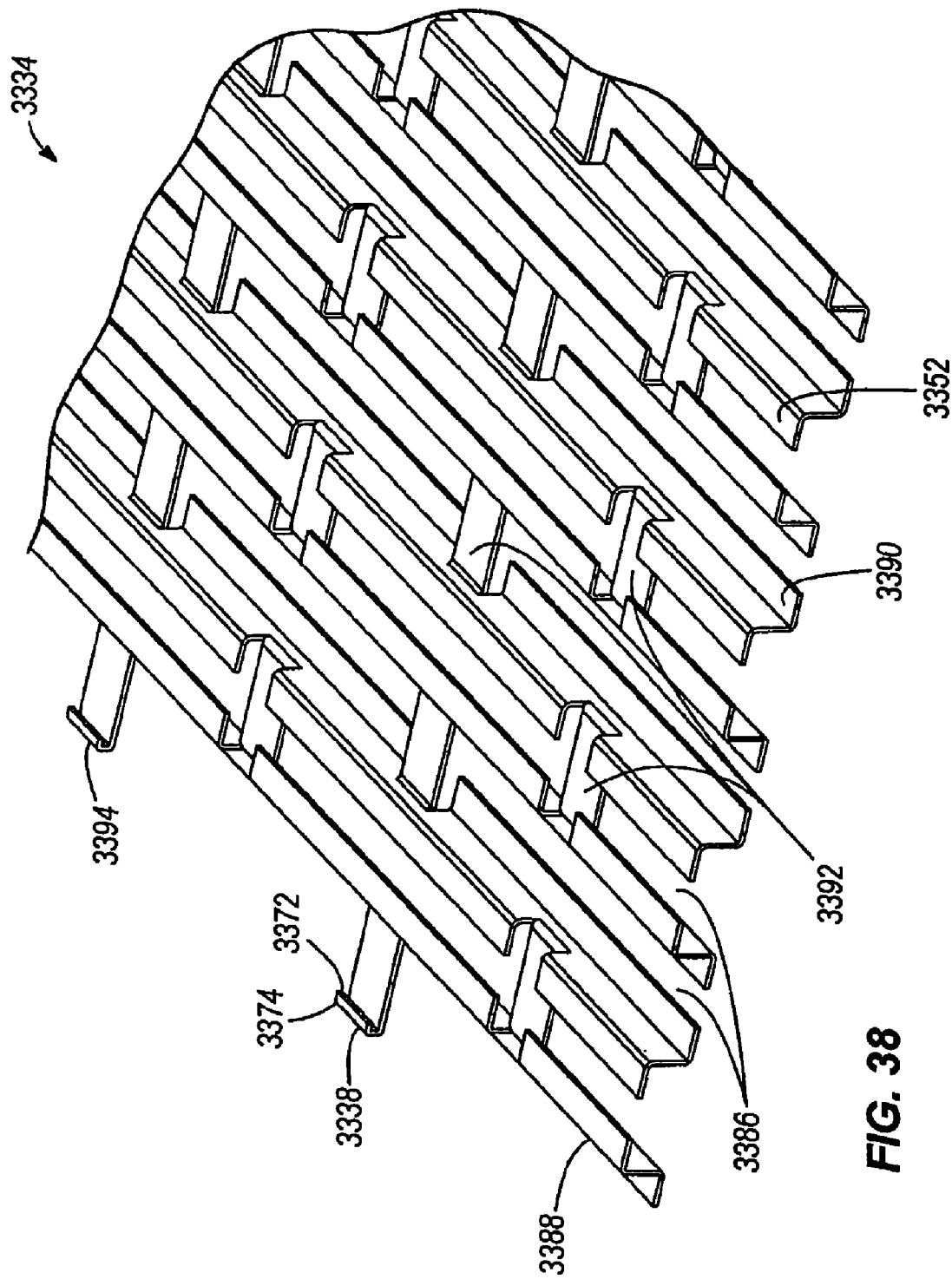
FIG. 38 is a perspective view of a portion of the internal insert shown in FIG. 35.
Figure 39:
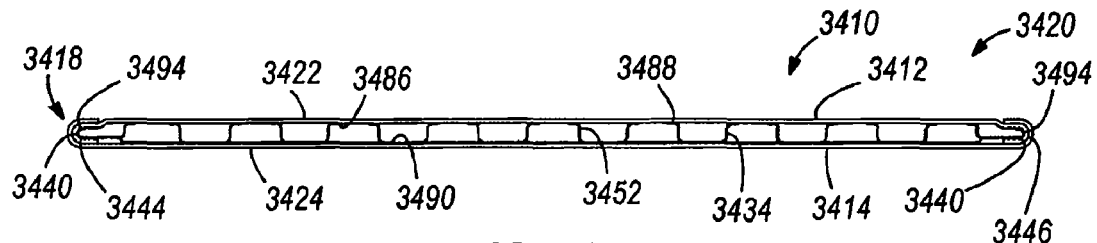
FIG. 39 is a side view of a tube according to some embodiments of the present invention.
Figure 40:
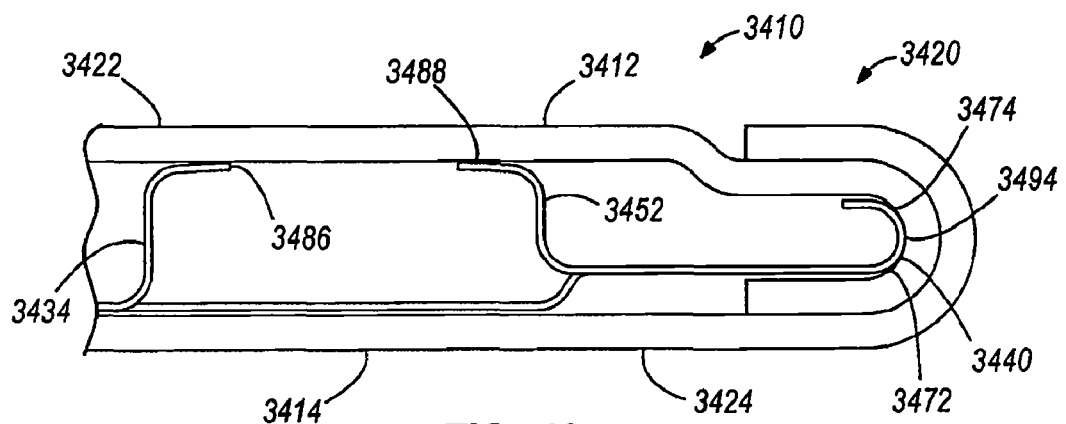
FIG. 40 is an enlarged perspective view of an internal insert for the tube shown in FIG. 39.
Figure 41:
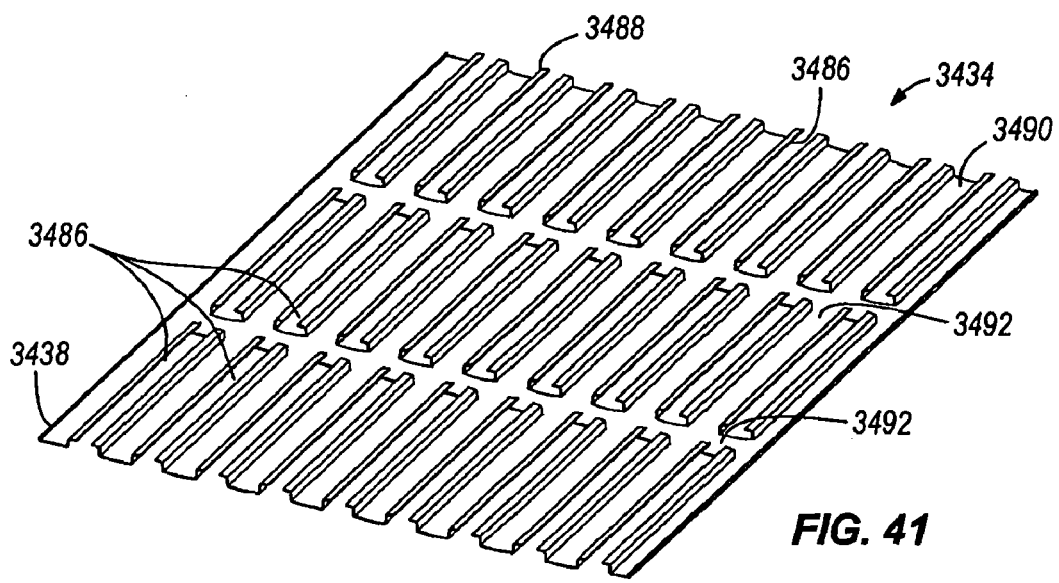
FIG. 41 is a perspective view of a portion of the internal insert shown in FIG. 40.
Figure 42:
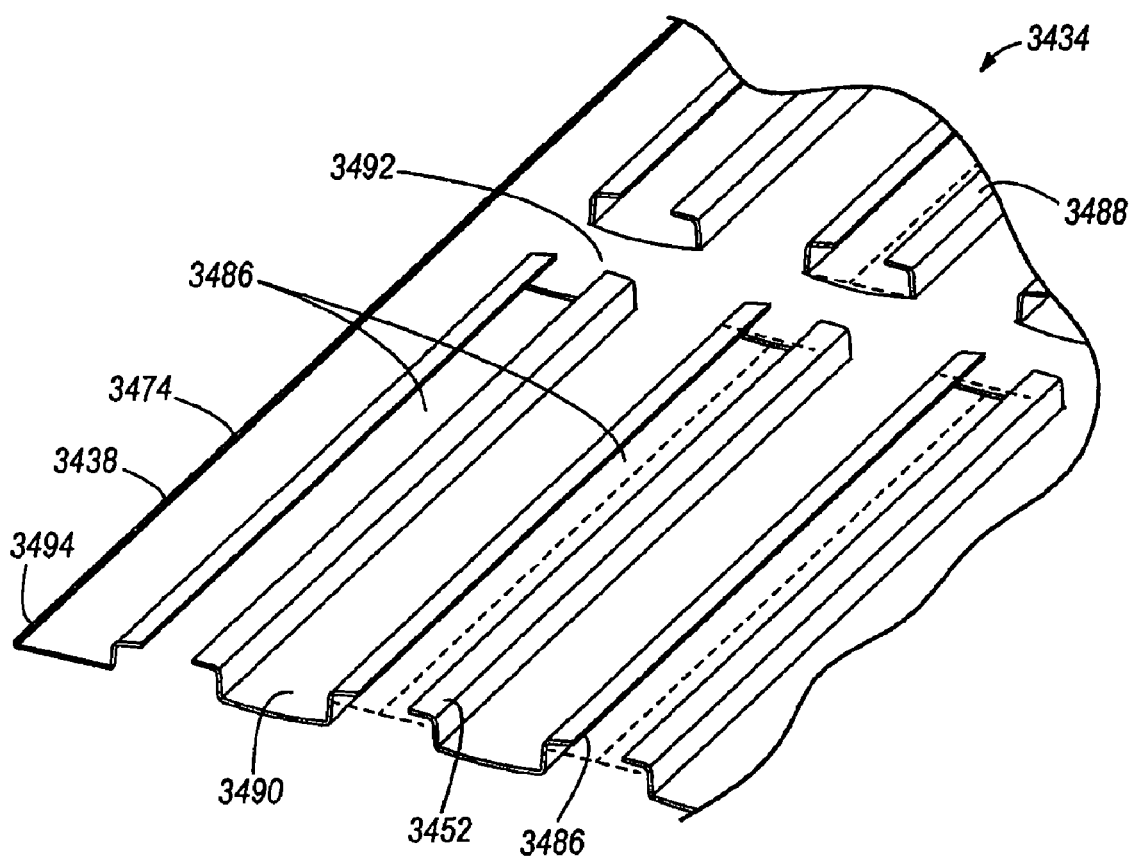
FIG. 42 is an enlarged perspective view of the internal insert shown in FIG. 40.
Figure 43:
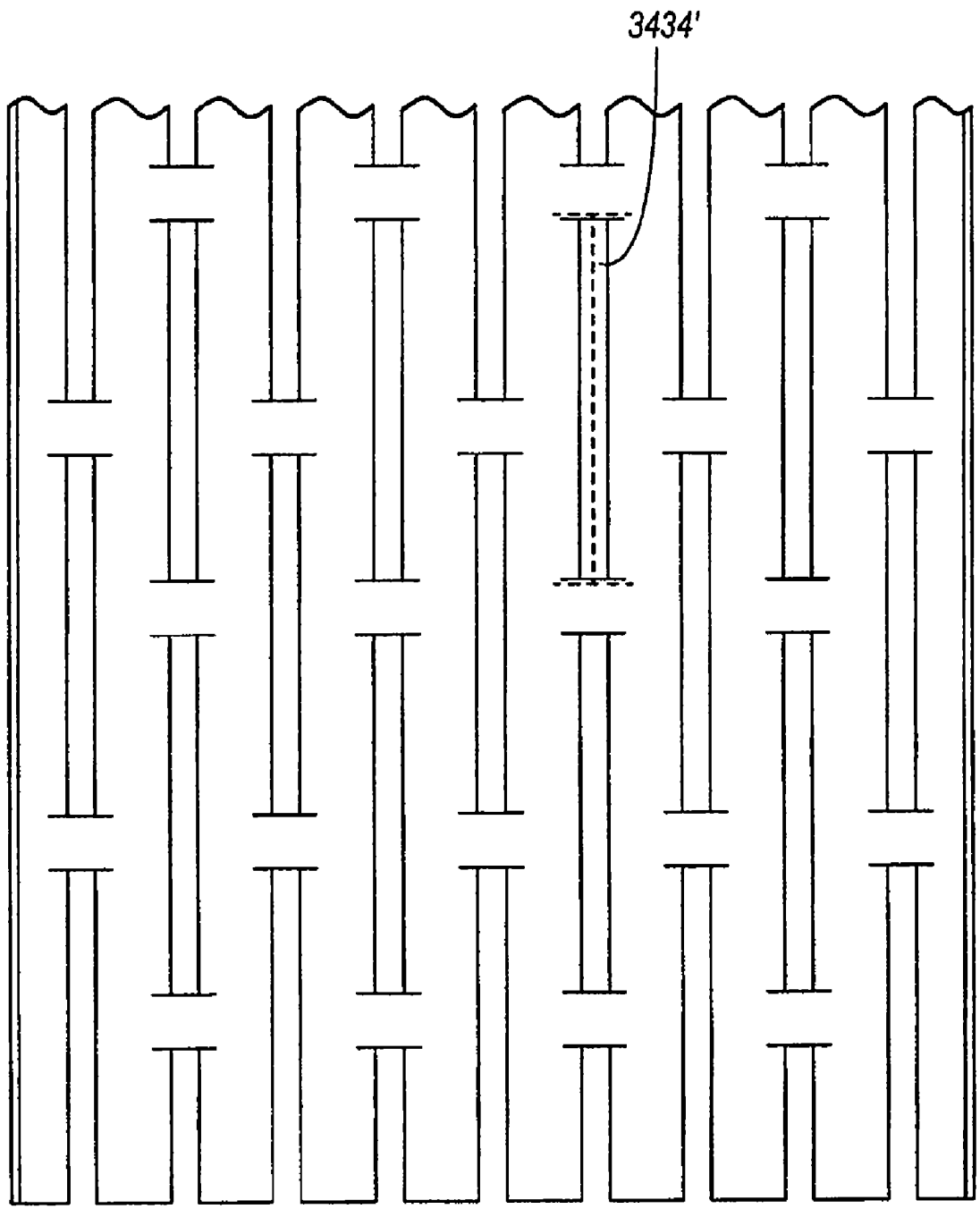
FIG. 43 is a top view of a portion of an internal insert for a tube according to some embodiments of the present invention.
Figure 44:
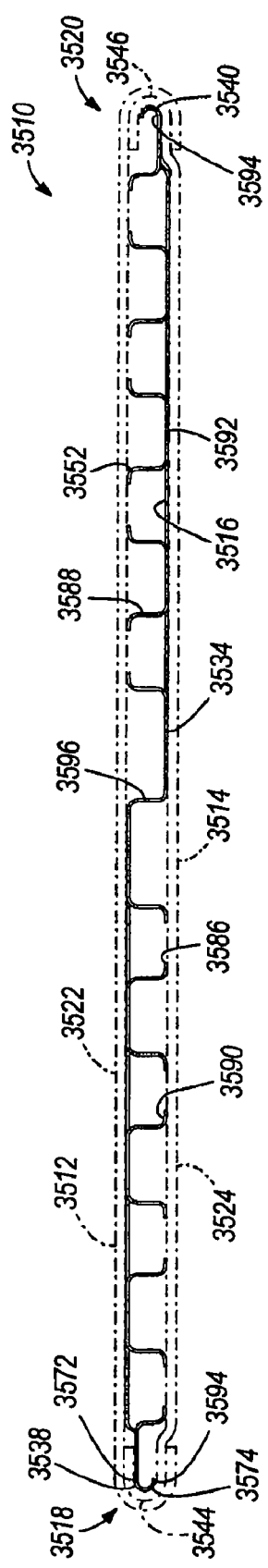
FIG. 44 is a side view of a an insert according to an embodiment of the present invention, shown within a flat tube in phantom.
Figure 45:
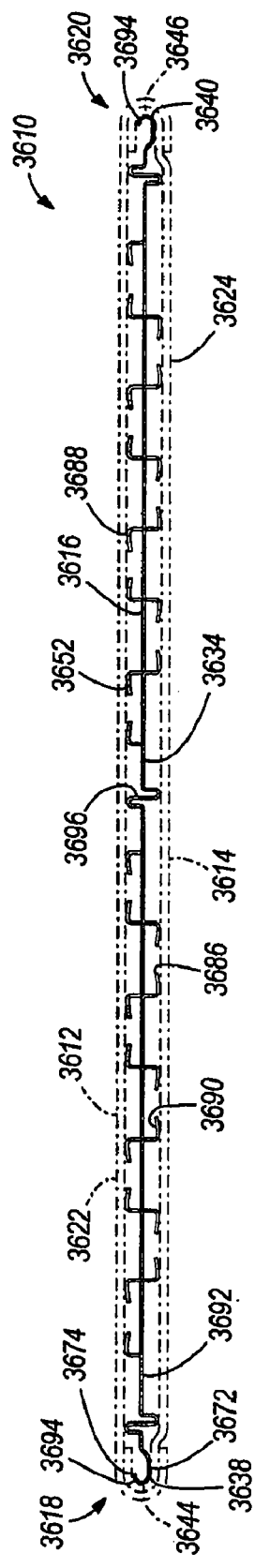
FIG. 45 is a side view of another insert according to an embodiment of the present invention, shown within a flat tube in phantom.

FIG. 34 illustrates ten constructions of flat tubes according to additional embodiments of the present invention. These embodiments employ much of the same structure and have many of the same properties as the embodiments of the flat tube described above in connection with FIGS. 25-33. Accordingly, the following description focuses primarily upon the structure and features that are different than the embodiments described above in connection with FIGS. 25-33. Reference should be made to the description above in connection with FIGS. 25-33 for additional information regarding the structure and features, and possible alternatives to the structure and features of the flat tubes illustrated in FIG. 34 and described below. Structure and features of the embodiments shown in FIG. 34 that correspond to structure and features of the embodiments of FIGS. 25-33 are designated hereinafter in respective series of reference numbers beginning with 2300.

As described above in connection with the illustrated embodiment of FIGS. 25 and 26, further reinforcement of the first and/or second narrow sides of a flat tube can be provided by one or more folds of the first and/or second tube portions at the narrow sides (i.e., at the longitudinal edges of such portions). Generally, folding the longitudinal edges of the first and/or second tube portions can increase the strength of the flat tube and resistance of the flat tube to damage. This feature can be employed in any of the embodiments described in connection with FIGS. 25-33. Examples of flat tubes having longitudinal folded edges are illustrated in FIG. 34, wherein inserts defining generally rectangular flow channels and not extending into or folded within the folds of the narrow tube sides are illustrated by way of example only. Any of the other types of inserts (or no inserts at all) or longitudinal insert construction and position described herein can instead be used as desired.

Each of the flat tubes 2310, 2410, 2510, 2610, 2710, 2810, 2910, 3010, 3110, 3210 illustrated in FIG. 34 includes at least one longitudinal edge of at least one of the first and second tube portions 2312, 2412, 2512, 2612, 2712, 2812, 2912, 3012, 3112, 3212 and 2314, 2414, 2514, 2614, 2714, 2814, 2914, 3014, 3114, 3214 having a fold 2330, 2430, 2530, 2630, 2730, 2830, 2930, 3030, 3130, 3230. Each of the constructions illustrated in FIG. 34 have an encompassed edge 2380, 2382 . . . 3280, 3282 (that is, the longitudinal edge 2380, 2382 . . . 3280, 3282 that is at least partially surrounded by a longitudinal edge 2378, 2384 . . . 3278, 3284 of the other tube portion 2312, 2314 . . . 3212, 3214) with at least one fold 2330 . . . 3230. Some of the constructions in FIG. 34 illustrate an encompassing edge 2978, 2984, 3078, 3074, 3178, 3174, 3278, 3274 (that is, the longitudinal edge 2978, 2984, 3078, 3074, 3178, 3174, 3278, 3274 that at least partially surrounds a longitudinal edge 2980, 2982, 3080, 3082, 3180, 3182, 3280, 3282 of the other tube portion 2912, 2914, 3012, 3014, 3112, 3114, 3212, 3214) with at least one fold 2930, 3030, 3130, 3230. Although the opposite narrow ends of each two-piece flat tube illustrated in FIG. 34 employ the same folded construction, in other embodiments (with or without inserts) only one of the two narrow ends has such a construction, in which case the other narrow end can have any of the other folded constructions described herein or has no longitudinal folded tube edge portions at all. In other embodiments, each of the longitudinal edges of at least one of the narrow ends of the two-piece flat tube (with or without an insert) has at least one fold.

In some embodiments, one of the narrow ends of any of the flat tubes illustrated in FIG. 34 can have any of the longitudinal folded edge constructions described and/or illustrated herein, while the other narrow end can have any of the folded constructions described above and/or illustrated in connection with any of the embodiments shown in FIGS. 1-24 (with or without inserts). In such cases, the other narrow end can be defined by a folded continuous sheet of material as described in detail above in connection with the one-piece tube embodiments of FIGS. 16-22, thereby resulting in a one-piece tube.

The combination of the longitudinal folded constructions of the first and second tube portions described herein with the relatively small thickness dimensions of the material that can be employed in some embodiments (as described above) can produce flat tubes having a significantly reduced weight without compromise of strength and stability.

For ease of description, the constructions of the flat tubes 2310 . . . 3210 illustrated in FIG. 34 include a similar configuration as the flat tube 1810 shown in FIGS. 25 and 26 with respect to the orientation of the first and second portions 2312, 2314 . . . 3212, 3214, and are classified into three groups: B, C, and D. Each of the groups B, C, and D illustrates alternative characteristics of the flat tube 2310 . . . 3210. As mentioned above, it is to be understood that the features illustrated in FIG. 34 are also applicable to other configurations of two-piece and one-piece flat tubes described and/or illustrated herein, and can be utilized with or without an insert. The flat tubes 2310, 2410, 2510, 2610, 2710, 2810 of Groups B and C each include a non-folded encompassing longitudinal edge 2378, 2384, 2478, 2484, 2578, 2584, 2678, 2684, 2778, 2784, 2878, 2884 of the first and second tube portions 2312, 2314, 2412, 2414, 2512, 2514, 2612, 2614, 2712, 2714, 2812, 2814 respectively. More specifically, the encompassing edges 2378, 2384, 2478, 2484, 2578, 2584, 2678, 2684, 2778, 2784, 2878, 2884 at least partially enclose encompassed edges 2382, 2380, 2482, 2480, 2582, 2580, 2682, 2680, 2782, 2780, 2882, 2880 having at least one fold 2330, 2430, 2530, 2630, 2730, 2830. The folds 2330, 2430, 2530, 2630, 2730, 2830 of the encompassed edges 2382, 2380, 2482, 2480, 2582, 2580, 2682, 2680, 2782, 2780, 2882, 2880 can be substantially parallel to the broad sides 2322, 2324, 2422, 2424, 2522, 2524, 2622, 2624, 2722, 2724, 2822, 2824 (e.g., Groups B and C). Also, the folds 2330, 2430, 2530 can include a portion parallel to the encompassing edge 2378, 2384, 2478, 2484, 2578, 2584 (e.g., Group B).

The flat tubes 2910, 3010, 3110 of Group D include narrow sides 2918, 2920, 3018, 3020, 3118, 3120, wherein both the encompassing edges 2978, 2984, 3078, 3084, 3178, 3184 and the encompassed edges 2982, 2980, 3082, 3080, 3182, 3180 of the first and second tube portions 2912, 2914, 3012, 3014, 3112, 3114 have folds 2930, 3030, 3130. As a result, the stability of the narrow sides 2918, 2920, 3018, 3020, 3118, 3120 can be increased with respect to the narrow sides 2318, 2320, 2418, 2420, 2518, 2520, 2618, 2620, 2718, 2720, 2818, 2820 of the flat tubes 2310, 2410, 2510, 2610, 2710, 2810 in Groups B and C. Furthermore, the encompassed and encompassing edges 2982, 2980, 3082, 3080, 3182, 3180 and 2978, 2984, 3078, 3084, 3178, 3184 of each of the flat tubes 2910, 3010, 3110 in Group D define only one fold 2930, 3030, 3130 (although more folds are possible in other embodiments), whereas the encompassed edges 2382, 2380, 2482, 2480, 2582, 2580, 2682, 2680, 2782, 2780, 2882, 2880 of the Group B and C flat tubes 2310, 2410, 2510, 2610, 2710, 2810 define more than one fold 2330, 2430, 2530, 2630, 2730, 2830. Also with reference to the Group D flat tubes 2910, 3010, 3110, the one fold 2930, 3030, 3130 of each encompassing edge 2978, 2984, 3078, 3084, 3178, 3184 is substantially parallel to the outermost portion of the flat tube 2910, 3010, 3110, and at least a portion of the fold 2930, 3030, 3130 of each encompassed edge 2982, 2980, 3082, 3080, 3182, 3180 is substantially parallel to the broad sides 2922, 2924, 3022, 3024, 3122, 3124 of the flat tubes 2910, 3010, 3110.

With continued reference to the various flat tube embodiments illustrated in FIG. 34, it is to be understood that the number of folds 2330 . . . 3230 at the encompassing and encompassed edges 2382, 2380 . . . 3282, 3280 and 2378, 2384 . . . 3278, 3284, and the design or shape of the folds 2330 . . . 3230 can be adjusted according to a desired set of parameters. Furthermore, although the internal insert 2334 . . . 3234 of the flat tube embodiments illustrated in FIG. 34 is not used for reinforcing the narrow sides 2318, 2320 . . . 3218, 3220, in other embodiments, either or both longitudinal edges 2338, 2340 . . . 3238, 3240 of the insert 2334 . . . 3234 is folded with and within the longitudinal edges 2382, 2380 . . . 3282, 3280 and 2378, 2384 . . . 3278, 3284 of the first and second tube portions 2312, 2314 . . . 3212, 3214. Yet other constructions of the flat tube can include forming folds with the longitudinal edges of a one-piece strip as mentioned above.

In any of the two-piece tube flat tube embodiments described in connection with FIGS. 25-34, it is envisioned that throughout the manufacturing process of the flat tube 1710 . . . 3210, the width of any of the longitudinal seams 1744, 1746 . . . 3244, 3246 or of the gradations 1716 . . . 3216 can be adjusted for different tubes 1710 . . . 3210. As a result, an abrupt thickness change of the broad sides 1722, 1724 . . . 3222, 3224 can be compensated, reduced, or even avoided. For purposes of illustration, it can be observed that the distance e illustrated in FIGS. 31 and 32B (representing the distance from the terminal longitudinal edge 2156, 2256 to the distal end of the corresponding narrow tube side 2120, 2220 is significantly larger in the embodiment of FIG. 31 than it is in the embodiment of FIGS. 32A and 32B. This distance e can be varied in any of the embodiments as desired.

FIGS. 35-45 illustrate several flat tube inserts according to various embodiments of the present invention, any of which can be used in any of the flat tube embodiments described and/or illustrated herein. In many embodiments, an insert can be described as having a number of hills and valleys at least partially defining flow channels along a flat tube.

The flat tubes 3310, 3410, 3510, 3610 illustrated in FIGS. 35-45 each include an internal insert 3334, 3434, 3534, 3634 with a number of elongated openings 3386, 3486, 3586, 3686 generally defined in the hills 3388, 3488, 3588, 3688 and/or valleys 3390, 3490, 3590, 3690 of the insert 3334, 3434, 3534, 3634. The elongated openings 3386, 3486, 3586, 3686 extend in a generally longitudinal direction along the insert 3334, 3434, 3534; 3634 (i.e., in a direction that will extend generally longitudinally along the inside of a flat tube 3310, 3410, 3510, 3610 in which the insert 3334, 3434, 3534, 3634 will be installed). In some constructions of the flat tube 3310, 3410, 3510, 3610, the elongated openings 3386, 3486, 3586, 3686 can be interrupted by bridges 3392, 3492, 3592, 3692. The bridges 3392, 3492, 3592, 3692 can be oriented to be substantially parallel to the broad sides 3312, 3314, 3412, 3414, 3512, 3514, 3612, 3614 of the flat tube 3310, 3410, 3510, 3610, and can be spaced at any desired regular or irregular interval along the longitudinal direction of the insert 3334, 3434, 3534, 3634.

By providing elongated openings 3386, 3486, 3586, 3686 in the insert 3334, 3434, 3534, 3634 as described above, the weight of the insert 3334, 3434, 3534, 3634 (and consequently of a heat exchanger equipped with flat tubes 3310, 3410, 3510, 3610 having such inserts 3334, 3434, 3534, 3634) can be significantly reduced in relation an insert 3334, 3434, 3534, 3634 that does not include such elongated openings 3386, 3486, 3586, 3686. Based on the design of the internal insert 3334, 3434, 3534, 3634, it is envisioned that the weight of an internal insert 3334, 3434, 3534, 3634 can be reduced by up to 50% with the inclusion of the elongated openings 3386, 3486, 3586, 3686, compared to a continuously corrugated internal insert 3334, 3434, 3534, 3634 of similar dimensions.

In some embodiments, the inserts 3334, 3434, 3534, 3634 described above and illustrated in FIGS. 35-45 are produced by cutting a sheet of material (e.g., endless or discrete lengths of aluminum, aluminum alloy, copper, brass or other metal, or other material), and bending portions of the cut sheet out of plane with respect to the original sheet. For example, in the constructions of the inserts 3334, 3434, 3534, 3634 shown in FIGS. 35-45, the internal inserts 3334, 3434, 3534, 3634 can be produced from a relatively thin sheet metal thickness of about 0.03 mm (0.0011811 in). The bent portions can include elongated slits which are opened by bending sheet material adjacent the slits out of plane with respect to the original sheet. The bends can be made in both directions out of the plane of the original sheet, or in only one direction out of the plane, thereby producing inserts 3334, 3434, 3534, 3634 having different shapes. Further cuts can be made to facilitate this bending, such as slits perpendicular to and joined with the elongated slits just described. In some embodiments, the bent portions include arc-like edges 3394, 3494, 3594, 3694 as illustrated in the embodiments of FIGS. 35-45, for example. In some embodiments, the cuts made in the sheet of material (prior to bending) and the resulting elongated openings 3386, 3486, 3586, 3686 and bridges 3392, 3492, 3592, 3692 define a double-T shape.

The inventors have discovered that desired internal pressure stability can be achieved within flat tubes including the inserts 3334, 3434, 3534, 3634 illustrated in FIGS. 35-45. More specifically, the brazing surfaces of the inserts 3334, 3434, 3534, 3634 illustrated in FIGS. 35-45 (defined by the upper portions of the arc-like edges 3394, 3494, 3594, 3694) are sufficiently large to provide strong bonds between the inserts 3334, 3434, 3534, 3634 and the broad sides 3322, 3324, 3422, 3424, 3522, 3524 of the flat tube 3310, 3410, 3510, 3610. The flanks of the arc-like edges 3394, 3494, 3594, 3694 can also be joined together by brazing the arc-like edges 3394, 3494, 3594, 3694 to the corresponding broad sides 3322, 3324, 3422, 3424, 3522, 3524, 3622, 3624 of the flat tube 3310, 3410, 3510, 3610. Such constructions of lamellae or internal inserts 3334, 3434, 3534, 3634 are frequently called flat-top lamellae.

The use of the inserts 3334, 3434, 3534, 3634 described above in conjunction with the flat tubes illustrated in FIGS. 35-45 and described elsewhere herein provides excellent results. For example, the bonds just described provide further strength to those flat tubes of the present invention constructed of the relatively thin sheet material having dimensions described earlier. Advantages were also found regarding the pressure loss experienced when using such internal inserts 3334, 3434, 3534, 3634. Furthermore, internal inserts 3334, 3434, 3534, 3634 having the elongated openings 3386, 3486, 3586, 3686 and bridges 3392, 3492, 3592, 3692 as described above can help prevent the first and second portions 3312, 3314, 3412, 3414, 3512, 3514, 3612, 3614 of the flat tube 3310, 3410, 3510, 3610 from being easily transversely shifted away from one another. For example, this structure can help prevent one of the first and second flat tube portions 3312, 3412, 3512, 3612 from shifting in the longitudinal direction of the flat tube 3310, 3410, 3510, 3610 with respect to the other flat tube portion 3314, 3414, 3514, 3614 in the course of manufacturing processes performed to create the completed flat tube assembly. One reason is that the hills 3388, 3488, 3588, 3688 and valleys 3390, 3490, 3590, 3690 having the elongated openings 3386, 3486, 3596, 3696 described above can exert an elastic force from the inside of the flat tube 3310, 3410, 3510, 3610 onto the broad sides 3322, 3324, 3422, 3424, 3522, 3524, 3622, 3624, thus placing the broad sides 3322, 3324, 3422, 3424, 3522, 3524, 3622, 3624 under tension to prevent or reduce such shifting.

In each of the embodiments illustrated in FIGS. 35-45 the inserts 3334, 3434, 3534, 3634 are received within two-piece flat tubes 3310, 3410, 3510, 3610 in which the longitudinal seams 3344, 3346, 3444, 3446, 3544, 3546, 3644, 3646 joining the two portions of the flat tube 3310, 3410, 3510, 3610 extend to and are at least partially located on different portions 3312, 3314, 3412, 3414, 3512, 3514, 3612, 3614. In each embodiment, the two portions 3312, 3314, 3412, 3414, 3512, 3514, 3612, 3614 are substantially identical to each other. However, in other embodiments, the inserts 3334, 3434, 3534, 3634 can be utilized in any of the other one-piece or two-piece flat tubes of the present invention described herein. For example, the two portions 3312, 3314, 3412, 3414, 3512, 3514, 3612, 3614 can be arranged such that one longitudinal seam 3344, 3444, 3544, 3644 is in one broad side 3324, 3424, 3524, 3624 and the other longitudinal seam 3346, 3446, 3546, 3646 is in the other broad side 3322, 3422, 3522, 3622 of the flat tube 3310, 3410, 3510, 3610, such as in the embodiment of the present invention illustrated in FIGS. 25 and 26. In such embodiments, one longitudinal edge 3354, 3356, 3454, 3456, 3554, 3556, 3654, 3656 of each of the two portions 3312, 3314, 3412, 3414, 3512, 3514, 3612, 3614 extends freely substantially within the flat tube 3310, 3410, 3510, 3610. As a consequence, the two portions 3312, 3314, 3412, 3414, 3512, 3514, 3612, 3614 can have relatively large tolerances in their widths as described earlier in connection with the illustrated embodiment of FIGS. 25 and 26. In other embodiments, both longitudinal seams 3344, 3346, 3444, 3446, 3544, 3546, 3644, 3646 are located to extend into the same broad side 3322, 3422, 3522, 3622 or 3324, 3424, 3524, 3624, such as the embodiment of the present invention illustrated in FIG. 27.

In some embodiments, either or both longitudinal edges 3338, 3340, 3448, 3440, 3548, 3540, 3648, 3640 of the insert 3334, 3434, 3534, 3634 can extend into a corresponding narrow side 3318, 3320, 3418, 3420, 3518, 3520, 3618, 3620, and can be shaped to line at least a portion of the interior of the narrow side 3318, 3320, 3418, 3420, 3518, 3520, 3618, 3620 in any of the manners described above in connection with the illustrated embodiments of FIGS. 25-34. For example, either or both longitudinal edges 3338, 3340, 3448, 3440, 3548, 3540, 3648, 3640 of the insert 3334, 3434, 3534, 3634 can include a gradation 3472, 3672 (see, for example, the embodiments of FIGS. 39-42 and 45) and/or an arc-shaped edge 3374, 3474, 3574, 3674 to reinforce either or both narrow sides 3318, 3320, 3418, 3420, 3518, 3520, 3618, 3620.

Such a relationship between the insert 3334, 3434, 3534, 3634 and the flat tube 3310, 3410, 3510, 3610 can provide significant strength and stability advantages as described earlier. In such embodiments, the thickness of the reinforced narrow sides 3318, 3320, 3418, 3420, 3518, 3520, 3618, 3620 corresponds to the sum of the thicknesses of the first and second tube portions 3312, 3314, 3412, 3414, 3512, 3514, 3612, 3614 and the thickness of the insert 3334, 3434, 3534, 3634. In some embodiments having this relationship, each of the first and second tube portions 3312, 3314, 3412, 3414, 3512, 3514, 3612, 3614 can have a thickness of no greater than about 0.15 mm (0.00591 in). Furthermore, each of the first and second tube portions 3312, 3314, 3412, 3414, 3512, 3514, 3612, 3614 can have a thickness greater than about 0.10 mm (0.003937 in). Also or alternatively, in such embodiments the thickness of the insert 3334, 3434, 3534, 3634 is no greater than about 0.10 mm (0.003937 in). For example, the flat tube 3310, 3410, 3510, 3610 can have first and second tube portions 3312, 3314, 3412, 3414, 3512, 3514, 3612, 3614 each with a thickness of about 0.12 mm (0.0047224 in), and in which the insert 3334, 3434, 3534, 3634 has a thickness of no greater than about 0.10 mm (0.003937 in). In other embodiments, the thickness of each of the first and second tube portions 3312, 3314, 3412, 3414, 3512, 3514, 3612, 3614 and the insert 3334, 3434, 3534, 3634 is no greater than about 0.15 mm (0.0059055 in) to provide a relatively cost-effective heat exchanger with good heat transfer and strength properties. Also, in some embodiments the thickness of each of the first and second tube portions 3312, 3314, 3412, 3414, 3512, 3514, 3612, 3614 and/or of the insert 3334, 3434, 3534, 3634 is no less than about 0.03 mm (0.0011811 in). In other embodiments, the inserts 3334, 3434, 3534, 3634 can have any of the insert thicknesses described above in connection with the illustrated embodiments of FIGS. 25-34.

As best shown in FIGS. 35, 39, 44, and 45, in some embodiments the inserts 3334, 3434, 3534, 3634 illustrated in FIGS. 35-45 are shaped such that the hills 3388, 3488, 3588, 3688 and valleys 3390, 3490, 3590, 3690 described above define corrugations 3352, 3452, 3552, 3652 running in the longitudinal direction of the inserts 3334, 3434, 3534, 3634. The flanks of these corrugations 3352, 3452, 3552, 3652 can be perpendicular or substantially perpendicular to the broad sides 3322, 3324, 3422, 3424, 3522, 3524 of the flat tubes 3310, 3410, 3510 (see FIGS. 35, 39, and 44) or can form an angle of inclination with respect to the broad sides 3622, 3624 of the flat tube 3610. In any of the illustrated embodiments of FIGS. 35-45, perpendicular or angled corrugation flanks can be used as desired. Additionally, the internal insert 3334, 3434, 3534, 3634 can be made of more than one part, such that the resulting flat tube assembly includes four or more parts in some embodiments.

In some embodiments (including embodiments in which the internal insert 3334, 3434, 3534, 3634 is constructed from a single sheet of material as described above), the internal insert 3334, 3434, 3534, 3634 is generally rolled in the longitudinal direction of the internal insert 3334, 3434, 3534, 3634 or of the flat tube 3310, 3410, 3510, 3610. In some manufacturing processes of the flat tube 3310, 3410, 3510, 3610, for example, two types of rolls are provided to roll the internal insert 3334, 3434, 3534, 3634 and generate the elongated openings 3386, 3486, 3586, 3686, the hills 3388, 3488, 3588, 3688 and the valleys 3390, 3490, 3590, 3690 in the longitudinal direction as described above. A first roll can be a cutting roll for forming slits on the substantially planar sheet. A second roll can be a forming roll for forming the hills 3388, 3488, 3588, 3688 and valleys 3390, 3490, 3590, 3690 defining the arc-like edges 3394, 3494, 3594, 3694 in FIGS. 35-45. Similar to the constructions described above, the longitudinal seams 3344, 3346, 3444, 3446, 3544, 3546, 3644, 3646 of the first and second tube portions 3312, 3314, 3412, 3414, 3512, 3514, 3612, 3614 forming the flat tube 3310, 3410, 3510, 3610 reach from the narrow sides 3318, 3320, 3418, 3420, 3518, 3520, 3618, 3620 into the broad sides 3322, 3324, 3422, 3424, 3522, 3524, 3622, 3624 of the flat tube 3310, 3410, 3510, 3610. As with the earlier-described two-piece tube embodiments, the gradations 3316, 3416, 3516, 3616 however, can lie in the broad sides 3322, 3324, 3422, 3424, 3522, 3524, 3622, 3624. As also described in earlier embodiments, the width of the gradation 3316, 3416, 3516, 3616 (measured to the distal end of the corresponding narrow side 3318, 3320, 3418, 3420, 3518, 3520, 3618, 3620) can be determined based on the manufacturing process and desired specifications of the flat tube 3310, 3410, 3510, 3610.

With continued reference to the illustrated embodiments of FIGS. 35-45, in some constructions of the flat tube 3310, 3410, 3510, 3610 having an insert 3334, 3434, 3534, 3634 with the elongated openings 3386, 3486, 3586, 3686 and bridges 3390, 3492, 3590, 3690 as described herein (including those embodiments having the relatively thin tube wall materials described above), the inventors have discovered that a flat tube small diameter d of at least about 0.7 mm (0.027559 in) provides good performance results in many applications, such as in radiators. The inventors have also discovered that a flat tube small diameter d of no greater than about 1.5 mm (0.059055 in) provides good performance results in many applications, such as in radiators, and particularly in those flat tube embodiments of the present invention having the relatively thin tube wall materials described above. In the case of charge air coolers and other applications, the inventors have discovered that the small diameter d can be greater than about 10.0 mm (0.3937 in) while still providing good performance results. Also, it should be noted that in other embodiments any of the small and large diameters D, d described above in connection with all of the flat tube embodiments disclosed herein can instead be used. The large diameter D of the two-piece flat tubes 3310, 3410, 3510, 3610 illustrated in FIGS. 35, 39, 44, and 45 can have any size desired (also including those described above in connection with all of the flat tube embodiments disclosed herein), based at least in part upon the width of the starting material used to construct the flat tube 3310, 3410, 3510, 3610. In this regard, if rolling rolls are used to produce the flat tubes, such rolls (not shown) can be adjusted to manufacture wider or narrower flat tubes 3310, 3410, 3510, 3610. In other constructions, the rolls for manufacturing the flat tubes 3310, 3410, 3510, 3610 can be replaced according to the desired dimensions of the flat tube 3310, 3410, 3510, 3610.

In some constructions of the flat tubes 3310, 3410, 3510, 3610 illustrated in the embodiments of FIGS. 35-45, the first and second tube portions 3312, 3314, 3412, 3414, 3512, 3514, 3612, 3614 and/or the insert 3334, 3434, 3534, 3634 can include a brazing material coating for the purpose of joining any two or more of these parts, and/or in some cases another element (e.g., a cooling grate of a heat exchanger). Although in some embodiments, the first and second tube portions 3312, 3314, 3412, 3414, 3512, 3514, 3612, 3614 and/or the insert 3334, 3434, 3534, 3634 are constructed of aluminum or an aluminum alloy, in other embodiments any or all of these parts can be constructed from other materials either suitable or not for brazing.

With particular reference now to the illustrated embodiment of FIGS. 35-38, in some embodiments the bridges 3390 interrupting the elongated openings 3386 are not continuous or aligned with other bridges spanning the entire width of the insert 3334. Instead, bridges 3390 interrupting an elongated opening can be staggered (i.e., located at different longitudinal positions along the insert 3334) with respect to adjacent bridges 3390 on either or both sides of the elongated opening 3386. In other embodiments, such as that shown in FIGS. 39-42, the bridges 3492 interrupting the elongated openings 3486 can be aligned so that two or more bridges 3492 interrupting adjacent elongated openings 3486 are aligned or substantially aligned at the same longitudinal position along the insert 3444. In either embodiment, the distance along each flow channel 3316, 3416 between bridges 3390, 3492 can be discrete (i.e., not in fluid communication with adjacent flow channels 3316, 3416), since the broad sides 3322, 3324, 3422, 3424 can close the elongated openings 3386, 3486. Although the bridge arrangements illustrated in the embodiments of FIGS. 35-42 provide advantages from manufacturing standpoints, in still other embodiments, the bridges can be arranged in any other manner desired.

The hydraulic diameter defined by the flow channels 3316, 3416 are defined by the corresponding design of the hills 3388, 3488 and valleys 3488, 3490 of the insert 3334, 3434. The hydraulic diameter can be relatively small, considering a small diameter d of about 0.8 mm (0.031496 in) and a relatively large number of flow channels 3316, 3416 across the width of the insert 3334, 3434, for example.

With continued reference to the embodiment shown in FIGS. 35-38, the illustrated corrugations 3352 "oscillate" approximately around a middle plane of the insert 3334 (or flat tube 3310). In other words, the flanks and arc-shaped edges 3374 of the insert 3334 extend in opposite directions toward the first and second tube portions 3312, 3314 from a portion of the insert 3334 defined between, and substantially parallel to, the broad sides 3322, 3324 of the flat tube 3310. Although this portion between the broad sides 3322, 3324 can be located at a middle plane of the insert 3334, such as that shown in FIG. 37, this portion from which the hills 3390 and valleys 3388 extend can be located anywhere between the extremities of the insert 3334 to either side of the original planar sheet. Also, it should be noted that the construction of the insert 3334 shown in FIG. 35 has elongated openings 3386 formed in the hills 3390 and valleys 3388 of the illustrated corrugations 3352, although such openings 3386, 3388 need not necessarily be defined in both the hills 3390 and valleys 3388 in other embodiments.

In the embodiment of FIGS. 38-42, the corrugations 3452 are instead formed to one side of the insert 3434. In particular, the insert 3434 is not in a middle plane with respect to the broad sides 3422, 3424 of the flat tube 3410, but instead lies approximately at the lower broad side 3424 of the flat tube 3410. Furthermore, the construction of the insert 3434 shown in FIG. 39 has elongated openings 3486 only in the hills 3488 of the illustrated corrugations 3452.

In some embodiments, any of the inserts described herein can be separated into two or more sections along the width of the inserts in order to define two or more flow channels that in some embodiments are fluidly isolated from one another. This separation can be produced by one or more longitudinally extending partitions defined in whole or in part by the insert. For example, in the embodiments of FIGS. 44 and 45, each of the internal inserts 3534, 3634 is formed with at least one partition 3596, 3696 to provide the flat tube 3510, 3610 with at least two flow chambers having any number of flow channels 3516, 3616 desired. In this manner, a separation of two flow mediums flowing within the flat tube 3510, 3610 is accomplished. Each of the flat tubes 3510, 3610 illustrated in FIGS. 44 and 45 includes two such flow chambers, permitting (for example) a medium to flow forward in one flow chamber in one direction, and permitting the same or a different medium to flow backward in the other flow chamber in an opposite direction.

A number of flat tubes according to various embodiment of the present invention have been described above as being constructed of a single piece of material (see, for example, the illustrated embodiments of FIGS. 16-23, which show a number of flat tubes 910, 1010, 1110, 1210, 1310, 1410, 1510, 1610 each having a number of interior folds 928, 1028, 1128, 1228, 1328, 1428, 1528, 1628 defined by first and second portions 912, 914, 1012, 1014, 1112, 1114, 1212, 1214, 1312, 1314, 1412, 1414, 1512, 1514, 1612, 1614 of the same piece of material used to construct the tube 910, 1010, 1110, 1210, 1310, 1410, 1510, 1610). As described in greater detail above, the interior folds 928, 1028, 1128, 1228, 1328, 1428, 1528, 1628 at least partially define a number of flow channels 916, 1016, 1116, 1216, 1316, 1416, 1516, 1616 through the flat tubes 910, 1010, 1110, 1210, 1310, 1410, 1510, 1610.

Figure 46:
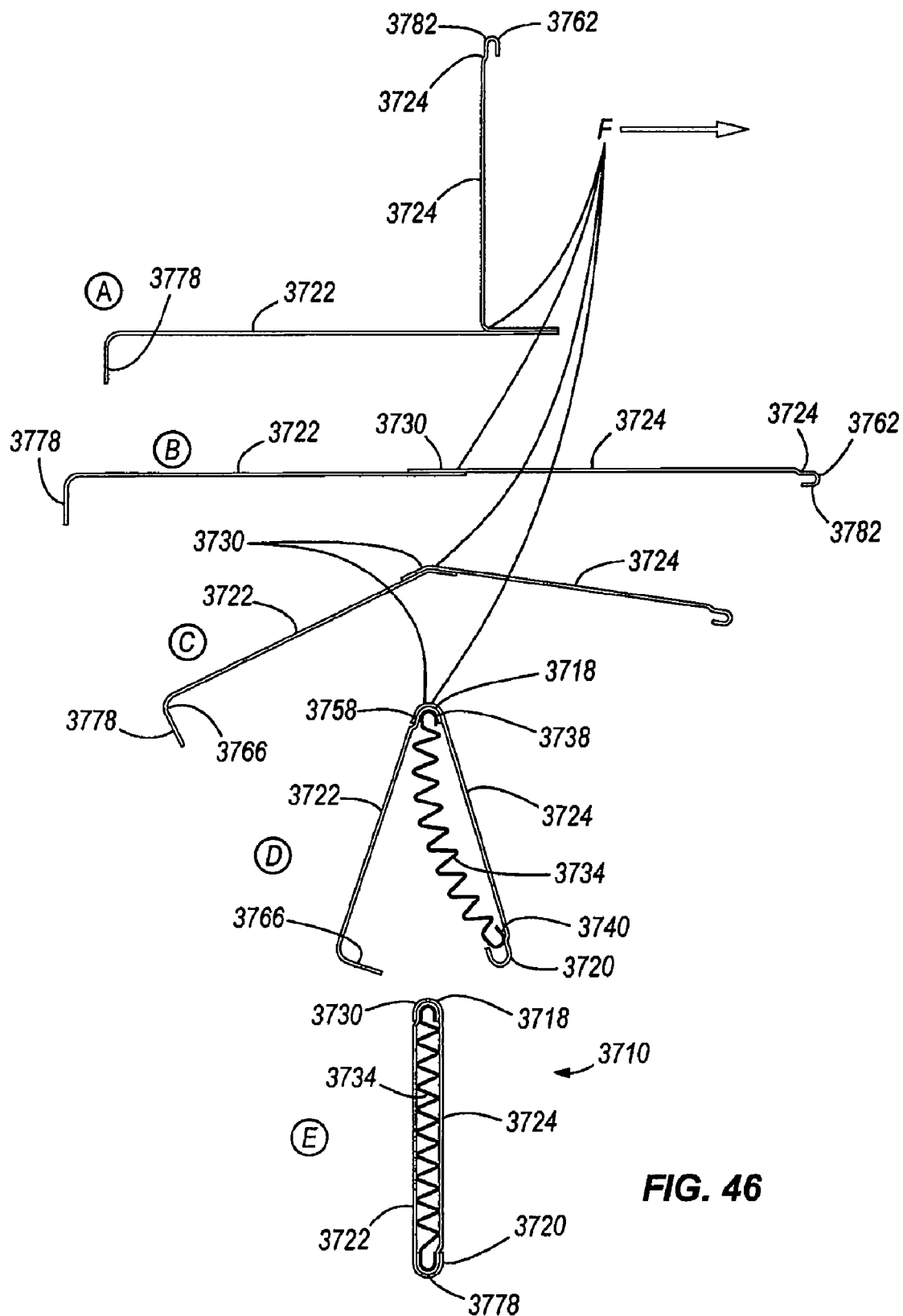
FIG. 46 schematically illustrates a set of exemplary manufacturing steps that can be used to form a tube according to some embodiments of the present invention.
Figure 47:
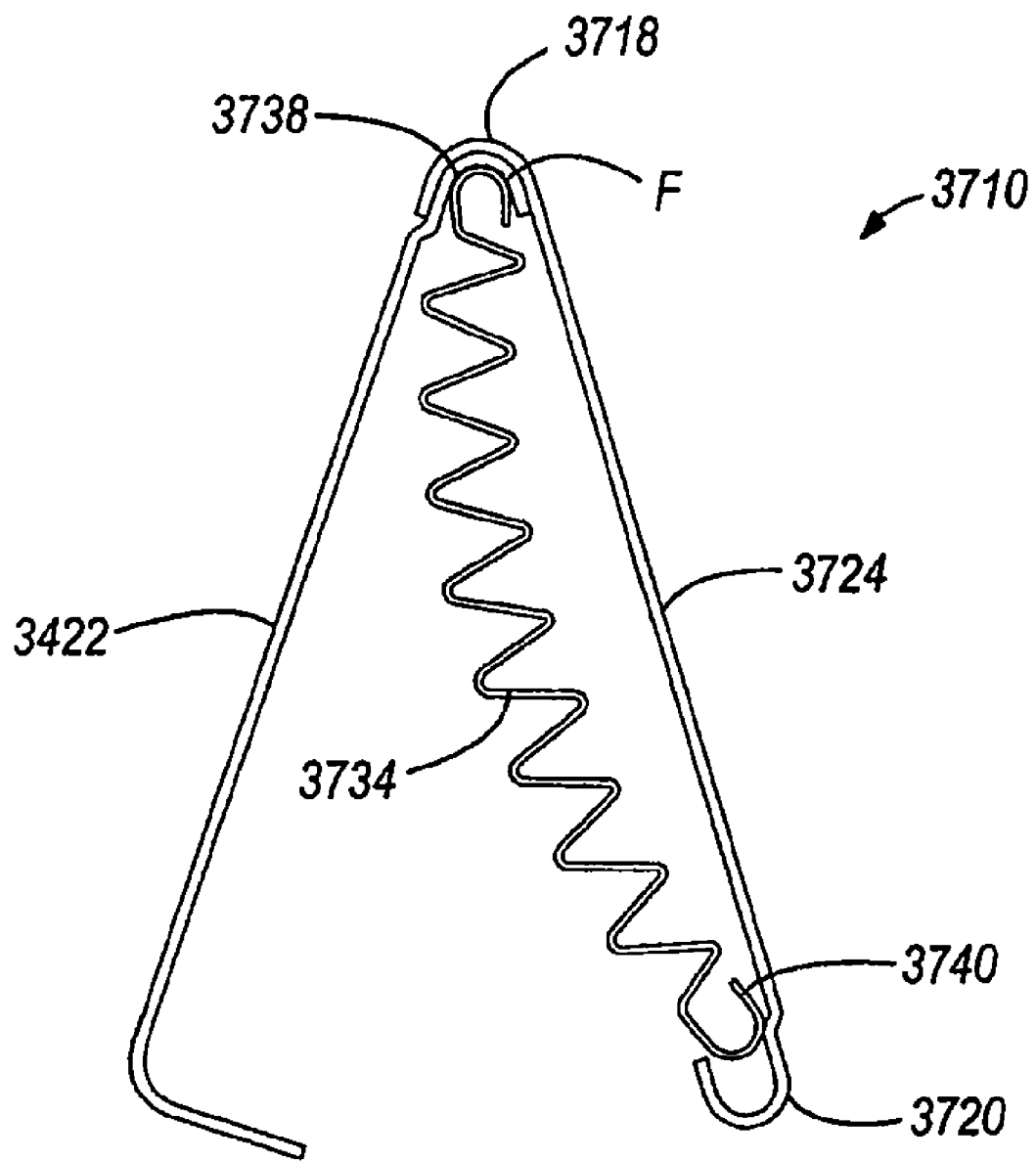
FIG. 47 is a partially exploded side view of the tube shown in FIG. 46.
Figure 48:
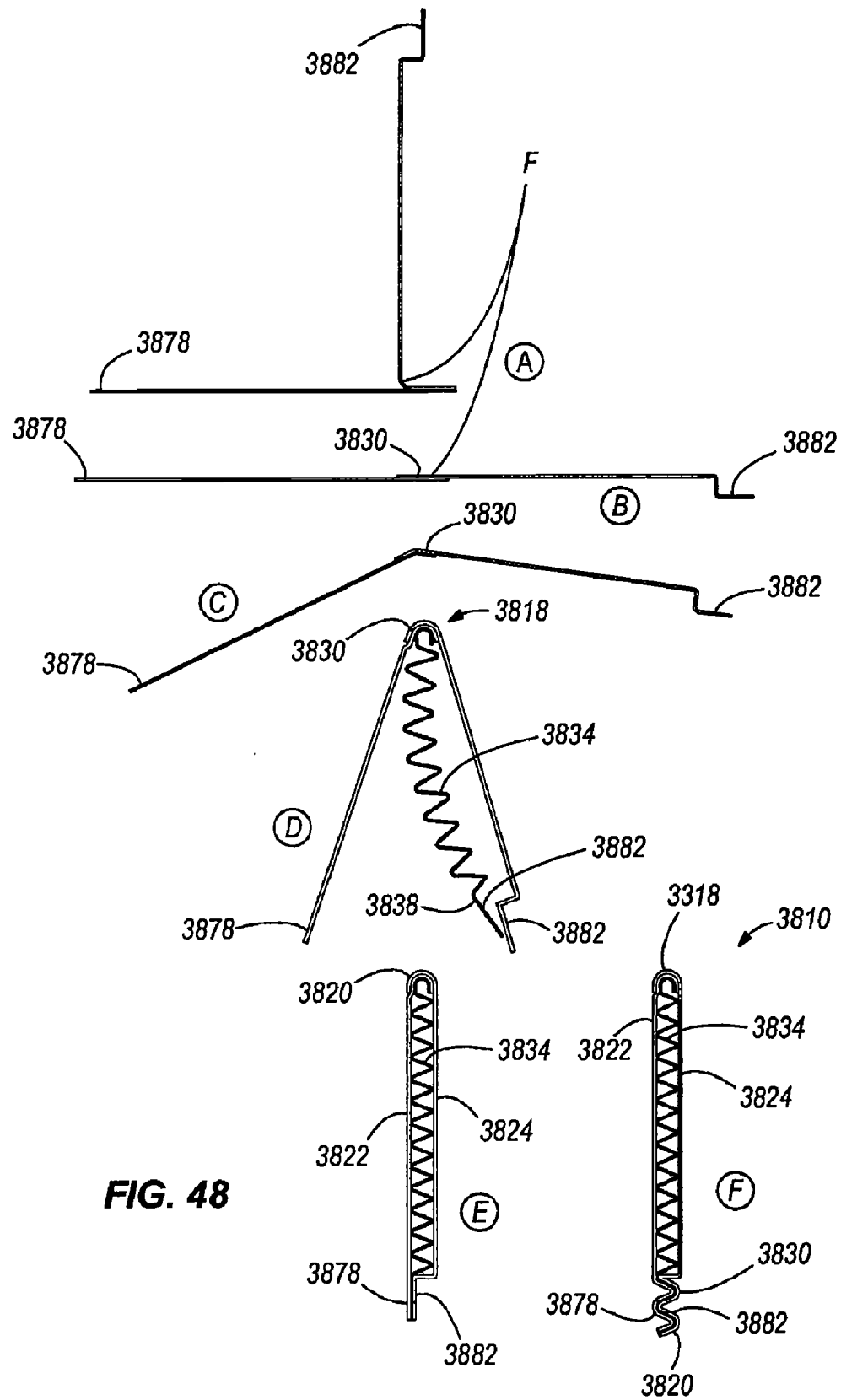
FIG. 48 schematically illustrates a set of exemplary manufacturing steps that can be used to form a tube according to some embodiments of the present invention.

In other embodiments of the present invention, a one-piece flat tube can be provided with an insert constructed of a separate piece of material received within (and in some embodiments, secured within) the one-piece flat tube. Two examples of such flat tubes 3710, 3810 having inserts 3734, 3834 are shown in FIGS. 46-47 and 48. Like the one-piece flat tubes described earlier, the flat tube 3710, 3810 can be constructed of a sheet (e.g., strip) of relatively thin material defining the broad sides 3722, 3724, 3822, 3824 and two reinforced narrow sides 3718, 3720, 3818, 3820 of the flat tube 3710, 3810. In some embodiments, the inventors have discovered that the thickness of the sheet of material can be less than about 0.15 mm (0.0059055 in) to provide good performance results in many applications. Also, in some embodiments, the inventors have discovered that the thickness of the sheet of material can be greater than about 0.03 mm (approx. 0.0011811 in) to provide good performance results in many applications. It is to be understood that the thickness of the sheet of material can have other dimensions not listed herein.

With continued reference to FIGS. 46-48, the longitudinal edges 3778, 3782, 3878, 3882 of the sheet of material are shaped and moved together such that one longitudinal edge 3778, 3878 abuts against the other longitudinal edge 3782, 3882 to form a narrow side 3718, 3818 of the flat tube 3710, 3810. This narrow side 3718, 3818 can be defined by at least one 180° bond of the sheet of material at the narrow side 3718, 3818 or by one or more other types of folds (described in greater detail below) used to close the narrow side 3718,

3818. The other narrow side 3720, 3820 is formed at least in part by folding the sheet of material to bring the first and second longitudinal edges 3778, 3782, 3878, 3882 together as just described. In some embodiments, this other narrow side 3720, 3820 can include at least a triple wall thickness generated by folding the sheet of material upon itself twice in the location of the narrow side 3720, 3820.

In some embodiments, the process of manufacturing the flat tube 3710, 3810 can include folding or otherwise forming the longitudinal edges 3778, 3782, 3878, 3882 that will be brought together to close the flat tube 3710, 3810 prior to folding the sheet of material to produce reinforcing folds 3730, 3830 (indicated at F in FIGS. 46-48) at the narrow side 3720, 3820 as described above. In other embodiments, these processes are performed at the same time or substantially the same time.

In some embodiments of the one-piece flat tube, such as the one-piece flat tube 3710 shown in FIGS. 46 and 47, one longitudinal edge 3778 of the sheet of material used to produce the tube 3710 defines an arch shape larger than an arch shape of the other longitudinal edge 3782. One advantage of such a construction is that when the larger arch-shaped longitudinal edge 3778 is shaped around the smaller arch-shaped longitudinal edge 3782, the finished flat tube 3710 generally does not gape or is resistant to gaping. However, in other embodiments, the longitudinal edges 3778, 3782 can have shapes other than ones that are arched. For example, the longitudinal edges 3878, 3882 illustrated in FIG. 48 can be joined together and have a number of different shapes, including without limitation any of the longitudinal edge shapes illustrated and/or described above in connection with FIGS. 2 and 6-11. Also, the longitudinal edges 3878, 3882 illustrated in FIG. 48 can be joined together with either or both longitudinal edges 3738, 3740 and have therewith a number of different shapes, including without limitation any of the longitudinal edge shapes illustrated and/or described above in connection with FIGS. 14 and 15.

The narrow sides 3718, 3720, 3818, 3820 of the one-piece flat tubes 3710, 3810 shown in FIGS. 46-48 each have a thickness of at least two times that of the sheet material used to construct the tubes 3710, 3810. Two of the illustrated narrow sides 3720, 3820 have a thickness that is three times that of the sheet material based upon the extra folds 3730, 3830 created in the areas of these narrow sides 3720, 3820. In other embodiments, further reinforcement of either narrow side 3718, 3720, 3818, 3820 can be achieved by forming one or more additional folds 3730, 3830 at the locations of the narrow sides 3718, 3720, 3818, 3820. Any of the types of folds described in connection with any of the embodiments of FIGS. 1-24 for reinforcing a narrow side defined by two joined longitudinal edges can be used to reinforce the first narrow side 3718, 3818 illustrated in FIGS. 46-48. Similarly, any of the types of folds described in connection with any of the embodiments of FIGS. 16-24 for reinforcing a narrow side defined by a continuous sheet of material can be used to reinforce the second narrow side 3720, 3820 illustrated in FIGS. 46-48.

In each of the two illustrated embodiments of FIGS. 46-48, an internal insert 3734, 3834 is received within the flat tube 3710, 3810 as the flat tube 3710, 3810 is manufactured. In some embodiments, the insert 3734, 3834 can be inserted after the production of the second narrow side 3720, 3820 (defining the reinforcing folds 3730, 3830 described above) while the flat tube 3710, 3810 is still partially open, as shown in FIGS. 46-48. Alternatively or in addition, either or both broad sides 3722, 3724 of the flat tube 3710, 3810 can have interior folds similar to those illustrated in FIGS. 1-13 and 16-24 (for example) at least partially forming flow channels.

One exemplary process for forming a one-piece flat tube 3710 with an insert 3734 is illustrated in FIG. 46 by way of example. First, a fold 3730 (indicated at F) is created, and the longitudinal edges 3778, 3782 are shaped simultaneously. Alternatively, only one longitudinal edge 3778, 3782 is shaped while the other longitudinal edge 3782, 3778 remains unshaped. In the illustrated embodiment of FIG. 46, and at the stage of manufacture shown in illustration (a) of FIG. 46, one longitudinal edge 3782 with an arch 3762 is already completed, and the other longitudinal edge 3778 has been provided with a simple bend which will later be further shaped into a larger arch 3766 extending at least partially around the arch 3762 defined by the first longitudinal edge 3782.

At the stage of manufacture shown in illustration (b) of FIG. 46, two reinforcing folds 3730 have been completed by adding a fold 3730 to the fold 3730 shown in illustration (a). Therefore, in the area of these folds 3730, a triple thickness of the sheet material used to form the one-piece flat tube 3710 is formed.

At the stage of manufacture shown in illustration (c) of FIG. 46, the folds 3730 are beginning to form the second narrow side 3720 of the flat tube 3710 by bending the folds 3730. In this intermediate step of the manufacturing process, a gradation 3758 is formed in one of the broad sides 3722 substantially adjacent the folds 3730 to provide a smooth exterior surface of the one-piece flat tube 3710. A gradation 3758 can also be formed in the other broad side 3724 substantially adjacent the folds 3730 in an alternative construction of the tube 3710. The smooth surface of the tube 3710 produced by such gradations 3758 and their ability to receive a fold 3730 or a longitudinal edge 3778 in a recessed manner can be advantageous in cases when the tube 3710 needs to be brazed, welded or glued to other elements.

Next, at the stage of manufacture shown in illustration (d) of FIG. 46, a corrugated internal insert 3734 is inserted into the flat tube 3710, although inserts having any of the other shapes described herein can instead be used. One of the longitudinal edges 3738 of the corrugated internal insert 3734 can first be placed in the small arch 3762 of the longitudinal edge 3782. Alternatively, one longitudinal edge 3740 of the internal insert 3734 can be first placed within the narrow side 3720 opposite the small arch 3762, as shown in FIGS. 46 and 47. The internal insert 3734 can be under a certain preliminary tension when inserted at the stage shown in illustration (d) of FIG. 46 and in FIG. 47. More specifically, the insert 3734 can be shaped to have a tension arching the insert 3734 slightly away from the broad side 3724 or urging expansion of the insert 3734 against compression needed to place the insert 3734 within the flat tube 3710, and is therefore pushed into the narrow sides 3718, 3720 during the complete closing of the one-piece flat tube 3710. At the stage of manufacture shown in illustration (e) of FIG. 46, a large arch 3766 is formed on the longitudinal edge 3778 and is placed around the small arch 3762 on the other longitudinal edge 3782, thus closing the one-piece flat tube 3710. The aforementioned small curvature of the internal insert 3734 (if existing) is thereby removed, and both shaped longitudinal edges 3738, 3740 of the internal insert 3734 are installed within the narrow sides 3718, 3720 of the flat tube 3710.

The process for forming the one-piece flat tube 3810 illustrated in FIG. 48 is similar in many respects to that described above with reference to the embodiment of FIGS. 46 and 47. Therefore, with the exception of features described hereafter and any inconsistent or incompatible description above, reference is hereby made to the description above regarding the manufacture of the flat tube 3710 for more information regarding the manufacture of the flat tube 3810.

At the stage of manufacture shown in illustration (a) of FIG. 48, the single sheet of material used to form the flat tube 3810 includes a fold 3830 that will partially define the second narrow side 3820 of the one-piece flat tube 3810. After producing another overlapping fold at the same location on the single sheet of material, the sheet of material is bent at the location as best shown in illustration (c) of FIG. 48. The first reinforced narrow side 3818 is at least partially formed from the opposite longitudinal edges 3878, 3882 brought together to close the one-piece flat tube 3810 (see illustrations (d) and (e) of FIG. 48). Closing the one-piece flat tube 3810 occurs through a joint bend or folding of the opposite longitudinal edges 3878, 3882 and a longitudinal edge 3838 of the internal insert 3834. More specifically, the longitudinal edge 3838 of the internal insert 3834 lies between the two longitudinal edges 3878, 3882. It should be noted that the flat tube 3810 shown in illustration (f) of FIG. 48 is not necessarily in a final stage of manufacture. The folds defined by the edges 3878, 3882, 3838 can be arranged against each other as shown in FIGS. 14 and 15. However, as mentioned above, any of the other reinforced narrow side fold constructions described and/or illustrated herein can instead be used as desired. In general, the number of folds or bends made to produce the narrow side 3818 at least partially determines the stability of the narrow side 3818.

If desired, the flat tubes 3710, 3810 illustrated in FIGS. 46-48 can be provided with reinforcements placed in predetermined areas, such as locations on either or both broad sides 3722, 3724, 3822, 3824 of the flat tubes 3710, 3810 where heat exchange is expected to take place. The reinforcements can take a number of different forms, such as one or more layers of sheet material separate from the sheet of material defining the flat tubes 3710, 3810 and attached thereto by brazing, welding, or in any other suitable manner, one or more additional folds of the sheet of material used to construct the flat tubes 3710, 3810, and the like.

By virtue of the relatively thin-walled material described above used in some embodiments to construct the flat tubes 3710, 3810 (with our without reinforcements), the weight of a heat exchanger formed with the flat tubes 3710, 3810 can be significantly reduced while improving the heat exchange capability thereof. Another reason for reduced weight and increased heat exchange capability is that the broad sides 3722, 3724, 3822, 3824 of the flat tube 3710, 3810 are formed such that the tubes 3710, 3810 ensure good brazed connections with fins, ribs, or other heat exchange elements (not shown), which can be arranged in a heat exchanger between two or more of the flat tubes 3710, 3810. Based upon the features of the one-piece flat tube 3710, 3810 described above, the flat tubes 3710, 3810 have substantial planar exterior surface are for connection to such heat exchange elements.

Additionally, it is to be understood that the characteristics of the flat tubes 3710, 3810 described with respect to FIGS. 46-48 can also be applied to any of the other constructions of the flat tubes described in this application.

Figure 49:
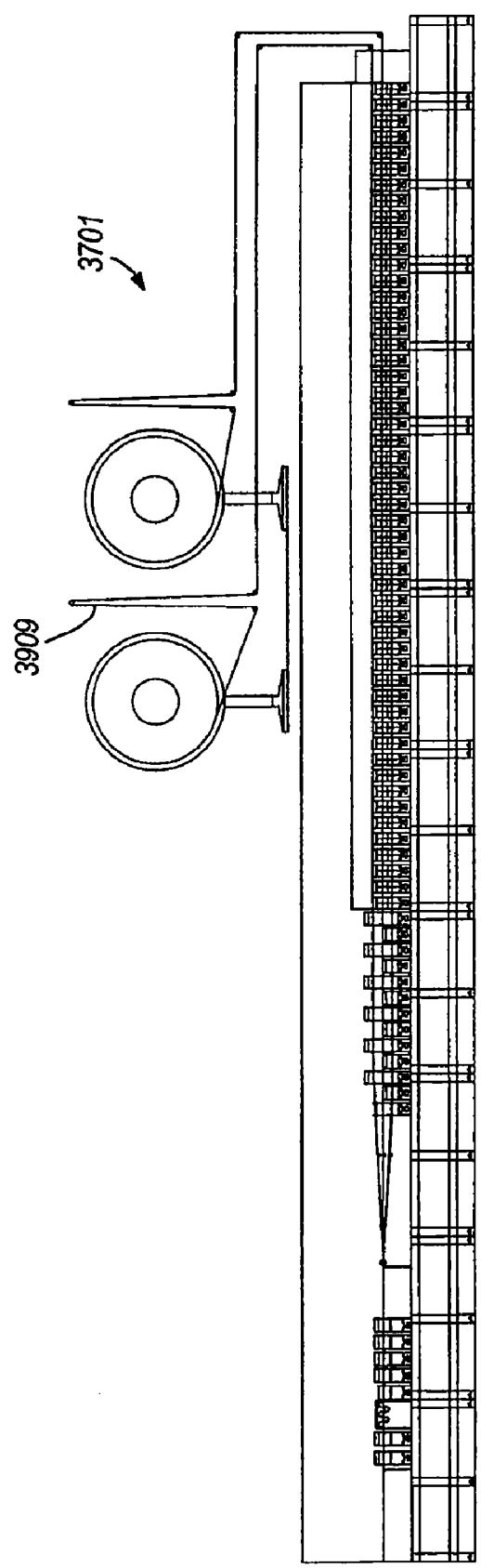
FIG. 49 is a roll press manufacturing line that can be used to manufacture tubes according to some embodiments of the present invention.

With regard to the manner in which the flat tubes 3710, 3810 can be manufactured, in some embodiments, two endless strips of sheet material are fed to a roller conveyor line 3701, such as that illustrated in FIG. 49. In many cases, aluminum or an aluminum alloy is considered a preferred material for manufacture of the flat tubes 3710, 3810. However, other metals and material are suitable for manufacturing the flat tube 3710, 3810. With reference to the tubes 3710, 3810 shown in FIGS. 46-48, the sheet of material forming the first and second portions 3712, 3714, 3812, 3814 of the flat tube 3710, 3810 can be received from an endless strip of material (e.g., sheet metal), and the internal insert 3734, 3834 can be formed from another endless strip of material (e.g., sheet metal). At one of the beginning stages of the roller conveyor line 3701 (prior to shaping the strips of material, in some embodiments), perforations can be added to the strips of material in distances that correspond to desired individual tube lengths. In some embodiments, the sheets of material can be shaped after perforating the strips of sheet metal, although such perforation can occur during or after such sheet shaping. As shown in FIG. 49, an insertion area 3703 in which the internal insert 3734, 3834 is inserted into the flat tube 3710, 3810 is located in a downstream part of the roller conveyor line 3701. Before inserting the internal insert 3734, 3834 within the one-piece flat tube 3710, 3810, the above-mentioned perforations should be substantially aligned with one another (i.e., all lying in a common plane substantially perpendicular to the one-piece flat tube 3710, 3810 in some embodiments) so that individual tubes 3710, 3810 can be separated thereafter.

The one-piece flat tube embodiments illustrated in FIGS. 46-48 each have an insert 3734, 3834 that is separate from and received with a respective flat tube 3710, 3810. In other embodiments, however, the inventors have discovered that it is possible to construct a one-piece flat tube having an insert integrally formed with the one-piece tube (i.e., formed of the same unitary piece of sheet material used to construct the flat tube 3710, 3810). Five such flat tubes 3910, 4010, 4110, 4210, 4310 are illustrated in FIGS. 50-54 by way of example. It should be noted that the features described below with reference to FIGS. 50-54 are also applicable to any of the other flat tube embodiments described herein, barring features that are inconsistent or incompatible therewith.

In each of the illustrated embodiments of FIGS. 50-54, a single piece of sheet material (e.g., a sheet metal strip, for example) is formed into both the flat tube 3910, 4010, 4110, 4210, 4310 and an insert 3934, 4034, 4134, 4234, 4334. The flat tubes 3910, 4010, 4110, 4210, 4310 illustrated in FIGS. 50-54 include opposite reinforced narrow sides 3918, 3920, 4018, 4020, 4118, 4120, 4218, 4220, 4318, 4320 and relatively low wall thicknesses. In some embodiments, the inventors have discovered that the thickness of the sheet of material can be less than about 0.15 mm (0.0059055 in) to provide good performance results in many applications. Also, in some embodiments, the inventors have discovered that the thickness of the sheet of material can be greater than about 0.03 mm (approx. 0.0011811 in) to provide good performance results in many applications. It is to be understood that the thickness of the sheet of material can have other dimensions not listed herein. As a result of such relatively thin sheet material thicknesses that can be used in some embodiments, heat exchangers with these flat tubes 3910, 4010, 4110, 4210, 4310 can have a comparably low weight and an improved heat exchange rate. Also, by virtue of the fact that both narrow sides 3918, 3920, 4018, 4020, 4118, 4120, 4218, 4220, 4318, 4320 of the one-piece flat tubes 3910, 4010, 4110, 4210, 4310 can be reinforced as will be described in greater detail below, the need to note the orientation of the one-piece flat tubes 3910, 4010, 4110, 4210, 4310 during assembly of a heat exchanger can be reduced or eliminated.

Each of the tubes described below in connection with FIGS. 50-54 can have any of the dimensions described above with reference to the embodiments of FIGS. 1-34. For example, in some embodiments, any of the one-piece flat tubes 3910, 4010, 4110, 4210, 4310 illustrated in FIGS. 50-54 can have a small diameter d greater than about 0.7 mm (0.027559 in). Also, in some embodiments, any of these tubes 3910, 4010, 4110, 4210, 4310 can have a small diameter d of less than about 15 mm (0.59055 in). As another example, any of the one-piece flat tubes 3910, 4010, 4110, 4210, 4310 illustrated in FIGS. 50-54 can have a large diameter D greater than about 8 mm (0.31496 in). Also, in some embodiments, any of these tubes 3910, 4010, 4110, 4210, 4310 can have a large diameter D of less than about 300 mm (1.811 in). However, it should be noted that in other embodiments, any of the small and large diameters d, D described above in connection with all of the flat tube embodiments disclosed herein can be used.

Figure 50:
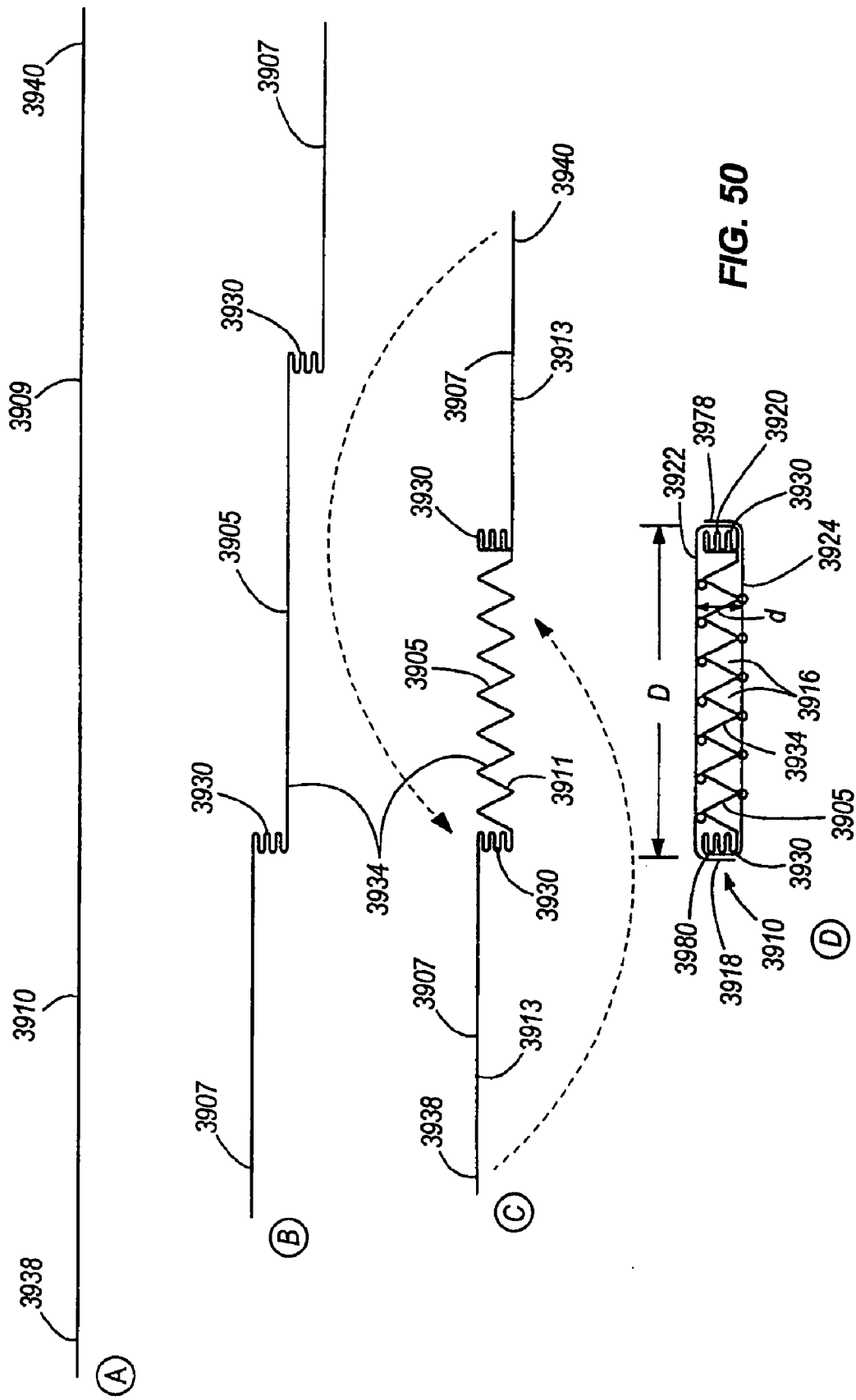
FIG. 50 schematically illustrates a set of exemplary manufacturing steps that can be used to form a tube according to some embodiments of the present invention.

With particular reference first to the illustrated embodiment of FIG. 50, the flat tube 3910 shown therein is formed of a single sheet of material having a center portion 3905 shaped in a wave-like manner to form flow channels 3916 in the resulting one-piece flat tube 3910. The center portion 3905 of the sheet of material is flanked on both sides by sets of folds 3930 used to reinforce a corresponding narrow side 3918, 3920 of the one-piece flat tube 3910. In other embodiments, the center portion 3905 is flanked on only one side with a set of folds 3930 (such as in cases where only one narrow side 3918, 3920 of the one-piece flat tube 3910 needs to be reinforced in this manner. Also, it should be noted that the center portion 3905 can be flanked one either side by any number of reinforcing folds, and that the folds need not necessarily be the same in number, shape, or size on the opposite sides of the center portion 3905. In the illustrated embodiment of FIG. 50, the sheet of material also has outer portions 3907 defining the broad sides 3922, 3924 of the one-piece flat tube 3910. The outer portions 3907 extend from and are integral with the sets of folds 3930 described above, and are shaped to at least partially encompass the sets of folds 3930. In other embodiments, the outer portions 3907 do not enclose or do not fully enclose the folds 3930, in which cases the outer portions 3907 are bent to at least close the flow channels 3916 within the one-piece flat tube 3910. Also, it should be noted that the sheet of material is formed to define only one outer portion (e.g., extending from the folds on only one of the two sides of the center portion 3905), which can extend around the center portion 3905 to close the flow chambers 3916.

In some embodiments, the flat tube 3910 shown in FIG. 50 can be efficiently produced on a roller line (such as the roller line 3701 shown in FIG. 49) from an endless sheet of material, such as an endless strip or belt 3909 of sheet metal or other suitable material as shown in FIG. 50(*a*). The strip of material 3909 includes two longitudinal edges 3938, 3940. First, and as shown in FIG. 50(*b*), two sets of multiple folds 3930 are created in the strip of material 3909 to form narrow sides 3918, 3920 of the flat tube 3910 to be created later. Each illustrated set of multiple fold 3930 is formed of six 180° bends in the strip of material 3909, wherein adjacent folds 3930 abut one another with little to no space between the adjacent folds 3930 between the bends defining the folds 3930. The gaps shown between the folds 3930 illustrated in FIG. 50 are for illustration purposes only to show individual folds 3930 in greater detail. Moreover, although six folds 3930 are shown in each set illustrated in FIG. 50, it should be noted that any other number of folds 3930 can exist adjacent the center portion 3905 as described earlier, determined in many embodiments at least in part by the desired specifications (e.g. dimensions) of the flat tube 3910.

As shown in FIG. 50(*c*), a wave-like section 3911 is then formed between the sets of multiple folds 3930. However, in other embodiments, the wave-like section 3911 can instead be formed at the same time as or subsequent to forming the folds 3930. The wave-like section 3911 can have any number of corrugations with any shape desired, including without limitation corrugations with flanks inclined with respect to the broad sides 3922, 3924 of the one-piece flat tube 3910 once assembled, corrugations having a square wave shape, corrugations having a curved wave shape (e.g., sine wave), corrugations having any other shape described herein, and any combination of such shapes.

The manufacturing process for forming the flat tube 3910 in FIG. 50(*d*) proceeds according to the two arrows shown with dashed lines. In particular, subsequent to forming the folds 3930 and the wave-like section 3911, belt sections 3913 connected to the sets of multiple folds 3930 are placed around the corresponding multiple folds 3930 and across the wave-like section 3911, thereby forming longitudinally-extending flow channels 3916 of the one-piece flat tube. In other words, each belt section 3913 encompasses or at least partially encompasses one set of multiple folds 3930 from the outside, and extends further to cover the wave-like section 3911. Also, one longitudinal edge 3978 is bent to lie on the first narrow side 3918 and to extend around and encompass the multiple folds 3230 at the first narrow side 3918, and the other longitudinal edge 3980 is bent to lie on the second narrow side 3920 and to extend around and encompass the multiple folds 3230 at the second narrow side 3920, as shown in illustrations (c) and (d) of FIG. 50. In some embodiments of the flat tube 3910, the longitudinal edges 3978, 3980 does not cover or only partially covers the corresponding narrow sides 3918, 3920, because the narrow sides 3928, 3920 can be sufficiently stable through the provision of the multiple folds 3930 described above.

In a completed version of the flat tube 3910, such as the one illustrated in FIG. 50(*d*), the wave peaks and the wave valleys of the wave-like section 3911 (or other features of center portions 3905 having different shapes defining the flow channels 3916) are brazed, welded, or secured in any other suitable manner to either or both broad sides 3922, 3924 of the one-piece flat tube 3910. More specifically, the dots on the wave peaks and wave valleys shown in FIG. 50(*d*) schematically illustrate the brazed connections that can be made between the wave-like section 3911 and the adjacent broad sides 3922, 3924.

Figure 51:
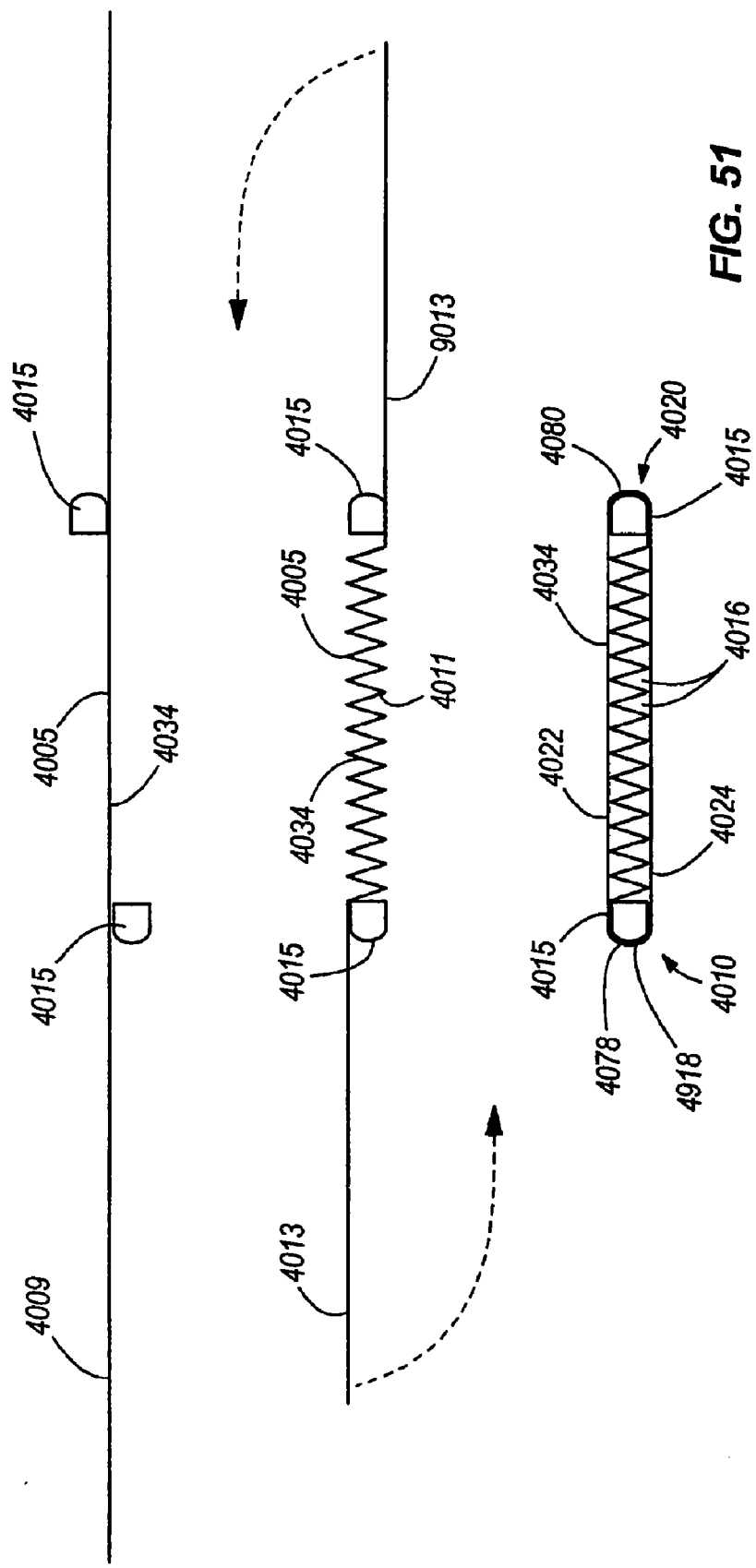
FIG. 51 schematically illustrates a set of exemplary manufacturing steps that can be used to form a tube according to other embodiments of the present invention.

FIG. 51 illustrates a one-piece flat tube with integral insert according to an additional embodiment of the present invention. This embodiment employs much of the same structure and has many of the same properties as the embodiments of the flat tube described above in connection with FIG. 50. Accordingly, the following description focuses primarily upon the structure and features that are different than the embodiments described above in connection with FIG. 50. Reference should be made to the description above in connection with FIG. 50 for additional information regarding the structure and features, and possible alternatives to the structure and features of the one-piece flat tube with integral insert illustrated in FIG. 51 and described below. Structure and features of the embodiment shown in FIG. 51 that correspond to structure and features of the embodiment of FIG. 50 are designated hereinafter in the 4000 series of reference numbers.

With particular reference now to FIG. 51 the one-piece flat tube 4010 shown therein is formed from one sheet of material (e.g., a sheet metal strip). In this particular embodiment, a center portion 4005 of the sheet of material is shaped in a wave-like manner to produce a wave-like section at least partially forming the flow channels 4016 located between the broad sides 4022, 4024 of the flat tube 4010. The center portion 4005 can have any of the shapes described above with reference to the illustrated embodiment of FIG. 50.

As an alternative to or in addition to using multiple folds 3930 to reinforce the narrow ends 3918, 3920 of the one-piece flat tube 3910 (see FIG. 50), the one-piece flat tube 4010 illustrated in FIG. 51 utilizes profiles 4015 (i.e., coils of wire, mandrels, hollow or solid inserts, and the like) at the narrow sides 4018, 4020. A profile 4015 can be located at either or both narrow sides 4018, 4020, and in some embodiments can supplement one or more folds produced at either or both narrow sides 4018, 4020, wherein such folds are similar to the folds 3030 described above in connection with FIG. 50. During the manufacturing process of the one-piece flat tube 4010, the profile 4015 can be uncoiled or otherwise laid longitudinally parallel to the sheet of material 4009. Subsequent to processing wave-like section 4011 between the placed profiles 4015, belt sections 4013 of the sheet of material adjacent the profiles 4015 are wrapped around the profiles 4015 from the outside, and are laid across the wave-like section 4011 to form the broad sides 4022, 4024 of the one-piece flat tube 4010 as shown by the dashed arrows in FIG. 51. The belt sections 4013 are connected to the wave-like section 4011, and can also be connected to the profiles 4015 in the narrow sides 4018, 4020. Also, each of the longitudinal edges 4078, 4080 of the sheet of material 4009 is bent around a corresponding profile 4015 and placed upon a respective narrow side 4018, 4020.

Accordingly, the narrow sides 4018, 4020 of the one-piece flat tube 4010 in FIG. 51 are each formed from one profile 4015 such that the narrow sides 4018, 4020 are encompassed by one corresponding longitudinal edge 4078, 4080 of the sheet of material 4009.

Figure 52:
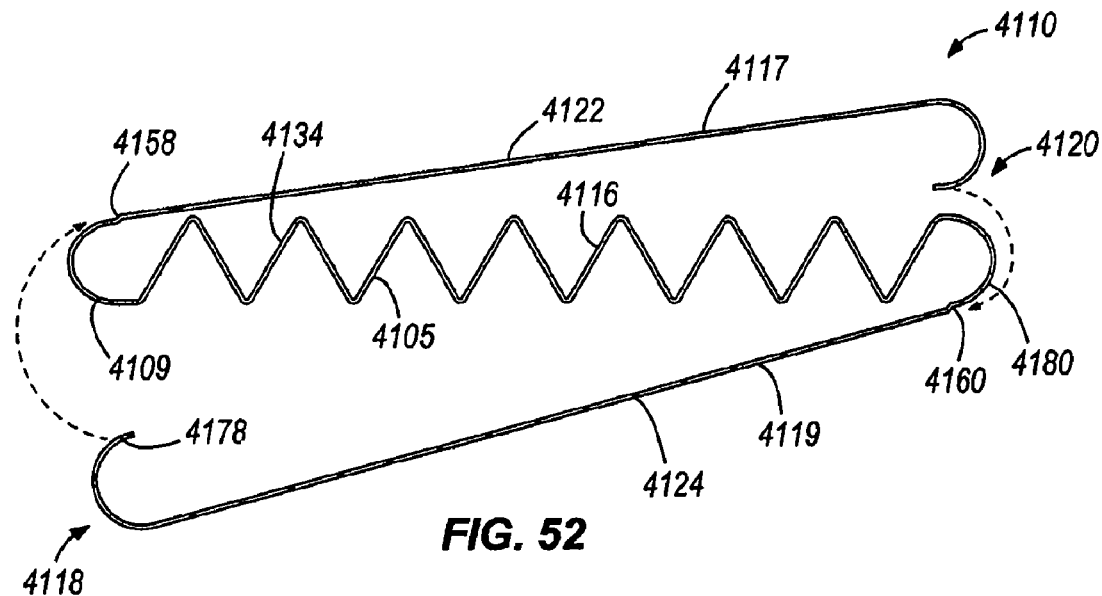
FIG. 52 schematically illustrates a set of exemplary manufacturing steps that can be used to form a tube according to still other embodiments of the present invention.
Figure 53:
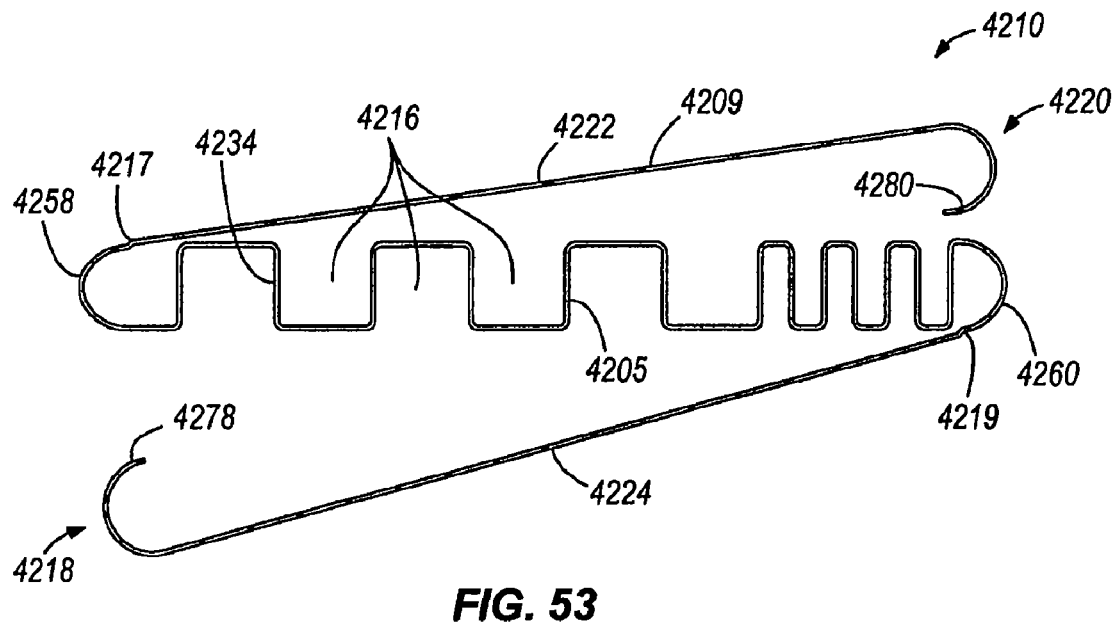
FIG. 53 schematically illustrates a set of exemplary manufacturing steps that can be used to form a tube according to yet other embodiments of the present invention.
Figure 54:
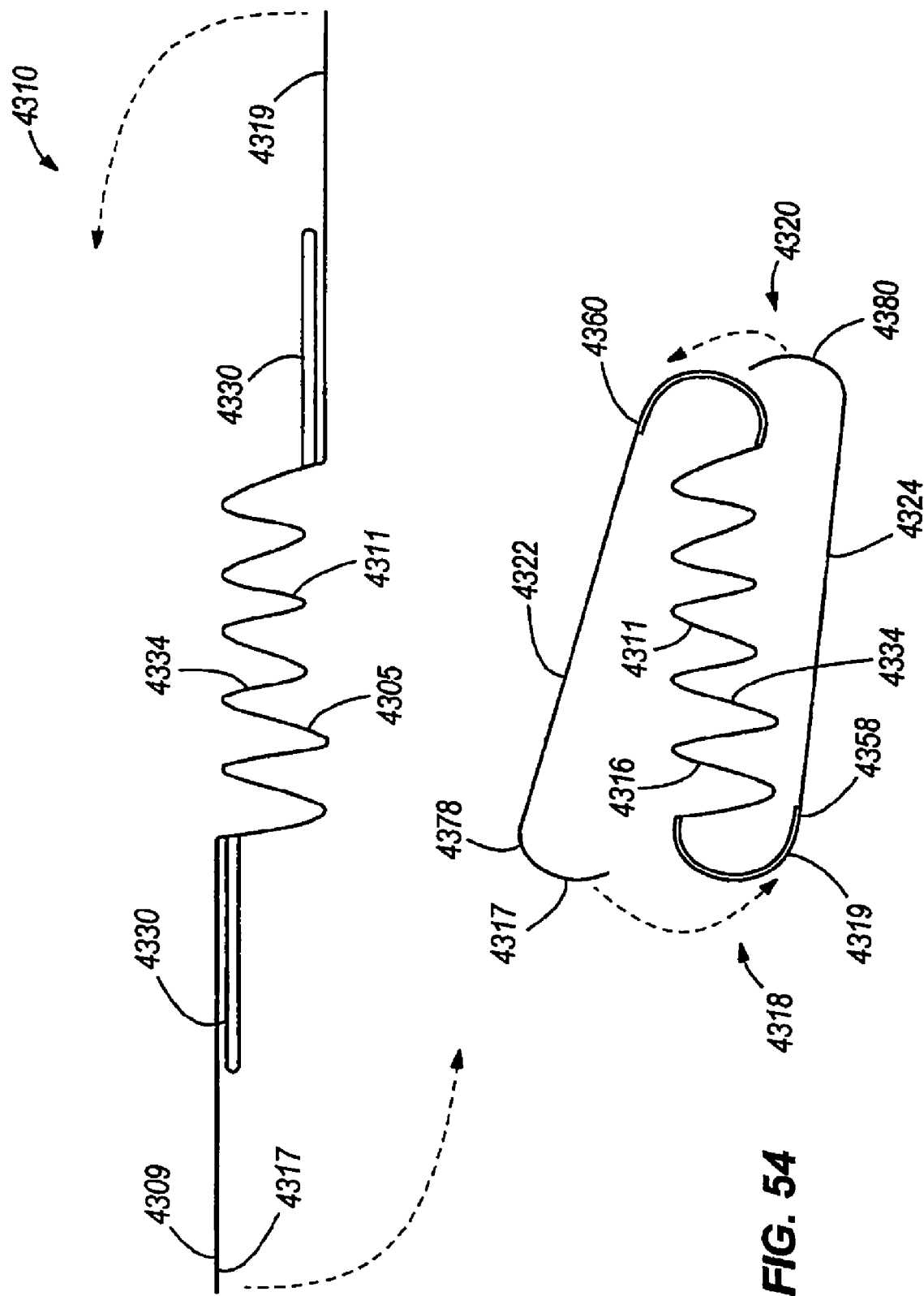
FIG. 54 schematically illustrates a set of exemplary manufacturing steps that can be used to form a tube according to other embodiments of the present invention.

FIGS. 52-54 illustrate one-piece flat tubes with integral inserts according to additional embodiments of the present invention. These embodiments employ much of the same structure and have many of the same properties as the embodiments of the flat tube described above in connection with FIGS. 50 and 51. Accordingly, the following description focuses primarily upon the structure and features that are different than the embodiments described above in connection with FIGS. 50 and 51. Reference should be made to the description above in connection with FIGS. 50 and 51 for additional information regarding the structure and features, and possible alternatives to the structure and features of the one-piece flat tubes with integral inserts illustrated in FIGS. 52-54 and described below. Structure and features of the embodiments shown in FIGS. 52, 53, and 54 that correspond to structure and features of the embodiments of FIGS. 50 and 51 are designated hereinafter in the 4100, 4200, and 4300 series of reference numbers, respectively.

FIGS. 52-54 each illustrate exemplary embodiments of a flat tube 4110, 4210, 4310 formed from a single sheet of material 4109, 4209, 4309 (e.g., a strip of aluminum, aluminum alloy or other metal or suitable material), and show such flat tubes 4110, 4210, 4310 prior to complete formation. In these particular embodiments of the flat tube 4110, 4210, 4310, a portion 4105, 4205, 4305 of the sheet of material 4109, 4209, 4309 is shaped in a wave-like manner and extends between the broad sides 4122, 4222, 4322 of the flat tube 4110, 4210, 4310 in order to form flow channels 4116, 4216, 4316. Additionally, each of the narrow sides 4118, 4120, 4218, 4220, 4318, 4320 is at least partially formed by a connecting section 4117, 4119, 4217, 4219, 4317, 4319 of the sheet of material 4109, 4209, 4309 and a longitudinal edge 4178, 4180, 4278, 4280, 4378, 4380 encompassing the connecting section 4117, 4119, 4217, 4219, 4317, 4319.

In the illustrated embodiments of FIGS. 52 and 53, the overlapping longitudinal edges 4178, 4180, 4278, 4280 and connecting sections 4117, 4119, 4217, 4219 provide a doubled wall thickness at the narrow sides 4118, 4120, 4218, 4220, which is generally stable enough for numerous applications of the flat tube 4110, 4210, 4310 in which the relatively thin wall materials (described above) are used. In other embodiments, such as in the illustrated embodiment of FIG. 54, a relatively stronger reinforcement of the narrow sides 4118, 4120, 4218, 4220 can be achieved through one or more folds 4330 of the connecting sections 4317, 4319. In other words, those portions of the sheet of material 4309 that will be overlapped by the longitudinal edges 4378, 4380 at the narrow sides 4318, 4320 can be further reinforced by one or more folds 4330. In such embodiments, these folds 4330 are shaped (e.g., rounded) to at least partially define the narrow sides 4318, 4320 when the sheet of material 4309 is bent to bring the first and second broad sides 4322, 4324 to their closed positions. Alternatively or in addition, the longitudinal edges 4378, 4380 at the narrow sides 4318, 4320 can be provided with one or more of such reinforcing folds 4330 in a manner similar to the Group D flat tube embodiments illustrated in FIG. 34, for example. In these embodiments utilizing reinforcing folds 4330, the narrow sides 4318, 4320 include a relatively larger thickness than the thicknesses of the wave like section 4311 and the broad sides 4322, 4324. Accordingly, it is possible to provide sufficient reinforcement for relatively more heavily stressed parts of the flat tube 4310, such as the narrow sides 4318, 4320, and leave relatively less stressed parts, such as the broad sides 4322, 4324 and/or the wave-like section 4311 with relatively thinner walls.

Although reinforcing folds 4330 can be employed in any of the narrow side locations described above for any of the embodiments also described above in connection with FIGS. 52-54, it should be noted that either of the narrow sides 4118, 4120, 4218, 4220, 4318, 4320 can be devoid of such reinforcing folds in other embodiments. Also, the number of such reinforcing folds 4130, 4230, 4330 at one of the narrow sides 4138, 4238, 4318 can be different from the number at the other narrow side 4120, 4220, 4320, and/or the location of the reinforcing folds 4130, 4230, 4330 at one of the narrow sides (e.g., only on the connecting section 4117, 4119, 4217, 4219, 4317, 4319 or only on the longitudinal edge 4178, 4180, 4278, 4280, 4378, 4380 overlapping the connecting section 4117, 4119, 4217, 4219, 4317, 4319) can be different from the location of the reinforcing folds 4130, 4230, 4330 at the other narrow side (e.g., only on the longitudinal edge 4178, 4180, 4278, 4280, 4378, 4380 or only on the connecting section 4117, 4119, 4217, 4219, 4317, 4319 overlapped by the longitudinal edge 4178, 4180, 4278, 4280, 4378, 4380, respectively).

In any of the embodiments just described in connection with the one-piece flat tubes 4110, 4210, 4310 illustrated in FIGS. 52-54, the overlapping longitudinal edges 4178, 4180, 4278, 4280, 4378, 4380 of the sheet of material 4109, 4209, 4309 can lie in a wall gradation 4158, 4160, 4258, 4260, 4358, 4360, such as a wall gradation 4158, 4160, 4258, 4260, 4358, 4360 located near or at the narrow side 4118, 4218 at which the longitudinal edge 4178, 4180, 4278, 4280, 4378, 4380 lies. In this manner, when the longitudinal edges 4178, 4180, 4278, 4280, 4378, 4380 are moved toward their closed positions to form the one-piece flat tube 4110, 4210, 4310 (shown by dashed arrows in each of FIGS. 52-54), the longitudinal edges 4178, 4180, 4278, 4280, 4378, 4380 can be received within the wall gradations 4158, 4160, 4258, 4260, 4358, 4360 encompassed thereby. In some embodiments, a wall gradation 4158, 4160, 4258, 4260, 4358, 4360 is provided on each broad side 4122, 4124, 4222, 4224, 4322, 4324 of the flat tube 4110, 4210, 4310.

As with the illustrated embodiment of FIG. 51, the wave peaks and wave valleys of the wave-like sections 4111, 4211, 4311 (or other features of the center portion 4105, 4205, 4305 having different shapes defining the flow channels 4116, 4216, 4316) illustrated in FIGS. 52-54 can be brazed, welded, or secured in any other suitable manner to either or both broad sides 4122, 4124, 4222, 4224, 4322, 4324 of the one-piece flat tube 4110, 4210, 4310.

As mentioned above, each of the one-piece flat tubes 4110, 4210, 4310 illustrated in FIGS. 52-54 have a wave-like section 4111, 4211, 4311 for defining the flow channels 4116, 4216, 4316. The portion 4105, 4205, 4305 defining this wave-like section 4111, 4211, 4311 can have any of the shapes described above with reference to the illustrated embodiment of FIG. 50. In the illustrated embodiments of FIGS. 52 and 54, for example, the wave-like section 4111, 4311 defines a number of flow channels 4116, 4316 with a generally triangular design and having generally the same cross-sectional shape and size (although either or both can vary across the width of the one-piece flat tube 4110, 4310). FIG. 53 illustrates a wave-like section 4211 provided with more than one wave design such that the wave-like section 4211 forms flow channels 4216 of at least two different cross-sectional sizes. The wave-like section 4211 shown in FIG. 53 includes one group of seven flow channels 4216 each having a relatively large cross-sectional area, and another group of six channels 4216 each having a relatively smaller cross-sectional area. In other embodiments, any other combination of flow channel shapes and sizes arranged in sections of the one-piece flat tube 4210 can be employed. Certain requirements for heat exchange can best be addressed with such illustrations of the heat exchanger tube 4210. Although the cross-sectional shape of these flow channels 4216 of varying size is generally rectangular in FIG. 53, it is envisioned that the wave-like section 4216 can define flow channels 4216 with other shapes, based at least in part upon the desired specifications of the flat tube 4210. As indicated above, the design of the wave-like section W is not limited to the design illustrated herein.

Any of the flat tubes described herein can be produced in a number of different manners. However, by utilizing one or more manufacturing improvements discovered by the inventors and described in greater detail below, such tubes can be produced at significant cost savings, with improved efficiency, at greater speed, and/or in a more reliable and reproducible manner compared with many conventional flat tube manufacturing techniques.

One such improvement discovered by the inventors relates to the manner in which flat tubes according to the present invention can be separated from an endless length of flat tubing (i.e., from a continuous supply of materials fed through manufacturing equipment), thereby resulting in discrete flat tubes having desired lengths. As used herein and in the appended claims, the term "endless tube" is used to refer to flat tubing according to any of the embodiments described herein produced by forming one or more sheets of material running from respective supplies (e.g., coils) prior to separation into discrete tubes at desired lengths, and therefore incorporates the earlier definition of "endless" described above. It will be appreciated by those in the art that significant challenges exist in cutting or otherwise separating elements constructed at least in part of relatively thin-walled products without creating deformations, burrs, flashing, or other undesirable features on the end products. Although similar problems exist in products constructed of thicker-walled materials (which can be addressed equally with some improvements described below), in many cases such problems more frequently result in unacceptable thin-walled end products. With reference to the thin-walled flat tube embodiments described herein, many of these embodiments have a tube wall thickness of no greater than about 0.15 mm (0.00591 in). The tube walls can have a thickness of at least about 0.03 mm (0.0011811 in) in some embodiments. Also, in those tube assembly embodiments having an insert as described herein, many of these embodiments have an insert material thickness of no greater than about 0.10 mm (0.003937 in). The material thickness of the insert can be no less than about 0.03 mm (0.00118 in) in some embodiments.

The inventors have discovered that individual (i.e., discrete) flat tubes can be produced in a superior manner from endless tubing of one or more sheets of material fed through manufacturing equipment by perforating at least one of the sheets. That is, at least one part of the tube can be perforated to facilitate improved tube separation from the endless tubing. Such perforations can take place before shaping operations are performed on the upstream sheet material, after the sheet material has been formed into a continuous length of flat tubing, or at any other stage or stages therebetween. Also, the locations of such perforations can vary between the different sheets of materials (or different locations on the same sheet of material) used to produce different parts of the continuous flat tubing.

An advantage of forming perforations in the sheet metal strips for making flat tubes is that in some embodiments, flat tubes can be produced substantially without the formation of deformations, burs, flashing and/or other undesirable features on the end products. The process of using perforations in a tube separating process can be applied to any of the tube embodiments described herein.

As an example of the perforating and separating process used to produce one-piece flat tubes, reference is hereby made to the process of separating one-piece flat tubes such as those illustrated in FIGS. 19-21, 52, and 53, wherein the one-piece flat tube 1210, 1310, 1410, 4110, 4210 can be formed from a single endless sheet of material. In FIGS. 52 and 53, the one-piece flat tubes 4110, 4210 are shown in a state of the manufacturing process shortly before completion, and must still be closed in the direction of the arrows shown in dashed lines before being separated at perforations already made. Accordingly, perforations can be formed prior to bending the sheet of material as shown in FIGS. 52 and 53. A similar concept can be applied to the tubes 1210, 1310, 1410 shown in FIGS. 19-21 and in other one-piece flat tubes described herein.

As an example of this process used to produce two-piece flat tubes, reference is hereby made to the process of separating two-piece flat tubes such as that illustrated in FIG. 28. As described in greater detail above, the two-piece flat tube 1910 shown in FIG. 28 has first and second portions 1912, 1914 defining respective broad sides 1922, 1924 of the flat tube 1910, and an insert 1934 received therebetween. As also described above, the first and second portions 1912, 1914 can be identical or substantially identical, but inverted with respect to each other, where one of longitudinal edges of one tube portion 1914 has a larger arc portion 1968 at least partially encompassing a smaller arc portion 1962 on the longitudinal edge of the other tube portion 1912. Folds 1970 at either or both longitudinal edges 1938, 1940 of the insert 1934 can be used to reinforce the narrows sides 1918, 1920 of the two-piece flat tube 1910. Although the perforating and separating process described herein can be applied to two-piece flat tubes having any of the tube part and tube dimensions described above in connection with the embodiment of FIG. 19, the insert 1934 described in connection with FIGS. 55-58 has a thickness of about 0.03-0.09 mm (0.0011811-

0.0035433 in), the sheets of material forming the first and second tube portions 1912, 1914 have a thickness of about 0.03-0.15 mm (0.0011811-0.0059055 in), and the completed two-piece flat tube 1910 has a small diameter d of about 1-10 mm (0.03937-0.3937 in) by way of example only. In FIG. 28, the two-piece flat tube 1910 is illustrated shortly before completion, wherein the perforations are already formed in the first and second portions 1912, 1914 and the insert 1934, and have been reconciled such that the perforations in the first and second portions 1912, 1914 and the insert 1934 are substantially aligned.

FIGS. 55-58 illustrate an exemplary manufacturing line 1900 similar to the manufacturing line 3701 shown in FIG. 49. In this particular case, the manufacturing line 1900 is designed to form three-piece flat tube assemblies (i.e., having a two-piece flat tube with first and second portions 1912, 1914, and also having an insert 1934), while manufacturing line 3701 is designed for forming two-piece flat tube assemblies (i.e., having a one-piece flat tube defining first and second portions 1212, 1214, 1312, 1314, 1412, 1414, 4112, 4114, 4212, 4214, and also having an insert 1234, 1334, 1434, 4134, 4234). Although the manufacturing lines 3701, 1900 are described herein with reference to the production of particular flat tube embodiments also described in this patent application, such is by way of example only. Accordingly, it is to be understood that the processes described with reference to FIG. 49 and FIGS. 55-58 can be applied for the manufacture of all tubes described in this application.

Figure 55:
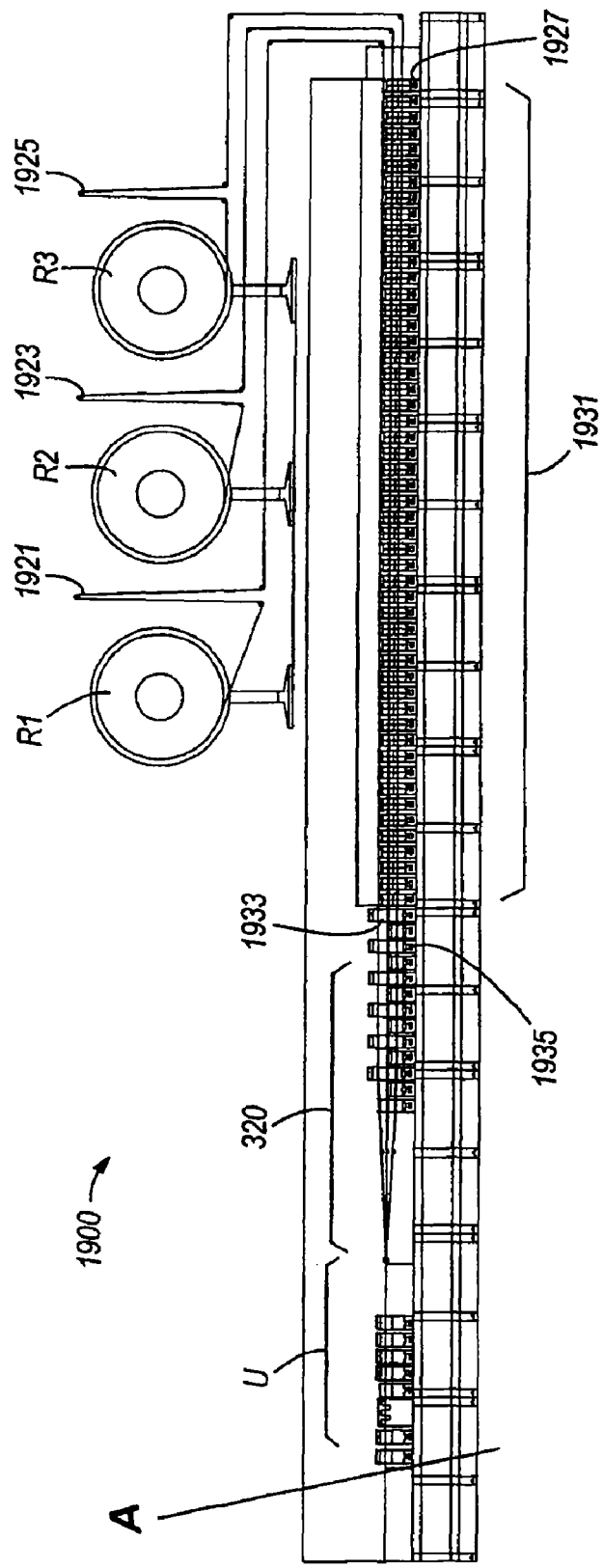
FIG. 55 illustrates an exemplary manufacturing line that can be used to manufacture tubes according to some embodiments of the present invention.
Figure 55A:
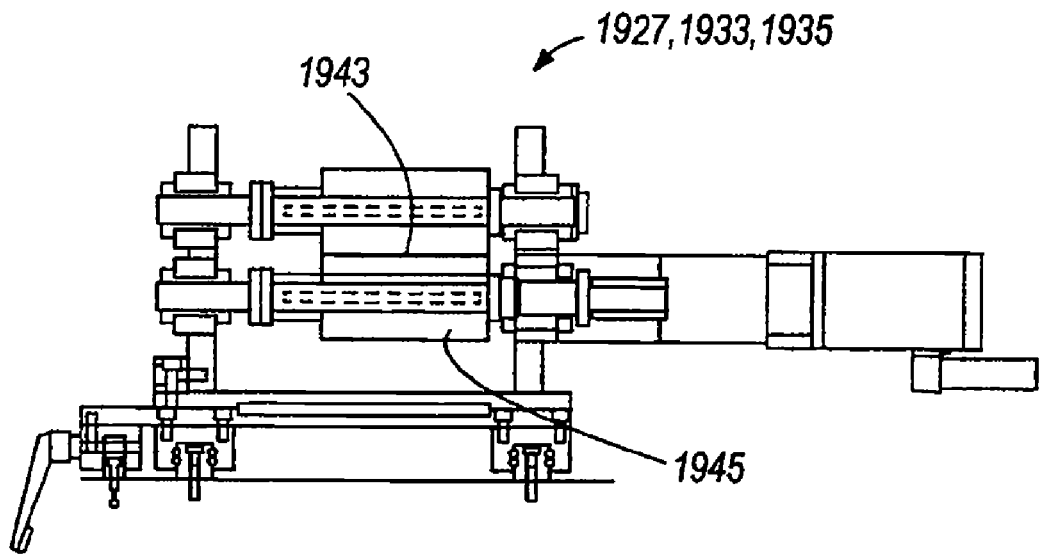
FIG. 55A is a sectional view showing a perforation station of the manufacturing line shown in FIG. 55.
Figure 55B:
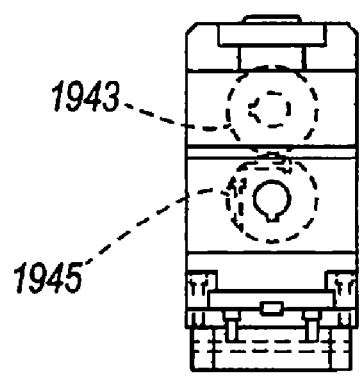
FIG. 55B is a side view showing the perforation station shown in FIG. 55A.
Figure 55C:
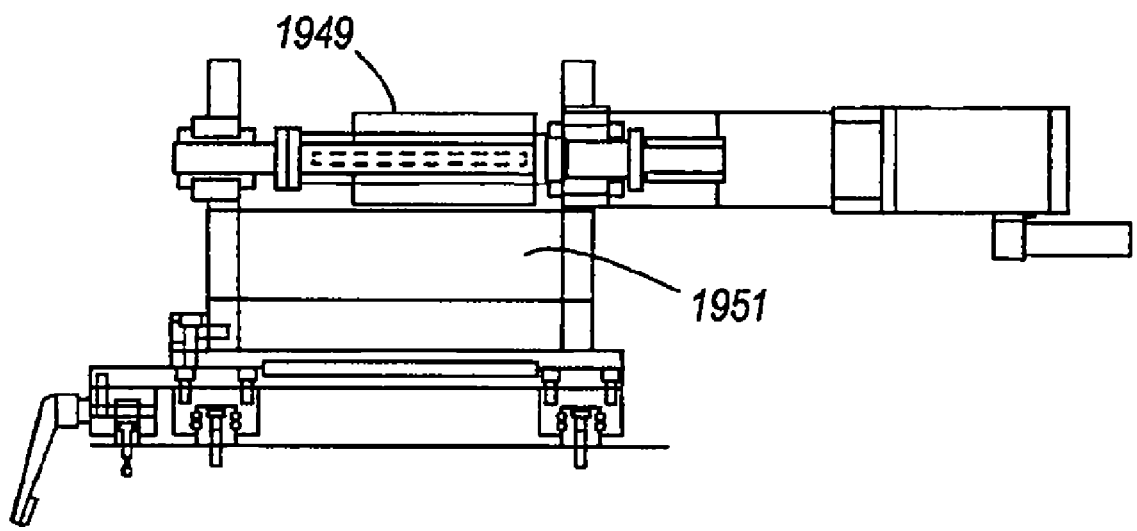
FIG. 55C is a sectional view showing a breaking roller and a bar of the manufacturing line shown in FIG. 55.
Figure 55D:
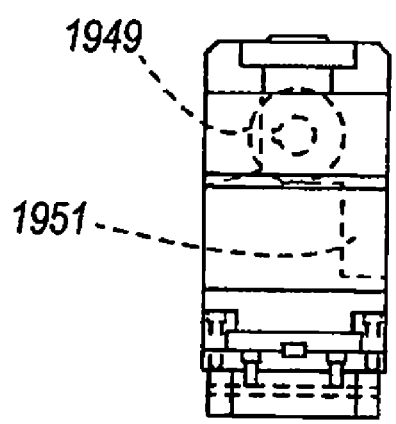
FIG. 55D is a side view of a breaking roller and a bar of the manufacturing line shown in FIG. 55.

As shown in FIG. 55, manufacturing line 1900 includes three coils of sheet material R1, R2, R3, such as sheets of aluminum, aluminum alloy, or other suitable material for the formation of three-piece flat tube assemblies. In this particular example, sheet material from the first coil R1 is used to produce a first portion 1912 or 1914, sheet material from the third coil R3 is used to produce a second portion 1914 or 1912, and sheet material from the second coil R2 is used to produce the insert 1934 for the two-piece flat tube 1910. Depending at least in part upon the paths of the sheets of material, other possible positions of the coils with respect to a manufacturing line, and the resulting orientation of the flat tube 1910 as it proceeds through the manufacturing process, each coil R1, R2, R3 can have sheet material used to produce any of the portions of the flat tube 1910 in other embodiments.

FIG. 55 illustrates sets of rolls 1921, 1923, 1925 for processing sheet material provided from the coils R1, R2, and R3, respectively. Each set of rolls 1921, 1923, 1925 can be arranged to define a respective loop of traveling sheet material as shown schematically in FIG. 55, although any other arrangement of rolls is possible. Any one or more of the rolls in each set 1921, 1923, 1925 can be driven by a suitable motor or prime mover in order to draw material being provided by the coils R1, R2, and R3. Also, any one or more of the rolls in each set 1921, 1923, 1925 can be idler rolls permitting free travel of a corresponding sheet of material thereover. Furthermore, any of the rolls in each set 1921, 1923, 1925 can perform both functions, such as by being selectively driven through a clutch, or otherwise being selectively driven in any other conventional manner. It will also be appreciated that the coils of material R1, R2, R3 themselves can be driven by suitable motors or other prime movers. By way of example, it is envisioned that the sheets of material supplied from the coils R1, R2, and R3 can move in some embodiments at a linear speed of about 100-200 m/min. (328.08-656.16 ft/min.). Slower or faster speeds are possible in other embodiments.

By controlling the motor(s) driving each coil of material R1, R2, R3 and/or driving any of the rolls in the sets of rolls 1921, 1923, 1925 it is possible to control the maximum speed of each sheet of material, such as by selectively providing a braking force upon any of the sheets of material. In some embodiments, this enables the speed of each sheet of material to be controlled independently of the others—even to the point of stopping one or two of the sheets while moving the others. Also, the sets of rolls 1921, 1923, 1925 can function to permit a certain buffering of the sheet material supplied to downstream locations.

The manufacturing line 1900 illustrated in FIG. 55 includes a first perforation station 1927 for forming perforations 1929 in the sheet of material received from the second coil R2 (for producing the insert 1934 in a later flat tube 1910). This perforation station 1927 is located at the beginning of the manufacturing line 1900 in FIG. 55, but can instead be downstream of this location in other embodiments. Subsequently, the sheet of material forming the insert 1934 is shaped by a set of rollers schematically illustrated in FIG. 55 as forming section 1931. The sheets of material from the first and third coils R1, R3 (for producing the first and second portions 1912, 1914 in a later flat tube 1910) are transported along the distance defined by the forming section 1931. Subsequently, the sheet of material from the first coil R1 reaches a second perforation station 1933, and the sheet of material from the third coil R3 reaches a third perforation station 1935 adjacent the second perforation station 1933. In other embodiments, the three perforation stations 1927, 1933, 1935 can be in different locations with respect to one another and/or the other portions of the manufacturing line 1900. Also, in other embodiments, one or more of the perforation stations 1927, 1933, 1935 can be used to perforate more than one sheet of material.

Figure 57A:
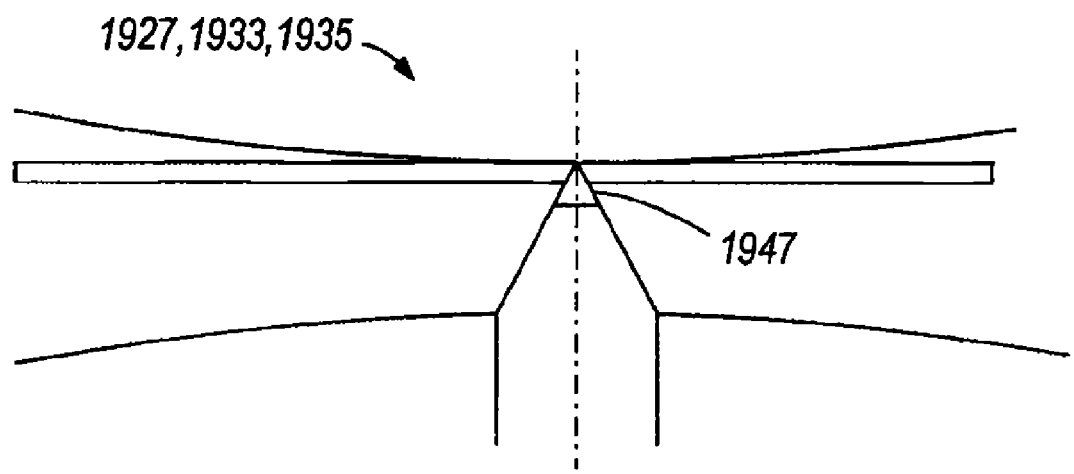
FIG. 57A is a side view showing a sheet of material traveling through a portion of the perforation station shown in FIG. 55A.
Figure 57B:
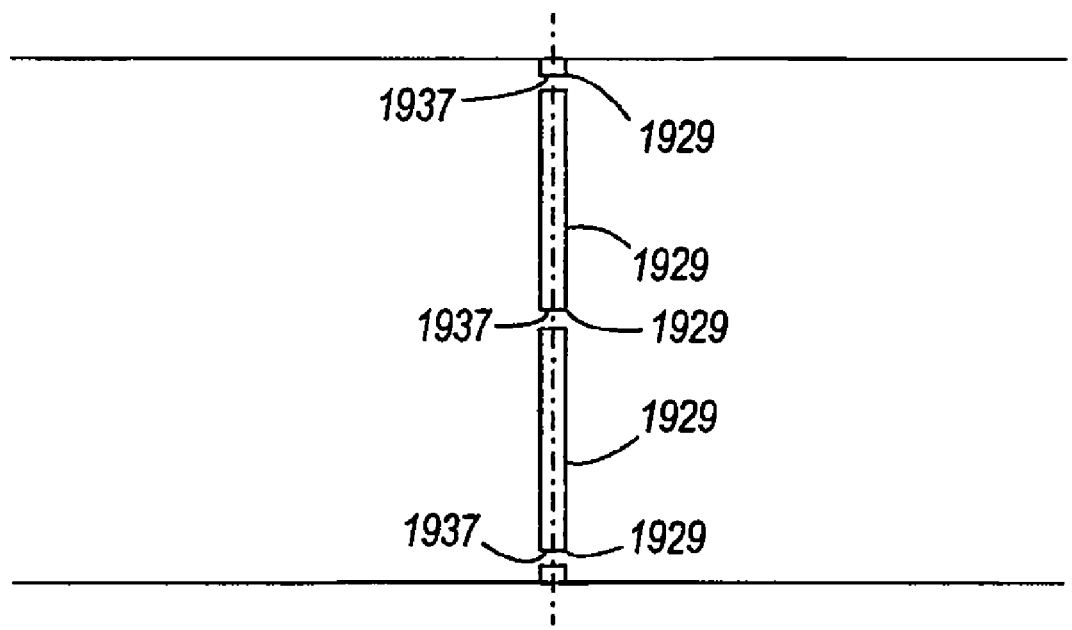
FIG. 57B is a top view showing a sheet of material traveling through a portion of the perforation station shown in FIG. 55A.

With continued reference to the illustrated embodiment of FIG. 55, the second and third perforation stations 1933, 1935 form perforations 1929 on the first and third sheets of material for the first and second portions 1912, 1914 of the flat tube 1910, respectively, while the second sheet for the insert 1934 is passed between the first and third sheets at the second and third perforation stations 1933, 1935. An example of perforations produced at the second and third perforations stations is shown in FIG. 57, and can be similar to the perforations produced in the first perforation station 1927 described above. In the embodiment of FIG. 57, the perforations 1929 are relatively fine openings separated by webs 1937 located at predetermined distances between the perforations 1929. However, in other embodiments the perforations can each be areas of reduced thickness of the material, and need not necessarily be defined by openings through the material. In either case, the description herein regarding the shape, size, and other features of perforations apply equally.

The webs 1937 are broken off as part of the manufacturing process of the flat tube 1910. In some embodiments, the length of the perforations 1929 extending in the transverse direction of the perforated sheets of material (from the first, second, or third coils R1, R2, and R3) is at least 1 cm (0.3937 in). Also, in some embodiments the length of each web 1937 is less than 1 mm (0.03937 in).

The shape (e.g., length) and arrangement of the perforations 1929 illustrated in FIG. 57 are presented by way of example only. Longer or shorter perforations 1929 and longer or shorter webs 1937 can be used as desired in any of the sheets of material used to form the flat tube 1910. For example, each of the perforations 1929 can instead be substantially round or can take other shapes desired, potentially resulting in fewer or more perforations across the sheet of material. Also for example, the length or other shape features of the perforations 1929 can vary across the width of the sheet of material being perforated, such as by providing perforations and/or webs proximate the longitudinal edges of the sheet that are longer than those at the center of the sheet, or vice versa. The types and features of the perforations 1929 depend at least in part upon the material properties of the sheet being perforated.

Based upon the perforation dimensions and the relatively thin sheet materials that can be used as described above, in some embodiments in webs 1937 between perforations 1929 are generally not visible with the naked eye. For many manufacturing operations, advantages can be achieved by locating a web 1937 near each longitudinal edge of a sheet of material being perforated, thereby reducing the opportunity for parts of the sheet of material to accumulate in such locations during later processing of the sheet.

In those flat tube embodiments described herein in which one or more sheets of material (e.g., sheet metal strips) are used to produce a flat tube, sheets of material can be perforated for separation at the perforations. In those embodiments in which two or more sheets of material are used to produce a flat tube, two or more of the sheets can be perforated, after which time the perforations in the different sheets can be aligned (e.g., in a common plane substantially perpendicular to the sheets, the direction of travel of the sheets, and/or the flat tube produced by the sheets), and individual tubes can be separated at the perforations from the continuous length of upstream material. The perforation alignment just described can be achieved in some embodiments by controlling the speed of one or more drives feeding one or more of the sheets of material through the manufacturing process. More specifically, if perforations of any two or more sheets of material are not already aligned, one or more of the sheets can be moved at different speeds until the perforations are aligned to be able to separate individual tubes at a downstream location. In this regard, it should be noted that this alignment process can take place for any number of perforated sheets of material being used to produce the flat tubes.

For example, and with continued reference to the embodiment of FIGS. 55-58 the perforations 1929 in the three sheets of material from coils R1, R2, and R3 are aligned in an aligning section 1939 of the manufacturing line 1900 by one or more drives controlled to adjust the speeds of the sheets of material with respect to one another. In light of the fact that speed adjustments of one or more sheets may be necessary to align the perforations 1929, the aligning section 1939 of FIG. 55 is generally placed in the manufacturing line 1900 upstream from a merging section 1941. The merging section 1941 is an area of the manufacturing line where the parts of the flat tube 1910 (e.g., first and second portions 1912, 1914 and insert 1934, in the illustrated embodiment) are connected with each other to form the flat tube 1910. The merging section 1941 can include rolls or other sheet forming elements for merging the parts of the flat tube 1910 to form an endless tube 1910. In those embodiments where none or only some of the longitudinal edges of the first and second tube portions 1912, 1914 have not already been formed at one or more upstream locations, the merging section 1941 can also include rolls and/or other sheet forming elements for performing other shaping operations on the longitudinal edges of the first and second portions 1912, 1914.

The continuous length of material immediately upstream of this separating location can be a continuous length of completed flat tubing. Alternatively, the continuous length of material immediately upstream of the separating location can be sheet(s) of material used to form the flat tubing at any stage of such formation. For example, in some embodiments, after perforations in the sheets of material have been aligned, partially-formed sheets of material can be combined into a continuous length of completed flat tubing, such that completed tubes are available after the separation. As a result, individual tubes can be created that have no impressions on the flat tube ends.

Figure 56:
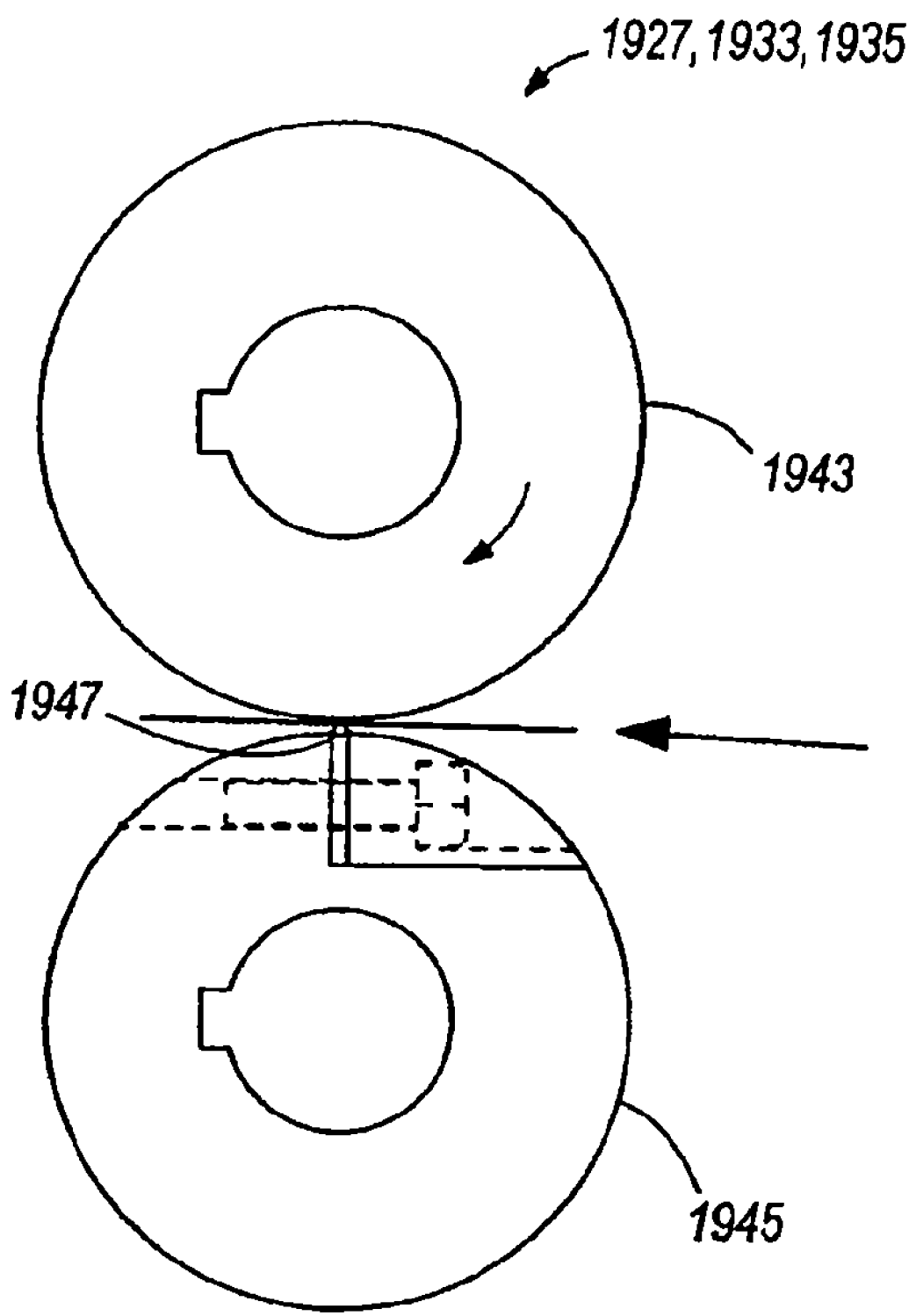
FIG. 56 is a side view of a portion of the perforation station shown in FIG. 55A.

In some constructions of a manufacturing line, perforations generally are formed by one or more perforating rollers. For example, a manufacturing line can include at least pair of perforation rollers. One of the rollers of the pair can run with one or more endless sheets of material that will be used to form at least part of the flat tube, and the other roller of the pair can be equipped with a tool (e.g., one or more perforating blades or stamps) for forming perforations in the sheet(s) of material. FIGS. 56 and 57 schematically illustrate a perforation process according to an embodiment of the present invention. For ease of description, the following description is with reference to the first perforation station 1927 described above. However, the same description applies equally to the other perforation stations 1933, 1935 in the illustrated embodiment of FIGS. 55-58, although one or more of the perforation stations can be different in other embodiments (e.g., can have different blades, use only a single roll rather than two rolls, and the like). As described earlier, the number and type of perforations, and the locations of the perforation stations can vary. Changes to these features can be based at least in part upon desired specifications of the flat tube 1910 produced in the manufacturing line 1900.

With reference to the embodiment of FIGS. 56 and 57, the perforation station 1927 includes a pair of perforation rollers having a first perforation roller 1943 and a second perforation roller 1945. In some embodiments, these perforation rollers 1943, 1945 can be arranged in any other orientation desired, depending at least in part upon the orientation of the sheet perforated by the perforation rollers 1943, 1945 and adjacent portions of the manufacturing line 1900. The first roller 1943 runs parallel to and guides one or more of the passing sheets of material (from coils R1, R2, and R3), while the lower roller 1945 has a protruding perforation stamp 1947.

To prevent sheet accumulation as perforations are created, some embodiments of the present invention utilize perforation rollers with one or more perforation blades or stamps having a standby position. In the standby position, at least one of the perforation rollers is rotated or translated to a position where the sheet(s) of material pass freely through the perforation rollers.

For example, the second roller 1945 illustrated in FIG. 56 has a driving mechanism (not shown), such that the second roller 1945 can hold the perforation stamp 1947 in a standby position in which the perforation stamp 1947 does not engage the passing sheets of material from coils R1, R2, and R3. In the standby position of the second roller 1945, the perforation stamp 1947 can be rotated a distance from the position shown in FIG. 56 to avoid this engagement, such as by being rotated approximately 90 degrees to a substantially horizontally position on the second roller 1945. In other embodiments, either or both rollers 1943, 1945 can be mounted upon respective axles that are moved with respect to the passing sheet, thereby enabling either or both rollers 1943, 1945 to translate with respect to the passing sheet and defining standby and perforation or action positions.

To perforate the sheet of material supplied from the second coil R2 (again with reference to the illustrated embodiment of FIGS. 55-58 by way of example), the second roller 1945 can be actuated to a perforation or action position, such as to the upper and substantially vertical position shown in FIGS. 56 and 57. This actuation can be performed by a motor, actuator, or other drive connected to the second roller to rotate the second roller from the standby position to the perforation or action position at a rotation speed. In the perforating position of the first and second rollers 1943, 1945, the perforation stamp 1947 engages the sheet of material supplied from the second coil R2, and forms perforations 1929 therein. In some embodiments, the rotational speed (and therefore, the circumferential speed) of the second roller 1945 is higher than the transport speed of the sheet of material to insure that the sheet of material does not accumulate during perforation operations. In other embodiments, the rotational speeds (and therefore, the circumferential speeds) of both rollers 1943, 1945 are higher than the transport speed of the sheet of material for this purpose. It should be noted that the terms "action position" or "perforating position" as used herein and in the appended claims do not alone indicate or imply that the subject roller(s) are stationary, but is rather indicative of the positions of the roller(s) at the moment when the perforations are made.

In some embodiments, the rotation speed of either or both roller 1943, 1945 of the perforation station 1927 is faster that that of the passing sheet of material. Following the creation of perforations in the perforating position, either or both perforating rollers 1943, 1945 can be moved back to a standby position to be reactivated in the next perforation process. In some embodiments, movement of either or both perforating rollers 1943, 1945 back to a standby position is performed by rotating the perforating roller(s) 1943, 1945 in the same direction used to move the roller(s) 1943, 1945 toward a perforating position (rather than by switching the rotational directions of the roller(s) 1943, 1945. Accordingly, driving the pair of perforating rollers 1943, 1945 as described above can help prevent accumulation of the passing sheet material.

Figure 58:
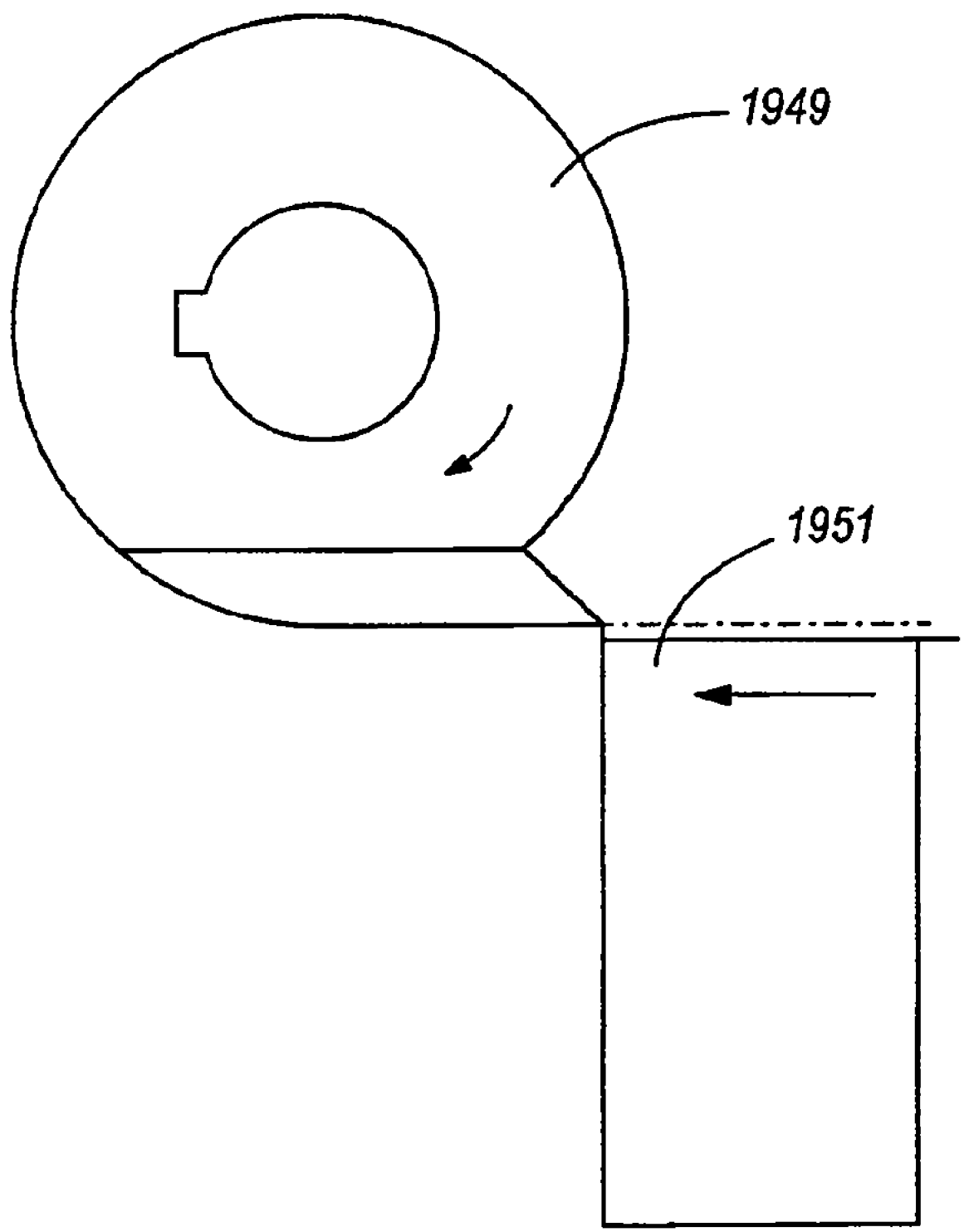
FIG. 58 is a side view of a breaking roller and a bar of the manufacturing line shown in FIG. 55.

It is envisioned that finished tubes can be separated at the end of a manufacturing process due at least in part to perforations described above. In some embodiments, the tubes are separated at the perforations at or near the end of a manufacturing line. Separation of individual tubes can be accomplished in some embodiments by using a pair of breaking rollers or a single breaking roller. In the embodiment of FIG. 58, for example, a breaking roller 1949 and a bar 1951 are used to separating endless tubing running between the breaking roller 1949 and the bar 1951 into individual finished flat tubes 1910. The breaking roller 1949 is equipped with a protruding breaking knife 1951 or other tool used to break the webs 1937 between the perforations 1929 described earlier.

The breaking roller 1949 and/or the bar 1951 can be controlled to include a standby position in which passing tubing is not slowed or otherwise operated upon, and a breaking position in which the breaking roller 1949 and/or bar 1951 is moved to engage the passing tubing and to separate the tube at the perforations 1929. For example, in the illustrated embodiment of FIG. 58, the breaking roller 1949 is rotatable to and from a breaking position in which the breaking knife 1951 of the breaking roller 1949 engages flat tubing and passes by the breaking bar 1951, thereby breaking (and in some embodiments, also cutting) the flat tubing running between the breaking roller 1949 and the breaking bar 1951 at a line of perforations 1929. In other embodiments, the breaking roller 1949 and/or the breaking bar 1951 are translated with respect to the flat tubing to define breaking and standby positions of a breaking station.

Although flat tubing can be broken by the use of a breaking roller 1949 and a breaking bar 1951 as described above, in other embodiments the webs 1937 defined by perforations 1929 of the flat tubing are not broken or cut by a blade or other similar tool, but are instead ripped by generating a force upon the flat tubing in a general longitudinal direction of the endless tube, thus forming individual flat tubes 1910. Such a force can be generated, for example, by passing the endless tubing by a roller engaging the tubing and running at a higher speed than the tubing. Through experimentation it has been found that this manner of separation can result in desirable tube ends as described above.

In some embodiments, one or more rollers 1949 in the portion of the manufacturing line used to break the tubing can be used to help advance the tubing along the manufacturing line. This is also true for any of the perforation stations 1927, 1933, 1935 described herein. It should also be noted that in any of the embodiments described herein, the stamp, blade, or other tool on a roll of any perforation station 1927, 1933, 1935 and/or on the breaking roller 1949 can be retractable to permit the roll to be driven for advancing the tubing without other action thereon. In such cases, the retracted position of the tool can also define the standby position described herein.

Additional aspects of manufacturing flat tubes described herein can also enable such tubes to be produced at significant cost savings, with improved efficiency, at greater speed, and/or in a more reliable and reproducible manner compared with many conventional flat tube manufacturing techniques. As will now be described, some of these additional aspects relate to the manner in which the parts of the flat tubes are formed and/or to the manner in which these parts are brought together to produce the flat tubes. By way of example only, these processes will now be described and illustrated with reference to the production of two-piece tubes, and more specifically to the two-piece tube 1910 illustrated in FIG. 28 and described above, produced using the manufacturing line 1900 illustrated in FIG. 55 and also described above. The following description and accompanying drawings apply equally to the production of any of the other two-piece tubes (with or without inserts) described herein. Also, with the exception of inconsistent or incompatible description, the following description and accompanying illustrations apply equally to the production of any of the one-piece tubes (with or without inserts) also described herein.

The inventors have discovered that significant advantages can be obtained by certain manners of assembling the first and second portions 1912, 1914 and insert 1934 of the tube assembly 1910. In some embodiments for example, the internal insert 1934 is rolled in a corrugated manner in a longitudinal direction of the manufacturing line 1900, and is inserted between the two flat tube portions 1912, 1914 of the later flat tube 1910. The longitudinal edges of the two flat tube portions 1912, 1914 can be rolled or otherwise formed with arc-like edges in the longitudinal direction, after which time the arc-like edges can be brought together to engage one another in order to form the flat tube 1910 shown in FIG. 28. This process is illustrated schematically in FIGS. 55, 59, and 60, and will now be described in greater detail.

As described earlier, FIG. 55 shows three coils of sheet material R1, R2, and R3 supplying sheet material to be used in producing the flat tube 1910. As also described above, the sheets of material from coils R1, R2, and R3 are used to manufacture a first tube portion 1912, an insert 1934 (using the widest sheet of material, in some embodiments), and a second tube portion 1914. The sheets of material used to form these parts run in generally parallel directions with respect to one another through the illustrated manufacturing line 1900.

Although other manufacturing line arrangements are possible, the manufacture of flat tubes 1910 in manufacturing line 1900 illustrated in FIG. 55 generally begins with the formation of the insert 1934 in the first sections of the manufacturing line 1900. In some embodiments, the sheets of material used to form the first and second tube portions 1912,

1914 can be guided without being deformed. In such embodiments, when the process of forming the insert 1934 has been completed, the process of forming the first and second tube portions 1912, 1914 generally begins. Alternatively, one or more forming operations can be performed on either or both of these sheets of material while the insert 1934 is being formed at one or more of the same locations along the manufacturing line 1900. In many cases, the process of manufacturing the first and second tube portions 1912, 1914 can be significantly shorter than that for manufacturing the insert 1934, due to the fact that the relative amount of deformation of the material used to form the first and second tube portions 1912, 1914 can be relatively small (see, for example, the flat tube assembly shown in FIG. 28).

The two-piece flat tube 1910 illustrated in FIG. 28 has identical or substantially identical first and second portions 1912, 1914. The manufacturing line 1900 illustrated in FIG. 55 is adapted to produce these portions 1912, 1914. By virtue of their identical or substantially identical shapes, one portion 1912 is inverted with respect to the other before the portions 1912, 1914 are joined together. As described above, the manufacturing line 1900 illustrated in FIG. 55 has forming rolls or other suitable forming devices for producing the arc-shaped edges of the portions 1912, 1914 described above.

In some cases, sets of forming rolls or other suitable forming devices used to create the same type of longitudinal edge in both tube portions 1912, 1914 are located on the same lateral side of the manufacturing line 1900 (e.g., sets used for producing the larger arc-shaped longitudinal edge of both portions 1912, 1914 being located next to one another in the plane of the sheets of material being formed). In these and other embodiments, the forming rolls or other suitable forming devices can be arranged such that the two portions 1912, 1914 have the same orientation after formation of some or all of the longitudinal edges. In such embodiments, the manufacturing line 1900 can be provided with suitable rollers to flip one of the portions 1912, 1914 about a longitudinal axis so that the two portions 1912, 1914 can be joined in the merging section 1941 of the manufacturing line 1900. In other embodiments, the forming rolls or other suitable forming devices can be arranged in the manufacturing line 1900 such that the two portions 1912, 1914 already have orientations that are inverted with respect to one another (i.e., with their longitudinal sides reversed) after formation of some or all of the arc-shaped edges. In such embodiments, the two portions 1912, 1914 can be parallel to one another, and can be combined in the merging section 1941 of the manufacturing line 1900.

As described in greater detail above in connection with FIG. 28, one longitudinal edge of the first tube portion 1912 encompasses a corresponding longitudinal edge of the second tube portion 1914, while an opposite longitudinal edge of the first tube portion encompasses a corresponding opposite longitudinal edge of the second tube portion 1914 to join the tube portions 1912, 1914 together. In these and other embodiments described herein that can be produced in the manufacturing line 1900, the first and second wall portions 1912, 1914 can be identical or substantially identical. In other embodiments described herein that can also be produced in the manufacturing line 1900, the first and second wall portions 1912, 1914 are not identical, such as where each of the first and second tube portions 1912, 1914 includes either two smaller arc portions or two larger arc portions.

With continued reference to the embodiment of FIGS. 55-60 in conjunction with the flat tube assembly illustrated in FIG. 28, the internal insert 1934 of the assembly can be manufacturing on a third roll set for introduction between the first and second tube portions 1912, 1914 of the two-piece tube 1910. This process is illustrated schematically in FIG. 59, and can take place after the first and second tube portions 1912, 1914 have been formed or substantially entirely formed (as is the embodiment in FIG. 59). In this embodiment, the first and second tube portions 1912, 1914 are not in one plane, but are in two planes at a distance from one another, while the set of forming rolls or other suitable forming devices producing the insert 1934 are positioned so that the sheet of material forming the insert 1934 is located between the sheets of material forming the first and second tube portions 1912, 1914. This allows the internal insert 1934 to be "threaded" in and between the two tube portions 1912, 1914. In other words, the layout of the manufacturing line 1900 illustrated in FIG. 55 is such that the sheet of material used to form the insert 1934 is located between the sheets of material used to form the first and second tube portions 1912, 1914.

Figure 59:
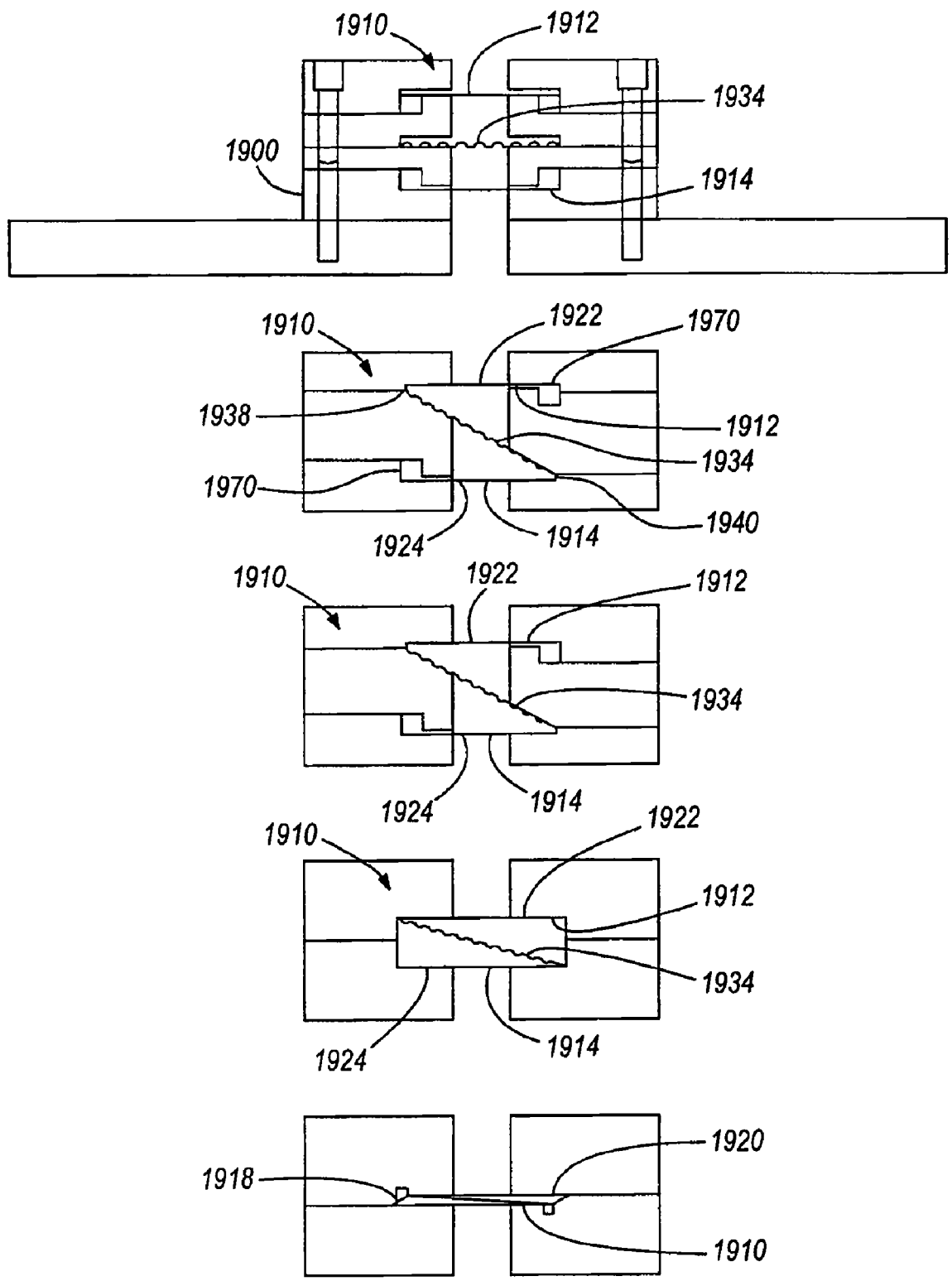
FIG. 59 is a series of schematic end views of the manufacturing line shown in FIG. 55, shown in different stages of forming a flat tube with insert.

With reference to FIG. 59, insertion of the internal insert 1934 as just described can be performed between first and second tube portions 1912, 1914 running substantially parallel to one another along a longitudinal section of the first and second tube portions 1912, 1914 in the manufacturing line 1900. In other embodiments, however, the planes in which the first and second broad sides 1922, 1924 of the first and second tube portions 1912, 1914 lie need not necessarily be parallel to one another at any location other than immediately upstream of the merging section 1941 of the manufacturing line 1900.

In the illustrated embodiment (see FIG. 59(*a*)) and in other embodiments, the sheet of material used to form the insert 1934 is substantially parallel to either or both sheets of material used to form the first and second tube portions 1912, 1914 prior to the process of inserting the insert 1934 into the first and second tube portions 1912, 1914. In other embodiments, other orientations of these three sheets upstream of the insertion process are possible. However, in some embodiments, the process of inserting the internal insert 1934 into the first and second tube portions 1912, 1914 begins by orienting the internal insert 1934 between the first and second tube portions 1912, 1914 at an inclination with respect to at least one of the planes of the first and second broad sides 1922, 1924. For example, in the illustrated embodiment of FIG. 59, the internal insert 1934 is introduced into and between the first and second tube portions 1912, 1914 at an inclination with respect to both of the planes of the first and second broad sides 1922, 1924.

As used herein and in the appended claims, the term "inclined" in its various forms expresses the position of the insert 1934 with respect to the broad sides 1922, 1924 of the tube portions 1912, 1914 (which can be parallel to one another, in some embodiments). In this regard, it should be noted that either or both broad sides 1922, 1924 of the first and second tube portions 1912, 1914 can be in respective planes that are not horizontal, whereby the insert 1934 would be inclined with respect to such non-horizontal orientations.

This inclined insertion can take place in a range of locations upstream of the merging section 1941 of the manufacturing line 1900, and in some embodiments occurs approximately at the beginning stages of the manufacturing line 1900. In some embodiments, the angle of the insert 1934 (with respect to the plane in which a broad side 1922, 1924 of at least one of the tube portions 1912, 1914 lies) can be at least about 25 degrees in at least one location of the insert 1934 between the sheets used to produce the first and second tube portions 1912, 1914, such as at the beginning of the insertion process. In other embodiments, this angle is at least about 30 degrees for good performance results. Also, in some embodiments, the angle of the insert 1934 as described above is no greater than about 45 degrees in at least one location of the insert 1934 between the sheets used to produce the first and second tube portions 1912, 1914, such as at the beginning of the insertion process. In other embodiments, this angle is no greater than about 40 degrees for good performance results.

Subsequently, the internal insert 1934 is brought into an orientation in which the internal insert 1934 is parallel or substantially parallel to the broad sides 1922, 1924 of the first and second tube portions 1912, 1914. FIGS. 59(*b*)-(*e*) show an example of the change or decrease of the inclined position of the insert 1934, as well as the gradual converging of the first and second tube portions 1912, 1914 to hold the insert 1934 therebetween.

In those embodiments (like that of FIG. 28) in which the either or both longitudinal edges 1938, 1940 of the internal insert 1934 are received within the narrow side(s) 1918, 1920 of the flat tube 1910, the shape of the longitudinal edges 1938, 1940 can provide a snug fit against the inner surface of the first and second tube portions 1912, 1914 at the narrow sides 1918, 1920. For example, in those embodiments in which either or both longitudinal edges 1938, 1940 of the insert 1934 are arc-shaped or have a series of folds 1970, the features can be received within the interior of arc-shaped longitudinal edges of the first and second tube portions 1912, 1914. In these and other embodiments of the insert 1934, one longitudinal edge 1938 of the insert 1934 can be placed into a longitudinal arc-like edge of a first wall portion 1912, at or after which time the insert 1934 can be inclined with respect to the broad sides 1922, 1924 of the first and second tube portions 1912, 1914.

As mentioned above, the inclination of the insert 1934 can be reduced to zero (i.e., the insert 1934 can be moved to a position parallel or substantially parallel to the broad sides 1922, 1924 of the first and second tube portions 1912, 1914). In this manner the opposite longitudinal edge 1940 of the insert 1934 can assume a qualitatively correct position in the longitudinal arc-like edge of the second tube portion 1914. Both first and second tube portions 1912, 1914 can be brought together during any part of this process, after which time the longitudinal edges of the first and second tube portions 1912, 1914 that surround the internal insert 1914 are closed as schematically illustrated in FIG. 59(*e*). It should be noted that by closing the flat tube 1910 as described herein, the insert 1934 is deformed in some embodiments. The insert 1934 within the closed flat tube 1910 can remain under compression against any of the broad or narrow sides 1922, 1924, 1918, 1920 of the flat tube 1910, particularly in those embodiments (such as in FIGS. 55-60) in which the insert 1934 was deformed in order to insert the insert 1934 within the flat tube.

In the illustrated embodiment, closure of the first and second flat tube portions 1912, 1914 is provided by bending the adjacent longitudinal edges of the first and second tube portions 1912, 1914 in a manner as described and shown in greater detail above in connection with the embodiments of FIGS. 25, 26 and 28 (i.e., by bending larger arc portions of the longitudinal edges about smaller arc portions of adjacent longitudinal edges of the tube portions 1912, 1914). Accordingly, the manufacturing line 1900 illustrated in FIG. 55 can be used to produce flat tubes 1900 in which either or both longitudinal edges of an insert 1934 are received within respective corresponding bent edges of tube portions 1912, 1914 at the narrow sides 1918, 1920 of the flat tube 1910.

Following closure of the flat tube 1910 in the manufacturing line 1900, finished flat tubes 1910 can be attached to one or more sets of fins or other elements (not shown), and can also be secured to the one or more headers of a heat exchanger (also not shown). In many embodiments, the headers of the heat exchanger is brazed in a brazing furnace, as are the fins or other heat exchange elements to the flat tubes 1910, and the flat tubes 1910 to their inserts 1934.

Figure 60:
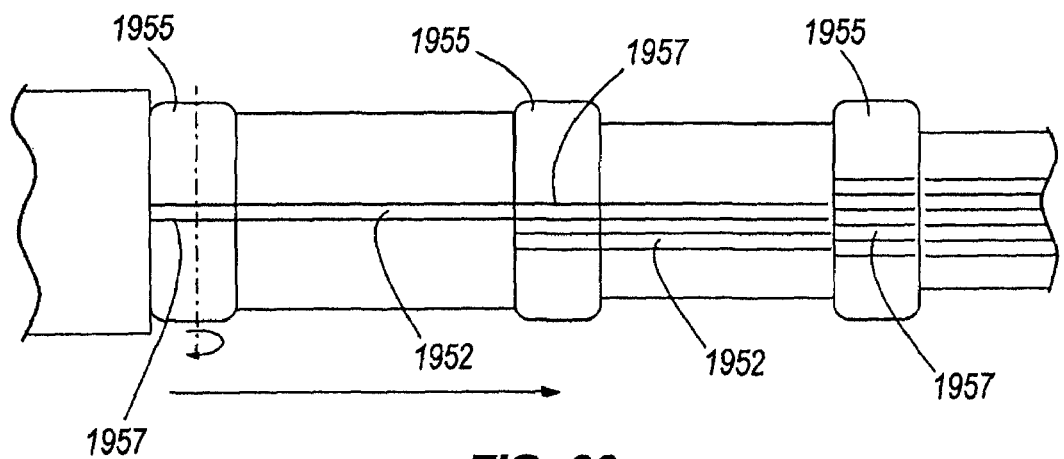
FIG. 60 is a schematic top view of a folding roller portion of the manufacturing line shown in FIG. 55.
Figure 60A:
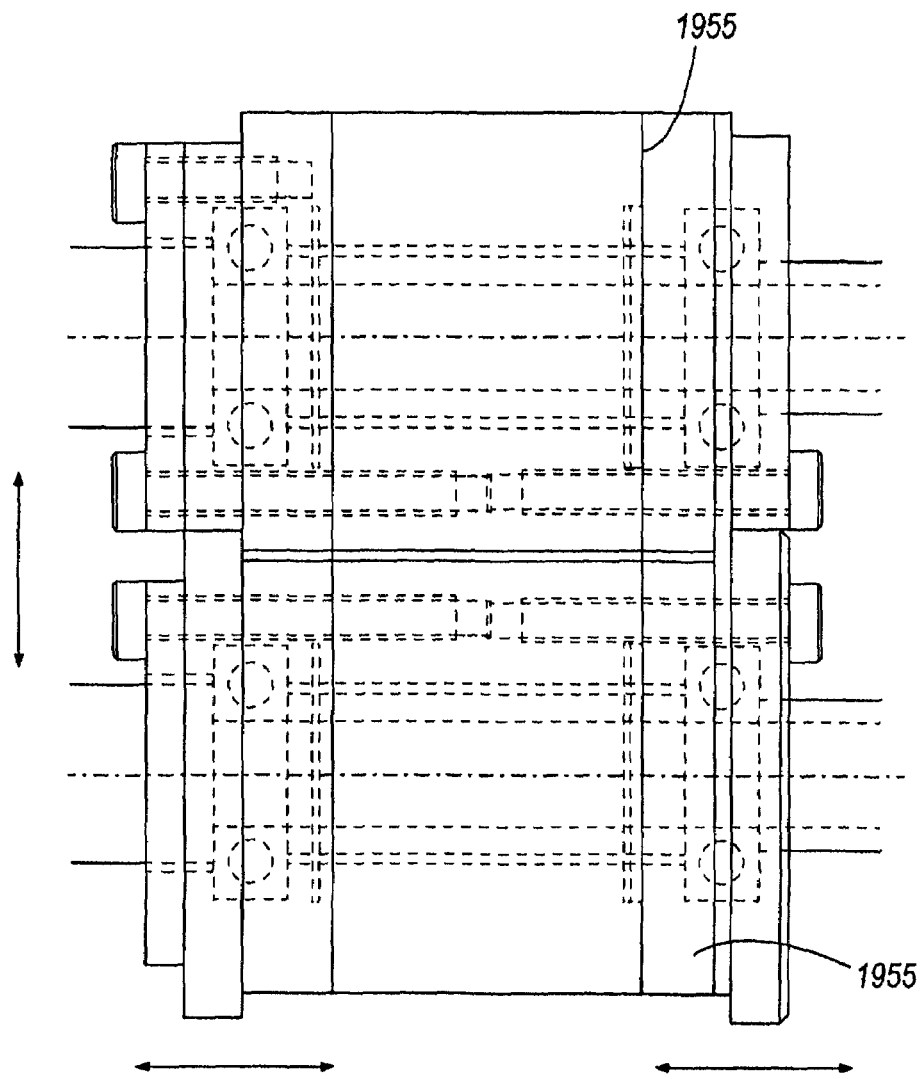
FIG. 60A is an end view of the folding roller portion shown in FIG. 60.

The insert 1934 can have any of the shapes and features described herein with regard to flat tube inserts. In many of these embodiments, the insert 1934 is formed from a flat starting sheet of material. Therefore, as the insert 1934 is formed with corrugations or other features to at least partially define the flow channels 1916 through the tube 1910, the width of the insert 1934 can decrease. This process is shown schematically in FIG. 60, which illustrates a sheet of material in which corrugations 1952 are successively created by forming rolls 1955 as the sheet advances in a longitudinal direction (indicated by the straight arrow in FIG. 60) through the manufacturing line 1900. Although three of such forming rolls 1955 are shown in FIG. 60, the manufacturing line 1900 can have any number of forming rolls 1955 to produce any number of desired corrugations 1952 or other insert features as described with respect to the various insert embodiments herein. The type and location of the corrugations or other wall features can at least partially determine how many forming rolls 1955 are needed in the manufacturing line 1900. For example, in some embodiments where the insert 1934 includes continuous corrugations 1952, such as those illustrated in FIGS. 25-34, a corresponding number of forming roll sets (e.g., each roll set defined by a pair of rolls—one on each side of the sheet of material) can be necessary to form the corrugations 1952 successively as described herein. Accordingly, in some embodiments, the manufacturing line 1900 can extend over a length of about 20 m (65.62 ft.) or more.

The manufacturing line 1900 can also include more than one type of roll 1955 for forming the insert 1934. For example, different rolls 1955 can be used to form different types of corrugations 1952 across the width of the insert 1934. As another example, one or more rolls 1955 can be cutting rolls used to create slits in a sheet of material for later formation of corrugations in the sheet of material, such as by bending portions of the sheet next to the slits as described above in connection with any of the embodiments of FIGS. 35-45. Any number of such rolls 1955 can be used in conjunction with any number of other types of rolls (e.g., for bending portions of the sheet of material) to create any insert type described herein.

In some embodiments, such as that shown in FIG. 60, the manufacturing process of the insert 1934 includes first forming one or more central corrugations 1952 in the sheet of material, and subsequently forming further corrugations 1952 closer to the longitudinal edges of the insert 1934. More specifically, and with reference to the embodiment of FIG. 60 by way of example, a first set of rolls 1955 (i.e., the left-most set of rolls in FIG. 60) includes two grooves 1957 to form corresponding corrugations 1952 in the passing sheet of material. The next set of rolls 1955 includes four grooves 1957 forming corresponding corrugations 1952 in the sheet of passing material. This process can continue for producing as many corrugations in the sheet of material as desired. At any point before, during, or after such corrugation formation, either or both longitudinal edges 1938, 1940 of the insert 1934 can be formed to take any shape, including any of the shapes described and/or illustrated herein. For example, both longitudinal edges 1938, 1940 of the insert 1934 produced in the embodiment of FIGS. 55-60 are provided with arc-like shapes subsequent to forming all the corrugations 1952, as best shown in FIG. 28.

In some embodiments, the width of the sheet used to form the insert 1934 is reduced to a greater extent than the width of the sheets used to form the first and second tube portions 1912, 1914. This can be the case, for example, when the sheets used to form the first and second tube portions 1912, 1914 are deformed only (or primarily) at their opposite longitudinal edges, such as in the case of the two-piece flat tube embodiment illustrated in FIG. 28. An advantage of such a flat tube construction is that smooth broad sides 1922, 1924 of the flat tube 1910 can provide relatively better surfaces for brazing joints between the broad sides 1922, 1924 of the flat tube 1910 and the insert 1934 and/or between the broad sides 1922, 1924 of the flat tube 10 and fins or other elements (not shown) attached to the flat tube 1910.

In those embodiments in which an insert 1934 is threaded between two tube portions 1912, 1914 (and possibly also moved from an inclined position to a parallel or substantially parallel position as described above), the forming rolls or other suitable forming devices for producing the insert 1934 can be located upstream of the location at which the two tube portions 1912, 1914 are brought together to close the flat tube 1910. Therefore, some or all of the features of the insert 1934 can be formed prior to this location. In other embodiments, however, some or all of the insert-forming devices can be located in the same part of the manufacturing line at which the two tube portions 1912, 1914 are brought together to close the flat tube 1910. Accordingly, the insert 1934 can still be in the process of being formed as the tube portions 1912, 1914 are brought together for closure, and/or as the insert 1934 is changed from an inclined position to a position parallel or substantially parallel to the broad sides 1922, 1924 of the tube portions 1912, 1914 as described above.

In some embodiments of the manufacturing line 1900, roll sets used to produce any one or more of the various parts of the flat tube 1910 and insert 1934 can be adjustable to produce flat tubes 1910 and/or inserts 1934 with different cross-sectional dimensions and characteristics. Alternatively or in addition, an advantage of some of the embodiments of the manufacturing line 1900 is that one or more roll sets (also identified as roll banks) used to produce any of the flat tube assembly parts can be fully exchanged for other sets to form flat tubes 1910 and/or inserts 1934 with different dimensions and characteristics. It should be noted that roll sets without individual adjustability can often be produced in a relatively more cost-effective and efficient manner.

Another feature of the manufacturing line 1900 that can define significant manufacturing advantages relates to flexibility in the widths of sheets used to create flat tubes according to embodiments of the present invention. In some embodiments, one or more of the sheets of material can be formed with additional folds and/or to define additional flow channels as needed to use an entire width of the sheets. For example (and with continued reference to the machine line embodiment illustrated in FIGS. 55-60), the width of the sheet of material used to produce the internal insert 1934 is generally larger than the width of the sheets of material used to manufacture the first and second tube portions 1912, 1914. This can be the result of the insert 1934 having corrugations 1952 and deformed longitudinal edges 1938, 1942, while the first and second tube portions 1912, 1914 has only deformed longitudinal edges or otherwise requires less material width to form the tube portions 1912, 1914, in some embodiments. Any additional width of the sheet of material used to form the insert 1934 can be used to create further features of the insert 1934, such as one or more additional folds at the narrow sides 1918, 1920 of the flat tube 1910, and/or one or more additional folds defining the flow channels 1916 through the flat tube 1910.

Still other features of the present invention also relate to the manner in which flat tubes described herein can be produced, flat tube and fin assemblies and the manner in which such assemblies can be produced, and/or flat tubes and fin assemblies incorporated into heat exchange devices. By way of example only, these aspects of the present invention will now be described and illustrated with reference to the production of two-piece tubes, and more specifically to the two-piece tube 1910 illustrated in FIG. 28 and described above. The following description and accompanying drawings apply equally to the production of any of the other two-piece tubes (with or without inserts) described herein. Also, with the exception of inconsistent or incompatible description, the following description and accompanying illustrations apply equally to the production of any of the one-piece tubes (with or without inserts) also described herein.

Some advantages of forming tubes 1910 with fins according to the present invention include a relatively simpler method of manufacturing such assemblies for manufacturing different types of heat exchangers. In some embodiments of the present invention, an endless tube 1910 (i.e., created by the continuous supply of sheet material from one or more upstream locations and the formation of the sheet material into a continuous flat tube 1910), such as the endless tube 1910 illustrated in FIGS. 61, 64, and 65, can be transported along a manufacturing line to attach the endless tube 1910 to at least one set of fins 1959. It is to be understood that reference to the process of coupling fins 1959 to a flat tube or to an endless tube can be used interchangeably herein (barring any indication to the contrary) without limiting the scope of the present invention. In some embodiments, only one of two broad sides 1922, 1924 of the endless tube 1910 is provided with a set of fins 1959 in this manner. Flat tubes 1910 produced with fins 1959 on only one side can be used, for example, at edges of a heat exchanger core 1965, in which cases the flat tube 1910 can be positioned to face inward so that the flat tube 1910 is adjacent a set of fins 1959 of an adjacent tube 1910, or outward so that the set of fins 1959 is adjacent a set of fins 1959 of an adjacent tube 1910. In other embodiments, such as that shown in FIGS. 61-66, both broad sides 1922, 1924 of the endless tube 1910 are provided with a respective set of fins 1959 in this manner. In both cases, the set(s) of fins 1959 can define a two-dimensional interface with the broad side(s) 1922, 1924 of the flat tube 1910.

Many of the flat tube and fin embodiments described below and illustrated herein are constructed of sheets of metal including aluminum (e.g., aluminum or an aluminum alloy), although other metallic and non-metallic sheet materials can instead be used in other embodiments. In some embodiments, the sheet of material used to produce the flat tubes 1910 is provided with a braze layer (not shown) on at least one side thereof, whereas the sheet of material for the manufacture of the fins 1959 does not have a braze coating. In other embodiments, different locations of braze coatings are possible.

Although the various aspects of finned tube production and finned tube features described herein can be applied to flat tubes having any dimensions, unique advantages are obtained in their application to flat tubes 1910 formed of the relatively thin material also described herein. By way of example only, the relatively thin tube material can enable continuous line production of finned flat tubes 1910 (described in greater detail below) where previously not possible. In some embodiments, the wall material of the flat tube has a thickness of no greater than about 0.20 mm (0.007874 in). However, in other embodiments, the inventors have discovered that a wall material of the flat tube having a thickness of no greater than about 0.15 mm (0.0059055 in) provides significant performance results relating to the overall performance of heat exchangers using the flat tube, manufacturability, and possible wall constructions (as disclosed herein) that are not possible using thicker wall materials. Also, in some embodiments, a wall material thickness of the flat tube of no less than about 0.050 mm (i.e., no less than about 0.0019685 in) provides good strength and corrosion resistance performance, although a wall material thickness of no less than about 0.30 mm (0.00118 in) can be used in other embodiments.

As explained in greater detail below, the heat exchanger tubes and other portions of heat exchangers described herein can be manufactured using a number of manufacturing techniques and processes and can include corrosion protection features, such as, for example, those techniques and processes described below and illustrated in FIGS. 92-95. A number of manufacturing processes and techniques and the corrosion protection features referenced hereinafter are particularly advantageous when applied to heat exchanger tubes and portions of heat exchangers having significantly reduced material thickness. In addition, such techniques, processes, and corrosion protection features provide significant advantages relating to the overall performance of flat tubes and heat exchangers made from such material.

The flat tube 1910 in the illustrated embodiment is a two-piece flat tube with an insert. With reference to the illustrated embodiment of FIG. 66 by way of example, each of the illustrated flat tubes 1910 can have a small diameter d of at least about 0.8 mm (0.031496 in) to provide good performance results in many applications. Also, a small diameter d of no greater than about 2.0 mm (0.07874 in) provides good performance results in many applications. However, in some embodiments, a maximum small tube diameter d of no greater than about 1.5 mm (0.059055 in) is used. Any of the other flat tube embodiments described herein (e.g., constructed of only a single piece or any number of additional pieces) can be used to create the finned tubes of the present invention. Also, in other embodiments, any of the other small and large diameters d, D described above in connection with all of the flat tube embodiments disclosed herein can instead be used.

Figure 61:
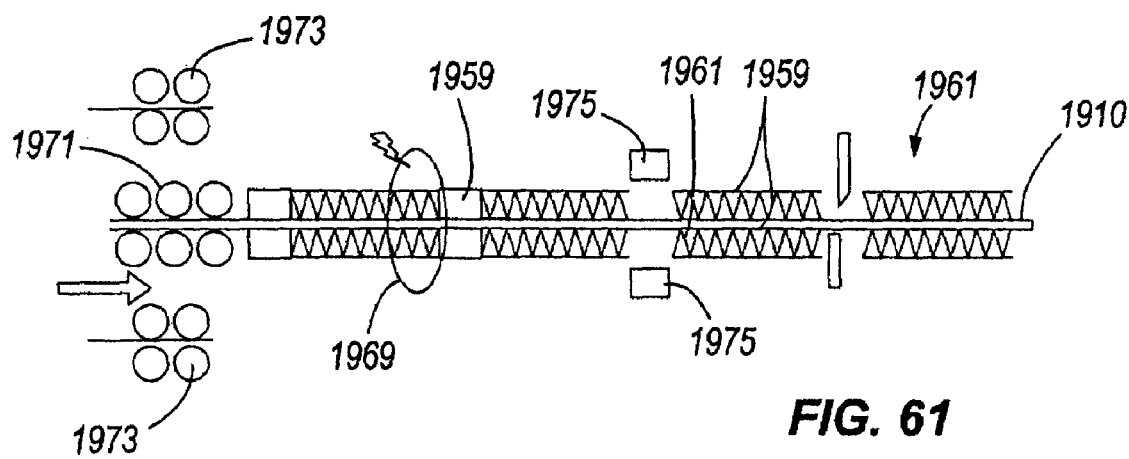
FIG. 61 is a schematic end view of a finned flat tube manufacturing line according to an embodiment of the present invention.

The manufacture of the flat tubes 1910 and sets of fins 1959 in the illustrated embodiment is shown schematically in FIG. 61 only by a few roll pairs 1971, 1973, which represent part of an upstream manufacturing line not shown in more detail. This upstream manufacturing line can also include intermediate buffers (e.g., roll sets, not shown) for controlling the feed rate of the flat tube 1910 and/or fins 1959. Furthermore, although two pairs of rolls 1973 are shown in FIG. 61 to schematically represent the production of two sets of fins 1959, it should be noted that a single upstream fin manufacturing line can instead be used in some embodiments.

Flat tubes that can be used to create finned tubes can be closed by brazing, welding, soldering, or in any other suitable manner described herein along one or more longitudinal seams upstream of the location at which fins are attached to the flat tubes. Such tube production can be used, for example, in those embodiments in which a flat joint between the flat tube 1910 and a set of fins 1959 is an adhesive joint. Alternatively, the flat tube 1910 can be joined by brazing, welding, or soldering in the course of production of the finned tubes.

The flat tubes 1910 illustrated in FIGS. 61-66, 68, and 69 are described in greater detail above in connection with FIG. 28. As noted above, the description and accompanying drawings regarding finned flat tubes and their manufacture apply equally to the production of any of the other one- and two-piece tubes (with or without inserts) described herein. By way of example only, FIG. 67 illustrates another flat tube 310 that can be used in any of the finned tube embodiments described herein, and is described in greater detail above in connection with FIG. 7. In some embodiments, the flat tube 310 shown in FIG. 67 has a wall thickness of about 0.10 mm (0.003937 in). One characteristic of this particular flat tube 310 is that the narrow sides 318, 320 are designed to the very stable. For example, the narrow side 318 includes a set of folds 330. Another characteristic of this flat tube 310 is that the flat tube 310 is divided into a number of flow channels 316 by single folds 328, or by sets 332 of multiple folds 328 in other embodiments. In some embodiments, the distance between the folds 330 can be less than 1.0 mm (0.003937 in). However, this distance can be increased into the centimeter range. As described in greater detail above in connection (for example), with the embodiments illustrated in FIGS. 1-13, it should be noted that the folds 330 that form the narrow side 318 can be designed with different lengths and/or shapes, thus relatively increasing the temperature change load resistance, pressure strength, and/or impact strength of the flat tube 310.

The fins 1959 described herein can have any thickness desired, and can be produced from an endless sheet of material in some embodiments. However, the use of fins 1959 formed from a sheet of material with a thickness no greater than about 0.09 mm (0.0035433 in) can provide good performance results in many applications. Also, fins 1959 formed from a sheet of material with a thickness no less than about 0.03 mm (0.0011811 in) can provide good performance results in many applications.

Figure 62:
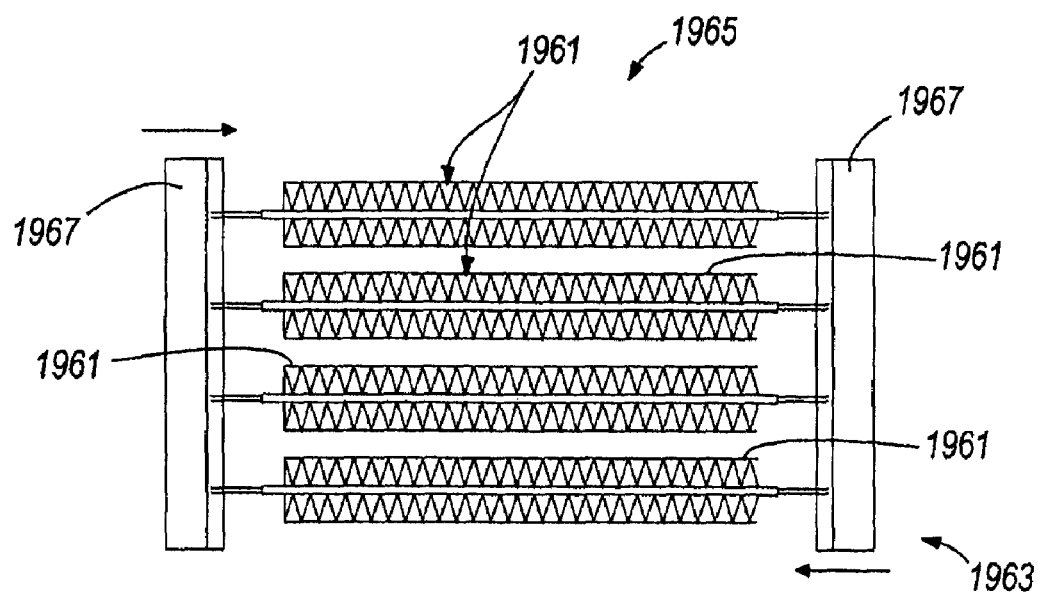
FIG. 62 is an exploded view of a heat exchanger having finned flat tubes according to an embodiment of the present invention.
Figure 63A:
FIGS. 63A-C are partial views of fin sets according to different embodiments of the present invention.
Figure 63B:
Figure 63C:

FIG. 63 illustrates alternative constructions of the fins 1959 that can be used in the various embodiments of the present invention. The fins 1959 illustrated in FIGS. 61, 62, 64-66, and 68-68 correspond to the fins 1959 illustrated in FIG. 63(*a*). However, it is to be understood that other designs of the fins 1959 are possible, and fall within the spirit and scope of the present invention.

Figure 66:
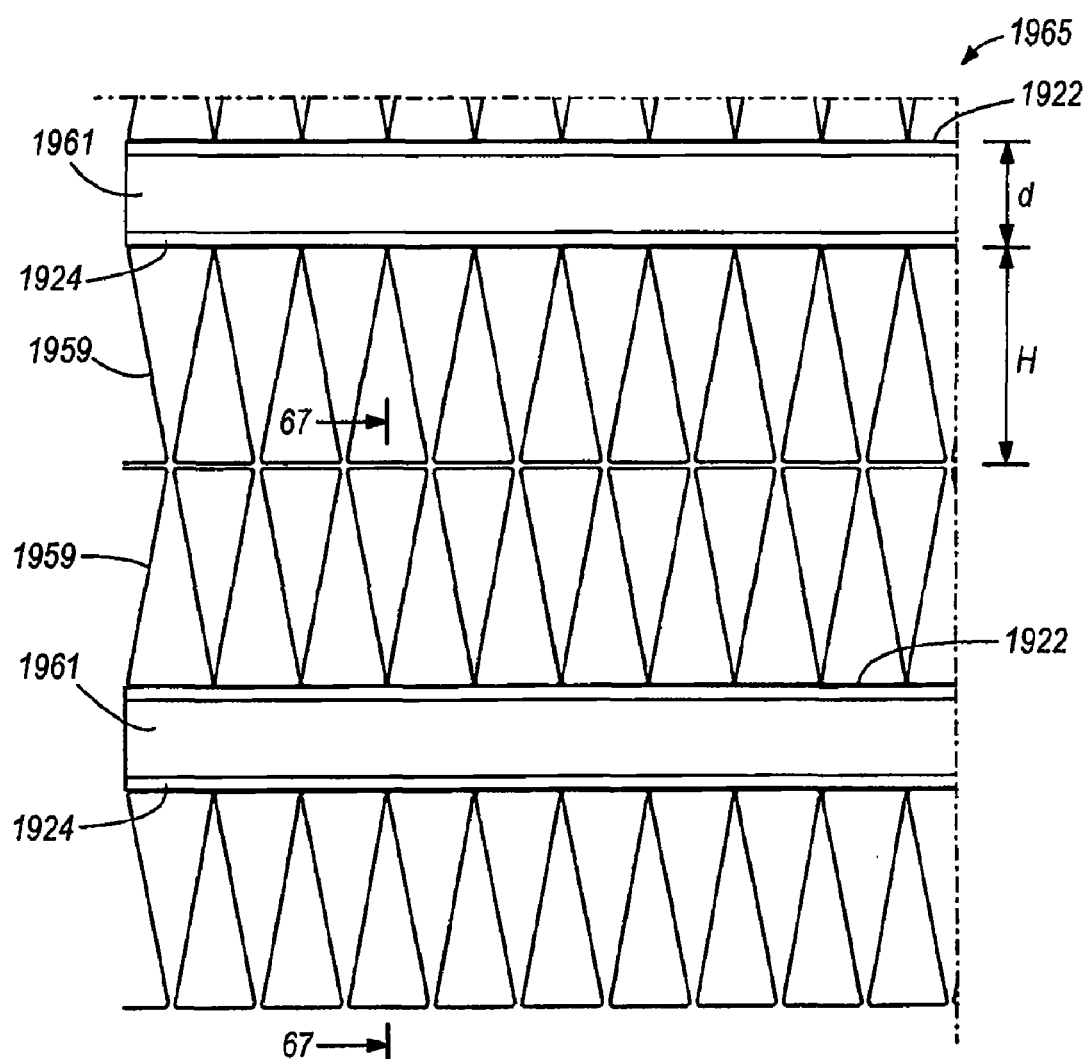
FIG. 66 is a detail view of a heat exchanger having finned flat tubes according to an embodiment of the present invention.
Figure 67:
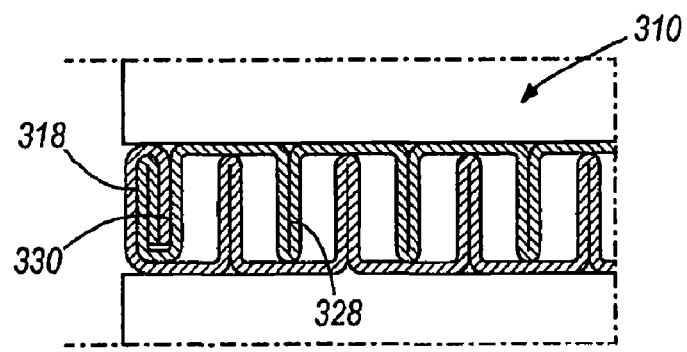
FIG. 67 is a detail view of a flat tube that can be used in producing a finned flat tube according to an embodiment of the present invention.

With reference to FIG. 66 by way of example, the wall thickness of the fins 1959 can be about 0.06 mm (0.0023622 in), and can have a height H of about 3.00 mm (0.011811 in). It can be observed that a distance 2H between two flat tubes 1910 can therefore be about 6.0 mm (0.023622 in) subsequent to the manufacturing process described herein in which adjacent fin sets 1959 of adjacent flat tubes 1910 abut one another.

The sets of fins 1959 can be secured to the broad sides 1922, 1924 of the flat tube 1910 by adhesive or by a metallic joint (e.g., welding, brazing, or soldering), wherein flat surfaces of the broad sides 1922, 1924 provide significant surface area for such attachments. In some embodiments, the flat joint between the flat tube 1910 and one or more sets of fins 1959 defines less surface area than that of the flat broad sides 1922, 1924 of the flat tube 1910.

Figure 68:
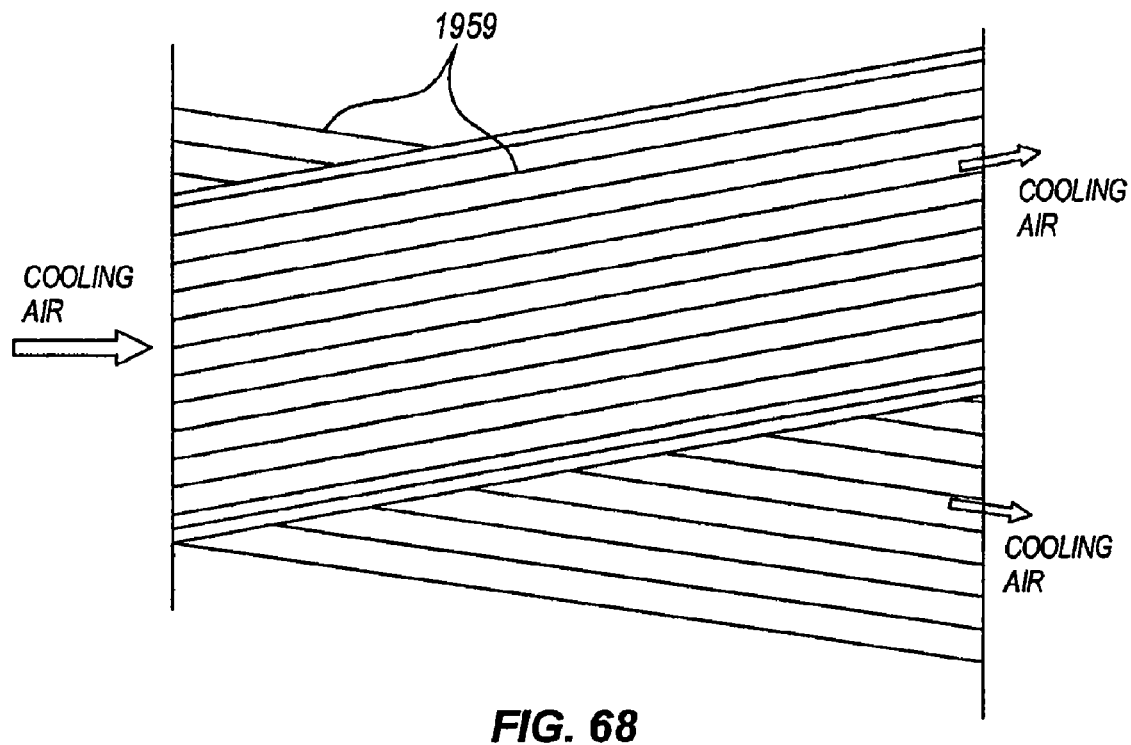
FIG. 68 is a detail side view of a heat exchanger having finned flat tubes according to another embodiment of the present invention.
Figure 69:
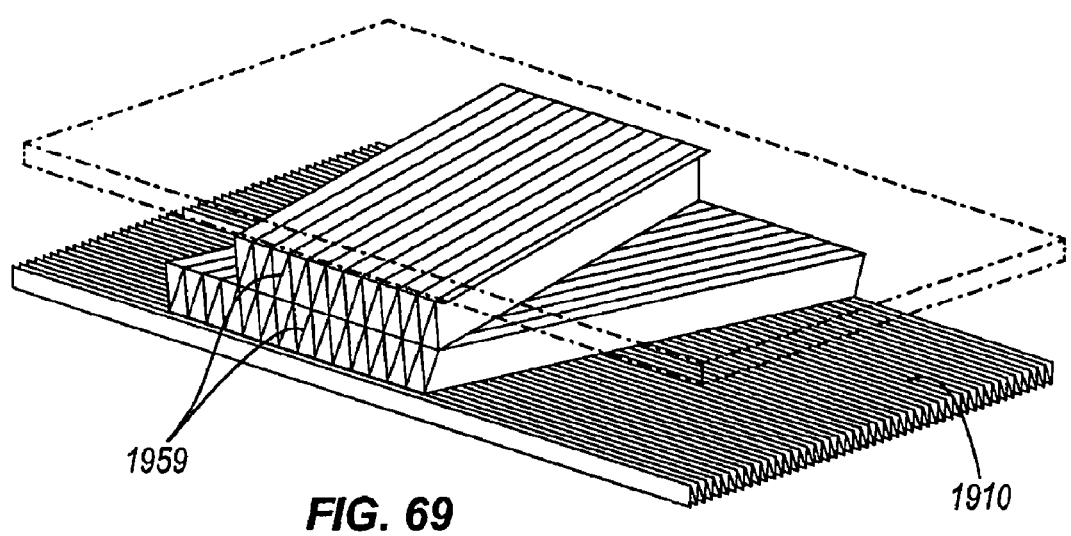
FIG. 69 is a detail perspective view of the part of the heat exchanger shown in FIG. 68.

The sets of fins 1959 joined to the flat tubes 1910 as described herein can be oriented in a number of different manners with respect to the flat tubes 1910. For example, the longitudinal direction of fins 1959 on a flat tube 1910 can be substantially perpendicular to the longitudinal direction of the flat tube 1910. However, the inventors have discovered that sets of fins 1959 can instead be joined to the flat tube (i.e., on the broad sides 1922, 1924 thereof) such that the longitudinal direction of the fins 1959 is inclined with respect to the longitudinal direction of the flat tube 1910 and a direction perpendicular thereto (i.e., in the direction of air flow, in many applications). Examples of such fins 1959 are shown in FIGS. 68 and 69, which show one fin set 1959 brazed to the broad side 1924 of one flat tube 1910 (transparent in FIG. 69), and another fin set 1959 brazed to the broad side 1922 of another flat tube 1910. Accordingly, and as indicated by the arrows in FIG. 68, airflow through one fin set 1959 is not parallel to air flow through the other fin set 1959. In those embodiments in which FIG. 68 represents an elevational view of the fin sets 1959 in use, cooling air in one fin set 1959 is deflected down from the incoming horizontal and cooling air, while cooling air in the other fin set 1959 is directed upward from the incoming horizontal and cooling air.

In some embodiments, the angle of inclination for each fin set as described above is no less than about 8° (measured between the longitudinal direction of the fins 1959 and that of the flat tube 1910) for good performance results in many applications. Also, in some embodiments, this angle of inclination is no greater than about 8° for good performance results in many applications. In some embodiments, including those in which a set of fins 1959 on one flat tube 1910 is adjacent another set of fins 1959 on another flat tube 1910 as described in greater detail below, this inclination of one set of fins 1959 can be in a direction that is different from an inclination of another adjacent set of fins 1959 (see, for example, FIGS. 68 and 69).

Figure 64:
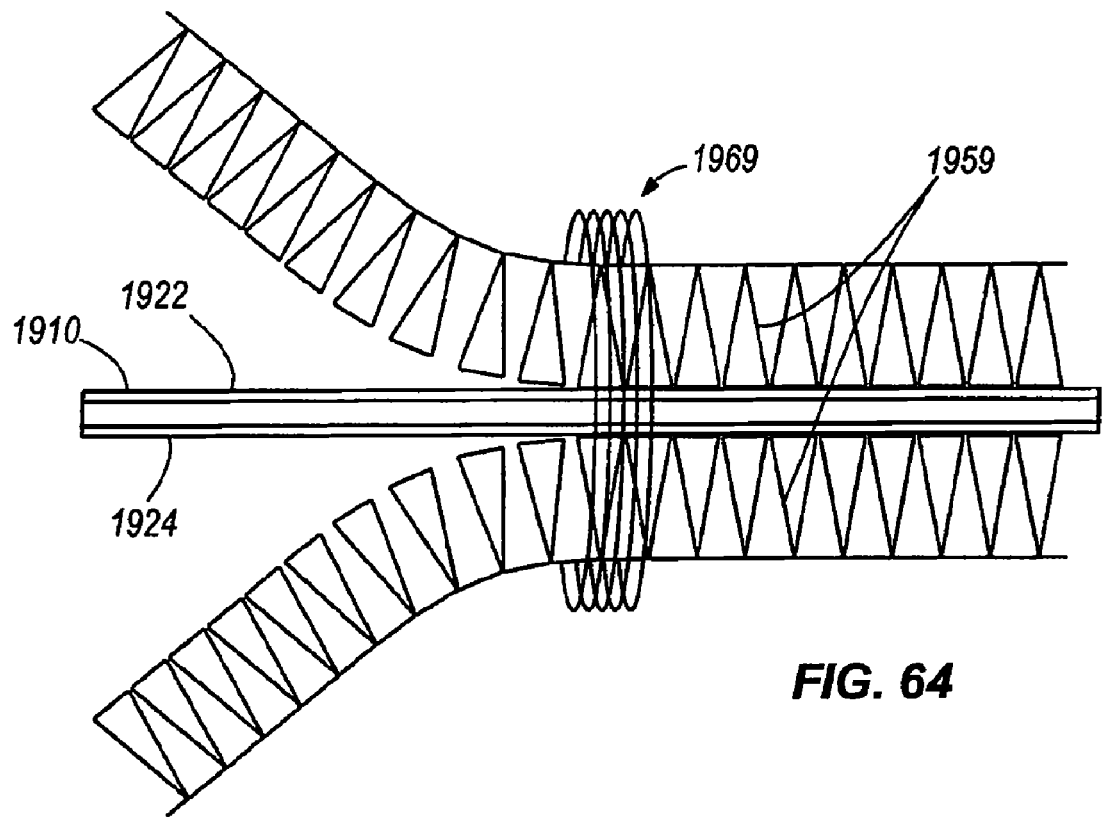
FIG. 64 is a schematic view of a finned tube manufacturing process according to an embodiment of the present invention.
Figure 65:
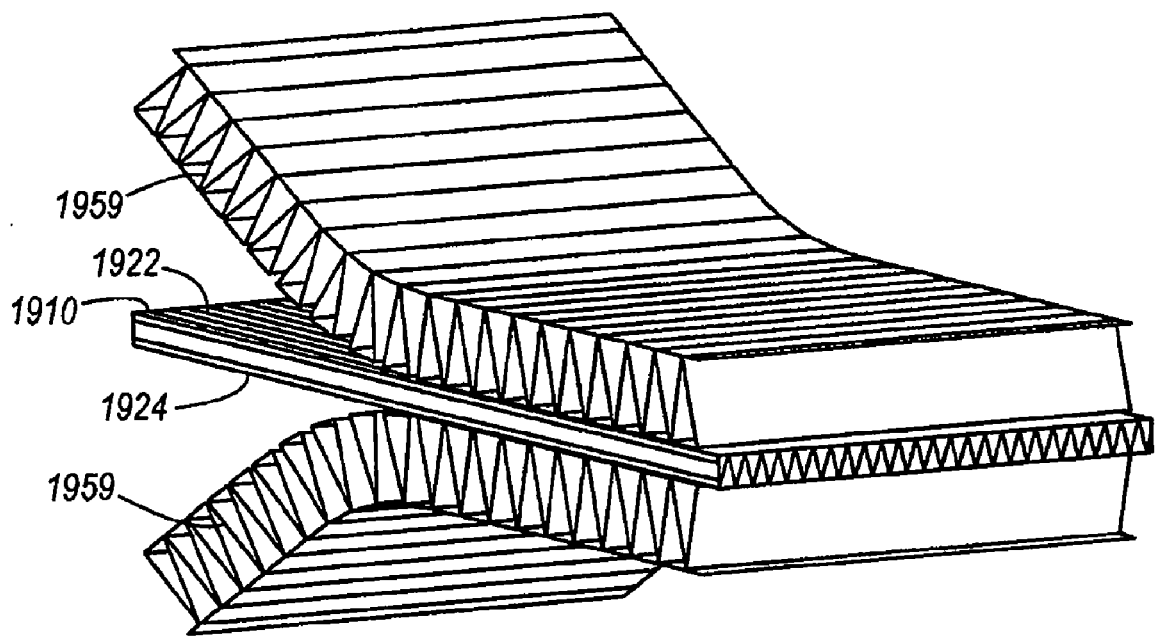
FIG. 65 is a perspective side view of a portion of the manufacturing process shown in FIG. 64.

In some embodiments of the present invention, a brazing method can be used where the endless flat tube 1910 and one or more sets of fins 1959 are transported continuously or in any interrupted manner through a joining station 1969, an example of which is shown schematically in FIGS. 61 and 64. The sets of fins 1959 can be brazed to the endless flat tube 1910 at one or more of such joining stations 1969, any or all of which are located at the later stages of a finned tube manufacturing line in some embodiments. Generally, a joining station can be a relatively small device producing the necessary brazing temperature with an induction coil, for example. It should be noted that brazing parameters (and therefore the type and power of the joining station(s) 1969 used) can vary according to desired parameters of the flat tube 1910.

In some embodiments, the sets of fins 1959 are held against the broad sides 1922, 1924 of the flat tube 1910 with a predetermined force while the sets of fins 1959 are brazed thereto as described above. Although the tube manufacturing process can occur upstream of the fin attachment process, significant advantages can be achieved by brazing or otherwise joining various parts of the flat tube (e.g., the insert 1934 to the flat tube 1910, at least one longitudinal edge of the flat tube 1910 for tube closure, and the like) at the same time as the sets of fins 1959 are attached to the flat tube 1910, such as through the same brazing process described herein. In cases wherein one or more longitudinal seams of the flat tube 1910 have already been completed by the time the flat tube 1910 reaches the fin attachment portion of the manufacturing line, however, the flat tube 1910 can be used within the framework of the manufacturing process. For example, with reference to FIGS. 64 and 65, sets of fins 1959 can be joined in an endless manner to the broad sides 1922, 1924 of a completed endless flat tube 1910 in any of the manners described herein.

In some embodiments, the manufacturing process also includes forming sections of tube and fin assemblies (otherwise referred to herein as "finned tubes", and indicated generally by reference number 1961) by separation of desired lengths of the finned tubes 1961 from an endless tube 1910 having one or more sets of fins 1959. For example, a set of fins 1959 supplied for connection to an endless flat tube 1910 can be cut to a desired length and removed from the endless flat tube 1910 prior to or after joining the set of fins 1959 to the endless flat tube 1910 (e.g., by brazing or in any other manner described above).

In other embodiments, a continuous supply of fins 1959 from an upstream manufacturing process can be cut to desired lengths, whereby the lengths of fins 1959 can be placed at intervals and joined to a surface of the endless flat tube 1910 in any such manner. With reference to the illustrated embodiment of FIG. 61, in still other embodiments one or more separators 1975 (e.g., blocks) can be placed between sets of fins 1959 on the flat tube 1910, and can thereby be used to position the fins 1959 for establishing a desired distance between the sets of fins 1959 coupled to the same broad side of the endless tube 1910. As shown in FIG. 61, the separators 1975 can be removed from the flat tube 1910 in a downstream location, allowing for the formation of finned tube sections with a free flat tube ends on either or both ends of the flat tube 1910.

In any case, and in still other embodiments, interruptions between the sets of fins 1959 can provide exposed portions of the flat tube 1910 that can be useful for cutting or other tube separation processes between the intervals formed, and/or for perforation or other operations performed upon the flat tube 1910 at such locations. Accordingly, the individual finned tube sections formed can includes a flat tube 1910 and sets of fins 1959 located on either or both flat sides of the flat tube 1910.

Finned tubes 1961 produced in accordance with the present invention can be incorporated into a wide variety of heat exchangers in any desired manner. In some embodiments, however, unique heat exchanger characteristics and heat exchanger assembly features have been identified by the inventors. For example, the heat exchanger 1963 illustrated in FIGS. 61, 62, and 66 can include finned tubes as described above, wherein a set of fins 1959 of one finned tube 1961 is positioned next to another set of fins 1959 of an adjacent finned tube 1961. FIG. 62 (which is an exploded view of a tube and fin block or core 1965) illustrates four finned tubes 1961 of a fin core 1965. The number of finned tubes 1961 can be determined at least in part upon a particular application of the heat exchanger. Accordingly, the fumed tube arrangement described above can be repeated as many times as desired to define the core 1965 of finned tubes 1961. Such a core 1965 can be assembled and then fitted to one or more collecting tanks 1967. In particular, the ends of the flat tubes 1910 of the core 1965 can be free and can engage the collecting tanks 1967 (e.g., received within respective slots or other openings in the collecting tanks 1967 or connected in fluid communication with the interiors of the collecting tanks 1967 in any other suitable manner) for being fastened and sealed thereto using any suitable adhesive or sealant. For example, FIG. 62 includes arrows indicating the general direction to mount the collecting tanks 1967 onto the core 1965 of finned tubes 1959.

As described above, finned tubes can be arranged in a heat exchanger such that a set of fins 1959 of one finned tube 1961 is positioned next to another set of fins 1959 of an adjacent finned tube 1961. These sets of fins 1959 can be in contact with one another. In some heat exchanger embodiments employing this arrangement of finned tubes 1961, there is a neutral zone of this structure which does not participate in heat exchange because the temperature of the finned tubes 1959 at the neutral zone is substantially similar, or in some embodiments is even the same. Depending upon the number of finned tubes 1961 arranged in this manner, any number of such neutral zones can exist in a core 1965 between adjacent fin sets 1959.

As a result, when assembling a heat exchanger 1963 from a number of finned tubes 1961 in these and other embodiments, it is possible to attach a set of fins on a finned tube 1961 to the fins 1959 of another adjacent finned tube 1961, thereby enabling a heat exchanger core 1965 having such a finned tube construction to be handled as a single structural unit. In relatively large heat exchangers, an advantage of joining the adjacent sets of fins 1959 in this manner is that vibrations or oscillations (and noise generated thereby) between adjacent finned tubes 1961 can be suppressed. The attachment of adjacent finned tubes 1959 as just described can be achieved in some embodiments by a bonding material (e.g., adhesive, soldering, brazing, welding, and the like) applied between the adjacent sets of fins 1959 of adjacent finned tubes 1961, such that the heat exchanger core 1965 can be handled as a single structural unit. In other cases, the fin sets 1959 of adjacent finned tubes 1961 can be joined in other manners to produce heat exchanger cores 1965 from such finned tubes 1961. For example, in some embodiments, an intermediate sheet (e.g., a relatively thin sheet of metal or other material) can be located between and join the adjacent fin sets 1959. In other embodiments, a narrow air gap can exist between the adjacent fin sets 1959 of adjacent finned tubes 1961. In other words, a set of fins 1959 from one finned tube 1961 can be "adjacent" a set of fins 1959 from another finned tube 1961 in a heat exchanger according to some embodiments of the present invention, even without a layer of material or element joining the sets of fins 1959.

Once a number of finned tubes 1961 have been assembled in a desired arrangement, the assembly can be secured together in a number of different manners, such as by soldering, welding, and/or brazing. In some embodiments, the manufacturing process of a tube-fin core 1965 can include the use of CAB brazing technology. Tube-fin cores 1965 as described herein can be manufactured with relatively reduced energy consumption. In those embodiments in which the tube-fin cores 1965 are constructed with flat tubes 1910 formed from the relatively thin sheet materials described herein, the various stages of securing the finned tubes 1961 together (e.g., in a CAB brazing process) can be significantly reduced. For example, the travel velocity or velocities of such tube-fin cores 1965 through the different temperature zones of a CAB brazing furnace can be significantly increased relative to those needed for conventional tube-fin cores. One reason for such faster securing processes is the relatively low wall thickness of the flat tubes 1910 (and also of the fins 1959), allowing for brazing temperatures (or elevated temperatures needed for other securing processes) to be reached significantly faster than in cases when thicker sheet materials are brazed. Transport velocities and/or exposure times in various stages of the manufacturing process can be optimized by selectively adjusting temperature settings, for example, based upon the use of such thinner materials. Additionally, the use of suitable hangings, fixtures, or auxiliary devices in the manufacturing process can help reduce the opportunity and/or degree of tube-fin core deformation, such as subsequent to the conclusion of a brazing process to secure the tube-fin assembly. More specifically, expansion and contraction of tube-fin cores 1965 occurring during heating and cooling need not cause unacceptable delays.

Further aspects of the present invention relate to the use of flat tubes disclosed herein in heat exchangers having one or more tanks used to establish fluid communication between the flow channels of the various flat tubes and/or to a fluid supply or exit connecting the heat exchanger to other equipment. These aspects of the present invention are adapted for the flat tubes disclosed herein having the relatively thin wall materials described above (e.g., no greater than about 0.20 mm (0.007874 in) in some embodiments, and no greater than about 0.15 mm (0.0059055 in) in other embodiments). However, the inventors have discovered that the aspects of the present invention described in greater detail below can be utilized in applications where flat tubes constructed of thicker materials are used. Therefore, the various features of the present invention described below apply to heat exchangers having other types of flat tubes, including any of the flat tubes described and/or illustrated herein.

As explained in greater detail below, the heat exchanger tubes and other portions of heat exchangers described herein can be manufactured using a number of manufacturing techniques and processes and can include corrosion protection features, such as, for example, those techniques and processes described below and illustrated in FIGS. 92-95. A number of manufacturing processes and techniques and the corrosion protection features referenced hereinafter are particularly advantageous when applied to heat exchanger tubes and portions of heat exchangers having significantly reduced material thickness. In addition, such techniques, processes, and corrosion protection features provide significant advantages relating to the overall performance of flat tubes and heat exchangers made from such material.

As described above, the flat tubes described and illustrated herein can be used in conjunction with heat exchangers having one or more tanks. These tanks can include collection tanks, headers, and other fluid enclosures adapted to establish fluid communication between the flat tubes and/or between the flat tubes and a fluid supply or exit of the tanks. Such tanks are collectively referred to herein as "collection tanks" for ease of description, it being understood that such tanks can perform other functions, can be larger or smaller, and can have any other shape desired while still incorporating aspects of the present invention described below.

Figure 77:
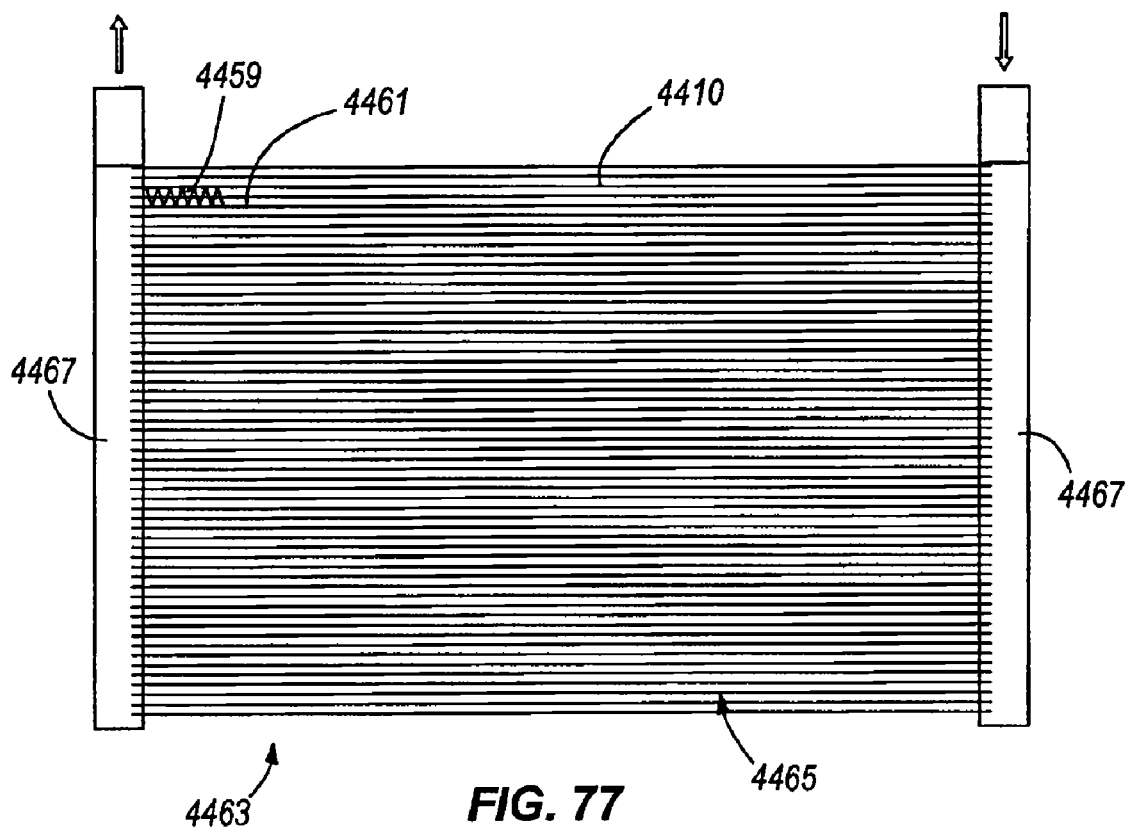
FIG. 77 is an elevational view of the heat exchanger illustrated in FIGS. 71 and 76.

One embodiment of a collection tank according to the present invention is illustrated in FIGS. 70, 70A, 71, 76, and 77, and is indicated generally by reference numeral 4467. Although the heat exchanger 4463 illustrated in FIG. 77 is shown with two collection tanks 4467, it should be noted that any number of collection tanks 4467 can be employed in various possible heat exchangers, including a single collection tank 4467 and more than two collection tanks 4467. Both collection tanks 4467 shown in FIG. 77 have substantially the same features and are connected to the flat tube 4410 in substantially the same way as described below and illustrated in FIGS. 70, 70A, 71, 76, and 77.

The collection tank 4467 can be constructed from any number of different parts. For example, the collection tank 4467 illustrated in FIGS. 70, 70A, 71, 76, and 77 is formed as a single unitary body, such as by injection molding or another suitable process. In this and other embodiments, at least one row of receiving openings 4479 (described in greater detail below) is integrally formed with the collection tank 4467. In other constructions, such as the collection tank embodiment illustrated in FIGS. 72-75 and described below, the collection tank is formed from two or more separate pieces by injection molding or any other suitable manner and connected together, and having at least one row of receiving openings in one or more of the pieces. In such embodiments for example, the collection tank 4467 can have one or more walls in which the receiving openings 4479 are defined, and one or more other walls defined by separate parts of the collection tank 4467, such that the other walls can be assembled at a stage later than that in which flat tubes 4410 are received within the receiving openings 4479.

The illustrated collection tank 4467 includes a series of receiving openings 4479 along a surface thereof. Each receiving opening 4479 is surrounded by a wall integrally formed with at least a portion of the collection tank 4467 and shaped to receive a corresponding free end 4477 of a flat tube 4410. The flat tubes 4410 can take any of the forms described herein, and can be cut to length specified by the desired parameters of the flat tube 4410 or corresponding application. With reference to FIGS. 70, 7A, and 71, part of the process of manufacturing a heat exchanger 4463 includes setting free ends 4477 of flat tubes 4410 (according to any of the embodiments described herein) into receiving openings 4479 of the collection tank 4467. In some embodiments, this process can be performed by pushing the collection tank 4467 onto the free flat tube ends 4477 in a manner similar to that shown schematically in FIG. 62. Alternatively, the free ends 4477 of the flat tubes 4410 can be pushed into the receiving openings 4479, or the flat tubes 4410 and the collection tank 4467 can be moved toward one another and pushed together to establish these connections.

In some embodiments, the flat tubes 4410 connected to the collection tank 4467 can have one or more sets of fins 4459 (see FIG. 77) according to any of the embodiments described herein. By way of example only, finned tubes 4461 already assembled and brazed in upstream manufacturing steps (such as any of those described above) can have fins 4559 with wall thicknesses of about 0.030-0.090 mm (0.0011811-0.0035423 in.), and can subsequently be secured to a collection tank 4467. For example, protruding free ends 4477 of individual flat tubes 4410 with fins 4459 already brazed thereto or of such finned tubes 4461 already assembled and brazed into a block or core 4465 can remain free during brazing (e.g., while in a brazing furnace), and therefore have no fins 4559 to interfere with their later insertion into receiving openings 4479 of a collection tank 4467. Both ends of the flat tubes 4410 in any such embodiment can protrude and be free as just described for connection to opposite collection tanks 4467.

In those embodiments in which the core 4465 is connected as just described, the core 4465 can be formed from flat tubes 4410 and fins sets 4459 by alternate stacking of the flat tubes 4410 and fins sets 4459. An example of such a core construction is illustrated in FIG. 77, which shows a brazed flat tube-fin core 4465 having two collection tanks 4467 each with a port for connection to other equipment, wherein cooling air flows through the fins 4459 to cool fluid within the flat tubes 4410. The heat exchanger 4463 illustrated in FIG. 77 is only one of many types of possible heat exchangers to which one of more of the collection tanks 4467 can be connected. By way of example only, either of the illustrated collection tanks 4467 can be a reversing tank, such that both inlet and outlet ports are arranged on the same collection tank 4467.

The flat tubes 4410 (with or without fins connected thereto as described in earlier embodiments above) can be individually inserted into respective receiving openings 4479 of a collection tank 4467. However, significant advantages can be achieved by inserting two or more of the flat tubes 4410, and in some cases all of the flat tubes 4410 of a core 4465, into their respective receiving openings 4479 at the same or substantially the same time, such as in a single step. This process can be performed when two or more of the flat tubes are 4410 are already connected together, such as by a brazing or other attachment processes (including those described herein) to define an entire flat tube heat exchanger core 4465 or portion thereof. Such a process can make possible the use of a larger number of collection tank materials. However, depending at least in part upon the material used for the collection tank 4467 and the process used to secure the fins 4459 to the flat tubes 4410, in some embodiments it is desirable to introduce the free ends 4477 of the flat tubes 4410 into respective receiving openings 4479 of the collection tank 4467 subsequent to post-brazing cooling of the tube-fin core 4465.

Many heat exchanger manufacturing processes require the exposure of the tubes and the collection tank to elevated temperatures for soldering, welding, brazing, and other attachment processes, such as receiving the flat tubes and the collection tank in a furnace or other heated environment to join the flat tubes to the collection tank. Such processes therefore prevent the use of many collection tank materials—at least those materials used for the parts of collection tanks defining the connection locations for the flat tubes (e.g., the collection tank wall or walls defining the receiving openings). Therefore, these parts of collection tanks are typically comprise metal. By connecting the collection tank to two or more flat tubes that have already been soldered, welded, brazed, or otherwise already joined together as described above, plastic or other lower temperature materials can be used for many parts, all, or substantially all of the collection tank 4467. For example, the part or parts of the collection tank 4467 defining the receiving openings 4479 can comprise plastic. The entire collection tank 4467 in the illustrated embodiment of FIGS. 70, 70A, 71, 76, and 77 is manufactured from a plastic material, although other materials can be used in other embodiments. In those embodiments in which part or all of the collection tank 4467 comprises plastic, such parts can be manufactured by injection-molding, for example.

With reference again to FIGS. 70 and 71, the receiving openings 4479 of the collection tank 4467 shown therein have curved surfaces 4481 to aid insertion of the flat tube ends 4477. In other embodiments, other shapes (e.g., flat inclined surfaces, perpendicular corner surfaces, and the like) are used instead.

When fully inserted into their respective receiving openings 4479, the flat tube ends 4477 reach to respective locations below the inner surface 4483 of the collection tank 4467, as best shown in FIG. 71, thereby preventing an undesirable pressure drop created by the flat tube ends 4477 during operation of the heat exchanger 4463.

In the illustrated embodiment of FIGS. 70, 70A, 71, 76, and 77, the receiving openings 4479 of the collection tank 4467 are shaped to define a rear portion 4485 (with reference to the direction of flat tube insertion in FIGS. 70, 70A, 71, 76, and 77) that is substantially the same as the cross-sectional shape of the flat tube ends 4477. Although the rear portion 4485 of each receiving opening 4479 can be dimensioned to define a clearance fit with a flat tube end 4477, in other embodiments (such as that shown in FIGS. 70, 70A, 71, 76, and 77) an interference fit is used. In those embodiments in which an interference fit is employed, a slight pressure can be exerted upon the collection tank 4467 and/or on the flat tube 4410 to fully insert the flat tube end 4477 into the rear portion 4485 of the receiving opening 4479, thereby providing a seal between the collection tank 4467 and the flat tube end 4477 that can be fluid tight or substantially fluid tight.

In some embodiments, a feature of the collection tank 4467 and/or of the flat tube ends 4477 is used to control or limit the amount of insertion of the flat tube ends 4477 into the receiving openings 4479. For example, a stop (not shown in FIGS. 70, 70A, 71, 76, and 77, but visible in FIG. 80, indicated by reference numeral 4675) can be formed on the flat tube end 4477 and/or on the inside surface of the receiving opening 4479 to limit the depth of insertion of the flat tube end 4477.

In other embodiments, one or more of flat tube ends 4477 can extend through a corresponding receiving opening 4479 and into an interior chamber 4487 of the collection tank 4467. In such embodiments, the flat tube end 4477 can be deformed in any manner, such as by being bent over the surfaces of the interior chamber walls 4483 adjacent the receiving opening 4479 to at least partially match the shape of such surfaces.

In the illustrated embodiment of FIGS. 70, 70A, 71, 76, and 77, adhesive 4489 is used to secure the flat tube ends 4477 within the receiving openings 4479 (see FIG. 71) of the collection tank 4467. A number of different adhesives can be used, including those that harden immediately or over time, and those that retain a degree of flexibility after setting. For example, silicone adhesives produced by Dow Corning® can be used in many embodiments. In some embodiments, the adhesive 4489 insures a permanent and tight joint between the flat tube ends 4477 and the interior surfaces of the receiving openings 4479.

The adhesive 4489 can further function as a sealant to prevent loss of fluid from the collection tank 4467. In other embodiments, the flat tube ends 4477 are sufficiently secured within the receiving openings 4479 by their insertion in the rear portions 4485 of the receiving openings 4479, in which cases sealant having no or substantially no adhesive properties can be used in place of adhesive 4489. For ease of description, the term "adhesive" with reference to the flat tube-to-collection tank connections refers to adhesive that may or may not function as a sealant, it being understood that in other embodiments such material can instead function only or primarily as a sealant.

As best shown in FIG. 71, the adhesive 4489 can substantially cover a significant portion of the flat tube end 4477, and in some embodiments surrounds the entire periphery of the flat tube end 4477 in at least one location along the length thereof. In the illustrated embodiment of FIGS. 70, 70A, 71, 76, and 77, a terminal portion of the flat tube end 4477 is not covered with adhesive 4489 due to its location within the rear portion 4485 of the of the receiving opening 4479. By virtue of the relatively close fit between the rear portions 4485 of the receiving openings 4479 and the flat tube ends 4477 as described above, fluid passing through the collection tank 4467 (e.g., liquid coolant or other fluid used as a heat exchange medium) can be prevented from coming into contact with the adhesive 4489.

Adhesive 4489 can be introduced between the flat tube ends 4477 and the interior surfaces of the receiving openings 4479 in a number of different manners according to various embodiments of the present invention, many of which include the introduction of adhesive 4489 after or while the flat tube ends 4477 are received within their respective receiving openings 4479. Before further description of such embodiments, however, it should be noted that adhesive 4489 can be applied to the interior of the receiving openings 4479 and/or to the exterior of the flat tube ends 4477 in any manner (e.g., spray, roller, or other applicator, and the like) prior to insertion of the flat tube ends 4477 within the receiving openings 4479.

Introduction of adhesive 4489 between the flat tube ends 4477 and interior surfaces of the receiving openings 4479 during or after tube end insertion can provide greater control over the amount and/or resulting locations of adhesive 4489 in the finished heat exchanger 4463, and can result in more reliable connection and/or seals between the flat tube ends 4477 and the collection tank 4467.

In order to provide space for adhesive 4489 to be introduced between the flat tube ends 4477 and the interior surfaces of the receiving openings 4479, the receiving openings 4479 and/or flat tube ends 4477 can be shaped to define one or more gaps 4493 therebetween. For ease of description, the term "gap" (when used herein to refer to the space where adhesive 4489 is received as described herein) refers to one or more of such gaps, regardless of particular peripheral location about a flat tube end 4477 and regardless of whether two or more of such gaps for the same flat tube end 4477 are in fluid communication with one another.

In some embodiments, the gap 4493 between the flat tube end 4477 and the adjacent interior surface defining the receiving opening 4479 can have a width of at least about 0.3 mm (0.011811 in) to permit proper adhesive injection (described below). Also, through experimentation, the inventors have discovered that this gap width of no greater than about 1.0 mm (0.03937 in) provides good performance results. A number of considerations can at least partially define the size of the gap 4493, such as the amount of adhesive needed, characteristics of the adhesive (e.g., viscosity and set time), and limitations on the distance between adjacent flat tubes 4410. Another consideration relates to the need in some embodiments for the collection tank 4467 to have a thickness or depth that is minimized. For example, in some embodiments the collection tank 4467 overhangs the flat tube core 4465 by a minimum amount in order to reduce the amount of space wasted by the heat exchanger 4463 within a vehicle.

In some constructions, the collection tanks 4467 have substantially no overhang in the direction of the depth of the tube-fin core 4465 to avoid waste of the available space required for installation of a heat exchanger 4463 into a vehicle. For example, in the illustrated embodiment of FIGS. 70, 70A, 71, 76, and 77, and with particular reference to FIG. 76, an undeformed flat tube end 4477 requires a minimum or substantially no overhang of the collection tank 4467 past the flat tube-fin core 4465, which addresses the need for a reduced space requirement of the heat exchanger 4463. In some embodiments, the overhang can also be reduced (e.g., on the order of a few millimeters) when the manufacturing process of the heat exchanger 4463 includes the use of deformed flat tube ends 4477 (described below).

In some embodiments, the adhesive 4489 is introduced by injection through one or more openings in the collection tank 4467 or through one or more gaps between the flat tube ends 4477 and the collection tank 4467 accessible from the exterior of the collection tank 4467 and flat tubes 4410 once these parts are at least partially assembled. For example, the collection tank 4467 illustrated in FIGS. 70, 70A, 71, 76, and 77 has a number of injection openings 4491, each extending through a wall 4495 of the collection tank 4467 to a gap 4493 defined between the flat tube end 4477 and one or more walls defining the receiving opening 4479.

Such injection openings 4491 can be located on either or both longitudinal sides of the collection tank 4467. Also, more than one injection opening 4491 can extend to the same receiving opening 4479. In such cases, adhesive 4489 can be injected simultaneously to the same receiving opening 4479, such as through two injection openings 4491 on opposite longitudinal sides of the collection tank 4467. Adhesive can be injected into the gap 4493 corresponding to each flat tube 4410 one at a time, in banks of gaps 4493 (corresponding to respective flat tubes 4410) at the same time or substantially the same time, or in all of the gaps 4493 of a core 4465 at the same time or substantially the same time. In some embodiments, the adhesive 4489 coats the entire periphery of each flat tube end 4477, and/or can fill the gap 4493 between the flat tube end 4477 and the adjacent walls defining the receiving opening 4479. Also, in some embodiments (e.g., that of FIGS. 70, 70A, 71, 76, and 77) the terminal ends of the flat tubes 4410 can be left uncoated with adhesive 4489.

An alternative manner in which to introduce adhesive between a flat tube end 4477 and interior walls of the receiving openings 4479 is to inject adhesive through a bottom opening or gap 4497 between these parts and in fluid communication with the gap 4493 described above. This type of adhesive introduction can be used in addition to or in place of injection through injection openings 4491 as also described above, and can eliminate the need for the injection openings 4491.

Figure 84:
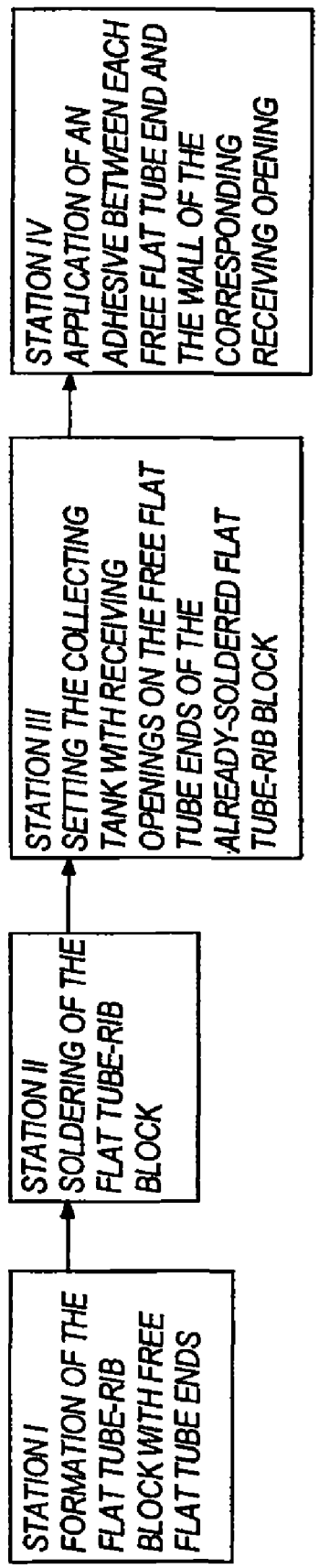
FIG. 84 is a flowchart of a heat exchanger manufacturing process according to an embodiment of the present invention.
Figure 84A:
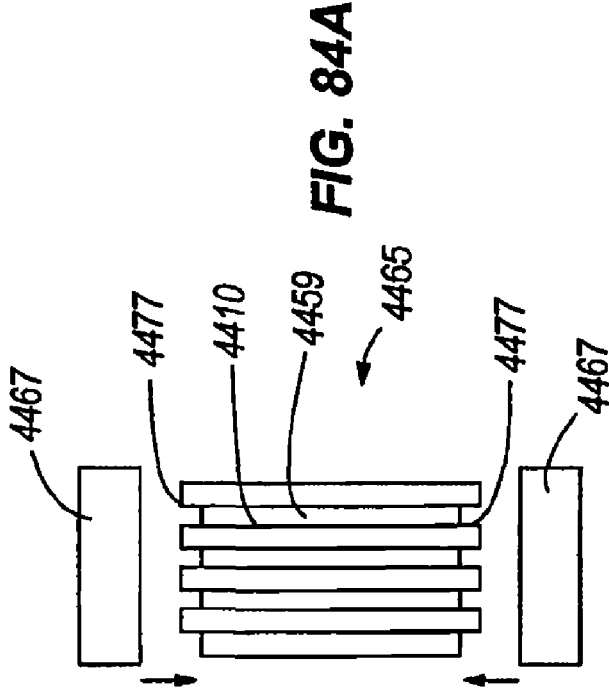
FIG. 84A is a schematic view of a heat exchanger manufactured according to the flowchart of FIG. 84.

FIG. 84 is a block diagram describing a manufacturing process of a heat exchanger 4463 according to an embodiment of the present invention, and referencing stations or steps of manufacturing, and is accompanied by a schematic view of a heat exchanger 4463 manufacturing by this process. The term "station" is used herein only for ease of description, and does not alone indicate or imply that there is a physical separation between such "stations" in a manufacturing line. For example, the collection tanks 4467 can be placed on the free flat tube ends 4477 (Station III) at the same or different location as the process of applying the adhesive 4489 (Station IV).

FIG. 72-75 illustrate a collection tank 4467 according to an additional embodiment of the present invention. This embodiment employs much of the same structure and has many of the same properties as the embodiments of the collection tank 4467 described above in connection with FIGS. 70, 70A, 71, 76, and 77. Accordingly, reference should be made to the description above in connection with FIGS. 70, 70A, 71, 76, and 77 for additional information regarding the structure and features, and possible alternatives to the structure and features of the collection tank illustrated in FIGS. 72-75 and described below. Structure and features of the embodiment shown in FIGS. 72-75 that correspond to structure and features of the embodiments of FIGS. 70, 70A, 71, 76, and 77 are designated hereinafter in the 4500 series of reference numbers.

Figure 73:
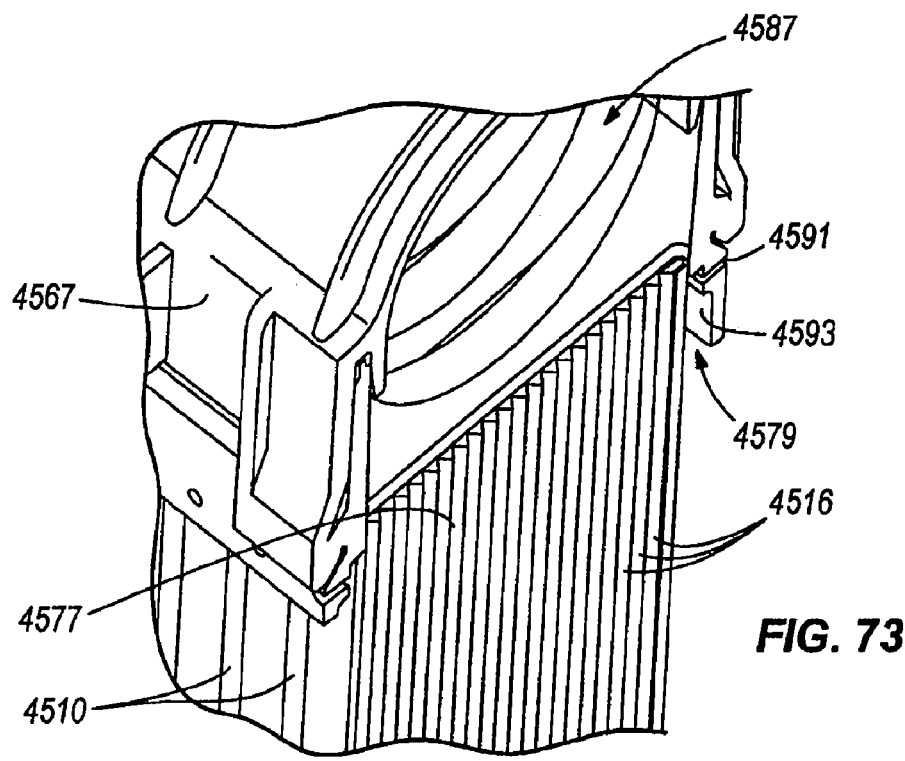
FIG. 73 is a detail perspective view of a heat exchanger having the collection tank illustrated in FIG. 72.
Figure 74:
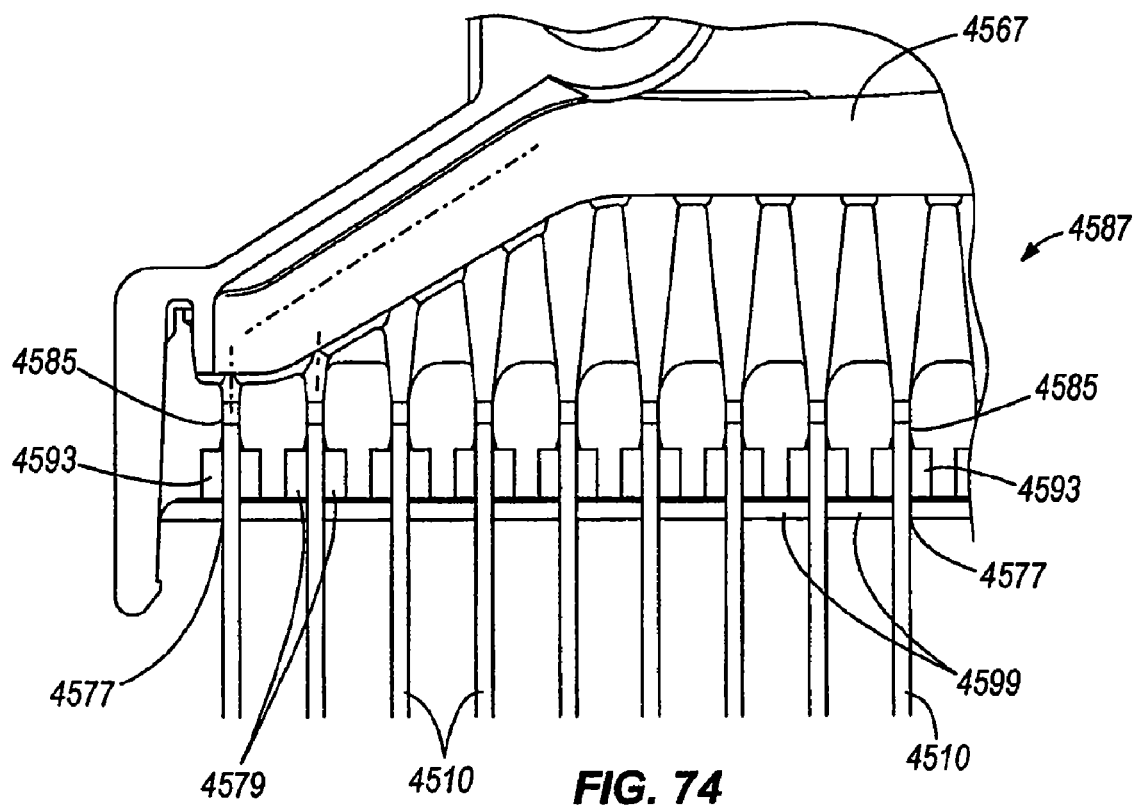
FIG. 74 is another detail perspective view of the heat exchanger shown in FIG. 73.
Figure 75:
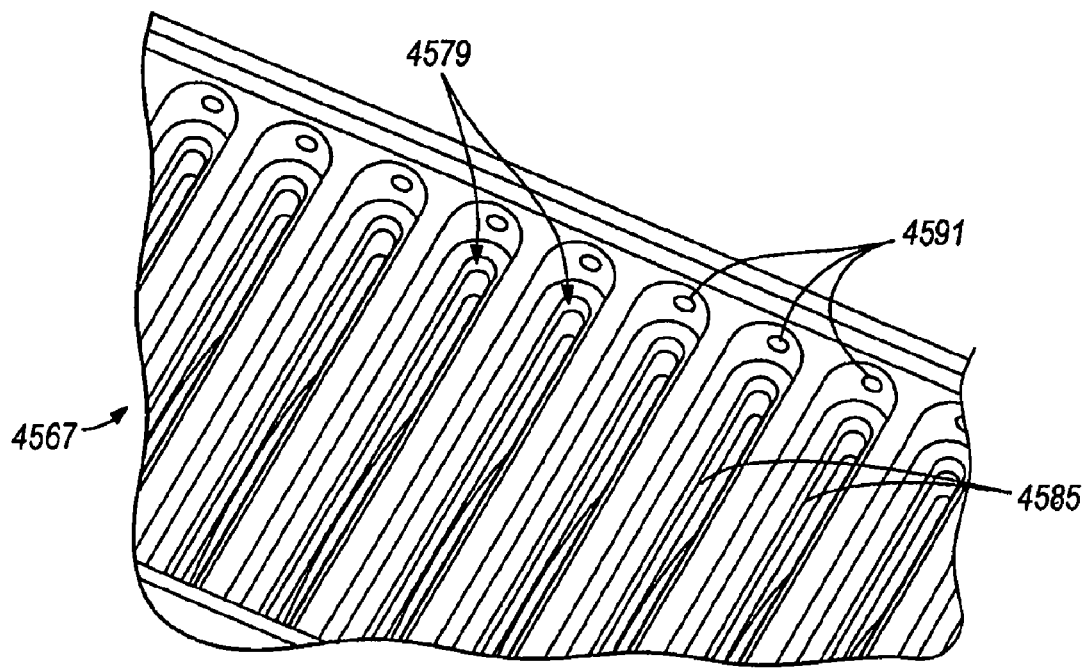
FIG. 75 is a detail perspective view of the collection tank shown in FIG. 72.
Figure 76:
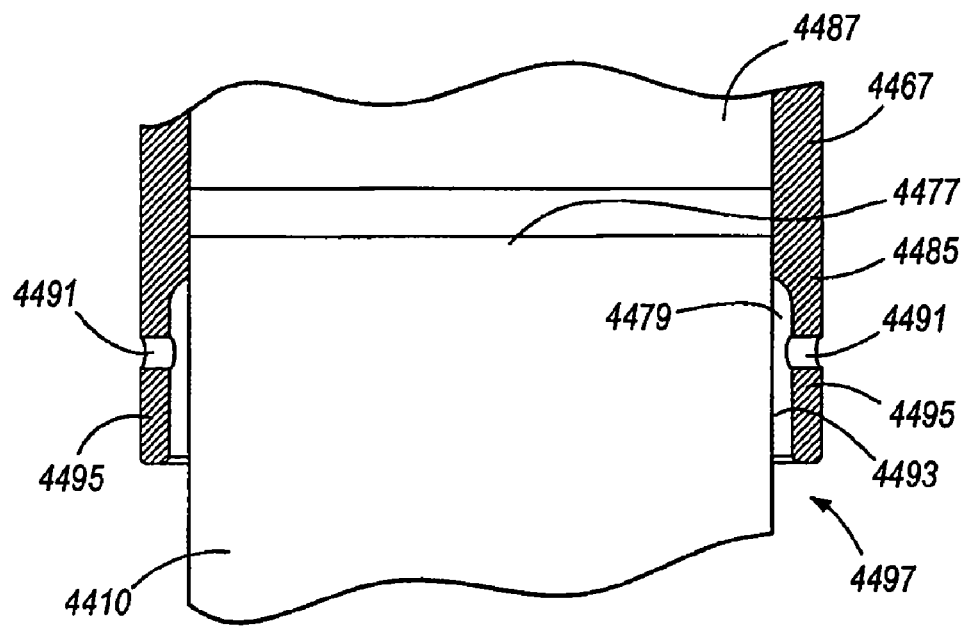
FIG. 76 is another detail view of a heat exchanger having the collection tank illustrated in FIGS. 70-71.

Like the collection tank 4467 illustrated in FIGS. 70, 70A, 71, 76, and 77, the collection tank 4567 shown in FIGS. 72-75 has an interior chamber 4587 for fluid communication with flat tubes 4510, a number of receiving openings 4579 each having a rear portion 4585 for receiving the ends 4577 of flat tubes 4510, and a number of injections openings 4591 along the longitudinal sides (only one visible in FIGS. 72-75) of the collection tank 4567. FIG. 75 provides additional detail regarding the receiving openings 4579, including the rear portions 4585 used to receive and support the ends 4577 of the flat tubes 4510 (not shown in FIG. 75), and the injection openings 4591 in fluid communication with the receiving openings 4579.

The flat tubes 4510 received through the receiving openings 4579 define corresponding gaps 4593 between the interior surfaces of the receiving openings 4579 and the flat tube ends 4577. With particular reference to FIG. 73, the flow channels 4516 of each flat tube 4510 within a respective receiving opening 4579 are in fluid connection with the interior chamber 4587 of the collection tank 4567. FIG. 73 also illustrates the connections between the injection openings 4591 and the receiving openings 4579 for injecting adhesive 4589 (not shown) into the gap 4593 as described above.

As best shown in FIG. 74, the entrance of the receiving openings 4579 can be closed or substantially closed on one or more sides of each flat tube end 4477 by entrance walls 4599 (not shown in FIG. 75). The entrance walls 4599 can be defined by one or more elements of the collection tank 4567, such as by a plate in which are defined multiple openings that define the entrance of each receiving opening 4579 when the plate is installed with the multiple openings aligned with the receiving openings 4579. Alternatively, the entrance walls 4499 can be defined by terminal ends of the receiving opening walls that have been enlarged, flared, bent, or otherwise shaped to at least partially close the gaps 4593 described above. In some embodiments, the entrance walls 4599 arc shaped to match or substantially match the cross-sectional shape of the flat tube ends 4577 received therein. Also, the entrance walls 4599 can be dimensioned to define a clearance fit with a flat tube end 4577, or can instead define an interference fit such that slight pressure can be exerted upon the collection tank 4567 and/or on the flat tubes 4510 to push the flat tubes 4510 past the entrance walls 4599 and into the rest of the receiving openings 4579. In this manner, seals at the entrances of the receiving openings 4579 can be provided between the collection tank 4567 and the flat tube ends 4577. These seals can be fluid light or substantially fluid tight in some embodiments, and can prevent adhesive leakage during adhesive injection in some embodiments.

It should be noted that the construction of the collection tank 4567 illustrated in FIGS. 72-75 (and in the other figures) is only exemplary, and is not limiting to the scope of the present invention.

In some embodiments, the flat tube ends 4477, 4577 can be deformed. For example, the flat tube ends 4477, 4577 can be deformed such that the large diameter D of the flat tube 4410, 4510 is increased and the small diameter d of the flat tube 4410, 4510 is decreased at the flat tube ends 4477, 4577. Considering the relatively small wall thickness of the flat tubes 4410, 4510 in some embodiments, such deformation can be performed without a significant load on the walls of the flat tube 4410, 4510. In some embodiments, the dimensions of the periphery of the undeformed flat tube end 4477, 4577 remain substantially the same as those of the deformed flat tube end 4477, 4577. As a result, the walls of the flat tube 4410, 4510 in such embodiments do not undergo a significant expansion or contraction.

In some embodiments in which the flat tube ends 4477, 4577 are deformed, such deformation can be performed before the introduction of the flat tube ends 4477, 4577 into the corresponding receiving openings 4479, 4579 of the collection tank 4467, 4567. Examples of flat tube-to-collection tank connections in which the flat tube ends have been deformed will now be described in connection with FIGS. 78-83.

FIGS. 78-83 illustrate flat tube-to-collection tank connections according to three additional embodiments of the present invention. These embodiments employ much of the same structure and have many of the same properties as the flat tube-to-collection tank connection embodiments described above in connection with FIGS. 70-77. Accordingly, the following description focuses primarily upon the structure and features that are different than the embodiments described above in connection with FIGS. 70-77. Reference should be made to the description above in connection with FIGS. 70-77 for additional information regarding the structure and features, and possible alternatives to the structure and features of the connection embodiments illustrated in FIGS. 78-83 and described below. Structure and features of the embodiments shown in FIGS. 78-83 that correspond to structure and features of the embodiments of FIGS. 70-77 are designated hereinafter in the 4600, 4700, and 4800 series of reference numbers, respectively.

In each of the embodiments illustrated in FIGS. 78-84, the flat tube ends 4677, 4777, 4877 are deformed, with the collection tanks 4667, 4767, 4867 having correspondingly shaped receiving openings 4679, 4779, 4879. Deformation of the flat tube ends 4677, 4777, 4877 shown in FIGS. 78-84 has been carried out after the conclusion of the brazing process (Station II in FIG. 84)—before setting the flat tube ends 4677, 4777, 4877 into the receiving openings 4679, 4779, 4879.

Figure 78:
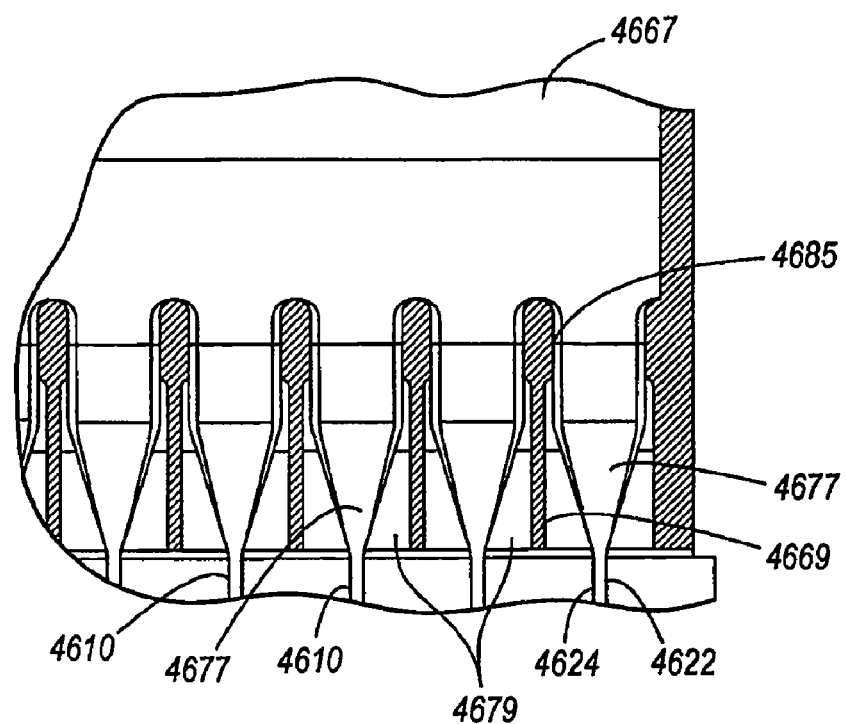
FIG. 78 is a detail side view of a heat exchanger having a collection tank according to another embodiment of the present invention.
Figure 79:
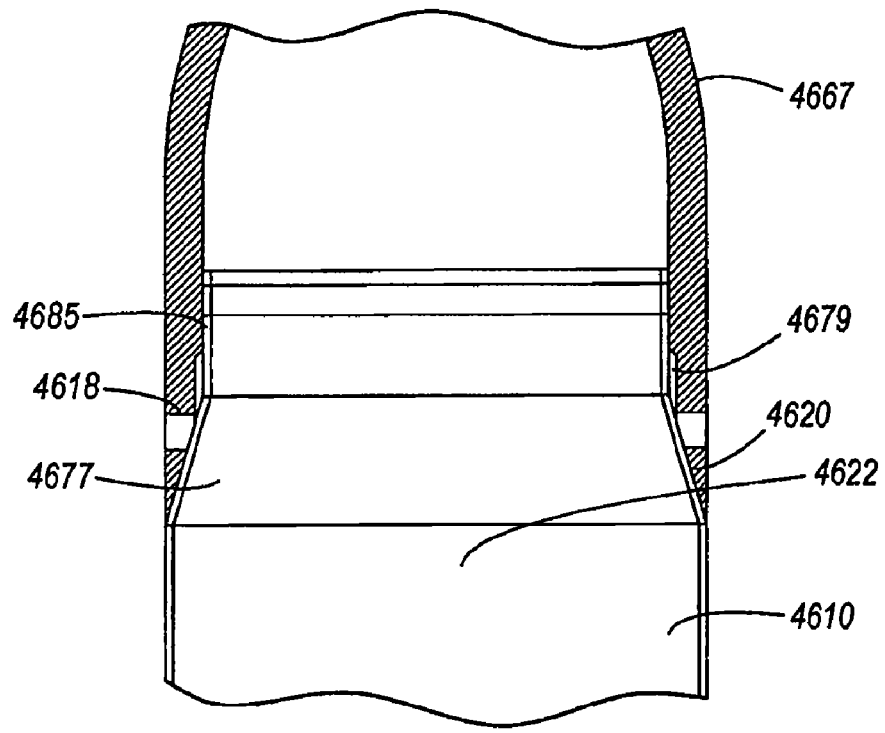
FIG. 79 is a detail end view of the heat exchanger illustrated in FIG. 78.

In the embodiment of FIGS. 78-80, each flat tube 4610 has an end 4677 that is received snugly into a corresponding rear portion 4685 of a receiving opening 4679. In this embodiment, the broad sides 4622, 4624 of each flat tube 4610 have been expanded (i.e., bent away from one another) to define a flared flat tube end 4677, whereas the narrow sides 4618, 4620 have been compressed (i.e., bent toward one another).

Also, each receiving opening 4679 also has a stops 4675 (see FIG. 80) for limiting insertion of the flat tubes 4610 to a desired distance.

Figure 82:
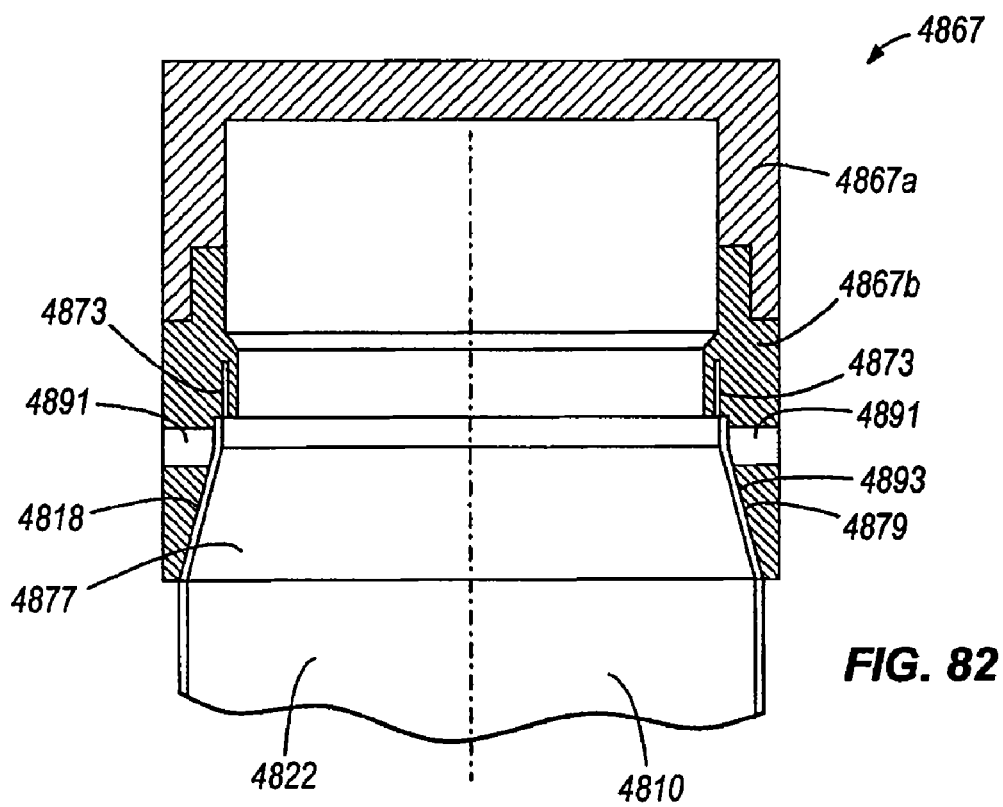
FIG. 82 is a detail end view of a heat exchanger having a collection tank according to another embodiment of the present invention.
Figure 83:
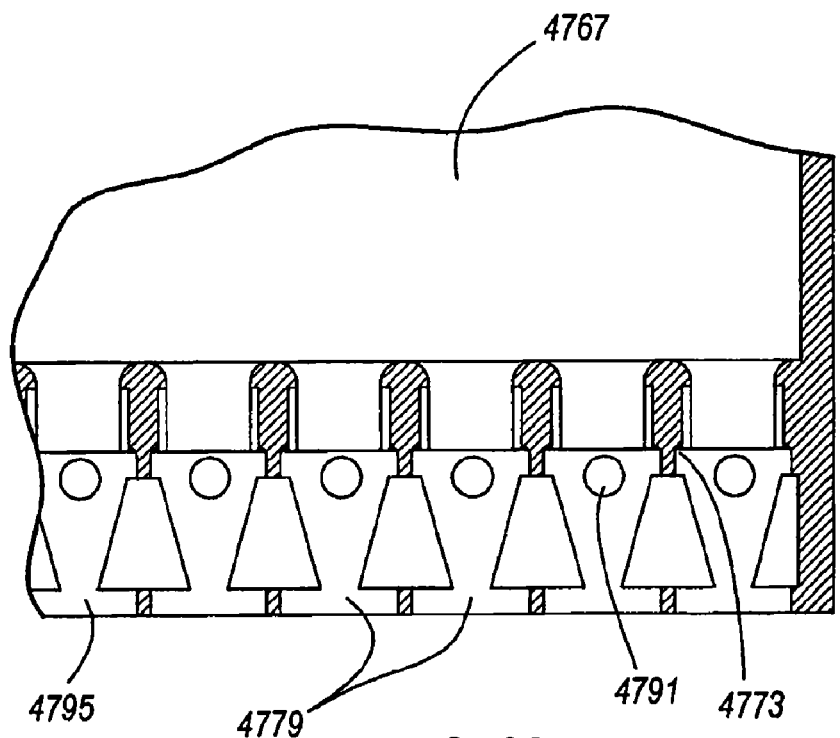
FIG. 83 is a detail side view of the collection tank of the heat exchanger illustrated in FIG. 81.

Like the embodiment of FIGS. 78-80, in the embodiments of FIGS. 81-83, the broad sides 4722, 4724, 4822, 4824 of each flat tube 4710, 4810 have been expanded to define a flared flat tube end 4777, 4877, whereas the narrow sides 4718, 4720, 4818, 4820 have been compressed. However, that part of the collection tank 4767, 4867 defining the receiving openings 4779, 4879 has one or more slits 4773, 4873 extending alongside at least a portion of the receiving openings 4779, 4879, and in some embodiments extending around the receiving opening 4779, 4879. In either case, the slits 4773, 4873 are positioned and dimensioned to receive the free ends 4777, 4877 of the flat tubes 4710, 4810. The slits 4773, 4873 also function as stops to limit the depth of insertion of the flat tube ends 4777, 4877.

Following the insertion of the flat tube ends 4777, 4877 into the receiving openings 4779, 4879 and slits 4773, 4873, adhesive 4789, 4889 (not shown) can be injected into gaps 4793, 4893 between the flat tube ends 4777, 4877 and the interior surfaces of the receiving openings 4779, 4879. This injection can be performed in any of the manners described herein, and is performed by injection through injection openings 4791, 4891 in the illustrated embodiments of FIGS. 81-83 by way of example. In some embodiments, including those in which deformed flat tube ends are utilized, one or more inserts 4771 can be placed between the flat tube ends 4777 to help prevent deformation of the flat tube ends 4777 when the flat tube ends 4777 are exposed to internal pressure loads. For example, interior folds formed in the embodiment of FIGS. 1-5 can be protected from deformation when exposed to internal pressures by use of such inserts 4771. In the illustrated embodiment of FIGS. 81 and 83, for example, the inserts 4771 have a generally trapezoidal cross-sectional shape, although any other cross-sectional shape can be used depending at least in part upon the adjacent shapes of the flat tube ends 4777. The inserts 4771 can be introduced to their positions adjacent the flat tube ends 4777 before or after application of the adhesive 4789 (e.g., after Station III, or before or after Station IV in FIG. 84).

If used, the inserts 4771 can be manufactured of any material, including without limitation plastic or metal, can be solid or hollow, and in some embodiments can be defined by an easily deformable or flowable mass that is later hardened. Also, multiple inserts 4771 can be connected prior to and during insertion, such as to a common bar or rail to define a comb-like shape (not shown). This type of insertion, such as by a common bar or rail, can permit two or more, and in some embodiments all of the inserts 4771 to be placed in one step. In some embodiments, the connections between the common bar or rail and the inserts 4771 is frangible, enabling the common bar or rail to be removed subsequent to the insertion of the inserts 4771.

To enable insertion of the inserts 4771 in desired locations between adjacent flat tube ends 4777, either or both of the opposite longitudinal walls 4795 of the collection tank 4767 can have apertures (see FIG. 83, for example) aligned with these locations and dimensioned to enable insertion of the inserts 4771. In this regard, it should be noted that the inserts 4771 need not necessarily occupy an entire space between adjacent flat tube ends 4777, and need only occupy sufficient space between the flat tube ends 4777 to support the ends under pressure as needed.

It should be noted that the various manners of introducing adhesive to locations between the flat tube ends 4477, 4577, 4677, 4777, 4877 and the interior surfaces of the receiving openings 4479, 4579, 4679, 4779, 4879 described herein can be utilized regardless of whether the flat tube ends 4477, 4577, 4677, 4877 are deformed or undeformed.

In some embodiments of the present invention, the collection tank 4467, 4567, 4667, 4767, 4867 can includes stiffening walls 4469, 4569, 4669, 4769, 4869 extending between and/or at least partially defining walls of the receiving openings 4469, 4569, 4679, 4779, 4879 of the collection tank 4467, 4567, 4667, 4677, 4877. These stiffening walls 4469, 4569, 4669, 4769, 4869 can be used to strengthen parts of the collection tank 4467, 4567, 4667, 4767, 4867 as needed, and are not visible in all illustrated collection tank embodiments. For example, one or more stiffening walls 4669, 4769, 4869 can extend in the transverse direction of the collection tank 4667, 4767, 4867 (e.g., connecting the opposite longitudinal walls 4695, 4795, 4895 of the collection tank 4667, 4767, 4867), and can provide added strength and/or rigidity to the collection tank 4667, 4767, 4867. The stiffening walls 4669, 4769, 4869 can be formed in any manner, and can be integral to collection tank 4667, 4767, 4867 or separate elements connected thereto in any suitable manner. In some embodiments, the stiffening walls 4669, 4769, 4869 are formed during injection molding of the collection tank 4667, 4767, 4867, and are thus an integral part of the collection tank 4667, 4767, 4867.

Some embodiments of collection tanks 4667, 4767, 4867 according to the present invention can also or instead have stiffening walls extending longitudinally with respect to the collection tank 4667, 4767, 4867. For example, such stiffening walls can be formed between and connect walls defining receiving openings 4679, 4779, 4879 of the collection tank 4667, 4767, 4867. A cross-section of one such longitudinal stiffening wall 4469 is shown in FIG. 70A by way of example, and is located mid-way between the front and rear faces of the collection tank 4667, 4767, 4867 (although such longitudinal stiffening walls can be located in other positions as desired). Such longitudinally-extending stiffening walls 4469 can extend along any part or all of the length of the collection tank 4667, 4767, 4867 (interrupted as needed by the receiving openings 4679, 4779, 4879).

Figure 72:
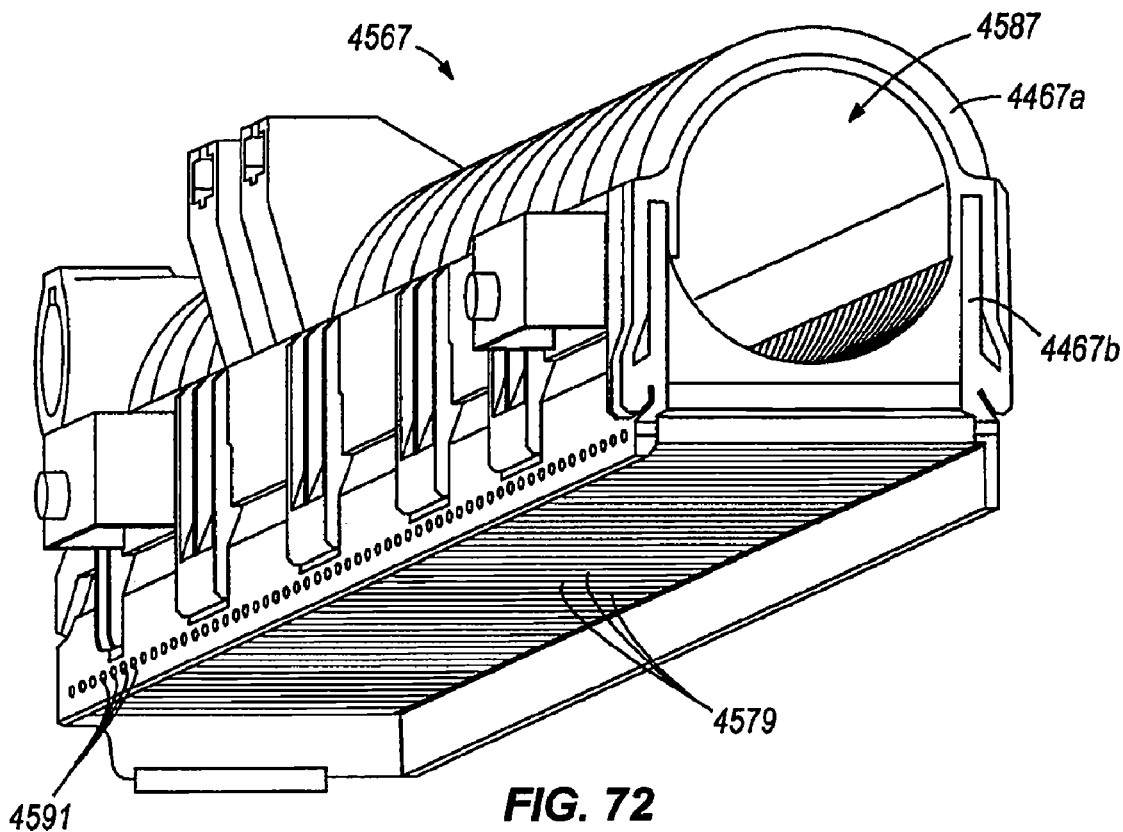
FIG. 72 is a perspective view of a collection tank according to another embodiment of the present invention.

As mentioned above, the collection tank can be constructed of any number of parts connected together in any suitable manner. By way of example, FIGS. 72 and 82 illustrate collection tanks 4467, 4867 in which the collection tank 4467, 4867 is formed of two parts 4467a, 4467b, and 4867a, 4867b. In both illustrated embodiments, the parts 4467a, 4467b, and 4867a, 4867b are joined along a Z-shaped interface, and can be joined by welding or adhesive. Still other manners of establishing this connection are possible based at least in part upon the material used to form the collection tank 4467, 4867. In some embodiments, this connection is releasable, such as that shown in the embodiments of FIGS. 72-75 where clips on the collection tank 4467 can be used to releasably secure part of the collection tank 4467a in place with respect to the remainder of the collection tank 4467b.

The various flat tube embodiments described herein can be utilized in a number of different heat exchangers adapted for different uses. In so doing, the flat tubes can be modified from the embodiments illustrated in FIGS. 1-54 and/or can be assembled in heat exchangers in a variety of different manner to adapt the heat exchangers for particular applications.

FIGS. 85-90 illustrate four constructions of heat exchangers according to different embodiments of the present invention. Although still other heat exchanger embodiments are possible by modifying the number and arrangement of flat tubes and/or by modifying the types of flat tubes (e.g., tube size and shape, insert size and shape, and the like), each of the heat exchangers illustrated in FIGS. 85-91 provides unique advantages in many applications.

Before describing each of the heat exchangers 4963, 5053, 5163, 5263 illustrated in FIGS. 85-90 in greater detail, it should be noted that each of the flat tubes 4910, 5010, 5110, 5210 illustrated therein can be replaced with flat tubes 4910, 5010, 5110, 5210 having any of the shapes and constructed in any of the manners described above with reference to the embodiments of FIGS. 1-54, and that any of the heat exchanger assembly features and methods of assembly (e.g., regarding the flat tubes, core construction, and core-to-header attachment) also described herein in connection with the embodiments of FIGS. 1-84 can be utilized in the construction and manufacture of the heat exchangers 4963, 5063, 5163, 5263 illustrated in FIGS. 85-90. For example, each of the flat tubes 4910, 5010, 5110, 5210 illustrated in FIGS. 85-90 is a two-piece flat tube 4910, 5010, 5110, 5210 with insert 4934, 5034, 5134, 5234, wherein two separate pieces of sheet material are used to form each illustrated tube 4910, 5010, 5110, 5210, and wherein a third separate piece of sheet material is used to form the internal insert 4934, 5034, 5134, 5234. Although the particular two-piece flat tube constructions (with inserts) illustrated in FIGS. 85-90 are desirable for the applications described and still other applications, any of these flat tubes 4910, 5010, 5110, 5210 can be replaced by any of the one-piece or other two-piece flat tubes (with inserts) described above and/or illustrated herein in order to adapt the flat tubes 4910, 5010, 5110, 5210 and the resulting heat exchangers 4963, 5063, 5163, 5263 for any desired application. In this regard, a combination of flat tubes 4910, 5010, 5110, 5210 with inserts formed of different numbers of sheets can be used in the same heat exchanger 4963, 5063, 5163, 5263.

In the illustrated tube constructions of FIGS. 85-91 and any of the alternative tube constructions just mentioned, either or both narrow sides of the flat tube can be formed by adjacent overlapping longitudinal edges of material, depending at least in part upon the number of sheets of material used to construct the flat tube. Each pair of overlapping longitudinal edges therefore defines a reinforced narrow side of the flat tube. In some embodiments, either or both of the overlapping longitudinal edges of the flat tube can be folded one or more times to define even further material thickness at the narrow side(s) of the flat tube. In some of these embodiments, a reinforcing sheet of material defining the insert can have one or both longitudinal edges shaped to lie adjacent the overlapping longitudinal edges of the flat tube, thereby providing an additional layer of material for tube reinforcement at the narrow sides. Also, either or both longitudinal edges of the insert can be folded to have a multiple-layered thickness lying adjacent the overlapping longitudinal edges of the flat tube, thereby providing still further reinforcement at either or both narrow sides. Accordingly, either or both narrow sides of the flat tubes can exhibit a thickness which amounts to at least twice, and in some embodiments more than twice the thickness of the sheet material used to form the flat tube walls, which can be formed by rolling thicker sheet material, in some embodiments.

As described in greater detail above, in those embodiments in which flat tubes are constructed of a single part (with or without an insert), reinforcement of the narrow sides can be achieved by rounding one or more folds of the sheet of material to form the first narrow side of the flat tube, and overlapping the opposite longitudinal edges of the sheet of material to form the second narrow side of the flat tube (e.g., by receiving or encompassing a bend of one longitudinal edge into a larger bend of the other longitudinal edge, or in other manners described herein).

In some one-piece flat tube embodiments, one sheet of material can form the exterior walls of the flat tube as well as the interior flow channels. In such embodiments, a gradation can be located at bends of the sheet of material (defining the narrow sides of the flat tube) at which a longitudinal edge of the sheet of material comes to rest so that the exterior surface of the flat tube remains as smooth as possible. Additionally, in those embodiments in which the insert is defined by a separate sheet of material, the two longitudinal edges of this separate sheet of material can be rounded or otherwise shaped to be received within the narrow sides of the flat tube (e.g., see the illustrated embodiment of FIG. 46).

As also described in greater detail above, in those embodiments in which flat tubes are constructed of two separate parts (with or without an insert), the two separate parts can be constructed identically, in which cases one longitudinal edge of each part can have a bend encompassing a smaller bend of an adjacent longitudinal edge of the other part. These two separate parts can therefore be transposed with respect to one another in order to form the flat tube. In other embodiments, the two separate parts are not identical to one another, and have opposite longitudinal edges joined together in any of the manners described herein (including without limitation nested arc-shaped longitudinal edges).

Also, the substantially planar broad sides of any of the tube embodiments described and/or illustrated herein can be used to provide improved brazed joints for fins attached thereto, thereby resulting in improved heat exchange efficiency of the heat exchanger 4963, 5053, 5163, 5263.

Also in any of the two-piece and three-piece flat tube constructions that can be employed in the heat exchangers of FIGS. 85-89, the internal insert can be corrugated or otherwise shaped to define two or more flow channels through the flat tube. The internal insert can have corrugations with different shapes and/or sizes at different locations across the width of the insert in order to define two or more laterally disposed regions of flow channels having different shapes and/or sizes (e.g., see FIGS. 85-89, for example). More broadly, the internal insert can be shaped to define regions of flow channels having different shapes and/or sizes in different locations across the width of the two-piece or three-piece flat tube. In some embodiments, the different regions of flow channels can be isolated from one another, whereas in other embodiments the different regions are in fluid communication with one another (e.g., at one or more locations along the length of one or more flow channels). Also, in some embodiments, each of the flow channels in a region is isolated from the other flow channels in the same region along the length of the flat tube, whereas in other embodiments, the flow channels within the same region are in fluid communication with one another (e.g., via openings between adjacent flow channels), but are isolated from other flow channels in other regions.

It will be appreciated that many of the advantages of using the flat tubes 4910, 5010, 5110, 5210 according to the present invention in the illustrated embodiments of FIGS. 85-89 relate to the ability to manufacture such flat tubes at lower cost, with reduced amounts of material, and/or with improved heat exchange performance. These advantages are realized by the use of sheet materials having the relatively low thicknesses described above for forming the flat tubes and inserts. Although any of the material thicknesses of the flat tubes described above can be used in the embodiments of FIGS. 85-89, the sheet material used to form the walls of the flat tubes in the illustrated embodiments has a thickness of no greater than about 0.15 mm (0.0059055 in). Also, this sheet material has a thickness of no less than about 0.03 mm (0.0011811 in.). These types of wall thicknesses can be used to withstand compressive loads and can exhibit relatively good internal pressure stability in many embodiments in light of the fact that the insert can be brazed to the broad walls of the flat tube. Similarly, although any of the material thicknesses of the inserts described above can be used in the embodiments of FIGS. 85-89, the sheet material used to form the inserts in the illustrated embodiments has a thickness of no greater than about 0.09 mm (0.003543 in). Also, this sheet material has a thickness of no less than about 0.03 mm (0.0011811 in.).

By utilizing the various flat tube constructions for the illustrated heat exchangers 4963, 5053, 5163, 5263 and for other heat exchanger designs, advantages of increased production speed and/or reduced material and assembly costs can be realized. For example, based upon the relatively low amount of sheet deformation needed to form the various one- or two-piece flat tubes according to the present invention described above, the flat tubes can be produced more economically on a tube mill (e.g., manufacturing lines 3701 and 1900, for example) even at high operating speeds using endless sheets of material. Moreover, with relatively low modification expenditure, heat exchangers having nearly any depth can be manufacturing using the same source of flat tubing (e.g., continuous or endless tubing and finned tubing produced as described above, for example).

The heat exchangers 4963, 5063, 5163, 5264 illustrated in FIGS. 85-90 are presented not only to illustrate heat exchanger embodiments that provide good performance results in many applications, but also to illustrate a number of heat exchanger features that can be utilized alone or in combination in heat exchangers according to other embodiments of the present invention. Such features include, without limitation, collection tanks that are internally divided to direct separate flows through different internal regions of the same flat tubes, and possible flow arrangements through the heat exchanger.

Figure 85:
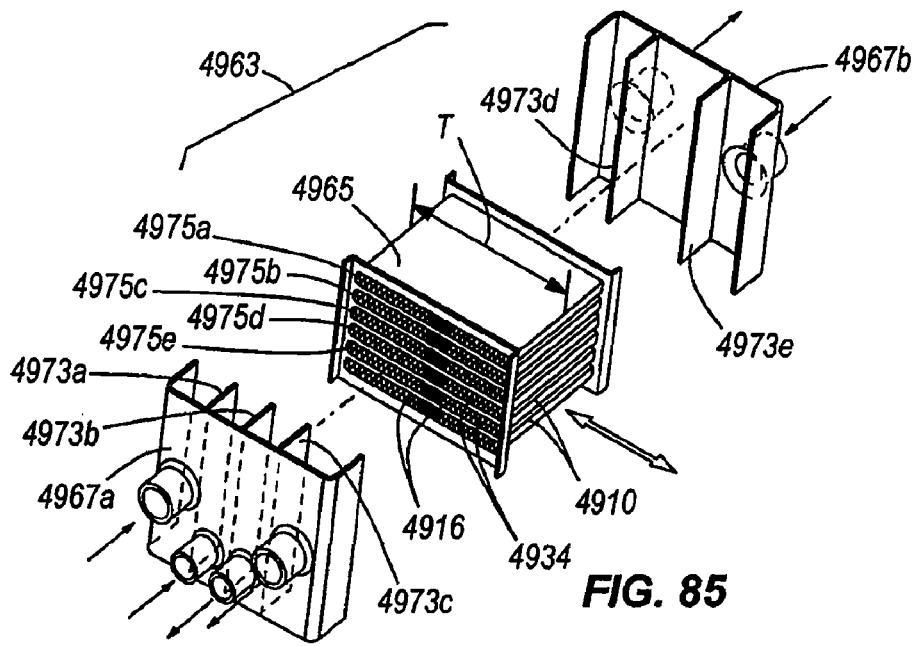
FIG. 85 is an exploded perspective view of a heat exchanger according to another embodiment of the present invention.

With reference now to the heat exchanger 4963 illustrated in FIG. 85, the heat exchanger 4963 has a single row of flat tubes 4910 having a depth T (generally similar to the large diameter D of each flat tube 4910). Although any of the other large and small diameters D, d described above can be used for the flat tubes 4910, the large diameter D of the flat tubes 4910 shown in FIG. 85 is no greater than about 300 mm (11.811 in). In some embodiments, a large diameter D of no less than about 10 mm (0.3937 in) is used to provide good performance results. Also, the small diameter d of the flat tubes 4910 shown in FIG. 85 is no greater than about 15 mm (0.59055 in). In some embodiments, a small diameter d of no less than about 0.7 mm (0.02756 in) is used to provide good performance results. These dimensions of the flat tubes 4910 in the illustrated embodiment of FIG. 85 are particularly suitable for heat exchangers 4963 in motor vehicles. However, other applications are possible and fall within the spirit and scope of the present invention.

The heat exchanger 4963 illustrated in FIG. 85 is adapted to cool two or three fluids by means of a common flow of cooling fluid (e.g., air) passing between the flat tubes 4910. The cooling air is illustrated in FIG. 86 as a double block arrow which flows through fins (not shown) between the flat tubes 4910.

Figure 86:
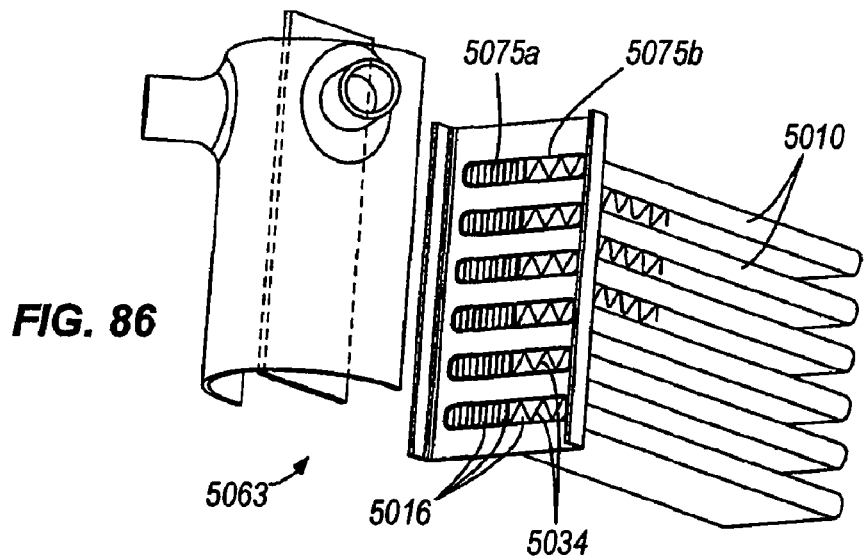
FIG. 86 is an exploded perspective view of a heat exchanger according to another embodiment of the present invention.

According to the illustrated embodiment of FIG. 86, cooling air can flow either from left to right or vice versa through the cooling network defined by the tube-fin block 4965. Each of the flat tubes 4910 includes four interior regions 4975*a*, 4975*b*, 4975*c*, 4975*d* at different locations along the width of the flat tube 4910. The four illustrated interior regions 4975*a*, 4975*b*, 4975*c*, 4975*d* have the same or substantially the same width, although interior regions 4975*a*, 4975*b*, 4975*c*, 4975*d* of different widths are possible in other embodiments. Also, each illustrated interior region 4975*a*, 4975*b*, 4975*c*, 4975*d* has a number of flow channels 4916*a*, 4916*b*, 4916*c*, 4916*d*, each having a different shape and/or size from the flow channels 4916*a*, 4916*b*, 4916*c*, 4916*d* of the other interior regions 4975*a*, 4975*b*, 4975*c*, 4975*d*. The shape and size of the flow channels 4916*a*, 4916*b*, 4916*c*, 4916*d* in each interior region 4975*a*, 4975*b*, 4975*c*, 4975*d* is at least partially defined by the shape of the insert 4934 in that interior region 4975*a*, 4975*b*, 4975*c*, 4975*d*. Although the insert varies in shape from interior region to interior region 4975*a*, 4975*b*, 4975*c*, 4975*d* in the illustrated embodiment, each flat tube 4410 is substantially the same as the others in the heat exchanger 4963.

Although four interior regions 4975*a*, 4975*b*, 4975*c*, 4975*d* are employed in the heat exchanger 4963 illustrated in FIG. 85, any number of interior regions 4975*a*, 4975*b*, 4975*c*, 4975*d* can be defined by one or more of the flat tubes 4910 in other embodiments, and can have any relative sizes desired. Also, although each portion of the insert 4934 in each interior region 4975*a*, 4975*b*, 4975*c*, 4975*d* of the flat tube 4910 illustrated in FIG. 85 has a shape different from that in the other interior regions 4975*a*, 4975*b*, 4975*c*, 4975*d* (thereby defining flow channels 4916*a*, 4916*b*, 4916*c*, 4916*d* that are different in each interior region 4975*a*, 4975*b*, 4975*c*, 4975*d*), in other embodiments two or more of the interior regions 4975*a*, 4975*b*, 4975*c*, 4975*d* can have identical or substantially identical flow channels 4916*a*, 4916*b*, 4916*c*, 4916*d*.

With continued reference to FIG. 85, in some embodiments, each flat tube 4410 in a heat exchanger 4963 or section of the heat exchanger 4963 has the same number of interior regions 4975*a*, 4975*b*, 4975*c*, 4975*d* with flow channels 4916*a*, 4916*b*, 4916*c*, 4916*d* having the same or substantially the same shape and size. However, this in not necessarily the case in other embodiments. The number, size and shapes of regions within each flat tube 4910 and in a set of flat tubes 4910 can be determined based at least in part upon the requirements of the application.

The heat exchanger 4963 of FIG. 85 includes two collection tanks 4967*a* and 4967*b*. One collection tank 4967*a* includes three dividing walls 4973*a*, 4973*b*, and 4973*c*, which extend in a direction substantially perpendicular to the depth T of the heat exchanger 4963, and which run lengthwise with respect to the collection tanks 4967*a*, 4967*b*. The other collection tank 4967*b* includes two dividing walls 4973*d* and 4973*e*.

FIG. 85 illustrates a number of arrows indicating the directions of flow through the heat exchanger 4963. On the left side (with respect to FIG. 85), a medium flows into the first collection tank 4967*a* and through the first interior region 4975*a* of each flat tube 4910. A second medium flows in the first collection tank 4967*a* and through the second interior region 4975*b* of each flat tube 4910, and is separated from the flow of the first medium through the first interior regions 4975*a* by a first dividing wall 4973*a* therein. The second medium is also separated from the first medium at the second collection tank 4967*b* by the first dividing wall 4973*d* therein, and from a third medium (which can be a second pass of the first medium through the heat exchanger 4963, in some embodiments, or another medium in other embodiments) at the second collection tank 4967*b* by the second dividing wall 4973*e* therein. The middle dividing wall 4973*b* of the first collection tank 4967*a* separates the flow of the second medium entering the heat exchanger 4963 from the return flow of the second medium exiting the heat exchanger 4963 after passing through the third interior region 4975c of each flat tube 4910. The third medium passes through the heat exchanger 4963 by flowing through the fourth interior region 4975d of each flat tube 4910, and is separated from the second medium in the first collection tank 4967a by the third dividing wall 4973c therein.

In some applications of the heat exchanger 4963 just described, the left section of the heat exchanger 4963 (with reference to the perspective of FIG. 85) can be a high temperature region for charge air. Charge air exiting this section of the heat exchanger 4963 after passing through the first interior region 4975a of each flat tube 4910 can flow back into the heat exchanger 4963 in some embodiments, passing through the fourth interior region 4975b of each flat tube 4910 in the right section of the heat exchanger 4963. Accordingly, this return flow can then be a low temperature region for charge air. In such embodiments, cooling fluid passing between the flat tubes 4910 can flow from right to left in the illustrated embodiment of FIG. 85. In the middle section of the heat exchanger 4963, a high temperature cooling fluid can enter into the first collection tank 4967a, pass through the second interior region 4975b of each flat tube 4910, and return via the second collection tank 4967b and through the third interior region 4975c of each flat tube 4910 to exit the heat exchanger 4963. The return pass of this fluid (upstream of the first pass, as referenced with respect to the direction of flow of cooling fluid passing between the flat tubes 4910) therefore defines a low temperature coolant region. In some embodiments, 10% of this fluid passing through the second and third interior regions 4975b, 4975c can flow through these regions again in order to further reduce its temperature, although other percentages (including none) are possible in other embodiments. Also, in other embodiments, any number of dividing walls 4973a, 4973b, 4973c, 4973d, 4973e in any number of collection tanks 4967a, 4967b having any number of fluid inlet and outlet ports can be arranged in other manners to provide other heat exchanger designs and functions.

Figure 87:
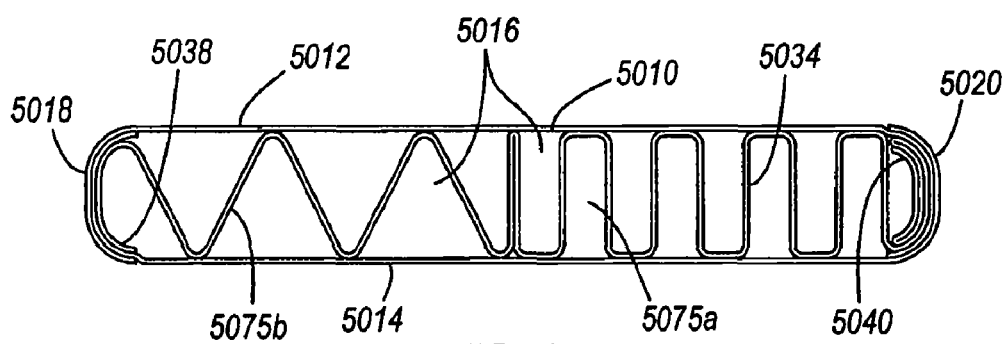
FIG. 87 is an end view of a flat tube of the heat exchanger illustrated in FIG. 86.

FIG. 86 illustrates a heat exchanger 5063 according to another embodiment of the present invention, in which flat tubes 5010 having the features shown in FIG. 87 are used. The illustrated heat exchanger 5063 is adapted for use in a vehicular cooling fluid radiator, although other applications for the heat exchanger 5063 are possible. This heat exchanger 5063 includes an interior region 5075a, which can be a high temperature region in some embodiments, based upon the fact that the temperature of the cooling fluid therein is relatively high. The heat exchanger 5063 can also include a low temperature interior region 5075b, in which the temperature of at least part of the cooling fluid leaving the first interior region 5075a can be further decreased.

More detail regarding the flat tubes 5010 illustrated in FIG. 86 can be seen in FIG. 87, which shows a flat tube 5010 according to an embodiment of the present invention that can be used in the heat exchanger 5063 of FIG. 86. Although the flat tube 5010 illustrated in FIG. 87 provides unique performance results, it should be noted that any of the other flat tube embodiments disclosed herein can instead be used. The flat tube 5010 illustrated in FIG. 87 is formed of two separate sheets of material, each of which form first and second portions 5012, 5014 of the two-piece tube 5010. A third sheet of material is used to form the insert 5034. The first and second portions 5012, 5014 in the illustrated embodiment are identical or substantially identical, but are transposed with respect to one another. In the manufacturing process, a larger bend defining a larger arc portion is formed on one longitudinal edge of each portion 5012, 5014, and encompasses a smaller arc portion formed on a corresponding longitudinal edge of the other portion 5014, 5012, so that the two narrow sides 5018, 5020 of the flat tube 5010 each have a double wall thickness. Furthermore, the opposite longitudinal edges 5038, 5040 of the insert 5034 are shaped to fit within the inside narrow sides 5018, 5020 of the flat tube 5010. In this particular construction, a three-layer thickness is defined on one narrow side 5018. This thickness can be three times that of the material used to form the first and second portions 5012, 5014 in those embodiments in which the material thickness of the insert 5034 is the same as that used for the first and second portions 5012, 5014, although the insert 5034 can be made of thinner material in other embodiments. It should be noted that the features shown in FIG. 87 can be applied in any of the other flat tube embodiments described and/or illustrated herein.

The two interior regions 5075a, 5075b of the flat tubes 5010 in the heat exchanger of FIG. 86 are defined at least in part by the corresponding section of the insert 5034 within each interior region 5075a, 5075b. The first interior region 5075a can be utilized in some embodiments to support relatively higher pressures than fluid in the second interior region 5075b, by virtue of the relatively narrow flow channels 5016 defined by the narrower spaces between corrugations of the insert 5034 in the first interior region 5075a. Also, the second narrow side 5020 corresponding to the second interior region 5075b has greater reinforcement than the opposite (first) narrow side 5018. This reinforcement is formed by a longitudinal edge 5040 of the insert 5034 having two additional folds at the second narrow side 5020, thereby providing the second narrow side 5020 with five layers of material. This design provides an example of how flat tubes 5010 according to the present invention can be reinforced where necessary due to anticipated stresses in selected areas of the flat tubes 5010, and can be provided with thinner wall areas (e.g., 0.03 mm-0.15 mm (0.0011811-0.0059055) in some embodiments) in other areas where anticipated stresses are relatively low. The weight of materials used to construct the flat tubes 5010 and manufacturing losses of the heat exchanger 5010 can therefore be considerably reduced.

Figure 88:
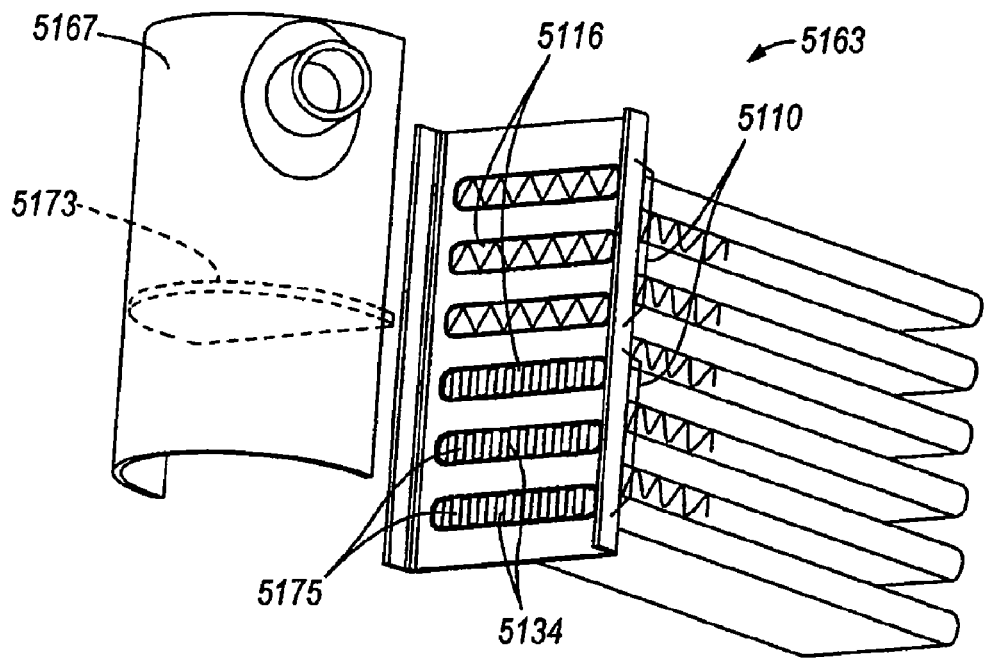
FIG. 88 is an exploded perspective view of a heat exchanger according to another embodiment of the present invention.
Figure 89:
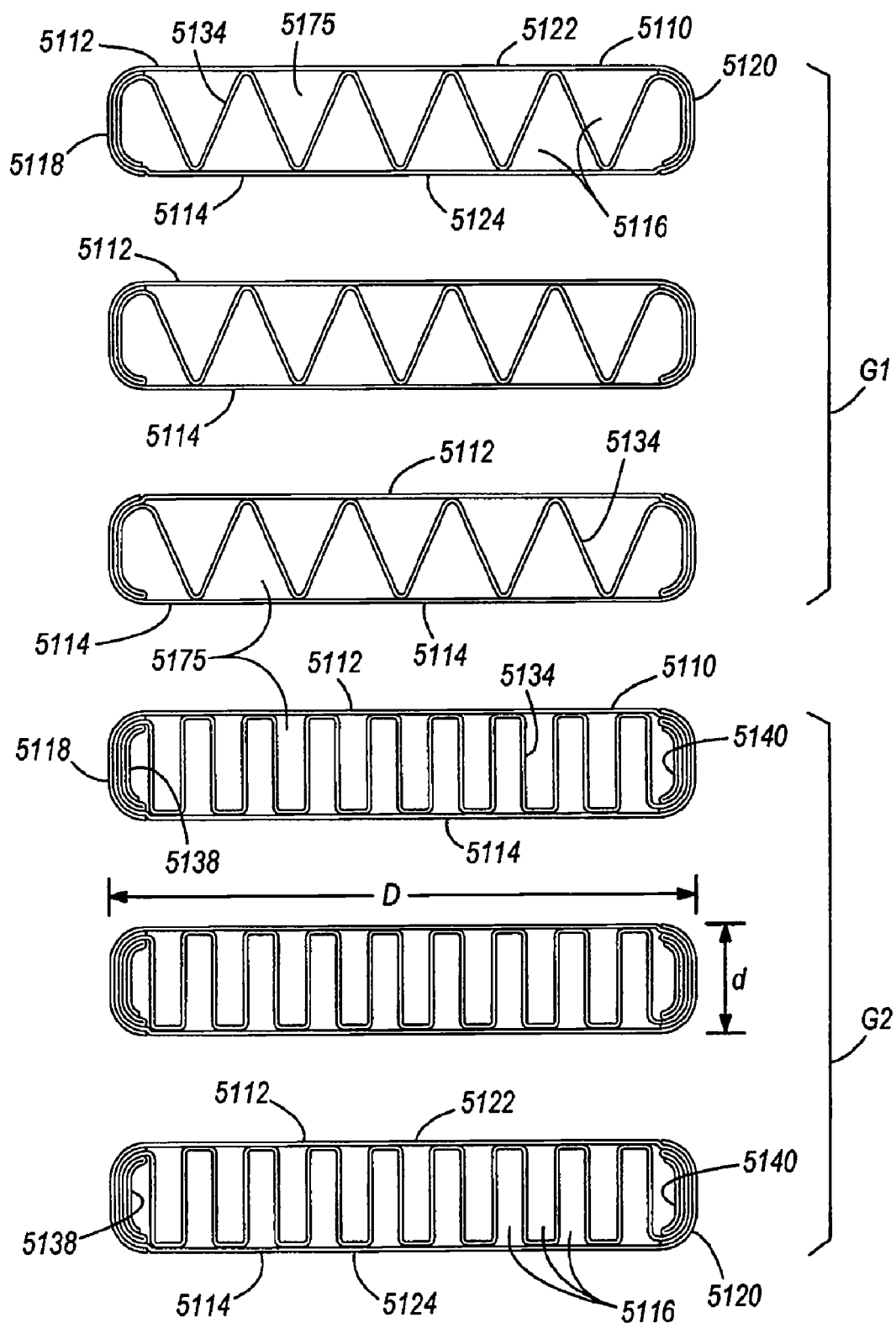
FIG. 89 illustrate end views of alternative flat tube embodiments according to the present invention.

FIG. 88 illustrates a heat exchanger according to another embodiment of the present invention, utilizing the flat tubes 5110 illustrated in FIG. 89. In the illustrated embodiment of FIGS. 88 and 89, the inside region 5175 of each flat tube 5110 has a number of flow channels 5116 defined at least in part by an insert 5134 that is uniformly shaped or substantially uniformly shaped across the width of the insert 5134. However, the heat exchanger 5163 is provided with two different groups G1, G2 of flat tubes 5110 having flow channels 5116 that are different from one another. In other embodiments, any number of such groups are possible. Fluid flowing into or out of each group G1, G2 of flat tubes 5110 is separated from that of the other group G2, G1 by a transverse dividing wall 5173 in the collection tank 5167 extending in the direction of the depth of the heat exchanger 5163. Different fluids can flow in each group G1, G2 of flat tubes 5110. For example, in one group G1, a first media (e.g. oil) can flow, while in the other group G2, a second media (e.g. cooling fluid) can flow. The flat tubes 5110 of group G2 are generally adapted for a medium which is under higher pressure than that in the flat tubes 5110 of group G1, as can be seen from the use of narrower flow channels 5116 and smaller distances between walls of the insert 5134 in the flat tubes 5110 of group G2, and the larger degree of reinforcement of the narrow sides 5118, 5120 in the flat tubes 5110 of group G2 for relatively more stability. In some applications, the flat tubes 5110 of the group G2 can define a low temperature cooling fluid radiator portion of the heat exchanger 5163, while the flat tubes 5110 of the group G1 can define a high temperature cooling fluid radiator portion of the heat exchanger 5163.

Under the assumption that the medium in the flat tubes 5110 of group G2 is under a higher pressure than the medium in the flat tubes 5110 of group G1, the broad sides 5122, 5124 and the narrow sides 5118, 5120 of the flat tubes 5110 of group G2 are reinforced by the design of the insert 5134 used therein. In particular, the corrugations of the inserts 5134 in the flat tubes 5110 of group G2 are significantly narrower than those of the flat tubes 5110 in group G1. Additionally, the narrow sides 5118, 5120 of the flat tubes 5110 in group G2 have five layers of material (two defined by overlapping longitudinal edges of the first and second tube portions 5112, 5114 at the narrow sides 5118, 5120, and three defined by two folds on each longitudinal edge 5138, 5140 of the insert 5134), whereas only three layers of material are located at the narrow sides 5118, 5120 of the flat tubes 5110 in group G1 based upon the lack of such insert folds. It should be noted that the flat tubes 5110 within both groups G1, G2 can be identical or substantially identical, and can both be equally adapted to receive the different types of inserts 5134 shown in FIG. 89. Accordingly, the two different interior regions 5175 in the flat tubes 5110 are created in this particular embodiment by different inserts 5134 defining two different groups of flat tubes 5110 for the heat exchanger 5163.

Figure 90:
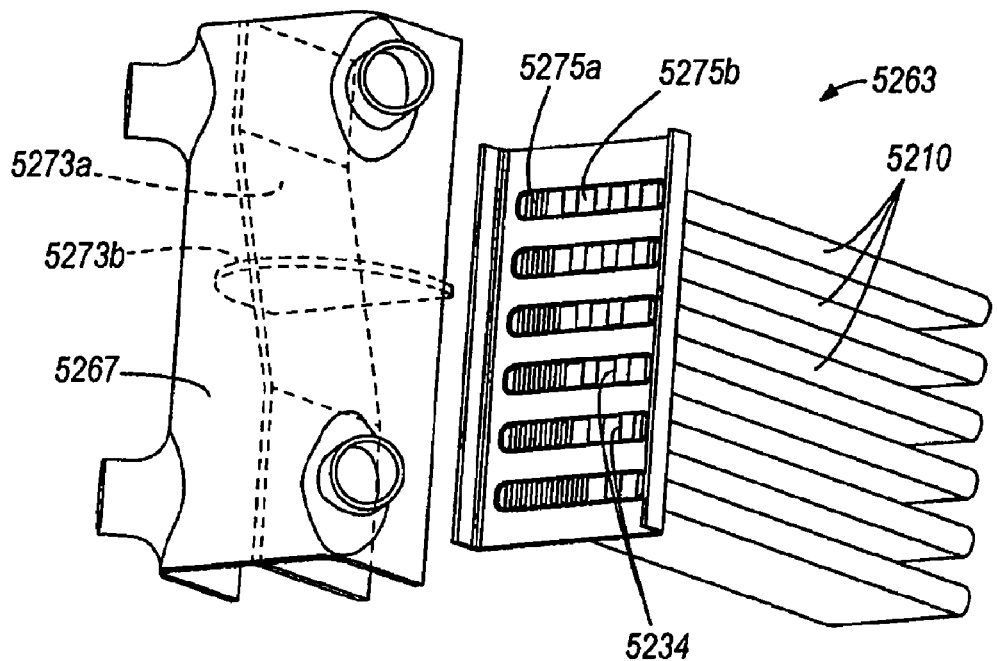
FIG. 90 is an exploded perspective view of a heat exchanger according to another embodiment of the present invention.

FIG. 90 illustrates a heat exchanger according to yet another embodiment of the present invention, utilizing flat tubes 5210 similar to that of FIG. 53. In this particular embodiment, the relative sizes of the interior regions 5275a, 5275b varies between the flat tubes 5210 of the heat exchanger 5263. In some embodiments (including the illustrated embodiment of FIG. 90, for example), the relative sizes of the interior regions 5275a, 5275b varies gradually from flat tube 5210 to flat tube 5210 across at least a portion of the heat exchanger 5263. Accordingly, a collection tank 5267 secured to the flat tubes 5210 can have a dividing wall 5273a extending obliquely with respect to the ends of the flat tubes 5210. The position of this dividing wall 5273a can correspond to the changing size of the interior regions 5275a, 5275b in the flat tubes 5210. If desired, one or more additional dividing walls (e.g., dividing wall 5273b shown in FIG. 90) can be included in the collection tank 5267 to provide further separations of flow through the heat exchanger 5263 as desired.

Figure 91:
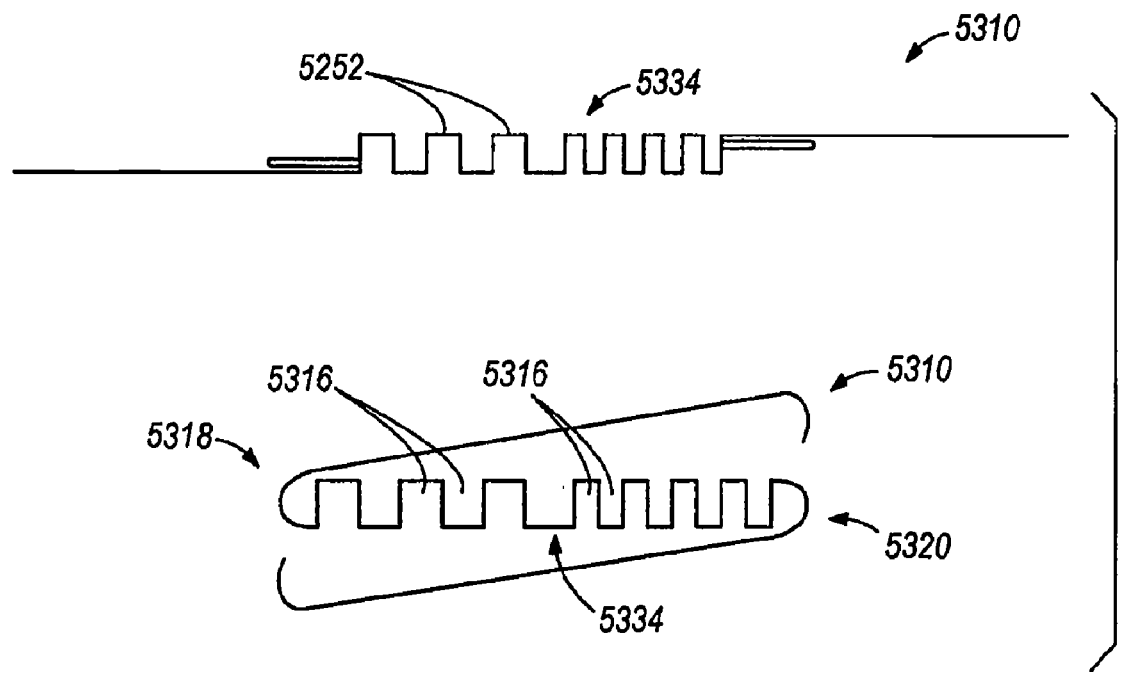
FIG. 91 are views of a flat tube according to another embodiment of the present invention, shown in different stages of formation.

An example of a one-piece flat tube 5310 that can be utilized in any of the heat exchanger embodiments described above is shown in FIG. 91 by way of example. The one-piece flat tube 5310 in FIG. 91 is substantially the same as that shown in FIG. 54 described earlier, with the exception of insert corrugations 5252 that are substantially rectangular in the embodiment of FIG. 91 (as opposed to the substantially triangular corrugations 4352 in the embodiment of FIG. 54), and with the exception of flow channels 4316, 5316 having the same size in FIG. 54, and having different sizes in FIG. 91. Accordingly, reference is hereby made to the description accompanying FIG. 54 for more information regarding the flat tube embodiment illustrated in FIG. 91.

The flat tubes 4310, 5310 in FIGS. 54 and 91 can be produced from a single sheet of material, and can be used in place of any of the flat tubes in the embodiments described above in connection with FIGS. 85-90. It should also be noted that any of the other one-piece and two-piece flat tubes disclosed herein can be used in place of any of the flat tubes in the embodiments described above in connection with FIGS. 85-90. The narrow sides 4318, 4320, 5318, 53210 of both flat tubes 4310, 5310 illustrated in FIGS. 54 and 91 include a double thickness of the sheet of material used to form the flat tube 4310, 5310. The sheet of material can be folded twice in the two areas of the sheet of material that will be bent to form the narrow sides 4318, 4320, 5318, 5320 of the flat tube 4310, 5310 (i.e., the areas adjacent and flanking that portion of the sheet of material shaped to define the integral insert 4334, 5334), thereby increasing the thickness of the narrow areas by three times that of the original material thickness. Furthermore, each longitudinal edge of the sheet of material can be bent and moved to encompass a respective reinforced section in the manner shown in FIGS. 54 and 91. Both of these reinforced sections can be provided with a gradation 4358, 4360 (not visible in FIG. 91, but visible in FIG. 54) for receiving the corresponding longitudinal edges in a recessed manner. In order to further reinforce the narrow sides 4318, 4320, 5318, 5320 of the flat tube 4310, 5310, additional folds can be incorporated into the reinforced sections shown in FIGS. 54 and 91. In the flat tube 5310 illustrated in FIG. 91, two groups of flow channels 5316 are defined, each having a size that is different from those of the other group. In contrast, all the flow channels 4316 in the illustrated embodiment of FIG. 54 are substantially the same in size.

FIGS. 19-23 show a number of different flat tubes that can be produced from a single sheet of material. Like the other one-piece flat tubes illustrated herein, each of the embodiments shown in FIGS. 19-23 are especially suitable for the heat exchangers 4963, 5063, 5163, 5263 discussed in connection with FIGS. 85-90. In particular, the flat tubes described above in connection with FIGS. 19-23 include narrow sides that are reinforced by the provision of vertical or horizontal folds. Additionally, FIG. 46 illustrates a flat tube 3710 that can be produced from a single piece of sheet material, with an insert 3734 that can be produced from another separate sheet of material. This particular flat tube 3710 can also serve as a replacement for any of the flat tubes 4910, 5010, 5110, 5210 described above with respect to FIGS. 85-90. As described in greater detail above, in the embodiment of FIG. 46, one reinforced narrow side 3718 is formed by bending a portion of the sheet of material having additional folds. The other reinforced narrow side 3720 is formed by one longitudinal edge of the sheet of material encompassing the opposite longitudinal edge of the same sheet of material. This other narrow side 3720 can also be distinguished by the fact that either or both longitudinal edges of the sheet of material can be folded for further reinforcement. The second sheet of material can be provided with a number of corrugations as described above, and can also be provided with bends or folds at either or both longitudinal edges 3738, 3740 for further interior reinforcement of either or both narrow sides 3718, 3720.

FIGS. 92-95 illustrate exemplary heat exchanger structures and methods for connecting sheets of material to form a heat exchanger or a portion of a heat exchanger (e.g., a heat exchanger core, a portion of a heat exchanger core, a tube insert, heat exchanger tubes, the ribs or fins of a heat exchanger, the header of a heat exchanger, and the like). For example, in the illustrated embodiments of FIGS. 93-95, fins 8313 are brazed to a heat exchanger tube 8310. In these illustrated embodiments, the heat exchanger tubes 8310 are formed from a generally planar first sheet of material 8317, and the fins 8313 are formed from a second sheet of material 8333 having a corrugated shape. In other embodiments, the sheets of material being brazed are different portions of the same sheet of material. Also, in other embodiments and as explained in greater detail below, the heat exchanger tubes 8310 and/or the fins 8313 can have different shapes.

Although the methods described herein are with reference to the production of particular heat exchanger embodiments described in this patent application, such is by way of example only. Accordingly, it is to be understood that the processes described with reference to FIGS. 92-95 can be applied for the manufacture of all heat exchangers and portions of heat exchangers described in this application.

As explained above, the relatively small sheet material thickness of the heat exchanger tubes 8310 and/or the fins 8313 in some embodiments of the present invention can provide significant advantages relating to the overall performance of the heat exchanger, manufacturability, and possible wall constructions (as disclosed herein) that are not possible using thicker wall materials. Also, by utilizing one or more of the flat tube features described herein, the inventors have discovered that a number of different flat tubes having various characteristics adapted for a variety of applications can be constructed using significantly reduced material while retaining strength and heat exchange properties of heavier conventional flat tubes. Moreover, while reference is made herein to flat heat exchanger tubes, the present invention can also or alternatively be applied to heat exchanger tubes having different cross-sectional shapes including without limitation round, rectangular, triangular, or other polygonal shapes, irregular shapes, and the like.

In some embodiments, the heat exchanger tubes 8310, the heat exchanger fins 8313, and/or other portions of a heat exchanger can be formed from sheets of material having the same or substantially the same thickness. Alternatively, in other embodiments, two or more portions of the heat exchanger can be formed from sheets of material having different thicknesses. In some of these other embodiments, the heat exchanger tubes 8310 can be formed from sheets of material 8317 having a first thickness, and the heat exchanger fins 8313 can be arranged between adjacent tubes 8310 and can be formed from sheets of material 8333 having a different thickness. In such embodiments, a first portion of the heat exchanger (e.g., a header) can be formed from sheets of material having a first thickness, a second portion of the heat exchanger (e.g., at least one of the tubes) can be formed from sheets of material having a second thickness, and a third portion of the heat exchanger (e.g., the fins 8333) can be formed from sheets of material having a third thickness.

For example, in some embodiments of the present invention, a flat tube 8310 can be formed from sheets of material 8317 having a thickness of no greater than about 0.20 mm (0.007874 in). However, in other embodiments and as mentioned above, the inventors have discovered that heat exchanger tubes formed from sheets of material having a thickness of no greater than about 0.15 mm (0.0059055 in) provides significant advantages relating to the overall performance of flat tubes and heat exchangers made from such material, manufacturability, and possible wall constructions (as disclosed herein) that are not possible using thicker wall materials. Alternatively or in addition, the fins 8313 can be formed from sheets of material 8333 having a thickness of no greater than about 0.20 mm (0.007874 in). In other embodiments, the fins 8313 can be formed from sheets of material 8333 having a thickness of no greater than about 0.15 mm (0.0059055 in). In still other embodiments, the fins 8313 can be formed from sheets of material 8333 having a thickness in the range of approximately 0.03-0.15 mm (0.0011811-0.0059055 in) or slightly higher. In yet other embodiments, heat exchanger fins 8313 can be formed from sheets of material 8333 having a thickness of no greater than about 0.03-0.09 mm (0.0011811-0.0035433 in).

Figure 92:
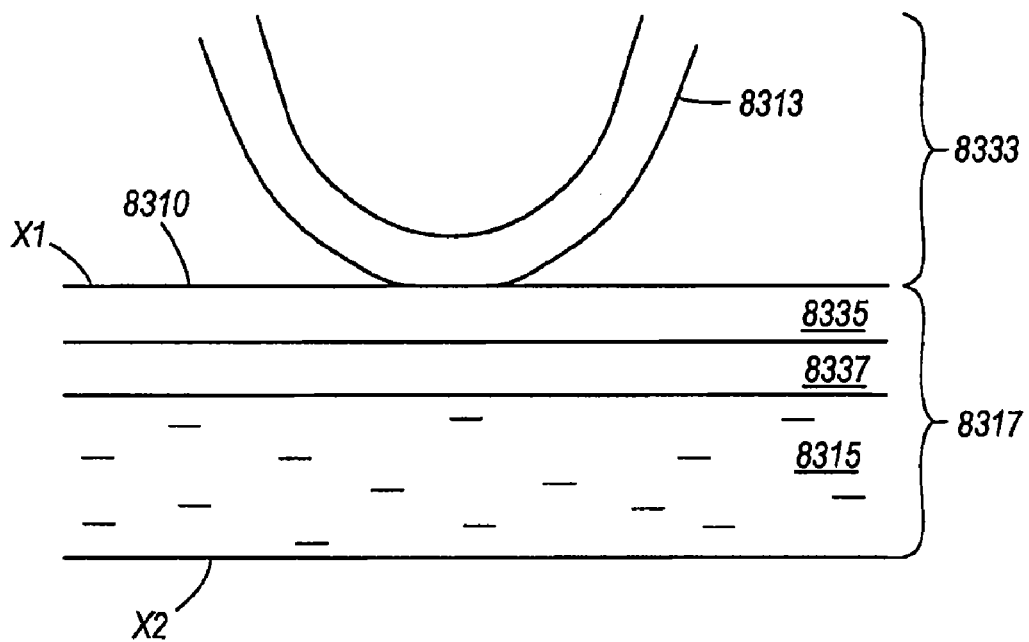
FIGS. 92-95 illustrate methods of connecting portions of a heat exchanger according to some embodiments of the present invention.
Figure 93:
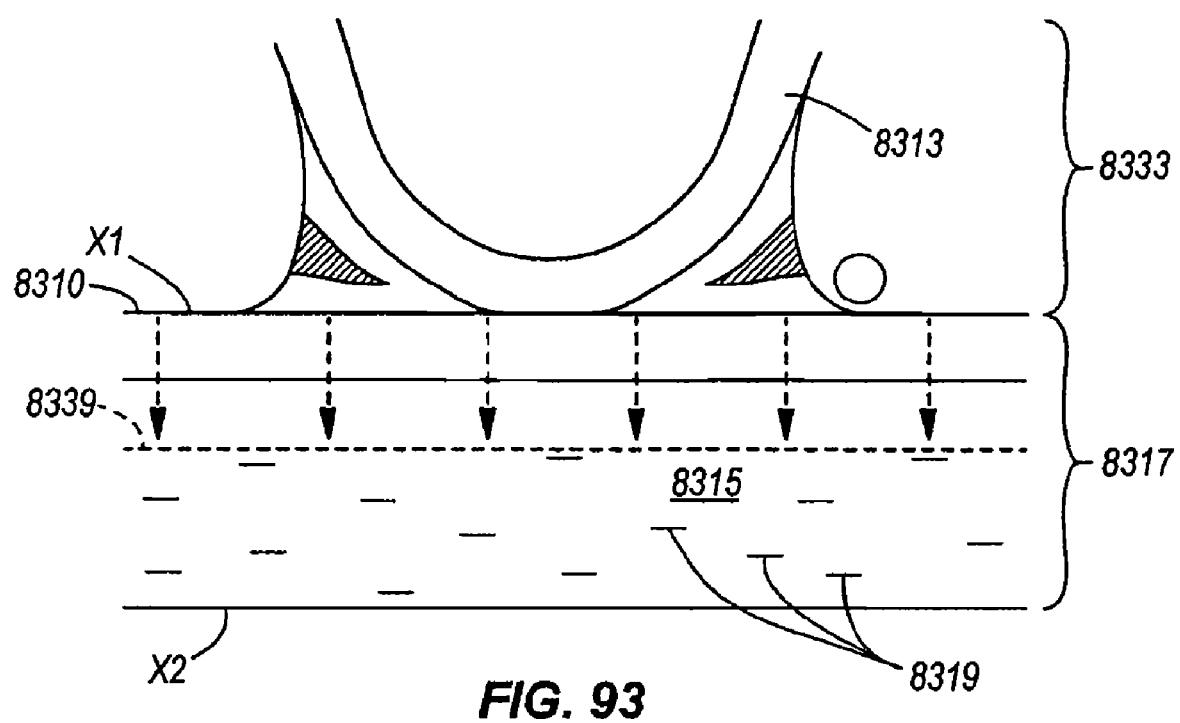
Figure 94:
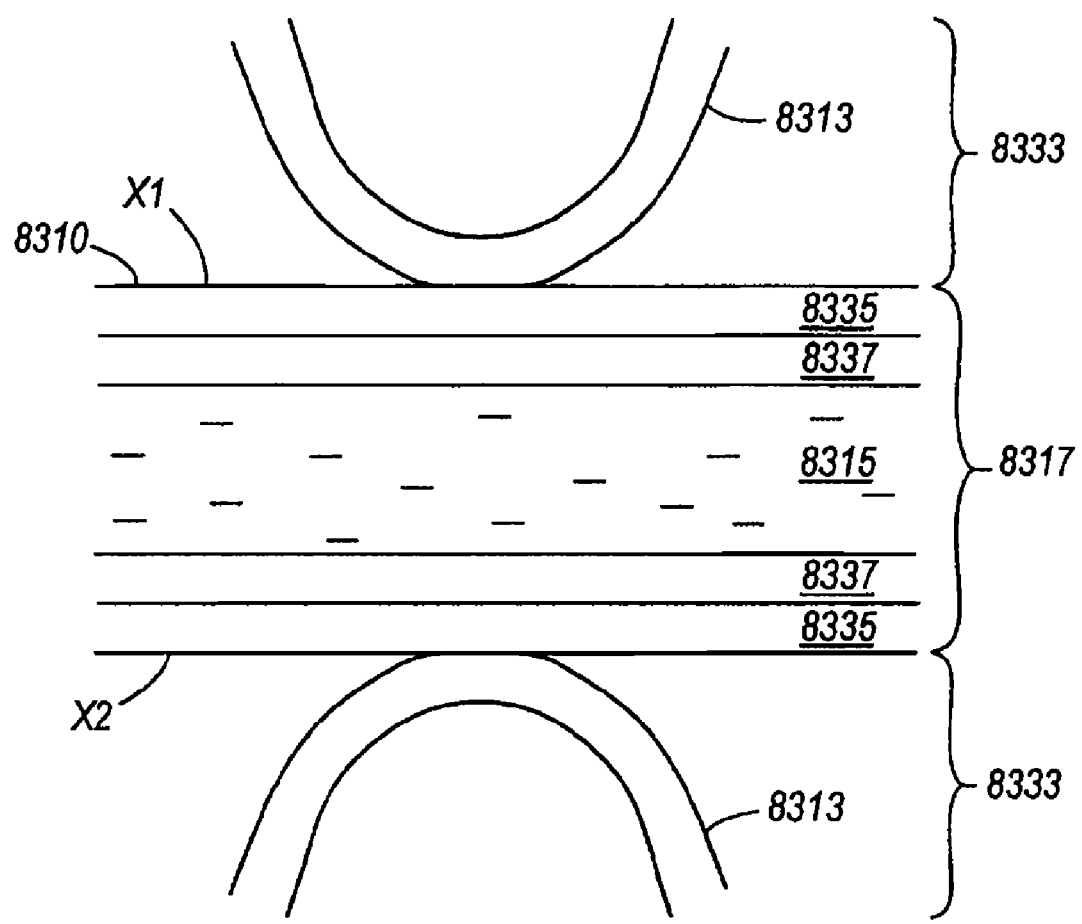
Figure 95:
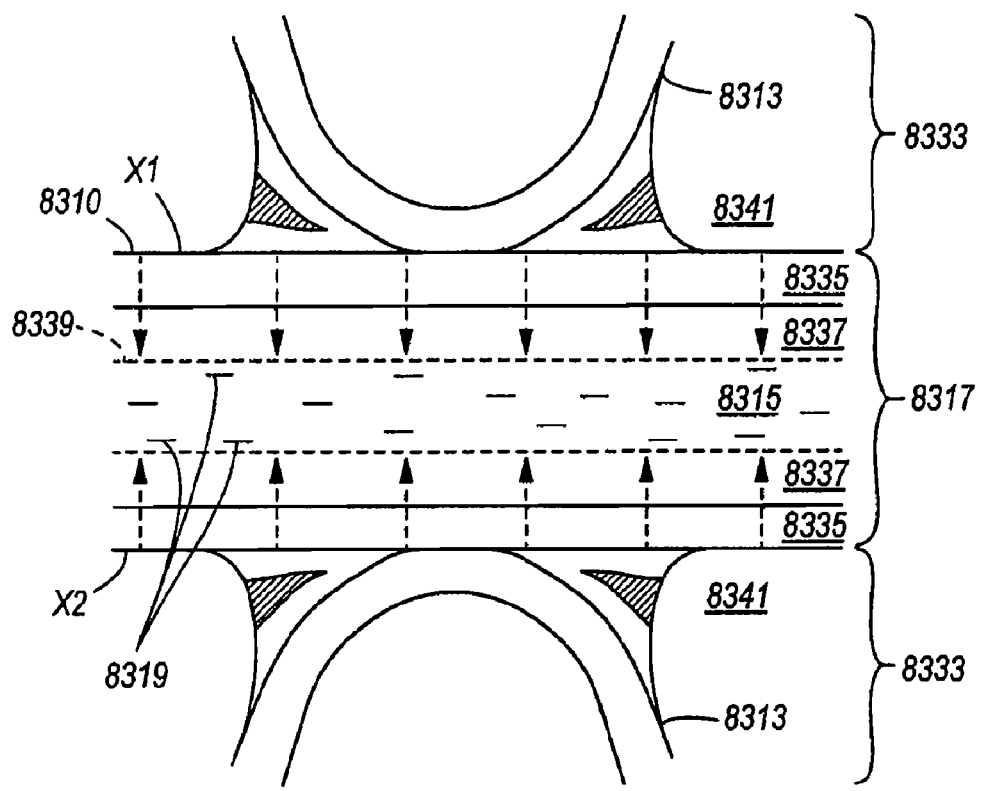

As shown in FIGS. 92-95, a first sheet of material 8317 manufactured according to some embodiments of the present invention can include a braze layer 8335 providing at least a portion of an outer surface X1 of the first sheet of material 8317, an inner sacrificial layer or corrosion protection layer 8337 disposed under the braze layer 8335 or a portion of the braze layer 8335, and a core 8315 disposed under the sacrificial layer 8337 (shown as a single layer in FIGS. 92 and 94, and as having two or more layers in FIGS. 93 and 95). As used herein and in the appended claims, terms such as "under", "beneath", "over", and "above" are used only for ease of description, and do not alone indicate or imply that the structure referred to must have any particular orientation taken alone or employed in any structure.

The core 8315 in the illustrated embodiments of FIGS. 92-95 comprise an aluminum alloy by way of example. The aluminum alloy can have suitable amounts of one or more other materials, such as manganese, magnesium, titanium, copper, and the like, used to increase the strength and/or corrosion resistance of the core 8315, or for changing one or more other characteristics of the core 8315 as desired.

In some embodiments, the core 8315 is changed to produce a layer 8339 (sometimes referred to herein as a sub-layer of the core 8315) having one or more different properties than the rest of the core 8315. For example, by diffusing silicon within an upper portion of the core 8315 at an elevated temperature, such as during a brazing process, the structure and/or composition of the aluminum alloy in the upper portion can change to define the layer 8339 in which the silicon diffused (see FIG. 93, which illustrates such a process performed on the structure of FIG. 92). In some embodiments, this change can occur by the production of intermetallic compounds comprising the silicon, such as a silicon-manganese aluminum intermetallic compound. In so doing, one or more components of the aluminum alloy in the layer 8339 (e.g., manganese, by way of example only) can accumulate while the sheet of material 8317 is heated sufficiently to permit such accumulation, resulting in a modified layer 8339 of the core 8315 in which intermetallic compound has accumulated in locations throughout the modified layer 8339. In some embodiments, the silicon can facilitate this accumulation, such as by drawing one or more of the alloy components out of solid solution, or facilitating this accumulation in other manner.

The thickness of the modified layer 8339 can be dependent upon the temperature at which the above-referenced diffusion occurs and the time permitted for such diffusion to occur (e.g., the duration of a brazing cycle). In some embodiments, the modified layer 8339 is anodic with respect to the rest of the core 8315. For example, in those embodiments in which manganese has been drawn out of solid solution and has accumulated as an intermetallic as a result of silicon diffusion into the core 8315, the resulting modified layer 8339 can be anodic with respect to the rest of the core 8315.

With continued reference to the embodiments of FIGS. 91-95, and as described above, the illustrated sheet of material 8317 includes one or more sacrificial layers 8337 (one in FIGS. 92 and 93, and two in FIGS. 94 and 95). Each sacrificial layer 8337 can include a metal material, and can be a relatively pure or unalloyed metal material. In some embodiments, the sacrificial layer 8337 comprises an aluminum alloy through which silicon diffuses at a slower rate than that though the underlying core material 8315, and has a corrosion potential as described herein. For example, in some embodiments, the sacrificial layer 8337 comprises an aluminum alloy through which silicon diffuses at no more than 50% of the rate at which silicon diffuses though the underlying core material 8315. In other embodiments, the sacrificial layer 8337 comprises an aluminum alloy through which silicon diffuses at no more than 70% of the rate at which silicon diffuses though the underlying core material 8315. In this regard, the sacrificial layer 8337 can have trace amounts of one or more additional materials (e.g., iron, copper, zinc, manganese, magnesium, like metals, and combinations of such metals, by way of example). In some embodiments, the sacrificial layer 8337 has a corrosion potential that is substantially similar to the corrosion potential of the adjacent residual braze material of the braze layer 8335 following a brazing process. In this regard, it should be noted that following a brazing process, a residual amount of braze material can remain on any portion or all of the sheet of material 8317. Also in some embodiments, the material of the sacrificial layer 8337 is anodic to the material of the core 8315 (e.g., to the modified layer 8339 and/or to the rest of the core 8315).

In some embodiments, the braze layer 8335 comprises a aluminum-silicon alloy brazing material. In other embodiments, other brazing materials can also or alternatively be used, some of which comprise silicon. The braze layer 8335 can extend across substantially the entire outer surface of the sheet of material 8317, or can instead extend across less than the entire outer surface (e.g., across intended brazing locations only) of the sheet of material 8317. The braze layer 8335 can be part of the sheet of material 8317 to be used in a brazing operation, or can be deposited upon and/or formed by a portion of the sheet of material 8317 during the brazing process. In either case, the residual brazing material of the braze layer 8335 following a brazing process can be anodic to the material of the sacrificial layer 8337.

Any of the layers and/or sub layers of the sheet of material 8317 described herein and/or illustrated in FIGS. 92-95 can be secured together by roll bonding. By way of example only, the sub-layer 8339 of the core 8315 described above can be produced by roll bonding a layer of material having the sub-layer properties described above onto another layer of material to produce the core 8317 illustrated in FIG. 93.

As will now be explained, sheets of material 8317 formed according to the present invention can reduce and/or prevent corrosion (such as pitting corrosion, by way of example). In some embodiments, one or more of the layers and sub layers of the sheet of material 8317 (e.g., the braze layer 8335, the sacrificial layer 8337, the sub layer 8339, and/or the rest of the core 8315) can be formed from a material or alloyed with a material such that it is anodic to one or more of the underlying layers or sub layers of the sheet of material 8317. For example, in some embodiments, each of the layers and sub layers of the sheet of material 8317 (i.e., residual braze material of the braze layer 8335 following a brazing process, the sacrificial layer 8337, the sub layer 8339, and/or the rest of the core 8315) can be formed from a material or alloyed with a material such that it is anodic to an underlying layer or sub layer and is cathodic to an adjacent overlying layer or sub layer after brazing.

In some embodiments, one or more layers and sub layers of the sheet of material 8317 (i.e., the braze layer 8335, the sacrificial layer 8337, the sub layer 8339, and/or the rest of the core 8315) is formed from a material or alloyed with a material such that there is a difference of at least about 30 millivolts between one or more of the underlying layers or sub layers. For example, in some embodiments, each of the layers and sub layers of the sheet of material 8317 (e.g., the braze layer 8335, the sacrificial layer 8337, the sub layer 8339, and/or the rest of the core 8315) can be formed from a material or alloyed with a material such that there is a difference of at least about 30 millivolts between each adjacent layer, or between layers or sub-layers separated from one another.

As mentioned above, in some embodiments the core 8315 include titanium. In sufficient quantities, titanium can form dendrites during casting of the core 8315, resulting in layers of titanium-rich aluminum disbursed throughout the core 8315. Depending at least in part upon the manner in which the sheet of material defining the core 8315 is produced, the titanium-rich aluminum can be located primarily in the sacrificial layer 8337, primarily in the rest of the core 8315, or fully throughout the core 8315. In some embodiments, the titanium-rich aluminum can form sub-layers in the core 8315, and can serve as another measure of resistance to core material corrosion. Such sub-layers can also be cathodic to adjacent portions of the core 8315 for further corrosion resistance.

In those embodiments in which titanium-rich aluminum is formed in sub-layers of the core material as just described, the titanium-rich aluminum can help increase corrosion resistance by forcing corrosion to propagate in directions parallel or substantially parallel to the core 8315, or in directions parallel or substantially parallel to the titanium-rich aluminum sub-layers, thereby helping to slow or reduce pitting corrosion. In some embodiments, the material of the core 8315 comprises about 0.05-0.30 wt-% titanium. In other embodiments, a core layer 8315 having about 0.10-0.25 wt-% of titanium provides good strength and corrosion resistance performance. However, in many embodiments, a sheet of material 8317 having a core 8315 with a core layer 8315 having a titanium content of approximately 0.20 wt-% or slightly higher provides improved overall performance.

In some embodiments, the sheet of material 8317 has a thickness of no greater than about 0.15 mm (it being noted that any of the relatively thin tube wall and insert material thicknesses disclosed herein can be used). For example, the sheet of material in the illustrated embodiment of FIGS. 92 and 93 has a thickness of approximately 100 μm (3.937 mil). As described above, some embodiments of the present invention have a modified core sub-layer 8339 that can be produced by diffusion of silicon therein. The silicon can diffuse from the sacrificial layer 8337 or from the brazing material 8335 into the core 8315 in such embodiments. Such diffusion can take place during a brazing process. In light of the fact that the rate of diffusion into the core 8315 can at least partially determine the resulting depth of the modified core sub-layer 8339, control of such diffusion is possible by the sacrificial layer 8337. In this regard, the sacrificial layer 8337 can function to impede (but not stop) such silicon diffusion, and can comprise a material (e.g., an aluminum alloy more resistant to silicon diffusion and having the corrosion potential as described above) in which silicon diffuses at a slower rate than the material of the core 8315. By utilizing such a sacrificial layer 8337, silicon diffusion can be limited to a depth of 50 μm (1.969 mil) while still permitting sufficient brazing time at a sufficiently high brazing temperature to braze the fin 8313 to the sheet of material 8317. In some embodiments, the manufacturing process described herein can prevent or significantly reduce diffusion beyond a depth of 30 μm (1.181 mil).

In embodiments in which two or more portions of the heat exchanger are secured together, a second portion of the heat exchanger (e.g., the fins 8313) can also or alternatively include a braze layer formed on or applied to an outer surface, an inner sacrificial layer disposed under the braze layer or a portion of the braze layer, and a core disposed under the sacrificial layer. Alternatively or in addition, a core of the sheet of material used for forming the second portion of the heat exchanger (e.g., the fins 8313) can include an outer portion or layer of modified core material as described above. Moreover, each of the layers and sub layers of the sheets of material used for forming the second portion of the heat exchanger (e.g., the fins 8313) can be anodic to one or more underlying layers or sub layers. In some such embodiments, each of the layers and sub layers of the sheets of material 8333 used for forming the second portion of the heat exchanger (e.g., the fins 8313) is formed from a material or alloyed with a material such that there is a difference of at least about 30 millivolts between each adjacent layer of the second portion of the heat exchanger.

In some embodiments in which two or more portions of the heat exchanger are secured together, a first portion of the heat exchanger can be formed from a sheet of material having an outer portion or layer which is substantially anodic to an outer layer or portion of a second portion of the heat exchanger. For example, as shown in FIGS. 92-95, in some such embodiments, an outer portion or layer of the fin 8313 can be formed from a sheet of material 8333 which is anodic to a sheet of material 8317 used to form the heat exchanger tube 8310.

Alternatively or in addition, the outer portion or layer of the fin 8313 can be formed from a sheet of material 8333 which is anodic to a residual alpha-phase layer 8341 formed from the brazing material between the outer surfaces of the heat exchanger tube 8310 and the fin 8313. In some such embodiments, the residual alpha-phase layer 8341 is anodic to the sacrificial layer 8337 of the sheet of material 8317 forming the heat exchanger tube 8310.

In some embodiments of the present invention, first and second portions of a heat exchanger can be connected to opposite sides of a third portion of the heat exchanger. For example, in the illustrated embodiment of FIGS. 94 and 95, a heat exchanger tube 8310 having first and second outer surfaces X1, X2 is formed from a first sheet of material 8317. As shown in FIGS. 94 and 95, each side of the sheet of material 8317 can include a braze layer 8335 providing at least a portion of the outer surfaces X1, X2 of the first sheet of material 8317, an inner sacrificial layer or corrosion protection layer 8337 disposed under the braze layer 8335 or a portion of the braze layer 8335, and a core 8315 disposed between the sacrificial layers 8337. In some embodiments, the both outer sides of the core 8315 can include a sub layer 8339 of modified core material.

The inventors have found that corrosion protection for heat exchangers or portions of heat exchangers with relatively small wall thicknesses (e.g., wall thicknesses of less than about 0.20 mm (0.007874 in)) can be improved if the brazing time (i.e., the time when the heat exchanger or the portion of the heat exchanger being brazed passes through the brazing furnace) is reduced. The inventors have determined that a reduction of approximately 10% in brazing time shows desired results and can provide, among other advantages, good strength and corrosion resistance. Furthermore, results can be improved if the brazing time is further reduced by approximately one half.

Figure 96:
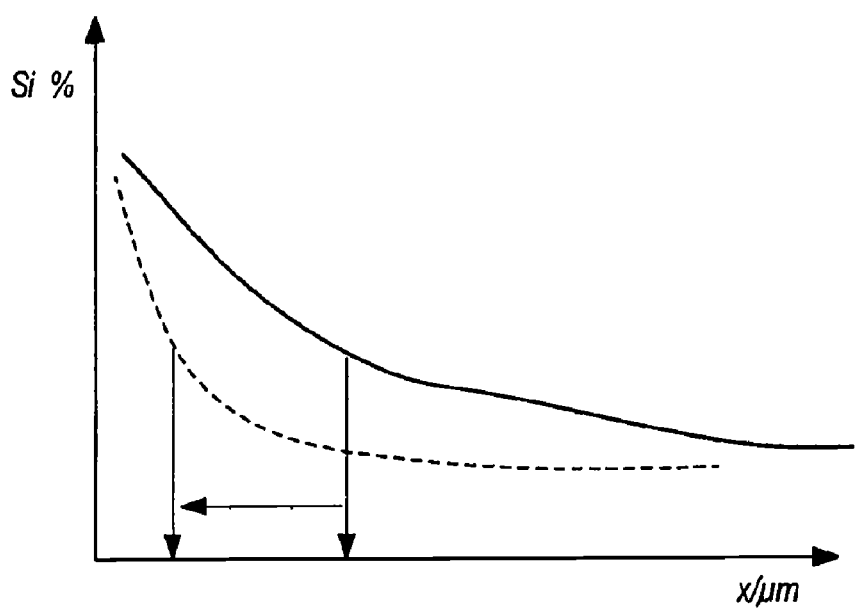
FIG. 96 is a graph showing silicon diffusion depths for heat exchangers connected according to some embodiments of the present invention.

More particularly, the inventors have found that increasing the brazing speed can reduce the diffusion of silicon from the braze layer 8335 into the underlying layers or sub layers of the sheet of material 8317. The diffusion of silicon is illustrated in FIGS. 93 and 95 with dashed arrows. The diffusion depth of the silicon can be less than about 50 μm (1.969 mil), or in some embodiments, can be significantly less. FIG. 96 graphically illustrates this relationship. The dashed curve in FIG. 96 represents the progression of the diffusion of the silicon, while the solid curve represents the progression of the diffusion in accordance with conventional materials and brazing techniques.

In some embodiments of the present invention, heat exchangers or portions of heat exchangers being brazed are placed on a conveyor or a similar transport device, which passes through different temperature zones of a CAB brazing furnace. In some such embodiments, the temperature of the brazing furnace can be in the range of approximately 577-610° C. (1070-1130° F.).

The optimal brazing time for a specific heat exchanger or for a specific portion of a heat exchanger depends, at least in part, upon the total mass of the heat exchanger or the portion of the heat exchanger being brazed, the temper condition of the sheets of material being brazed, the thickness of the sheets of material being brazed, and the composition of the sheets of material being brazed. For example, in some embodiments, the transport speed for brazing heat exchangers or portions of heat exchangers with wall thicknesses of 0.20 mm (0.007874 in) or more in a CAB brazing furnace is approximately 0.5-1.5 m/min (19.69-59.055 in/min).

Before brazing a heat exchanger or portion of a heat exchanger, the inventors have found that material samples having material properties substantially similar or identical to the heat exchanger or the portion of the heat exchanger being brazed can be used to experimentally determine an optimal temperature profile for the specific material of the heat exchanger or portion of the heat exchanger being brazed. The inventors have also found that by determining an optimal temperature profile, it is possible to increase the transport speed of the heat exchanger or the portion of the heat exchanger being brazed to about 1.5-4.0 m/min (4.92-13.12 ft/min), thereby reducing the brazing time.

In some embodiments, non-corrosive flux can be applied to the outer surface X1 of one or both aluminum sheets of material 8317, 8333 prior to brazing. In some embodiments, it may not be necessary to apply flux material to the outer surface X1 of one or both sheets of material 8317, 8333 to achieve high quality brazed connections. Moreover, in some embodiments, including embodiments in which flux material is not applied to the surfaces of the sheets of material 8317, 8333 prior to brazing, the inventors have determined that high quality internal brazing connections can be created in a controlled atmosphere by adding one or more alloys, such as, for example, magnesium and/or lithium to the sheets of material 8317, 8333.

Various features and advantages of the invention are set forth in the following claims.

What is claimed is:

1. A heat exchanger tube comprising:
a first sheet of material and a second sheet of material each having a thickness less than 0.15 mm and together at least partially forming a tube body, the first and second sheets of material being braze clad and at least partially defining an interior space, first and second opposing broad sides of the tube body, and first and second opposing narrow sides of the tube body joining the first and second opposing broad sides; and
a third sheet of material forming an insert supported in the interior space of the tube body between the first sheet of material and the second sheet of material.

2. The heat exchanger tube of claim 1, wherein the first and second narrow sides are defined at least in part by overlapping portions of the first and second sheets of material, wherein the overlapped portions of the first and second sheets of material extending to and terminating at locations within at least one of the broad sides of the tube body between the first and second narrow sides of the tube body.

3. The heat exchanger tube of claim 2, wherein the overlapping portions of the first and second sheets of material at the first narrow side extend to and terminate at a location in a substantially planar portion of the first broad side of the tube body.

4. The heat exchanger tube of claim 3, wherein the overlapping portions of the first and second sheets of material at the second narrow side extend to and terminate at another location in a substantially planar portion of the second broad side of the tube body.

5. The heat exchanger tube of claim 3, wherein the overlapping portions of the first and second sheets of material at the second narrow side extend to and terminate at another location in a substantially planar portion of the first broad side of the tube body.

6. The heat exchanger tube of claim 1, wherein:
each of the first and second narrow sides has a concave shape facing the interior space of the tube body; and
first and second portions of the insert are received within and reinforce the concave shape of the first and second narrow sides of the tube body, respectively.

7. The heat exchanger tube of claim 1, wherein:
each of the first and second narrow sides has a concave shape facing the interior space of the tube body; and
first and second portions of the insert are nested within the concave shape of the first and second narrow sides of the tube body, respectively.

8. The heat exchanger tube of claim 1, wherein a portion of the first sheet of material defines a recess, and wherein an end of the second sheet of material is at least partially nested in the recess such that an exterior surface of the first sheet of material adjacent the recess is substantially flush with an exterior surface of the second sheet of material in the recess.

9. The heat exchanger tube of claim 8, wherein the recess extends into one of the first and second opposing broad sides of the tube body.

10. The heat exchanger tube of claim 1, wherein:
each of the first and second narrow sides has a concave shape facing the interior space of the tube body; and
a portion of the insert is received within the concave shape of one of the first and second narrow sides of the tube body, and is folded such that a first layer and a second layer of the insert are substantially parallel to at least one of the first and second broad sides of the tube body.

11. The heat exchanger tube of claim 1, wherein the first sheet of material and the second sheet of material are substantially symmetrical.

12. The heat exchanger tube of claim 1, wherein the first sheet of material and the second sheet of material are substantially identical.

13. The heat exchanger tube of claim 1, wherein the thickness of each of the first sheet of material and the second sheet of material is no greater than about 0.10 mm.

14. The heat exchanger tube of claim 1, wherein at least one of the first and second sheets of material has a first layer comprising an aluminum alloy, a second layer comprising an aluminum alloy having accumulations of an intermetallic compound including silicon, and a third layer comprising a metal material that is anodic with respect to the second layer and that is more resistant to the diffusion of silicon than the second layer, the second layer located between the first and third layers.

15. A method of forming a heat exchanger tube, the method comprising:
shaping a first braze-clad sheet of material having a thickness less than 0.15 mm to form at least a braze-clad portion of each of a first broad side, a first narrow side, and a second narrow side of a tube body, wherein the first and second narrow sides are opposite one another;
shaping a second braze-clad sheet of material having a thickness less than 0.15 mm to form at least a braze-clad portion of each of a second broad side, the first narrow side, and the second narrow side of the tube body, wherein the first and second broad sides of the tube body are opposite one another and are joined by the first and second narrow sides of the tube body; and
shaping a third sheet of material to form an insert supported in an interior space of the tube body between the first sheet of material and the second sheet of material.

16. The method of claim 15, further comprising overlapping the first and second sheets of material at the first and second narrow sides to double the thickness of the tube body across at least a portion of the first and second narrow sides.

17. The method of claim 15, further comprising receiving ends of the insert within concave portions of the first and second narrow sides of the tube body.

18. The method of claim 15, further comprising nesting the ends of the insert within the concave portions of the first and second narrow sides of the tube body.

19. The method of claim 15, wherein the thickness of the first and second sheets of material is no greater than about 0.10 mm.

20. The method of claim 15, wherein the first and second sheets of material each have a first layer comprising an aluminum alloy, a second layer comprising an aluminum alloy having accumulations of an intermetallic compound including silicon, and a third layer comprising a metal material that is anodic with respect to the second layer and that is more resistant to the diffusion of silicon than the second layer, the second layer located between the first and third layers.

21. The method of claim 15, wherein shaping the first sheet of material includes shaping an edge of the first sheet of material to terminate in the first broad side of the tube body.

22. The method of claim 15, further comprising receiving an edge of the first sheet of material into a recess in an exterior of the second sheet of material.

23. The method of claim 15, wherein the first and second sheets of material are shaped to be substantially identical.

24. The method of claim 15, wherein the first and second sheets of material are shaped to be substantially symmetrical.

* * * * *